(12) United States Patent
Kurani et al.

(10) Patent No.: US 12,244,583 B1
(45) Date of Patent: Mar. 4, 2025

(54) SYSTEMS AND METHODS FOR PROVIDING ACCESS RIGHTS OF AN ENTERPRISE ACCOUNT TO AN ENTERPRISE RESOURCE

(71) Applicant: Wells Fargo Bank, N.A., San Francisco, CA (US)

(72) Inventors: Ashish B. Kurani, Hillsborough, CA (US); Ranganathan Kanchi, Danville, CA (US); Dinesh Arora, San Francisco, CA (US); Greg J. Hansen, San Francisco, CA (US); Imran Haider, San Ramon, CA (US); Jesse Owens, San Francisco, CA (US); Kiran Rapolu, San Francisco, CA (US); Udaya Isampalli, San Francisco, CA (US); James Christopher Noe, Charlotte, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/090,959

(22) Filed: Dec. 29, 2022

Related U.S. Application Data

(60) Provisional application No. 63/295,037, filed on Dec. 30, 2021.

(51) Int. Cl.
*H04L 9/40* (2022.01)

(52) U.S. Cl.
CPC .......... *H04L 63/083* (2013.01); *H04L 63/102* (2013.01); *H04L 63/105* (2013.01)

(58) Field of Classification Search
CPC .... H04L 63/083; H04L 63/102; H04L 63/105
See application file for complete search history.

(56) References Cited

U.S. PATENT DOCUMENTS 11,496,483 B1 * 11/2022 Babani ................ G06F 21/6218
2021/0081947 A1 * 3/2021 Hockey ............... H04L 63/0838

* cited by examiner

*Primary Examiner* — Huan V Doan
(74) *Attorney, Agent, or Firm* — Foley & Lardner LLP

(57) ABSTRACT

Systems and methods for providing access rights may include a first computing system that receives a request to link an enterprise account of the first computing system to a second computing system. The first computing system may authenticate a user, receive a selection of one or more access rights, and one or more accounts of the enterprise account, via an application interface of the second computing system, and generate an access token for transmission to a computing device of the user, where the access token identifies the one or more access rights and the one or more accounts. The first computing system may transmit the access token to the computing device, to provide the computing device access to the one or more accounts according to the one or more access rights, of the first computing system, via the second computing system.

20 Claims, 53 Drawing Sheets

RECEIVABLES FINANCING (KAP) EPIC

USE CASE #6 A

AS A SUPPLIER, I SEE AN INSTITUTION FINANCED INVOICE THAT IS DUE AND NEEDS REPAYMENT AND WOULD LIKE TO ASSOCIATE MY REMITTANCE WITHIN ERP APPLICATION.

PRECONDITION
SUPPLIER USING ERP APPLICATION AND HAS A REPAYMENT OF INSTITUTION FINANCED CREDIT THAT IS DUE. THEY HAVE PERFORMED USE CASE #4 & #5 AND A SET NUMBER OF DAYS (90) HAVE PASSED, AND THEY HAVE FORWARDED THEIR PAYMENT TO ICS FOR PROCESSING.

ACCEPTANCE CRITERIA
1. PAYMENT REMITTANCE TO INSTITUTION WITH THE FOLLOWING DETAIL -
   - UNIQUE INVOICE ID, INVOICE AMT, MATURITY DATE, CUSTOMER CODE, CURRENCY, SUPPLIER INVOICE NUMBER, CHECK NUMBER
2. INFORMATION IS INACCURATE, AN APPROPRIATE ERROR MESSAGE IS PROVIDED TO SUPPLIER
3. IF VERIFICATION IS CONFIRMED, THEN SEND ACKNOWLEDGMENT OF PAYMENT TO SUPPLIER

**SUPPLIER/BUYER START THE PROCESS TO INITIATE A PAYMENT AT ERP APPLICATION CALLS VIA PAYMENT ADVICE API AT IBAAS AND REGISTER WITH 'WEB HOOK'
1. IBAAS INVOKES PMGR API TO PROCESS THE PAYMENT, PMGR API WILL GET BACK TO IBAAS IF THE PAYMENT INITIATION IS SUCCESSFUL OR NOT, IBAAS WILL RESPOND BACK TO ERP APPLICATION WITH RESPONSE VIA THE 'WEB HOOK'
2. IBAAS WILL CALL ACCOUNTING SYSTEM OF RECORD TO NOTIFY A PAYMENT HAS BEEN SUCCESSFULLY INITIATED.

SELLER SENDS PAYMENT ADVICE TO ICS VIA PAYMENT ADVICE API

FIG. 25

| ENTERPRISE APPLICATION | | | | |
|---|---|---|---|---|
| INSTITUTION PAGE - PAYMENT SUMMARY | | | | |
| SEND DATE | PAYMENT NUMBER | STATUS | ACCOUNT NO. | TYPE | AMOUNT |
| 1/12/2021 | 5832037 | PENDING | 1111111111 | CHECK | 234.27 USD |
| 1/13/2021 | 8474937 | APPROVED | 2222222222 | CREDIT TRANS. | 581.43 USD |
| 1/14/2021 | 7456381 | PENDING | 2222222222 | CREDIT TRANS. | 2,395.35 EUR |
| 1/15/2021 | 5857393 | APPROVED | NNNNNNNNNN | AFT | 51,20,9.28 USD |

MAKE PAYMENTS 4504   RETURN 4506

FIG. 45

SYSTEMS AND METHODS FOR PROVIDING ACCESS RIGHTS OF AN ENTERPRISE ACCOUNT TO AN ENTERPRISE RESOURCE

CROSS-REFERENCE TO RELATED PATENT APPLICATIONS

This application claims the benefit of and priority to U.S. Appl. No. 63/295,037, filed Dec. 30, 2021, the contents of each of which are incorporated herein by reference in their entirety.

TECHNICAL FIELD

The present disclosure relates to systems and methods for facilitating communications between computing devices, including but not limited to systems and methods for providing access rights of an enterprise account to an enterprise resource.

BACKGROUND

Businesses often use various software platforms to manage their business processes, interactions with customers, and overall day-to-day operations. For example, businesses often use an enterprise resource planning (ERP) platform to manage main business processes (e.g., finance, human resources, etc.), a customer relationship management (CRM) platform to manage the business's interactions with existing and potential customers, and third-party platforms for other day-to-day operations (e.g. financial, banking, etc.). Although businesses move between these software platforms many times a day, these platforms are often fragmented and difficult to move between easily. As such businesses are often forced to increase time, decrease efficiency, and increase overall cost in moving between these platforms in order to manage the business.

SUMMARY

Various embodiments relating to systems, methods, and computer readable media for embedding financial insights may include a first computing system that may receive a request to link an enterprise account of the first computing system to a second computing system, the request including log-in credentials for a user associated with the enterprise account and received via an application interface of the second computing system from a computing device of the user. The first computing system may authenticate the user based on the log-in credentials from the request matching log-in credentials associated with the enterprise account. The first computing system may receive a selection of one or more access rights, and one or more accounts of the enterprise account, via the application interface of the second computing device. The first computing system may generate an access token for transmission to the computing device, the access token identifying the one or more access rights and the one or more accounts. The first computing system may transmit the access token to the computing device, to provide the computing device access to the one or more accounts according to the one or more access rights, of the first computing system, via the second computing system.

In some embodiments, the first computing system may receive a second request for data of the enterprise account from the second computing system, the second request including the access token. The first computing system may validate the access token based on the access token of the second request matching the access token associated with the enterprise account. The first computing system may transmit the data of the enterprise account to the second computing system responsive to validating the access token. In some embodiments, the first computing system may determine that the second request originates from a permitted user having at least one access right of the one or more access rights identified by the access token. The first computing system may transmit the data of the enterprise account responsive to validating the access token and determining that the second request originates from the permitted user.

In some embodiments, the access token is a primary access token. The first computing system may receive a secondary access token from the second computing system, the secondary access token granted to a second user associated with the enterprise account and having access rights defined under the primary access token. The first computing system may transmit data of the enterprise account to the second computing system according to the secondary access token. In some embodiments, the first computing system may determine one or more second users including the second user having a title associated with the one or more access rights of the primary access token. The first computing system may transmit identifiers associated with the one or more second users including the second user, to recommend granting respective secondary access tokens to the one or more secondary users.

In some embodiments, the one or more access rights grant the second computing system access to a first account of the one or more accounts and blocks access to a second account of the one or more accounts. In some embodiments, the one or more access rights grant the second computing system access to first data of a first type of an account of the one or more accounts. In some embodiments, the one or more access rights deny the second computing system access to second data of a second type of the account. In some embodiments, the application interface comprises a plug-in application for the first application, accessed by the computing device through the second application.

In some embodiments, the first computing system may generate an authentication code responsive to receiving the selection of the one or more access rights. The first computing system may transmit the authentication code to the application interface executing on the computing device. The first computing system may receive a request for an access token from the application interface, the request including the authentication code. In some embodiments, the first computing system may generate the access token responsive to the authentication code included in the request matching the authentication code generated and transmitted to the application interface. In some embodiments, the first computing system may receive, from a second computing device, a request to identify the one or more access rights identified in the access token, the request including the access token, a client identifier of the second computing device and a secret associated with the access token. The first computing system may determine that the second computing device is associated with the first computing device based on the client identifier of the second computing device. The first computing system may generate a message for transmission to the second computing device, the message including data corresponding to a payload of the access token determined using the secret associated with the access token, the payload identifying the access rights identified in the access token. In some embodiments, the payload further includes an identifier associated with a user of the first computing device which provided the selection of the one or more access rights and the one or more accounts.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 25 is a diagram showing a use case for repayment of a financed invoice by a supplier, according to an exemplary embodiment.

FIG. 45 is user interface displayed on a device executing an enterprise application which includes a payment summary page, according to an exemplary embodiment.

DETAILED DESCRIPTION

Figure 1:
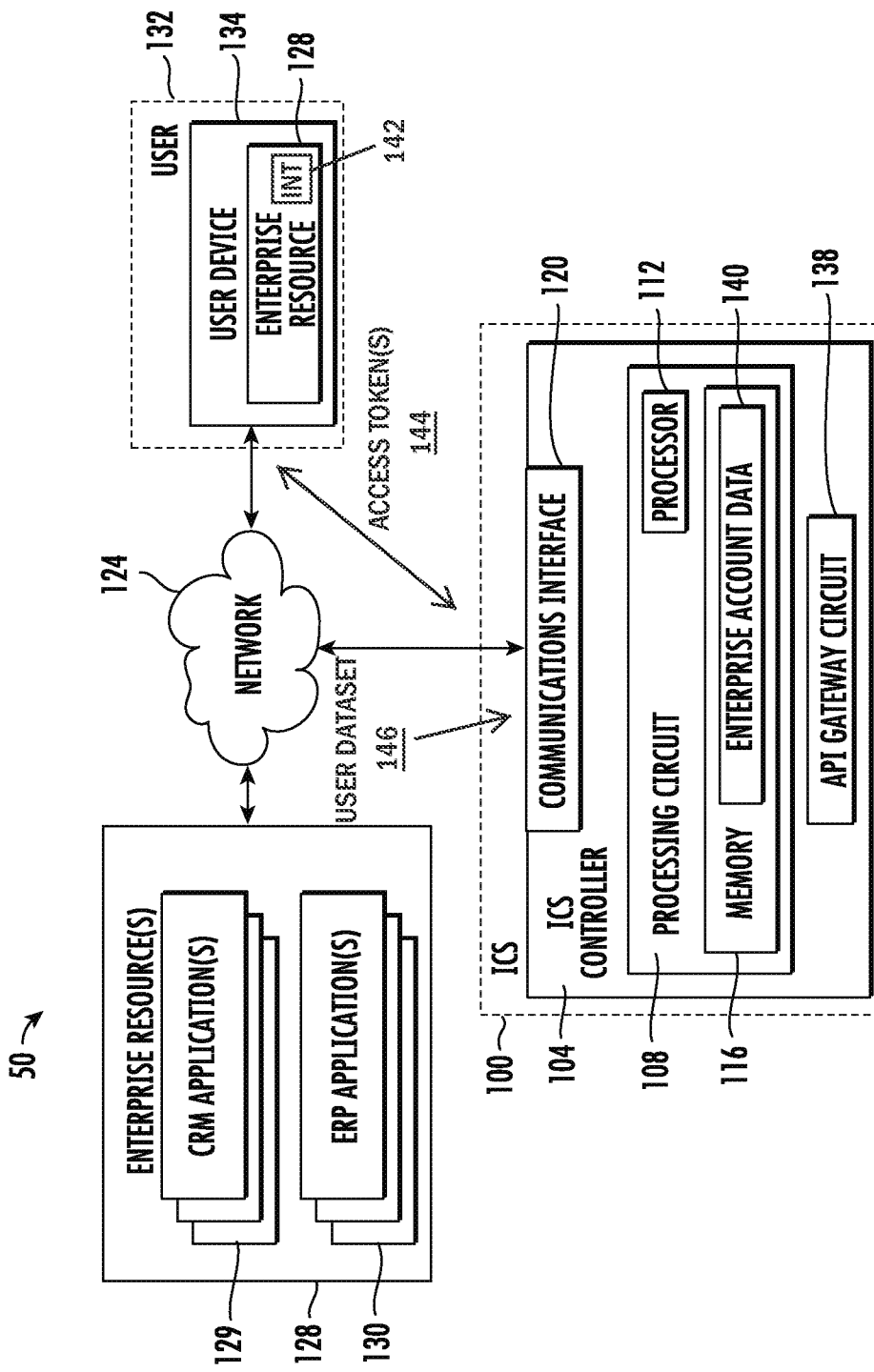
FIG. 1 is a schematic diagram of a computing system, according to an exemplary embodiment.

Following below are more detailed descriptions of various concepts related to, and implementations of, systems and methods for delivering content (such as content relating to products or services offered via an institution) using an institution computing system (ICS) to an enterprise resource, such as an enterprise resource planning (ERP) application or customer relationship management (CRM) application. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In various implementations, an enterprise may maintain various applications and resources which are used in day-to-day operations. For example, an enterprise may maintain, use, or otherwise access various enterprise resources. Such resources may be or include customer relationship management (CRM) applications (e.g., for establishing leads on new customers, assisting in converting a lead to a sale, planning delivery, and so forth), enterprise resource planning (ERP) applications, such as human resources (HR) or payroll applications, marketing applications, customer service applications, operations/project/supply chain management applications, commerce design applications, and the like. Each of these applications may be maintained as part of suite or platform of applications which are accessible by various users associated with the enterprise. The enterprise resources may be locally-hosted applications or resources (e.g., executing on various computing devices of the enterprise), or cloud-hosted or web-based applications or resources provisioned to the enterprise computing devices and systems by one or more third parties. For example, the enterprise resources may be or include a software suite or platform including a plurality of enterprise resources which are accessible by enterprise computing devices or systems.

Such enterprise resources may be limited in their capabilities to interface with, exchange data with, or otherwise interoperate with other applications or resources of an enterprise. For example, an ERP application (or CRM application) may not be configured to exchange, transmit, receive, or otherwise access data associated with financial accounts associated with the enterprise. As such, enterprise members (or enterprise users) may be required to access multiple applications (e.g., several ERP applications, CRM applications, financial institution applications, etc.) in performing day-to-day operations for the enterprise. Such implementations result in bogged-down user experiences, decreased efficiency, and so forth.

According to an exemplary embodiment, an institution computing system (ICS) is provided that facilitates connections and communications between enterprise resources (e.g., remotely hosted and/or locally executing applications) and an institution through a network of application programming interfaces (APIs). The ICS may include any number of APIs which are configured to facilitate communications and exchange of content and data with enterprise resources. The ICS is configured to provide content and data from the institution corresponding to the enterprise to various enterprise resources, such that a user device accessing an ERP application/CRM application (e.g., installed and/or executing locally on the user device, or hosted on one or more servers and accessed via the user device) may also receive and display real-time data and content from the ICS. With this in mind, an enterprise resource may send various API calls to the ICS, requesting the ICS to communicate content and data (e.g., content and data relating to the institution's products and/or services) in real-time. In various embodiments, the ICS provides various APIs that facilitate real-time interaction between the ICS and enterprise resources.

According to the examples and embodiments described herein, the ICS is configured to standardize and integrate communications between the institution (i.e., the institution's products or services) and the external systems (i.e., the various platforms or resources an enterprise may use or access, such as the ERP applications, CRM applications, or other locally-executing/remotely-executing enterprise resources described herein). The systems and methods described herein may be used by an enterprise to perform various functions related to the institution within an enterprise resource. For instance, the systems and methods described herein may verify and track account balances, view account analytics, and other institution-related transactions and functions, all within various enterprise resources.

Additionally, the systems and methods described herein may leverage data from the enterprise resources. For example, upon an enterprise establishing or otherwise enrolling with one or more enterprise resources (e.g., a CRM application), a user or administrator may provide various information corresponding to the enterprise as part of the enrollment with the enterprise resource (e.g., enterprise name, management information, principle place of business, tax information, etc.). Such information may be maintained by the enterprise resource (e.g., at one or more servers or memory corresponding to the enterprise resource, which may be maintained by a service-provider of the enterprise resource). According to the systems and methods described herein, a user of the enterprise resource may establish or open an account for an enterprise, apply for a loan instrument, or perform other functions seamlessly within an enterprise resource. Upon selecting an option within the enterprise resource, the enterprise resource may transmit such information relating to the enterprise along with a request to open an account, apply for a loan instrument, etc. Such implementations and embodiments provide for a simple and seamless user experience by leveraging data from an enterprise resource.

In some embodiments, the systems and methods described herein may provide recommendations to a user/financial institution/third party relating to a financial state of the user (or entity associated with the user). For example, the systems and methods descried herein may leverage enterprise resource data of an entity for determining a predicted financial state of the entity. The enterprise resource data may include ERP data, CRM data, financial institution data, publicly available data, etc., which is associated with the entity. The systems and methods described herein may receive such data via various APIs, accessing various databases, and so forth. The systems and methods described herein may determine the predicted financial state of the entity using trained machine learning models. Such machine learning models may be trained using historic data of customers/entities, and may generate or determine predicted financial states of customers based on given inputs (i.e., given enterprise resource data). The machine learning models may be configured to generate recommendations. For example, the machine learning models may be configured to generate recommendation which optimize a financial state of the customer (i.e., to apply for a loan using collateral determined from an ERP application, to invest in particular short term opportunities when assets and predicted accounts receivable are greater than accounts payable, and so forth). In some embodiments, the recommendations may be used by the customer, by an account manager (i.e., an employee or analyst with the institution who is assigned to provide recommendations to the customer), or a third party. For example, the third party may be a loan underwriter who may use the recommendation and/or predicted financial state to make an underwriting decision (i.e., the recommendation and/or predicted financial state may be an input to another model for making an underwriting decision). Various other examples and embodiments are described in greater detail below.

Referring now to FIG. 1, a schematic diagram of a computing system 50 is shown, according to an exemplary embodiment. Computing system 50 is shown to include an institution computing system (ICS) 100, which includes an ICS controller 104. The ICS controller 104 includes a processing circuit 108, having a processor 112 and a memory 116. The ICS controller 104 may also include, and the processing circuit 108 may be communicably coupled to, a communications interface 120 such that the processing circuit 108 may send and receive content and data via the communications interface 120. As such, the ICS controller 104 may be structured to communicate via one or more networks 124 with other devices and/or applications. The computing system 50 is shown to include enterprise resources 128 including a plurality of CRM applications 129 and a plurality of ERP applications 130, and a user device 134 accessing an enterprise resource 128 (which may be one of the enterprise resources 128). In some embodiments, the ICS controller 104, the enterprise resources 128, and the user device 134 may be communicably coupled and configured to exchange data over the network 124, which may include one or more of the Internet, cellular network, Wi-Fi, Wi-Max, a proprietary banking network, a proprietary retail or service provider network, or other type of wired or wireless network. The ICS controller 104 may be configured to transmit, receive, exchange, or otherwise provide data to one or more of the enterprise resources 128. The ICS controller 104 is shown to include an application programming interface (API) gateway circuit 138. The API gateway circuit 138 may be configured to facilitate the transmission, receipt, and/or exchange of data between the ICS controller 104 and the enterprise resources 128.

Referring to FIG. 1 generally, the ICS controller 104 is associated with (e.g., owned, managed, and/or operated by) the institution computing system (ICS) 100. In the example depicted, the ICS 100 is a computing system configured to maintain data or content relating to one or more one or more enterprises (e.g., enterprise account data 140). According to the embodiments described herein, the ICS 100 may be configured to transmit existing enterprise account data 140 to one or more enterprise resources 128. For example, the ICS 100 may be configured to provide various content and data relating to different institution accounts, such as general ledger accounts, lending, money transfers, issuing credit or debit, etc. Thus, the ICS controller 104 is structured or configured to maintain and provide, or otherwise facilitate providing, the content and data (e.g., the enterprise account data 140) to devices and/or applications associated with internal or external users (e.g., users having an account with the institution corresponding to the ICS 100, users seeking to establish an account with the institution, etc.). In some embodiments, the ICS controller 104 is structured or configured control access to the enterprise account data 140 (e.g., by authenticating an enterprise resource 128 or a user of the enterprise resource 128).

In some embodiments, the ICS controller 104 may be implemented within a single computer (e.g., one server, one housing, etc.). In other embodiments, the ICS controller 104 may be distributed across multiple servers or computers, such as a group of two or more computing devices/servers, a distributed computing network, a cloud computing network, and/or any other type of computing system capable of accessing and communicating via local and/or global networks (e.g., the network 124). Further, while FIG. 1 shows applications outside of the ICS controller 104 (e.g., the network 124, the enterprise resources 128, etc.), in some embodiments, one or more of the enterprise resources 128 may be hosted within the ICS controller 104 (e.g., within the memory 116).

As shown in FIG. 1, the ICS controller 104 is shown to include the processing circuit 108, including the processor 112 and the memory 116. The processing circuit 108 may be structured or configured to execute or implement the instructions, commands, and/or control processes described herein with respect to the processor 112 and/or the memory 116. FIG. 1 shows a configuration that represents an arrangement where the processor 112 is embodied in a machine or computer readable media, as described below. However, FIG. 1 is not meant to be limiting as the present disclosure contemplates other embodiments, such as where the processor 112, or at least one circuit of processing circuit 108 (or ICS controller 104), is configured as a hardware unit. All such combinations and variations are intended to fall within the scope of the present disclosure.

The processing circuit 108 is shown to include the processor 112. The processor 112 may be implemented or performed with a general purpose single- or multi-chip processor, a digital signal processor (DSP), an application specific integrated circuit (ASIC), one or more field programmable gate array (FPGAs), or other suitable electronic processing components. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the circuits of the processor 112 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The processing circuit 108 is also shown to include the memory 116. The memory 116 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 116 may be or include tangible, non-transient volatile memory or non-volatile memory. The memory 116 may also include database components, object code components, script components, or any other type of information structure for supporting the activities and information structures described in the present application. According to an exemplary embodiment, the memory 116 is communicably connected to the processor 112 via the processing circuit 108 and includes computer code for executing (e.g., by the processing circuit 108 and/or the processor 112) one or more processes described herein.

As shown in FIG. 1, the ICS controller 104 is also shown to include an application programming interface (API) gateway circuit 138. In some embodiments, the external devices (e.g., CRM application(s) 129 or ERP application(s) 130 of the enterprise resources 128, user device 134 having enterprise resource 128, etc.) may include API protocols that are used to establish an API session between the ICS controller 104 and the external devices. In this regard, the API protocols and/or sessions may allow the ICS 100 to communicate content and data (e.g., associated with the institution's products and/or services) to be displayed directly within the external devices (e.g., CRM application(s) 129, ERP application(s) 130, user device 134, etc.). For example, the external device may activate an API protocol (e.g., via an API call), which may be communicated to the ICS controller 104 via the network 124 and the communications interface 120. The API gateway circuit 138 may receive the API call from the ICS controller 104, and the API gateway circuit 138 may process and respond to the API call by providing API response data. The API response data may be communicated to the external device via the ICS controller 104, communications interface 120 and the network 124. The external device may then access (e.g., display) the API response data (e.g., associated with the ICS 100 product and/or service) on the external device.

As such, the API gateway circuit 138 is structured to initiate, receive, process, and/or respond to API calls (e.g., via the ICS controller 104 and the communications interface 120) over the network 124. That is, the API gateway circuit 138 may be configured to facilitate the communication and exchange of content and data between the external devices (e.g., CRM applications 129, ERP applications 130, user device 134, etc.) and the ICS controller 104. Accordingly, to process various API calls, the API gateway circuit 138 may receive, process, and respond to API calls using other circuits, as discussed below. Additionally, the API gateway circuit 138 may be structured to receive communications (e.g., API calls, API response data, etc.) from other circuits. That is, other circuits may communicate content and data to the ICS controller 104 via the API gateway circuit 138. Therefore, the API gateway circuit 138 is communicatively coupled other circuits of the ICS controller 104, either tangibly via hardware, or indirectly via software.

Still referring to FIG. 1, the computing system 50 may further include a plurality of enterprise resources 128. The enterprise resources 128 may be or include various systems or applications which are provided to an enterprise (e.g., by one or more service providers of the enterprise resource(s) 128). The enterprise resources 128 may be configured to facilitate management of resources corresponding to various entities in various industries. The enterprise resources 128 is shown to include a plurality of customer relationship management (CRM) applications 129. The CRM applications 129 may be or include applications for establishing leads on new customers, assisting in converting a lead to a sale, planning delivery, and so forth. The enterprise resources 128 is shown to include a plurality of ERP applications 130. The ERP applications 130 may include human resources (HR) or payroll applications, marketing applications, customer service applications, operations/project/supply chain management applications, commerce design applications, and the like.

The enterprise resources 128 may be implemented on or otherwise hosted on a computing system, such as a discrete server, a group of two or more computing devices/servers, a distributed computing network, a cloud computing network, and/or another type of computing system capable of accessing and communicating using local and/or global networks (e.g., the network 124). Such computing system hosting the enterprise resources 128 may be maintained by a service provider corresponding to the enterprise resource(s) 128. The enterprise resources 128 may be accessible by various computing devices or user devices associated with an enterprise responsive to enrollment of the enterprise with the enterprise resources 128. The CRM applications 129 and/or the ERP applications 130 may include software and/or hardware capable of implementing a network-based or web-based applications (e.g., closed-source and/or open-source software like HTML, XML, WML, SGML, PHP, CGI, Dexterity, TypeScript, Node, etc.). Such software and/or hardware may be updated, revised, or otherwise maintained by resource or service providers of the enterprise resources 128. The CRM and ERP application(s) 129, 130 may be accessible by a representative(s) of a small or large business entity, any customer of the institution, and/or any registered (or unregistered) user of the products and/or service provided by one or more components of the computing system 50. As such, the enterprise resources 128 (including the CRM application(s) 129 and/or the ERP application(s) 130) may be or include a platform (or software suite) provided by one or more service providers which is accessible by an enterprise having an existing account with the ICS 100. In some instances, the enterprise resources 128 may be accessible by an enterprise which does not have an existing account with the ICS 100, but may open or otherwise establish an account with the ICS 100 using a CRM application 129 and/or an ERP application 130 of the enterprise resources 128, as described in greater detail below.

The enterprise resources 128 may be configured to establish connections with other systems in the computing system 50 (e.g., the ICS 100, the user device 134, etc.) via the network 124. Accordingly, the CRM application(s) 129 and/or ERP application(s) 130 of the enterprise resources 128 may be configured to transmit and/or receive content and data to and/or from the ICS controller 104 (e.g., via the communications interface 120) over the network 124. For example, and as described in greater detail below, an ERP application 130 (or CRM application 129) may activate an API protocol (e.g., via an API call) associated with the ICS 100 (e.g., to open an account, to request or apply for a loan instrument, to verify or determine an account balance, etc.). The API call may be communicated to the ICS controller 104 via the network 124 and the communications interface 120. The ICS controller 104 (e.g., the API gateway circuit 138) may receive, process, and respond to the API call by providing API response data. The API response data may be communicated to the ERP application 130 (or CRM application 129) via the communications interface 120 and the network 124, and the ERP application 130 (or CRM application 129) may access (e.g., analyze, display, review, etc.) the content and data received from the ICS 100.

In an exemplary embodiment, the enterprise resources 128 may be configured to include an interface that displays the content and data communicated from the ICS controller 104. For example, the enterprise resources 128 may include a graphical user interface, a mobile user interface, or any other suitable interface that may display the content and data (e.g., associated with products and services of the ICS 100) to the enterprise resources 128. In this regard, enterprise resources 128, and entities associated with the enterprise resources 128 (e.g., customers, employees, shareholders, policy holders, etc.), may access, view, analyze, etc. the content and data transmitted by the ICS controller 104 remotely using the enterprise resources 128.

Still referring to FIG. 1, the computing system 50 may further include a user device 134 associated e.g., owned by, used by, etc. with a user 132. The user device 134 may be or include a mobile phone, a tablet, a laptop, a desktop computer, an IoT-enabled device (e.g., an IoT-enabled smart car), a wearable device, a virtual/augmented reality (VR/AR) device, and/or other suitable user computing devices capable of accessing and communicating using local and/or global networks (e.g., the network 124). Wearable computing devices may refer to types of devices that an individual wears, including, but not limited to, a watch (e.g., a smart watch), glasses (e.g., eye glasses, sunglasses, smart glasses, etc.), bracelet (e.g., a smart bracelet), etc. In an exemplary embodiment, the user 132 may be a customer or client of the ICS 100 associated with the ICS controller 104 (e.g., a user having access to one or more accounts of another entity, such as a business or enterprise, another individual, etc.).

The user device 134 may be configured to establish connections with other systems in the computing system 50 (e.g., ICS 100, enterprise resources 128, etc.) via the network 124. Accordingly, the user device 134 may be able to transmit and/or receive content and data to and/or from the ICS controller 104 (e.g., via the communications interface 120) over the network 124. In some embodiments, the user device 134 may be able to transmit and/or receive content and data to and/or from the enterprise resources 128 over the network 124. In an exemplary embodiment, the user device 134 may include software and/or hardware capable of accessing a network-based or web-based application. For example, in some instances, the user device 134 may include an application that includes (closed-source and/or open-source) software such as HTML, XML, WML, SGML, PHP (Hypertext Preprocessor), CGI, Dexterity, TypeScript, Node, etc.

As shown in FIG. 1, the user device 134 is also shown to access an enterprise resource 128, which may be or include one or more of the enterprise resources 128 described above (e.g., a CRM application 129, an ERP application 130). For example, a user of the enterprise resource 128 may provide log-in credentials associated with an enterprise, to access the corresponding enterprise resource 128. In some embodiments, the enterprise resource 128 may be a standalone application. In some embodiments, the enterprise resource 128 may be incorporated into one or more existing applications of the user device 134. The enterprise resource 128 may be downloaded by the user device 134 prior to its usage, hard coded in the user device 134, and/or be a network-based or web-based interface application. In this regard, the ICS controller 104 may provide content and data (e.g., relating to the ICS 100 products or services) to the enterprise resource 128 via the network 124, for displaying at the user device 134. The enterprise resource 128 may receive the content and data (e.g., directly from the ICS controller 104, or indirectly from the ICS controller 104), and the user device 134 may process and display the content and data remotely to the user through the enterprise resource 128 displayed at the user device 134.

In some embodiments, the user device 134 may prompt the user 132 to log onto or access a web-based interface before using the enterprise resource 128. Further, prior to use of the enterprise resource 128, and/or at various points throughout the use of the enterprise resource 128, the user device 134 may prompt the user 132 to provide various authentication information or log-in credentials (e.g., password, a personal identification number (PIN), a fingerprint scan, a retinal scan, a voice sample, a face scan, any other type of biometric security scan) to ensure that the user 132 associated with the user device 134 is authorized to use the enterprise resource 128 and/or access the data from the ICS corresponding to the enterprise.

In some embodiments, upon logging onto the enterprise resource 128, the enterprise resource 128 may be configured to display one or more application interfaces 142 for establishing a connection between, associating, or otherwise linking accounts of the enterprise resource 128 with an enterprise account managed by the ICS 100. In some embodiments, the interface 142 may include a plug-in application for accessing the ICS 100 through a third-party application (e.g., the enterprise resource 128). In some embodiments, the interface 142 may include a stand-alone application or page which, upon accessing a link provided via a user interface of the enterprise resource 128, launches a uniform resource locator (URL) corresponding to the application or page for accessing the ICS 100. Upon accessing the interface 142, a user interface corresponding to the ICS 100 may prompt, solicit, or otherwise request log-in credentials for the user 132, to establish the connection or link between the enterprise resource 128 and ICS 100. The user 132 may provide the log-in credentials (e.g., a username and password, a key, etc.) via the user interface for accessing the ICS 100. The ICS 100 may be configured to validate, confirm, or otherwise authenticate the user 132 based on the log-in credentials provided by the user 132 matching log-in credentials associated with an enterprise account (e.g., of the enterprise account data 140).

In an exemplary embodiment, the enterprise resource 128 is structured to provide displays on the user device 134, which provide content and data corresponding to the enterprise resource 128 to the user 132. As described in greater detail below, the enterprise resource 128 may be configured to display, render, or otherwise provide data from the ICS 100 (such as enterprise account data 140) to the user 132 via the user device 134. As such, the user device 134 may permit the user 132 to access the content and data of the ICS 100 that is maintained and distributed by the ICS controller 104 using the enterprise resource 128 (e.g., via the communications interface 120 and the network 124).

In some embodiments, responsive to establishing the link (e.g., via the interface 142), the ICS 100 may be configured to present (e.g., through the interface 142 of the enterprise resource 128 to the ICS 100) one or more user interfaces for establishing access rights to various enterprise accounts, and functions performable for the accounts. For example, the ICS 100 may be configured to present a list of enterprise accounts which are associated with or otherwise linked to the user 132 or enterprise of the user 132. The user 132 may select which of the accounts are to be accessible via the interface 142. For instance, the user 132 may select a first account which is accessible via the interface 142, and a second account which is inaccessible or blocked via the interface 142. Similarly, the ICS 100 may be configured to present a list of functions, tasks, or access rights which are permitted (or prohibited) using the enterprise resource 128 via the interface 142 on the selected accounts. Such access rights may include, for example, balance checks, transfers, payments, and various other functions which may be performed via the API gateway circuit 136 described in greater detail below. The user 132 may select various access rights which are enabled (or disabled) via the interface 142. The ICS 100 may be configured to use the selections (e.g., of the accounts and functions) for configuring an access token 144, as described in greater detail below.

The ICS 100 may be configured to establish, determine, define, or otherwise generate one or more access tokens 144 for providing to the user device 134, responsive to the user 132 configuring or otherwise defining the access rights and accessible accounts. In some embodiments, the ICS 100 may be configured to generate the access token 144 by configuring a public-private key for the access token 144. For example, the ICS 100 may be configured to configure a public key as the access token 144, by encoding the public key using a private key maintained by the ICS 100. The ICS 100 may be configured to encode the public key by encoding various information relating to the access rights and accessible accounts for the interface 128. In this regard, the access token 144 itself may contain, include, or otherwise incorporate the various accessible account information and access rights for such accounts. Such implementations may provide for more efficient determination of access rights as compared to performing a separate look-up using (for example) identifying data encoded in the access token 144 to determine such access rights. The ICS 100 may be configured to communicate, transmit, send, or otherwise provide the access token 144 to the user device 134.

In some embodiments, the ICS 100 may be configured to generate the access token 144 as a primary access token 144. The user device 134 may be configured to use the primary access token 144 to establish secondary access tokens 144 for provisioning to other user devices 134 associated with users 132 of the enterprise which are permitted access to the enterprise account data via the enterprise resource 128. For example, the user device 134 may be configured to duplicate the primary access token 144 to generate the secondary access tokens 144, encode additional access tokens 144 using an additional public-private key or other encryption mechanism, etc. The user device 134 may be configured to provide the secondary access tokens 144 to other user devices 134.

In some embodiments, the ICS 100 may be configured to generate, transmit, or otherwise provide secondary access tokens 144 to the user device 134. Additionally or alternatively, the ICS 100 may be configured to provide recommendations to the user devices 134 of users which may likely be granted secondary access tokens 144 by the user device 134. For example, the ICS 100 may be configured to retrieve, access, determine, identify, or otherwise receive a user dataset 146 from one or more enterprise resources 128. The user dataset 146 may include, for example, identifiers and titles of a plurality of users associated with an enterprise. For example, the user dataset 146 may include a corporate structure or hierarchy, an employee database (including job titles), or other user dataset 146 maintained by the ERP application 130 linked to an enterprise. While described as being maintained by an ERP application 130, in various embodiments, the ICS 100 may be configured to retrieve the user dataset 146 from various third-party data sources. In some embodiments, the ICS 100 may be configured to determine, identify, or otherwise select a subset of users from the user dataset 146 for providing recommendations and/or secondary access tokens 144. For example, the ICS 100 may be configured to parse the user dataset 146 to extract or otherwise determine titles for each of the respective users of the user dataset 146. The ICS 100 may be configured to apply a filter to the titles to identify the subset of users. The filter may include, for example, titles related to accounting, finance, or other titles which may be pertinent to users which may have or be granted access to enterprise account data 140. The ICS 100 may be configured to transmit, send, or otherwise provide secondary access tokens 144 and/or identifiers for the subset of users which may have or be granted secondary access tokens 144.

In an exemplary embodiment, an enterprise resource 128 accessed via the user device 134 may be configured to transmit, send, receive, communicate, or otherwise exchange data with the ICS 100. For example, an ERP application 130 (e.g., or CRM application 129) may have an option for viewing account information relating to accounts with the ICS 100. The user 132 of the user device 134 (e.g., a registered user having an account with the institution corresponding to the ICS 100) may select the option on the ERP application 130 to view the account information of the user 132 within the ERP application 130 (e.g., as part of or in addition to configuring the interface 142). The ERP application 130 may activate an API protocol (e.g., via an API call) to request the information from the ICS controller 104 corresponding to the account information. The ERP application 130 may communicate the API call to the ICS controller 104 via the network 124 and the communications interface 120. The API call may include or be linked to the access token 144 generated and transmitted by the ICS 100 to the user device 132. The ICS controller 104 (e.g., the API gateway circuit 138) may receive, process, and respond to the API call to provide API response data (e.g., responsive to validating the access token 144 corresponding to the API call). For example, responsive to the ERP application 130 (or ICS controller 104) authenticating the user 132 as described herein (e.g., using the access token 144), the ERP application 130 may transmit data corresponding to the user (e.g., a user identifier) with the API call to the ICS controller 104. The ICS controller 104 may perform a look-up function in an accounts database using the user identifier from the API call and the access rights encoded or encrypted in the access token 144, to generate the API response data including the enterprise account data 140. The API response data may be communicated to the ERP application 130 via the communications interface and the network 124. In some embodiments, the ERP application 130 may display the response data to the user 132 (e.g., via the ERP application(s) 130), such as the enterprise account data 140.

Similarly, the user device 134 may communicate with the ICS 100, via the network 124, requesting enterprise resource 128 data (e.g., data from a CRM application 129, data from an ERP application 130, etc.) to view on a page associated with the ICS 100. For example, the user device 134 may display a page or user interface corresponding to the ICS 100 which includes an option for viewing analytics on conversion of leads to sales from the CRM application 129. The user device 134 may receive a selection of the option, and initiate a request for the ICS 100 to request the customer information from the CRM application 129. The ICS 100 (e.g., the ICS controller 104 via the communications interface 120) may process the request from the user device 134 (e.g., as discussed above), and activate an API protocol (e.g., via an API call) associated with the request (i.e., and the CRM application 129, etc.). The API call may be communicated to the CRM application 129 via the network. The CRM application 129 may receive, process, and respond to the API call by providing API response data as described above. The API response data may be communicated to the ICS 100 (e.g., the ICS controller 104 via the network and the communications interface 120). In some embodiments, a webpage or website (or application) associated with the ICS 100 may display the CRM data received from the CRM application 129 along with ICS data (e.g., account data, balances, etc.).

Figure 2:
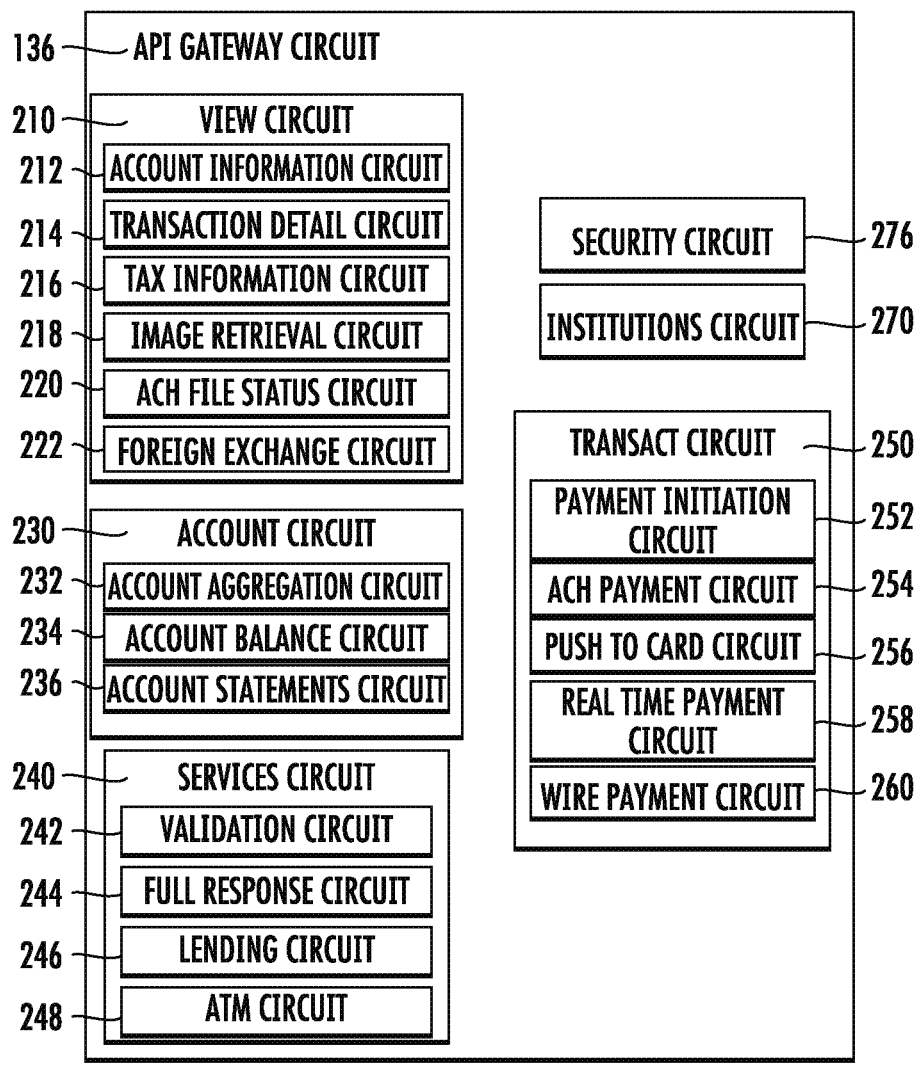
FIG. 2 is a schematic diagram of an application programming interface (API) gateway circuit of the computing system of FIG. 1, according to an exemplary embodiment.

Referring to FIG. 2, a schematic diagram of the API gateway circuit 138 of FIG. 1 is shown, according to an exemplary embodiment. As shown in FIG. 2, the API gateway circuit 138 may include a plurality of circuits. As some examples, the API gateway circuit 138 may include a view circuit 210, an account circuit 230, a services circuit 240, a transact circuit 250, an institutions circuit 270, and a security circuit 276. Each of the plurality of circuits (e.g., circuits 210-276) may also include a plurality of sub-circuits, as discussed below.

Referring generally to FIG. 2, in an exemplary embodiment the plurality of circuits (e.g., circuits 210-276) of the API gateway circuit 138 are structured to initiate, receive, process, and/or respond to API calls. As discussed briefly with regard to FIG. 1, the enterprise resources 128 may be configured to have API protocols which are used to establish sessions and facilitate communications (or exchange of data) between the ICS controller 104 and the enterprise resources 128. As such, the circuits (e.g., circuits 210-276) may receive an API call from the enterprise resources 128 (e.g., the ERP applications 130, CRM applications 129, etc.) via the network 124, the communications interface 120, and the API gateway circuit 138. The circuits (e.g., circuits 210-276) may then process the API call, and transmit content and data in response (e.g., API response data). The API response data may include information corresponding to the API call and associated with the corresponding circuit of the ICS 100. The data (e.g., API response data) may be transmitted back to the enterprise resources 128 through the communications interface 120, and the network 124. In this regard, the API protocols and sessions may allow the enterprise resources 128 and the user device 134 to request, transmit, receive, and/or display information relating to the content corresponding to the ICS 100 (e.g., via the ICS controller 104).

Various examples of general functions which may be performed by each of the circuits 210-276 provided in the API gateway circuit 138 are described in greater detail below.

As shown in FIG. 2, the view circuit 210 may include a plurality of circuits that are generally structured to retrieve and provide information. The view circuit 210 may include an account information circuit 212, a transaction detail circuit 214, a tax information circuit 216, an image retrieval circuit 218, an automated clearing house (ACH) file status circuit 220, and a foreign exchange circuit 222. In an exemplary embodiment, the account information circuit 212 may be structured to retrieve and provide account balance and transaction data for checking and/or saving accounts. The transaction detail circuit 214 may be structured to retrieve and provide same day or previous day data (e.g., details, summaries, etc.) for one or more accounts. The transaction detail circuit 214 may also be structured to retrieve and provide specific transaction data (e.g., wire payments, ACH payments, checks, deposits, etc.). The tax information circuit 216 may be structured to retrieve and provide historic tax information (e.g., documents) of entities having an account with the ICS 100. In some embodiments, the tax information circuit 216 may be structured to retrieve and provide tax data from the ICS 100 with certain criteria (e.g., trust accounts, brokerage accounts, mortgages, student loans, etc.).

Referring still to the view circuit 210, in an exemplary embodiment, the image retrieval circuit 218 may be structured to retrieve and provide images of certain checks and/or deposit slips (e.g., paid, deposited, returned, etc.). In some embodiments, the image retrieval circuit 218 may be structured to provide data (e.g., research, reconciliation, collection, adjustments, etc.) relating to accounts maintained at the ICS 100. In other embodiments, the image retrieval circuit 218 may be structured to retrieve and provide data relating to checks (e.g., paid checks, deposited checks, returned checks, etc.) over a predetermined period for accounts maintained at the ICS 100. The ACH file status circuit 220 may be structured to retrieve and/or provide the status of ACH files and ACH batches originated through the ICS 100. The foreign exchange circuit 222 may be structured to retrieve and provide national and international exchange data (e.g., exchange rates) and certain ICS 100 account information (e.g., customer, supplier, payroll, marketplace, etc.).

As shown in FIG. 2, the account circuit 230 may also include a plurality of other circuits, which may be generally structured to retrieve and provide account specific information. For example, the account circuit 230 may include an account aggregation circuit 232, an account balance circuit 234, and an account statements circuit 236. In an exemplary embodiment, the account aggregation circuit 232 may be structured to retrieve and provide data relating to an ICS 100 account (e.g., checking, savings, credit, loan, investment, etc.). The account aggregation circuit 232 may also be structured to retrieve and provide historic and/or real-time account data (e.g., balances, transactions, holdings, etc.) of accounts maintained at the ICS 100.

Still referring to the account circuit 230, in an exemplary embodiment, the account balance circuit 234 may be structured to retrieve and provide balance information for national and/or international commercial accounts (e.g., checking, savings, general ledger, etc.). The account balance circuit 234 may also be structured to retrieve and provide additional balance information (e.g., opening balance, current available balance, closing ledger, etc.). The account statements circuit 236 may be structured to retrieve and provide certain ICS 100 account statements (e.g., accounts with certain credit cards, trust accounts, lines of credit, etc.) based on an input.

As shown in FIG. 2, the services circuit 240 may also include a plurality of other circuits that are generally configured to process and provide information. The services circuit 240 may include a validation circuit 242, a full response circuit 244, a lending circuit 246, and an automated teller machine (ATM) circuit 248. In an exemplary embodiment, the validation circuit 242 may be structured to process and provide status and ownership information for certain accounts maintained at the ICS 100. In some embodiments, the validation circuit 242 is structured to process certain new and/or existing ICS 100 accounts (e.g., enroll or establish new accounts, collect premiums on accounts, issue or collect taxes on accounts, etc.). The full response circuit 244 may be structured to provide detailed response information on ICS 100 accounts by processing the status and ownership information of certain ICS 100 accounts. In some embodiments, the full response circuit 244 may be structured to process the status and ownership information from the validation circuit 242.

Referring still to the services circuit 240, in an exemplary embodiment the lending circuit 246 may be structured to process a new or existing ICS 100 account (e.g., enroll new lending account, provide increased lending, etc.). Also, in an exemplary embodiment, the ATM circuit 248 may be structured to provide ICS 100 account information (e.g., checking, credit card, etc.) and/or process the ICS 100 account (e.g., process payment of an account balance).

As shown in FIG. 2, the transact circuit 250 may also include a plurality of circuits that are generally structured to initiate, process, and/or provide information relating to certain payments. The transact circuit 250 includes a payment initiation circuit 252, an automated clearing house (ACH) payment circuit 254, a push to card circuit 256, a real time payment circuit 258, and a wire payment circuit 260. In an exemplary embodiment, the payment initiation circuit 252 may be structured to initiate payment to certain ICS 100 national and international accounts. Similarly, the payment initiation circuit 252 may be structure to process and respond to API calls relating to the status of payments to certain ICS 100 national and international accounts. The ACH payment circuit 254 may be structured to initiate payment to other ICS 100 accounts (e.g., customer accounts, supplier accounts, payroll accounts, marketplace accounts, etc.). In some embodiments, the ACH payment circuit 254 may be structured to process the payment of claims to certain ICS 100 accounts (e.g., policyholders, insurance accounts, etc.).

Still referring to the transact circuit 250, in an exemplary embodiment, the push to card circuit 256 may be structured to initiate and/or process payment to certain ICS 100 accounts (e.g., consumer debit accounts, life insurance accounts, etc.). The real time payment circuit 258 may also be structured to initiate and/or process payment to certain ICS 100 accounts (e.g., policyholders, medical accounts, etc.) in real-time. Also in an exemplary embodiment, the wire payment circuit 260 may be structured to initiate and/or process wire payment to certain ICS 100 accounts. In some embodiments, the wire payment circuit 260 may also be structured to process and provide the status of the wire payment, or process and provide receipt of the wire payment.

As shown in FIG. 2, the API gateway circuit 138 includes an institutions circuit 270. The institutions circuit 270 may be structured to retrieve and provide information relating to ICS 100 institutions. For example, in an exemplary embodiment the institutions circuit 270 may be structured to provide information relating to a specific ICS 100 institution (e.g., geographic location, services offered, scheduling information, etc.). In some embodiments, the institutions circuit 270 may be structured to process an input (e.g., a current location, service preferences, dialect preference, etc.). In response, the institutions circuit 270 may be configured to provide information on fixed locations of facilities relating to the institution based on the input (e.g., closest facility to the user, services offered at the facility, directions to the facility, available appointments at the facility, etc.).

As shown in FIG. 2, the API gateway circuit 138 may also include a security circuit 276. The security circuit 276 may be structured to authenticate and/or validate a user accessing the ICS controller 104 (e.g., from the external devices or applications) to ensure sharing and permission preferences. The security circuit 276 may authenticate and/or validate a user via a variety of modalities input into the external devices or applications, for example a password, a fingerprint scan, a retinal scan, a voice sample, a face scan, and/or any other type of biometric security scan. The security circuit 276 may also be structured to process (e.g., verify) a supplemental authentication when applicable (e.g., a two-factor authentication (2FA) is presented on the enterprise resource(s) 128 and/or user device 134). The supplemental authentication may occur as part of a process to authorize an enterprise resource 128 (e.g., ERP application(s) 128, CRM application(s) 129, etc.) to access data or content (e.g., ICS data) from the ICS 100 (e.g., the ICS controller 104).

Referring back to FIG. 1, in some embodiments, to access data via the API gateway circuit 138, a user 132 may access the enterprise resource 128. Following configuring the interface 142, the user device 134 may include an access token 144 granted, established, provisioned, or otherwise provided by the ICS 100. In some embodiments, the access token 144 may be maintained by the user device 134 for the interface 142 of the enterprise resource 128. In some embodiments, an instance of the enterprise resource 128 may maintain the access token 144. The access token 144 maintained by the enterprise resource 128 and/or user device 134 may include a primary access token 144 and/or secondary access token 144. In various embodiments, and as described above, the access token 144 may be encoded with access rights and account information. Where a user accessing the enterprise resource 128 requests information from the ICS 100 relating to enterprise account data 140, the user device 134 and/or enterprise resource 128 may be configured to transmit the access token 144 together with an API call to the API gateway circuit 138. The ICS 100 may be configured to validate the access token 144 (e.g., by decoding the access token 144 using the private key for the ICS 100, or other encoding/cryptographic mechanism), and determine that the access token 144 matches the access token 144 generated for the user device 134.

In some embodiments, the ICS 100 may be configured to determine that request (e.g., the API call) originates from a permitted user responsive to the user having at least one access right encoded in the access token. For example, as part of transmitting the API call, the user device 134 may be configured to incorporate data corresponding to the user of the user device 134. Such data may include, for example, a user identifier or other identifying information from the user. The ICS 100 may be configured to decrypt the access token 144 corresponding to the API call to determine the access rights established or permitted for the enterprise. The ICS 100 may be configured to perform a look-up in the user dataset 146 using the user identifier, to determine whether the user has any access rights granted under the access token 144. The ICS 100 may be configured to provide or otherwise transmit API responses to the user device 134 responsive to validating the access token and confirming that the user identifier is associated with a user having at least one access right granted under the access token 144.

Figure 3:
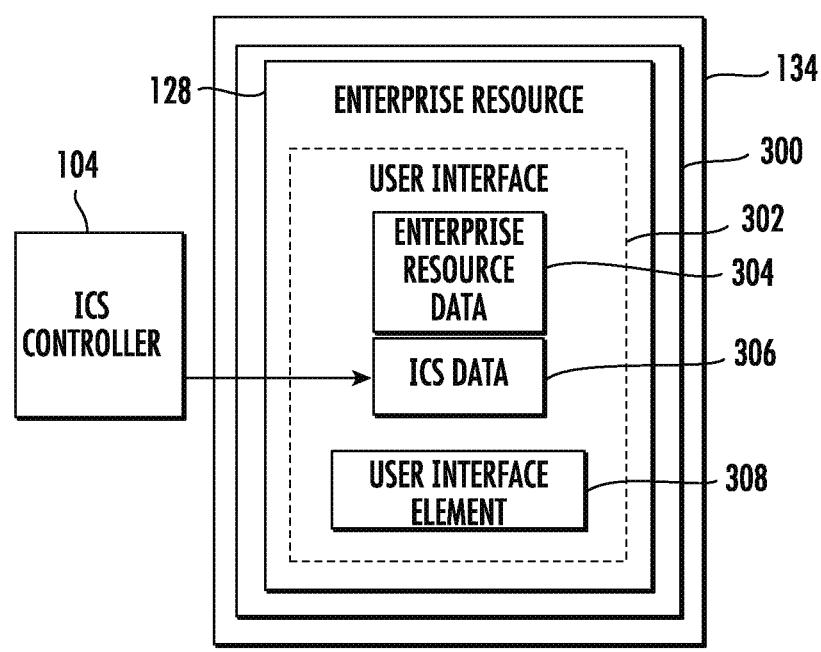
FIG. 3 is a diagram of a user device of FIG. 1 accessing an enterprise resource which displays institution computing system data, according to an exemplary embodiment.

Referring now to FIG. 3, depicted is a user device 134. As discussed above with regard to FIG. 1, the user device 134 may be used in combination with the enterprise resources 128 to communicate with the ICS 100 (e.g., the ICS controller 104 and/or the API gateway circuit 138). The user device 134 is shown to include a display 300 which displays a user interface 302 corresponding to an enterprise resource 128. The user interface 302 may display enterprise resource data 304 to the user. In some implementations, the user interface 302 may display ICS data 306 (e.g., data received from the ICS 100 as described above). In some implementations, the user interface 302 may display one or more user interface elements 308 for interacting with the ICS data 306, for initiating requests for the ICS 100, and so forth. Various examples of communications, data, or other information that may be exchanged between the ICS 100 and enterprise resources 128 via the API gateway circuit 138 are described in greater detail below.

As one example, a user associated with the enterprise may open a new account with the institution corresponding to the ICS 100 using an enterprise resource 128. For example, a user of the user device 134 may access a payroll ERP application 130. The payroll ERP application 130 may include data corresponding to the enterprise (e.g., a tax identification number or tax ID, an address corresponding to the enterprise, identification of an authorized person associated with the enterprise, etc.). The payroll ERP application 130 may also include a user interface element 308 which corresponds to opening a new account with the institution. The payroll ERP application 130 may receive a selection of the user interface element 308 from the user (e.g., indicating that the user intends to open a new account with the institution). The payroll ERP application 130 may be configured to transmit, send, or otherwise provide an API call which includes an indication of the selection of the user interface element 308 and the data maintained by the payroll ERP application 130 corresponding to the enterprise. The API call may be communicated to the ICS controller 104 via the network 124 and the communications interface 120.

The API gateway circuit 138 may receive the API call from the ICS controller 104, and determine (e.g., analyze, process, select) the best configured circuit (e.g., circuits 210-276) to process the API call, for example the validation circuit 242. The validation circuit 242 may then process the API call (e.g., the "establish a new account" API call), for example by processing a new account. In some implementations, the validation circuit 242 may provide API response data (e.g., "new account data") to the API gateway circuit 138, the processing circuit 108 (e.g., for further processing by the processor 112, or for storage in the memory 116 as new enterprise account data 140), and/or the ICS controller 104. In some embodiments, the validation circuit 242 may provide API response data to request additional information from the user for opening the account, as needed. The ICS controller 104 may then transmit the API response data to the payroll ERP application 130 via the communications interface 120 and the network 124.

In some embodiments, the payroll ERP application 130 may display the API response data (e.g., the "new account information," the request for additional information, etc.) as the ICS data 306 to the user device 134. For example, where the payroll ERP application 130 maintains sufficient data for opening a new account for the enterprise, the API response data may include a confirmation of the new account and new account details, which may be rendered as the ICS data 306 within the user interface 300 of the payroll ERP application 130. As another example, where the API response data requests additional information, the payroll ERP application 130 may render one or more fields as the ICS data 306 which requests the additional information, which is subsequently provided to the ICS controller 104 in a similar manner as described above (e.g., via the ERP application(s) 130). In this regard, the payroll ERP application 130 may facilitate seamless account opening with the ICS 100 by way of API calls and responses via the API gateway circuit 138.

Figure 4:
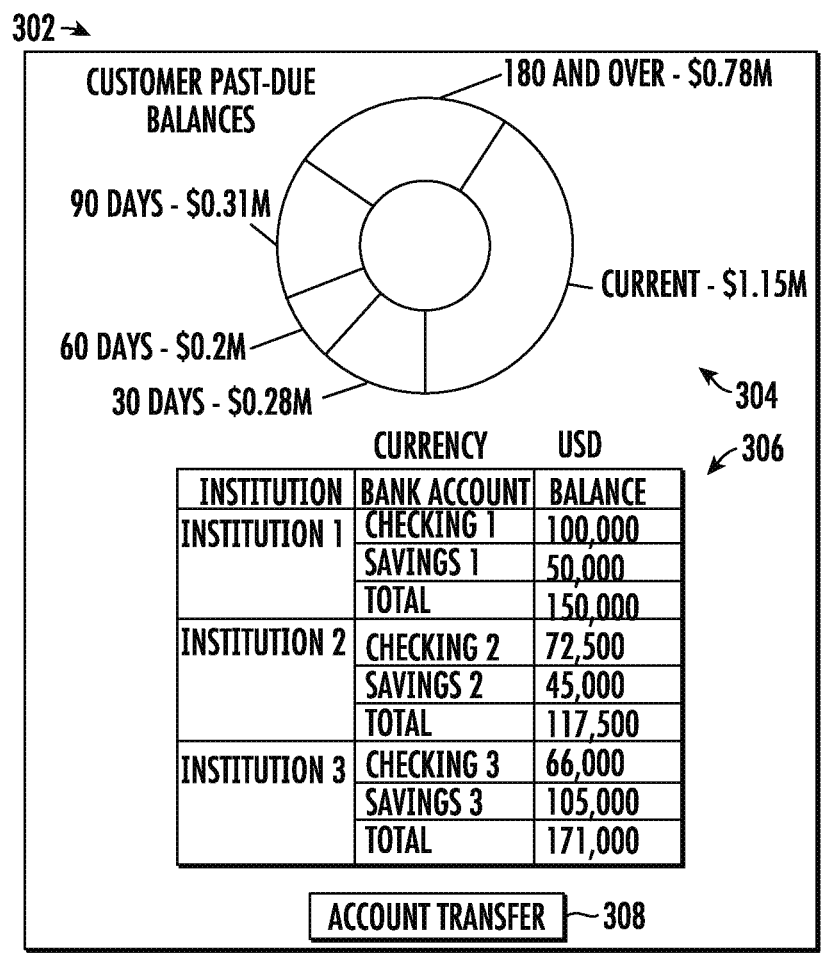
FIG. 4 is an example user interface of the user device of FIG. 1, according to an exemplary embodiment.

As another example, and with reference to FIG. 4, a user may view account details or balances for a plurality of accounts within an enterprise resource 128. Specifically, FIG. 4 depicts a user interface 302 of the user device 134. For example, the user 132 of the user device 134 may access the user interface 302 showing a finances page (or tab, dedicated portion of a main page, etc.) of a CRM application 129. The finances page of the CRM application 129 may include data corresponding to finances of the enterprises (e.g., a number of customers past due, a customer's balance due, a customer's amount over credit limit of the enterprise, etc.) as the enterprise resource data 304. The user interface 302 shown in FIG. 4 shows a graph depicting customer aged balances. The finances page may also be configured to display information or data related to account details or balances for a plurality of accounts as the ICS data 306. For example, the ICS data 306 on the finances page may include a graph or chart which shows details of each of the accounts maintained by the enterprise (e.g., at the institution corresponding to the ICS 100 or one or more other institutions).

The CRM application 129 may be configured to transmit an API call, including an identifier corresponding to the enterprise, to the ICS controller 104 (e.g., via the network 124). The API gateway circuit 138 may receive the API call from the ICS controller 104, and determine (e.g., analyze, process, select) the best configured circuit (e.g., circuits 210-276) to process the API call, for example the account circuit 230, as described above. The account circuit 230 may be configured to use the identifier corresponding to the enterprise from the API call to determine or identify each of the accounts associated with the enterprise (e.g., by performing a look-up function using the identifier in an accounts database), and determine an account balance for each of the accounts. The account circuit 230 may be configured to generate API response data including an account balance for each of the accounts of the enterprise, and transmit the API response data back to the CRM application 129 for displaying (e.g., as the ICS data 306 within the user interface 302 of the CRM application 129). As such, a user of the CRM application 129 may view the accounts balance in conjunction with the other information displayed on the finances page of the CRM application 129, thereby avoiding having to open and view pages for several different applications.

In some embodiments, the CRM application 129 may display a user interface element 308 for initiating an accounts transfer. The user 132 may initiate a transfer of funds between one or more of the accounts displayed on the user interface 302 by selecting a user interface element 308 on the user interface 302 of the CRM application 129 and specifying an amount to transfer to a specific account. The CRM application 129 may generate an API call responsive to selection of the accounts transfer user interface element 308. The API call may specify the amount to be transferred, a source account, and a destination account. The CRM application 129 may transmit the API call to the ICS controller 104 as described above, to cause the ICS controller 104 to initiate the transfer of funds from the source account to the destination account in a similar manner. The ICS 100 may transmit, send, or otherwise provide a confirmation of the transfer to the CRM application 129 for displaying to the user. In some implementations, the accounts balances for the accounts displayed on the user interface 302 may automatically be updated to reflect the transfer of funds (e.g., by way of additional API calls from the CRM application 129 to the ICS controller 104).

As still another example, a user may view an accounts balance within the payroll ERP application 130. Similar to the example described above, the payroll ERP application 130 may include and display enterprise resource data 304 including information on payroll to each of the employees of the enterprise. The payroll ERP application 130 may also include the ICS data 306 which displays an account balance for a checking account with the ICS 100. The payroll ERP application 130 may be configured to transmit an API call including an account number corresponding to the checking account. The API gateway circuit 138 may receive the API call from the ICS controller 104, and determine (e.g., analyze, process, select) the best configured circuit (e.g., circuits 210-276) to process the API call, for example the account balance circuit 234, as described above. The account balance circuit 234 may be configured to use the account number to determine an account balance for the payroll checking account. The account balance circuit 234 may be configured to generate API response data including an account balance for checking account, and transmit the API response data back to the ERP application 130 for displaying as the ICS data 306 within the user interface 302 of the ERP application 130. As such, a user of the ERP application 130 may view the accounts balance in conjunction with the payroll information to ensure that sufficient funds are in the payroll checking account to cover the payroll expenses.

As yet another example, a user may apply for a loan instrument within a finances ERP application 130. The finances ERP application 130 may display enterprise resource data 304 similar to the finances page of the CRM application 129 as described above (e.g., an accounts receivable, a number of customers past due, a customer's balance due, a customer's amount over credit limit of the enterprise, etc.). The finances ERP application 130 may display a user interface element 308 for selecting an option to apply for a loan instrument for a particular balance (e.g., for a duration from a delivery date to an expected payment date, for an undefined duration such as until a customer pays off a balance due, etc.). The finances ERP application 130 may be configured to receive a selection of the user interface element 308 requesting applying for the loan instrument. The ERP application 130 may prompt the user for additional details upon receiving the selection (e.g., a duration of the loan instrument, an amount for the loan instrument, etc.). The finances ERP application 130 may generate and transmit an API call to the ICS controller 104 identifying the selection of the user interface element 308 and the additional data provided by the user. The API gateway circuit 138 may receive the API call from the finances ERP application 130, and determine which API circuit is to process the request (e.g., the lending circuit 246). The lending circuit 246 may process the request and generate an application for the loan instrument according to the API call. In some embodiments, the lending circuit 246 may automatically approve the loan instrument. In some embodiments, the lending circuit 246 may route the application to another component or circuit of the ICS controller 104 for processing and approval. In various embodiments, the lending circuit 246 may provide an API response indicating the approval of the loan instrument to the finances ERP application 130. Such implementations and embodiments provide for a seamless and low touch experience for opening loan instruments through a finances ERP application 130.

In some instances, following a loan instrument being approved, the finances ERP application 130 may provide additional resources to the user corresponding to the loan instrument. For example, the finances ERP application 130 may include a user interface element 308 to facilitate a balance transfer to a specific account at the institution corresponding to the ICS 100 as described above. As another example, the finances ERP application 130 may include a user interface element 308 to facilitate locating an ATM nearest to the user (e.g., to withdraw funds corresponding to the loan instrument). In these and other embodiments, the finances ERP application 130 may generate various API calls to facilitate the balance transfer, locate the nearest ATM, etc. and display corresponding information as the ICS data 306.

Figure 5:
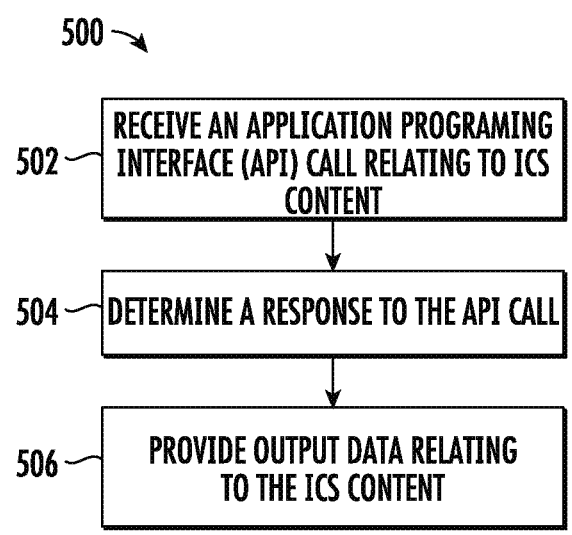
FIG. 5 is a flowchart of a process for providing a product or service using an institution computing system (ICS), according to an exemplary embodiment.

Referring now to FIG. 5, a flow diagram of a process 500 for providing ICS 100 content and data is shown, according to an exemplary embodiment. More specifically, in an exemplary embodiment, the process 500 relates to receiving an API call relating to ICS content and data, determining a response to the API call, and providing output data (e.g., API response data) relating to the ICS content and data. The process 500 may be performed using the computing system 50 of FIG. 1, such that reference is made to the components described above to aid in the description of process 500.

At step 502, the ICS 100 receives an API call (e.g., associated with an ICS 100 product or service) from an enterprise resource 128. More specifically, in one embodiment, the ICS controller 104 may receive an API call, via the communications interface 120, from an enterprise resource 128 and/or the user device 134 (e.g., by the CRM application(s) 129, ERP application(s) 130, etc. accessed via the user device 134). The API call may be any variety of selections or requests, for example via a graphical or user interface associated with the enterprise resources 128 or user device 134 (e.g., drop-down, button, highlighted row, voice command, etc.). The API call may also be transmitted or communicated over the network 124. It should also be appreciated that step 502 may be presupposed by an authentication of a user/user device-session in order to gain access the CRM application(s) 129, ERP application(s) 130 and/or the ICS 100. The authentication may be completed via the security circuit 276 of the ICS 100 prior to accessing or requesting any data via the ICS 100 via an API call (e.g., prior to the step 502). Any authentication may also be completed via a password, biometric scan, voice command, etc., as described above with regard to FIG. 2.

At step 504, the ICS 100 determines a response to the API call. In one embodiment, the ICS controller 104 may process the API call (e.g., from the enterprise resource 128) using the API gateway circuit 138. More specifically, the API gateway circuit 138 may receive the API call, determine (i.e., analyze, process, select, etc.) at least one of the plurality of circuits that is best configured to process the API call (e.g., circuits 210-276), and route the API call to the selected (i.e., best configured) circuit. The selected circuit may process the API call, and provide output data (e.g., API response data) associated with an ICS 100 content and data (e.g., the ICS 100 product or service in response). The output data may be communicated, transmitted, and or received by the API gateway circuit 138, the processing circuit 108 (e.g., the processor 112 for further processing, and/or the memory 116 for storage), and/or the ICS controller 104.

At step 506, the ICS 100 provides the output data relating to an ICS 100 content and data to the enterprise resource 128. In some embodiments, the ICS controller 104 may provide, via the communications interface 120, the output data (e.g., the API response data) relating to the ICS 100 content and data to the enterprise resource 128. More specifically, the output data may be transmitted or communicated over the network 124, and may be received by enterprise resource 128 accessed via the user device 134. As described above with regard to FIGS. 1-2, the process described in steps 502-506 (e.g., the API protocols or sessions, the API calls, the processing, the output data and/or API response data, etc.) may allow ICS 100 content and data to be displayed directly within the external devices (enterprise resource(s) 128, user device 134, etc.) or the external applications (e.g. ERP application(s) 130, CRM application(s) 129, etc.).

In one embodiment, the process 500 (i.e., steps 502-506) may be repeated multiple times. For example, the ICS 100 users of user device 134 (e.g., the user, employees, shareholders of a company, policy holders, etc.) may repeat the process 500 to review account information, view the exchange rates, and then execute real time payments.

As an illustrative example, a user 132 may wish to view their account balance. The user 132 may use the user device 134 to send an API call to "view account balance" (e.g., via the ERP application 130). The API call may be communicated or transmitted to the ICS controller 104, via the network 124 and the communications interface 120. The API gateway circuit 138 may receive the API call from the ICS controller 104. The API gateway circuit 138 may then determine (e.g., analyze, process, select) the best configured circuit (e.g., circuits 210-276 of the API gateway circuit 138) to process the input request, for example the account balance circuit 234. The account balance circuit 234 may then receive and process the "view account balance" API call by, for example, retrieving account balance information for the account's national and international commercial accounts (e.g., checking, savings, general ledgers, etc.). This account information (e.g., output data and/or API response data) may then be communicated from the account balance circuit 234 to, and/be received by, the API gateway circuit 138, the processing circuit 108 (e.g., for further processing by the processor 112, or for storage in the memory 116), and/or the ICS controller 104. The ICS controller 104 may then transmit or provide, via the communications interface 120 and the network 124, the account balance information for the user's national and international commercial accounts (e.g., the output data, or the API response data) to the user device 134 (e.g., the output data and/or API response data, received via the ERP application 130). The user device 134 may display the account information, and the user 132 may then determine that additional ICS 100 products and/or services are desired (e.g., "view foreign exchange rates," or "make real time payment," etc.).

Figure 6:
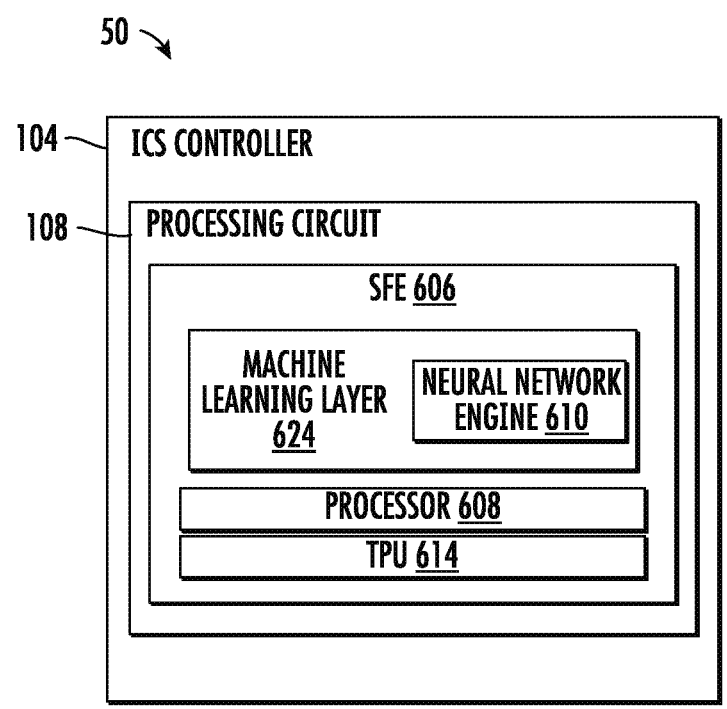
FIG. 6 is a schematic diagram of the processing circuit in the ICS controller of the computing system of FIG. 1 including a smart financial engine, according to an exemplary embodiment.

Referring to FIG. 1 and FIG. 6, in some embodiments, the ICS controller 104 may include a smart financial engine 606. Specifically, FIG. 6 shows a schematic diagram of the processing circuit 108 in the ICS controller 104, as part of computing system 50 may include a smart financial engine (SFE) 606 as shown, according to an exemplary embodiment. SFE is shown to include a machine learning layer 624, a processor 608, and a tensor processing unit (TPU) 614.

SFE 606 may be configured to receive enterprise resources 128 data, including data from CRM applications 129 and data from ERP applications 130. Data received by the SFE 606 may include, for example, accounts receivable data, accounts payable data, account balance data (derived from one or more enterprises), liquid asset data, illiquid asset data, 401K data, investment retirement account (IRA) data, property holding data, investment opportunities, collateral backing opportunities, refinance opportunities, user 132 feedback (e.g., whether a customer, customer relationship manager, or the like ranked (or scored) the recommendation as "positive" or "negative", whether the customer, customer relationship manager, or the like ranked (or scored) the recommendation as aggressive, conservative or moderate), and the like.

The SFE 606 may access enterprise resources 128 using the API gateway circuit 138 described above with reference to FIG. 1. The SFE 606 may also access one or more databases using API gateway circuit 138. In some embodiments, the data received from databases may include trained machine learning models, thresholds, and the like. Alternatively or additionally, an enterprise may store trained machine learning models and/or threshold. Alternatively or additionally, the SFE 606 may store the trained machine learning models and/or thresholds. As such, the SFE 606 may include, maintain, or otherwise access the trained machine learning models described herein.

In some embodiments, a user 132 may configure the SFE 606 by interacting with a user interface (e.g., user interface 302 in FIG. 3). For example, a user 132 may configure various thresholds or select machine learning models to be implemented via SFE 606. In some embodiments, the SFE 606 receives the user's 132 instructions and/or configurations using an API (e.g., via the API gateway circuit 138).

A processor 608 may be the logic in a device (e.g., SFE 606) that receives software instructions. A central processing unit (CPU) may be considered any logic circuit that responds to and processes instructions. CPUs are configured to execute various types of instructions. One or more algorithmic logic units (ALU) may be incorporated in processors to perform necessary calculations in the event an instruction requires a calculation be performed. When a CPU performs a calculation, it performs the calculation, stores the calculation in memory, and reads the next instruction to determine what to do with the calculation.

A different type of processor 608 utilized in SFE 606 may be the graphics processing unit (GPU). The SFE 606 may include both GPU and CPU processors 608. A GPU is a specialized electronic circuit designed to quickly perform calculations and access memory. As GPUs are specifically designed to perform calculations quickly, GPUs may have many ALUs allowing for parallel calculations. Parallel calculations mean that calculations are performed more quickly (e.g., in parallel to other tasks being performed by the processor 608). GPUs, while specialized, are still flexible in that they are able to support various applications and software instructions. As GPUs are still relatively flexible in the applications they service, GPUs are similar to CPUs in that GPUs perform calculations and subsequently store the calculations in memory as the next instruction is read.

In some embodiments, processor 608 may include a neural network engine 610. In other embodiments, the SFE 606 may access the neural network engine 610 using an API. That is, each machine learning model may have an associated API that may be used to call the machine learning model. Instructions for invoking various machine learning models in the machine learning layer 624 may be stored in memory 116. The various machine learning models may include neural networks (including convolutional neural networks, deep neural networks), Support Vector Machines (SVMs), Random Forests, and the like.

Employing APIs to invoke machine learning models allows the machine learning models to be implemented in different environments. For example, the machine learning models may be implemented in cloud or on-premise environments. In addition, machine learning models may be added over time (e.g., by a user 132 using a user interface 302).

Processor 608 may call machine learning models using the instructions stored in memory 116, access databases using the instructions stored in memory 116, and may receive information from a user interface 302 using the instructions stored in memory 116. The use of APIs facilitates the scalability of SFE 606.

A neural network engine 610 is an engine that utilizes the inherent parallelisms in a neural network to improve and speed up the time required for calculations. For example, generally, processors performing neural network instructions perform the neural network calculations sequentially because of the dependencies in a neural network. For example, the inputs to one neuron in a network may be the outputs from the previous neuron. In other words, a neuron in a first layer may receive inputs, perform calculations, and pass the output to the next neuron. However, many of the same computations are performed numerous times during the execution of the neural network. For example, multiplication, addition and executing activation functions are performed at every neuron. Further, while neurons within the same layer may be dependent on one another, neurons are independent from neurons in other layers. Thus, a neural network engine 610 may be used to capitalize on the parallelisms of a neural network. For example, every addition, multiplication and execution of the activation function may be performed simultaneously for different neurons in different layers.

In addition to CPUs and GPUs, SFE 606 may additionally have a tensor processing unit (TPU) 614. TPU 614, while still a processor like a CPU and GPU, is an Artificial Intelligence application-specific integrated circuit. TPUs may not require any memory, as their purpose is to perform computations quickly. Thus, TPU 614 performs calculations and subsequently passes the calculations to an ALU or outputs the calculations such that more calculations may be performed. Thus, TPUs may be faster than their counterparts CPUs and GPUs.

Figure 7:
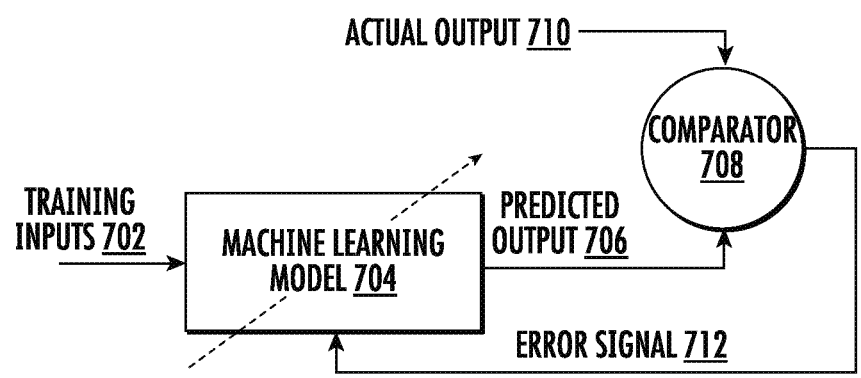
FIG. 7 is a block diagram of an example system using supervised learning, according to an exemplary embodiment.

Referring to FIG. 7, a block diagram of an example system using supervised learning, is shown. Supervised learning is a method of training a machine learning model given input-output pairs. An input-output pair is an input with an associated known output (e.g., an expected output).

Machine learning model 704 may be trained on known input-output pairs such that the machine learning model 704 can learn how to predict known outputs given known inputs. Once the machine learning model 704 has learned how to predict known input-output pairs, the machine learning model 704 can operate on unknown inputs to predict an output.

The machine learning model 704 may be trained based on general data and/or granular data (e.g., data based on a specific user 132) such that the machine learning model 704 may be trained specific to a particular user 132.

Training inputs 702 and actual outputs 710 may be provided to the machine learning model 704. Training inputs 702 may include accounts receivable data, accounts payable data, account balance data, liquid asset data, illiquid asset data, 401k data, IRA data, and the like. Actual outputs 710 may include recommendations (e.g., investment opportunities, collateral backing opportunities, refinance opportunities, and the like), user feedback (e.g., whether a customer, customer relationship manager, or other specialist ranked (or scored) the recommendation as positive or negative, whether the customer, customer relationship manager, or the like ranked (or scored) the recommendation as aggressive, conservative or moderate), actual future accounts receivable data, actual future accounts payable data, actual future account balance data, actual future liquid asset data, actual future illiquid asset data, actual future 401k data, actual future IRA data, and the like.

The inputs 702 and actual outputs 710 may be received from historic enterprise resource 128 data from any of the data repositories. For example, a data repository of an enterprise resource 128 may contain an account balance of a user 132 a year ago. The data repository may also contain data associated with the same account six months ago and/or data associated with the same account currently. Thus, the machine learning model 704 may be trained to predict future account balance information (e.g., account balance information one year into the future or account balance information six months into the feature) based on the training inputs 702 and actual outputs 710 used to train the machine learning model 704.

The SFE 606 may include one or more machine learning models 704. In an embodiment, a first machine learning model 704 may be trained to predict data associated with a financial state of a user 132 based on current user 132 enterprise resource 128 data. For example, the first machine learning model 704 may use the training inputs 702 (e.g., accounts receivable data, accounts payable data, account balance data, liquid asset data, illiquid asset data, 401k data, IRA data, and the like) to predict outputs 706 (e.g., future accounts receivable data, future accounts payable data, future account balance data, future liquid asset data, future illiquid asset data, future 401k data, future IRA data, and the like), by applying the current state of the first machine learning model 704 to the training inputs 702. The comparator 708 may compare the predicted outputs 706 to actual outputs 710 (e.g., actual future accounts receivable data, actual future accounts payable data, actual future account balance data, actual future liquid asset data, actual future illiquid asset data, actual future 401k data, actual future IRA data, and the like) to determine an amount of error or differences. For example, the future predicted accounts receivable data (e.g., predicted output 706) may be compared to the actual accounts receivable data (e.g., actual output 710).

In other embodiments, a second machine learning model 704 may be trained to make one or more recommendations to the user 132 based on the predicted data of the financial state of the user 132. For example, the second machine learning model 704 may use the training inputs 702 (e.g., future accounts receivable data, future accounts payable data, future account balance data, future liquid asset data, future illiquid asset data, future 401k data, future IRA data, and the like) to predict outputs 706 (e.g., a probability of a predicted investment opportunity, a probability of a predicted collateral backing opportunity, a probability of a predicted refinance opportunity, and the like) by applying the current state of the second machine learning model 704 to the training inputs 702. The comparator 708 may compare the predicted outputs 706 to actual outputs 710 (e.g., a selected investment opportunity, a selected collateral backing, predicted refinance opportunity, and the like) to determine an amount of error or differences.

The actual outputs 710 may be determined based on historic data of recommendations made to the user 132 by a customer relationship manager or other specialist. In an illustrative non-limiting example, a user 132 six months ago may have been in a particular financial state. In response to being in the particular financial state, the user 132 may have been advised of to seek an additional loan with various identified collateral backing. Thus, the input-output pair would be the particular financial state of the user 132 and the loan with identified collateral backing. In another illustrative non-limiting example, a user 132 four months ago may have been in a particular financial state. In response to being the in particular financial state, the user 132 may have been advised to invest in one or more enterprises. The user 132 may have received 30 day notes and rates, 60 day notes and rates, and 90 day notes and rates and selected an investment opportunity. Thus, the input-output pair would be the particular financial state of the user 132 and the selected investment opportunity. Accordingly, the second machine learning model 704 may learn to predict a recommendation (e.g., investment opportunity, collateral backing, refinance opportunity) for a given financial state. As described in greater detail below, the recommendation may be provided to the user, to a team member associated with the enterprise (i.e., to provide the recommendation to the user), and/or to other entities associated with the enterprise and/or user (such as loan underwriters in some instances).

In some embodiments, a single machine leaning model 704 may be trained to make one or more recommendations to the user 132 based on current user 132 data received from enterprise resources 128. That is, a single machine leaning model may be trained using the training inputs 702 (e.g., accounts receivable data, accounts payable data, account balance data, liquid asset data, illiquid asset data, 401k data, IRA data, and the like) to predict outputs 706 (e.g., a probability of a predicted investment opportunity, a probability of a predicted collateral backing opportunity, a probability of a predicted refinance opportunity, and the like) by applying the current state of the machine learning model 704 to the training inputs 702. The comparator 708 may compare the predicted outputs 706 to actual outputs 710 (e.g., a selected investment opportunity, a selected collateral backing, a selected refinance opportunity, and the like) to determine an amount of error or differences. The actual outputs 710 may be determined based on historic data associated with the recommendation to the user 132 (e.g., determined by a customer relationship manager or other specialist).

Training the machine learning model 704 with the data from the enterprise resources 128 allows the machine learning model 704 to learn, and benefit from, the interplay between the current and future states of the user/entity and enterprise resource 128 data. For example, training the machine learning model to predict a future account balance with accounts receivable input data may result in improved accuracy of the future account balance. Conventional approaches may predict a future account balance information algorithmically, without consideration of other factors that may affect the future account balance such as accounts receivable data. Generally, machine learning models are configured to learn the dependencies between various inputs. Accordingly, the machine learning model 704 learns the dependencies between the enterprise resource data and other data/factors of the user, resulting in improved predictions over predictions that are determined individually and/or independently.

During training, the error (represented by error signal 712) determined by the comparator 708 may be used to adjust the weights in the machine learning model 704 such that the machine learning model 704 changes (or learns) over time. The machine learning model 704 may be trained using a backpropagation algorithm, for instance. The backpropagation algorithm operates by propagating the error signal 712. The error signal 712 may be calculated each iteration (e.g., each pair of training inputs 702 and associated actual outputs 710), batch and/or epoch, and propagated through the algorithmic weights in the machine learning model 704 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 704 may be tuned to reduce the amount of error, thereby minimizing the differences between (or otherwise converging) the predicted output 706 and the actual output 710. The machine learning model 704 may be trained until the error determined at the comparator 708 is within a certain threshold (or a threshold number of batches, epochs, or iterations have been reached). The trained machine learning model 704 and associated weighting coefficients may subsequently be stored in memory 116 or other data repository (e.g., a database) such that the machine learning model 704 may be employed on unknown data (e.g., not training inputs 702). Once trained and validated, the machine learning model 704 may be employed during a testing (or an inference phase). During testing, the machine learning model 704 may ingest unknown data to predict future data (e.g., accounts receivable, accounts payable, 401k data, IRA data, account balance, and the like).

Using the systems and methods described herein, the SFE 606 can have a formalized approach to estimate future enterprise resource 128 data in a single automated framework based on current enterprise resource 128 data. The SFE 606 uses the data available from the enterprise resources 128 to predict future data and a user 132 financial state.

Figure 8:
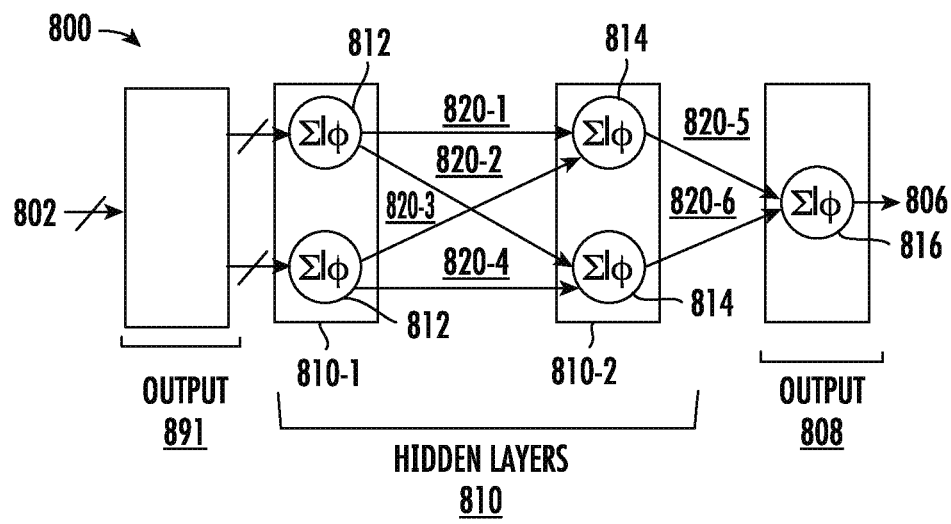
FIG. 8 is a block diagram of a simplified neural network model, according to an exemplary embodiment.

Referring to FIG. 8, a block diagram of a simplified neural network model 800 is shown. The neural network model 800 may include a stack of distinct layers (vertically oriented) that transform a variable number of inputs 802 being ingested by an input layer 804, into an output 806 at the output layer 808.

The neural network model 800 may include a number of hidden layers 810 between the input layer 804 and output layer 808. Each hidden layer has a respective number of nodes (812, 814 and 816). In the neural network model 800, the first hidden layer 810-1 has nodes 812, and the second hidden layer 810-2 has nodes 814. The nodes 812 and 814 perform a particular computation and are interconnected to the nodes of adjacent layers (e.g., nodes 812 in the first hidden layer 810-1 are connected to nodes 814 in a second hidden layer 810-2, and nodes 814 in the second hidden layer 810-2 are connected to nodes 816 in the output layer 808). Each of the nodes (812, 814 and 816) sum up the values from adjacent nodes and apply an activation function, allowing the neural network model 800 to detect nonlinear patterns in the inputs 802. Each of the nodes (812, 814 and 816) are interconnected by weights 820-1, 820-2, 820-3, 820-4, 820-5, 820-6 (collectively referred to as weights 820). Weights 820 are tuned during training to adjust the strength of the node. The adjustment of the strength of the node facilitates the neural network's ability to predict an accurate output 806.

In some embodiments, the output 806 may be one or more numbers. For example, output 806 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

Figure 9:
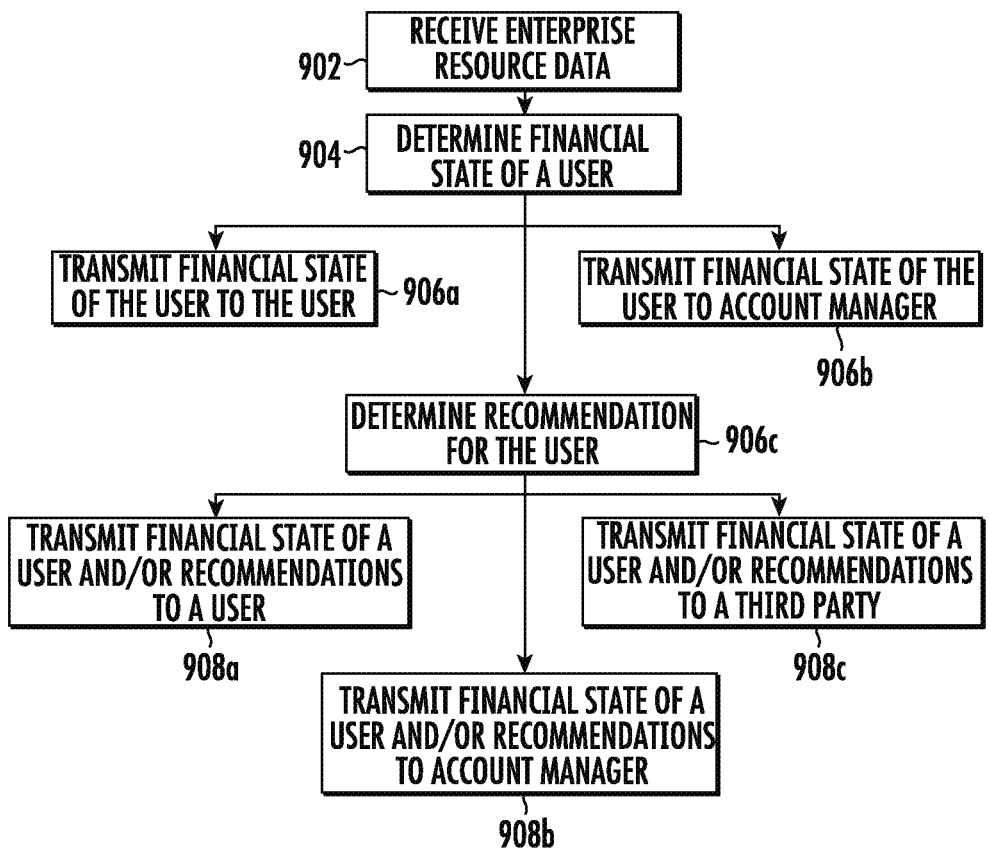
FIG. 9 is a flowchart of a process for providing real-time (or near real time) predictions to a user using the smart financial engine of FIG. 6, according to an exemplary embodiment.

Referring now to FIG. 9, a flow chart of a process 900 for providing real-time (or near real-time) SFE 606 predictions to a user is shown, according to an exemplary embodiment. The process 900 may include steps 902-908. However, other embodiments may include additional or alternative steps, or may omit one or more steps altogether. The method 900 is described as being executed using the computing system 50 of FIG. 1, and in particular the SFE of FIG. 6 such that reference is made to the components described above to aid in the description of process 900. However, one or more steps of process 900 may be executed by any number of computing systems. For example, one or more computing systems may locally perform part or all of the steps described in FIG. 9.

At step 902, the ICS 100 receives enterprise resource 128 data. The enterprise resource 128 data may include, for example, data which is maintained by the ICS 100 for an enterprise (i.e., enterprise account data 140 for instance), data which is maintained by an enterprise on enterprise computing devices and/or data which is maintained by a third party on behalf of an enterprise. The enterprise resource 128 data may include, for example, data which is provided to a customer relationship management (CRM) application 129, data which is provided to an enterprise resource planning (ERP) application 130, data which is provided during account setup at a financial institution, data which is maintained by third parties (i.e., publicly known information), etc. In some embodiments, the ICS controller 104 may receive enterprise resource 128 data via the communications interface 120 by CRM Application(s) 129, ERP Application(s) 130, and the like. Alternatively or additionally, the ICS controller 104 may receive enterprise resource 128 data via the communications interface 120 by a user device 134. For example, a user 132 may manually enter enterprise resource 128 data (e.g., 401k information) into a user device 134 which transmits the enterprise resource 128 data to the ICS controller 104 via the communications interface 120. The data received by the ICS controller 104 may be ingested by the SFE 606 and in particular, by a trained machine learning model 704.

In some embodiments, the ICS controller 104 may receive enterprise resource 128 data based on one or more user 132 inputs via a user device 134. For example, a user 132 may manually trigger SFE 606 using drop-downs buttons, highlighted rows, voice commands, etc.

In other embodiments, the ICS controller 104 may receive enterprise resource 128 data based on predetermined configurations. The predetermined configurations may include temporal triggers. For example, the ICS controller 104 may periodically (e.g., annually, every six months, quarterly, monthly, bi-weekly, weekly, daily, etc.) query one or more CRM Application(s) 129, ERP Application(s) 130, and the like (i.e., via API calls to corresponding APIs for the CRM application(s) and or ERP applications 129, 130) for enterprise resource 128 data.

In yet other embodiments, the ICS controller 104 may receive enterprise resource 128 data based on triggering conditions. A triggering condition may include monitoring enterprise resource 128 data obtained from CRM application(s) 129 and/or ERP application(s) 130, and determining that one or more thresholds have been satisfied. For example, the ICS controller 104 may monitor accounts payable data obtained from CRM application(s) 129 and/or ERP application(s) 130. Every time a predetermined number of accounts (such as one new account, two new accounts, etc.) are added as an account payable, the ICS controller 104 may be triggered to query CRM Application(s) 129, ERP Application(s) 130, and the like for enterprise resource 128 data.

Alternatively or additionally, the ICS controller 104 may be triggered to query CRM Application(s) 129, ERP Application(s) 130, and the like for enterprise resource 128 data in response to determining that a withdrawal (or deposit) satisfies a threshold. For example, transactions exceeding a threshold (determined by, for example, comparing an account balance at a first point in time and an account balance at a second point in time) may be a triggering condition.

It should also be appreciated that step 902 may be presupposed by an authentication of a user/user device-session in order to gain access the CRM application(s) 129, ERP application(s) 130 and/or the ICS 100. The authentication may be completed via the security circuit 276 of the ICS 100 prior to accessing or requesting any data via the ICS 100 via an API call (e.g., prior to the step 902). Any authentication may also be completed via a password, biometric scan, voice command, etc., as described above with regard to FIG. 2.

At step 904, the ICS controller 104 may determine a user's 132 financial state. The user's financial state may be a state of the user's 132 financial accounts. For example, the financial state of the user 132 may be a current or future state of the user's 132 accounts receivable data, accounts payable data, account balance data, liquid asset data, illiquid asset data, 401k data, IRA data, property holdings, and the like.

The user's 132 financial state may be determined by employing one or more trained machine learning models 704. For example, the trained machine learning model 704 may receive enterprise resource 128 data (e.g., accounts receivable data, accounts payable data, account balance data (derived from one or more enterprises), liquid asset data, illiquid asset data, 401K data, IRA data, property holding data, and the like) and determine a future financial state of the user's accounts receivable data, accounts payable data, account balance data, liquid asset data, illiquid asset data, 401k data, IRA data, and the like. The extent of the prediction of the financial state may depend on how the machine learning model 704 was trained (e.g., trained to predict a financial state six months into the future, trained to predict one year into the future, etc.).

In some embodiments, the dimensionality of the received enterprise resource 128 data may be reduced such that only statistically significant data (or other data determined to be relevant) is applied to the machine leaning model 704. For example, the SFE may reduce the dimensionality of the data received by the SFE 606 using clustering, support vector machines, decision trees, filtering, and the like. For example, statistically insignificant data (e.g., noise) may be removed using a Kalman filter, a Z-test, a T-test, or other machine learning model.

The ICS controller 104 may proceed to step 906a, 906b, 906c or some combination.

At step 906a, the ICS controller 104 may transmit the user's 132 financial state to the user 132. In some embodiments, the ICS controller 104 may transmit the information via a notification. The notification may include the predicted future financial state of the user's 132 accounts receivable data, accounts payable data, account balance data, liquid asset data, illiquid asset data, 401k data, IRA data, and the like. The notification may also categorize the predicted future financial state of the user 132.

In some embodiments, the SFE 606 may categorize the predicted financial state of the user 132 into negative and positive predicted financial states. For example, a negative financial state may be a in which the user 132 does not have enough money to pay various accounts payable at the end of a month. A positive financial state may be a state in which the user 132 has a surplus of money. In a different example, a positive financial state may be a state in which the user 132 has enough money available in one or more accounts to make the necessary monthly payments.

The SFE 606 may determine whether the financial state of the user is a negative financial state based on statistically or algorithmically combining (or comparing) one or more predicted outputs from the machine learning model 704. For example, the SFE 606 may compare the predicted accounts receivable data with the predicted account balance and predicted accounts payable data. If the predicted accounts payable value is greater than an aggregated predicated account balance and predicted accounts receivable value, then the SFE 606 may determine that the user is in a negative financial state.

In contrast, if the aggregated predicted account balance and predicted accounts receivable value is greater than the predicted accounts payable value (by a predetermined percentage amount, for example), then the SFE 606 may determine that the user 132 is not in a negative financial state. For instance, if the aggregated (e.g., sum) predicted account balance and predicted accounts receivable value is 10% greater than the predicted accounts payable value, then the SFE 606 may determine that the user 132 is not in a negative financial state. In some embodiments, if the SFE 606 determines that the user 132 is not in a negative financial state, then the SFE 606 may determine that the user 132 is in a positive financial state.

In other embodiments, the SFE 606 may employ one or more thresholds (statically or dynamically determined) to evaluate whether the user 132 is in a positive financial state. For example, if the aggregated predicted account balance and predicted accounts receivable value is 10% greater than the predicted accounts payable value, then the SFE 606 may determine that the user is not in a negative financial state, and if aggregated predicted account balance and predicted accounts receivable value is 30% greater than the predicted accounts payable value, then the SFE 606 may determine that the user is in a positive financial state.

At step 906b, the ICS controller 104 may transmit the user's 132 financial state to an account manager (i.e., rather than the user). For example, the ICS controller 104 may transmit the user's financial state to a customer relationship manager which is assigned (i.e., in the CRM application 129) to the user or entity. The customer relationship manager may be an account manager at the institution corresponding to the ICS controller 104. The customer relationship manager may use the financial state for updating a financial plan for the user, for determining one or more recommendations for the customer, etc. In some embodiments, the ICS controller 104 may transmit the information via a notification. The notification may include the future financial state of the user's 132 accounts receivable data, accounts payable data, account balance data, liquid asset data, illiquid asset data, 401k data, IRA data, and the like. The notification may also categorize the future financial state of the user 132 into positive and/or negative financial states, as discussed herein.

At step 906c, the ICS controller 104 may determine a recommendation for the user 132. That is, the financial state information may be fed into one or more downstream applications. More specifically, the SFE 606 may determine a recommendation for the user 132 using a machine learning model 704 trained to receive financial state information such as enterprise resource 128 data including accounts receivable data, accounts payable data, account balance data, liquid asset data, illiquid asset data, 401k data, IRA data, property holdings, and the like and predict recommendations (e.g., opening an account, transferring holdings between accounts to optimize savings, investing money in stocks, investing money in bonds, investing money with various companies, taking out a loan, identifying property as collateral, identifying future accounts receivable as collateral, refinancing a loan, and the like).

Alternatively or additionally, the machine learning model 704 may be trained to receive predicted financial state information such as future accounts receivable data, future accounts payable data, future account balance data, future liquid asset data, future illiquid asset data, future 401k data, future IRA data, future property holdings, and the like and predict recommendations (e.g., investing money in stocks, investing money in bonds, investing money with various companies, identifying property as collateral, identifying future accounts receivable as collateral, refinancing a loan, and the like).

The output of the machine learning model 704 may include probabilities of various recommendations. The SFE 606 may determine a recommendation based on the recommendation with the maximum probability. The recommendation may indicate a recommendation with the highest probability that a customer relationship manager would recommend, and/or a recommendation that results in the highest probability of a favorable outcome. For example, a favorable outcome may be an outcome that includes the user's 132 account balance and accounts receivable value being greater than the user's 132 accounts payable value. Recommendations may be based on historic recommendations and include recommending the user 132 to invest their money in stocks, invest their money in bonds, invest their money with various companies, identify property as collateral, identify future accounts receivable as collateral, refinance the loan, and the like.

Alternatively or additionally, in response to a user 132 input, SFE 606 may determine a particularly classified recommendation. Recommendations may be classified into various groups, where groups of recommendations may include aggressive recommendations, conservative recommendations, or moderate recommendations. The recommendations may be classified and/or grouped based on information received from customer and/or customer relationship managers feedback. The SFE 606 may employ clustering (such as k-means clustering or other suitable unsupervised learning methods) to determine the recommendations in the groups of recommendations.

In k-means clustering, for example, groups of recommendations may be clustered by randomly generating a centroid and associating a group of recommendations (e.g., aggressive recommendations, conservative recommendations, or moderate recommendations) with the centroid. Recommendations may be clustered based on relative distances between the recommendations and the centroids. The centroids may be moved to new relative locations based on minimizing the average distance of each of the recommendations associated with the centroid. Each time the centroid moves, the distance between the recommendations and the centroid may be recalculated. The clustering process may iterate until a stopping criteria is met (e.g., recommendations do not change clusters, the sum of the distances is minimized, a maximum number of iterations is reached). In some embodiments, distances may be measured between the recommendations and centroids using Euclidean distance. In other embodiments, the distance between the recommendations and the centroids may be measured based on correlation features of the recommendations.

Alternatively or additionally, each recommendation may be treated as a centroid. The recommendations may be clustered based on the distances of the centroid recommendations to the other recommendations. Distance measure may include, for example, the smallest maximum distance to other recommendations, the smallest average distance to other recommendations, and the smallest sum of squares of distances to other recommendations.

Figure 10:
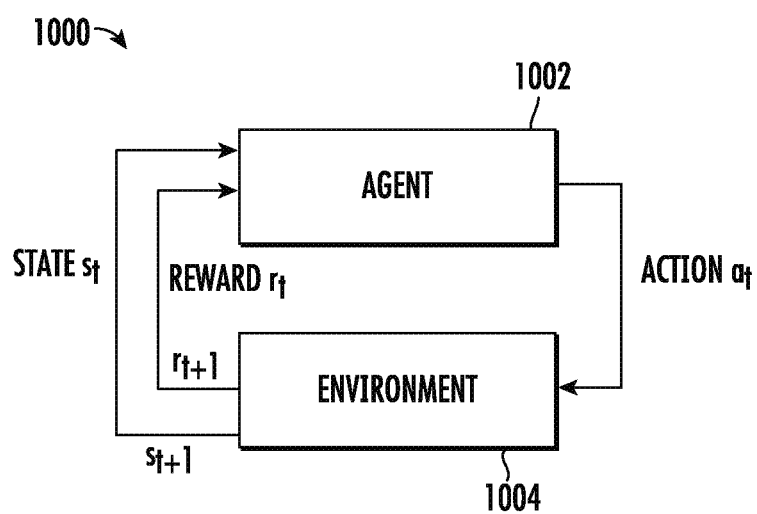
FIG. 10 is a block diagram of an example system using reinforcement learning, according to an exemplary embodiment.

In an example, a user 132 may use the user device 134 to select (e.g., via drop-down menus, scroll wheels, etc.) an aggressive recommendation. Accordingly, the SFE 606 may determine a recommendation from the group of aggressive recommendations with the maximum probability responsive to the user 132 selecting their preferred level of aggressiveness for a recommendation Referring now to FIG. 9 and FIG. 10, the SFE 606 may generate a recommendation for the user 132 using reinforcement learning. Specifically, FIG. 10 shows a block diagram of an example system using reinforcement learning. Reinforcement learning is a method of training a machine learning model using agents selecting actions to maximize rewards based on a policy network.

In reinforcement learning, an agent 1002 interacts with an environment 1004. As used herein, the "agent" 1002 refers to the learner or the trainer. The environment 1004 refers to the predicted financial state of the user 132. At each time step t (e.g., each iteration), the agent 1002 observes a state $s_t$ of the environment 1004 and selects an action from a set of actions. The possible set of actions may include investing money in stocks, investing money in bonds, investing money with various companies, identifying property as collateral, identifying future accounts receivable as collateral, refinancing a loan, and the like.

Using reinforcement learning, for example, given the user's 132 environment 1004, the agent 1002 may recommend using collateral from ERP application 130 data. In particular, given the user's 132 predicted financial state (e.g., a negative financial state in which an accounts payable value is greater than an aggregated sum of an account balance and accounts receivable), the agent 1002 may select an action of recommending a loan using a particular property as collateral for the loan.

Agents 1002 may select an action based on the value of taking each action, where the value of selecting the action is defined as the expected reward received when taking that action from the possible set of actions. Agents 1002 may select actions based on exploratory actions and exploitation actions. An exploratory action improves an agent's 1002 knowledge about an action by using the explored action in a sequence resulting in a reward calculation. An exploitation action is a "greedy" action that exploits agent's 1002 current action-value estimates. Using epsilon-greedy action selection, for example, the agent 1002 balances exploratory actions and exploitation actions. The agent 1002 may select an epsilon value and perform an exploitation action or an exploratory action based on the value of the epsilon and one or more exploitation and/or exploration thresholds. The agent 1002 may randomly select an epsilon value and/or select an epsilon value from a predetermined distribution of epsilon values.

Agents 1002 may also select an action using a policy TT, where IT maps states (and observations) to actions. The policy IT gives the probability of taking a certain action when the agent 1002 is in a certain state.

In response to selecting an action (or multiple actions), the environment 1004 may change, and there may be a new state $s_{t+1}$. The agent 1002 may receive and/or determine feedback, indicating how the action affected the environment 1004.

The agent 1002 learns (e.g., reconfigures its policy TT) by taking actions and analyzing the rewards received. A reward functions can include, for example, $R(s_t)$, $R(s_t, a_t)$, and $R(s_t, a_t, s_{t+1})$. In some configurations, the reward may be a recommendation goodness function. For example, a reward function based on recommendation goodness may include various quadratic terms representing considerations determined by a customer relationship manager or other specialist when providing recommendations to user 132 based on the user's 132 financial state.

Each iteration (or after multiple iterations and/or steps), the agent 1002 may select a policy TT (and an action) based on the current state $s_t$ and the agent 1002 may calculates a reward. Each iteration, the agent 1002 may iteratively increase a summation of rewards.

One goal of reinforcement learning is to determine a policy IT that maximizes the cumulative set of rewards, determined via the reward function. A core policy network evaluates the environment 1004 and produces probabilistic distributions that the agent 1002 uses to select how to modify the recommendation for a given user 132 financial state.

At each step (or series of steps) policies may be weighed based on the rewards determined such that certain policies (and actions) are encouraged and/or discouraged in response to the environment 1004 being in a certain state. Weights may be determined to maximize the objective function (e.g., reward function) during training. The policies are optimized by taking the gradient of the objective function (e.g., a reward function) to maximize a cumulative sum of rewards at each step, or after a predetermined number of steps (e.g., a delayed reward).

In some embodiments, the rewards at each step may be compared (e.g., on an iterative basis) to a baseline. The baseline may be an expected performance (e.g., a customer relationship manager recommendation), or an average performance (e.g., an average recommendation over a series of steps). Evaluating a difference between the baseline and the reward is considered evaluating a value of advantage (or advantage value. The value of the advantage indicates how much better the reward is from the baseline (e.g., instead of an indication of which actions were rewarded and which actions were penalized).

The agents 1002 may train themselves by choosing the action(s) based on policies that provide the highest cumulative set of rewards. The agents 1002 of the machine learning model may continue training until a predetermined threshold has been satisfied. For instance, the machine leaning model may be trained until the advantage value is within a predetermined accuracy threshold. Alternatively or additionally, the machine learning model may be trained until a predetermined number of steps (or series of steps called episodes, or iterations) have been reached.

To improve the rate in which the agents learn, asynchronous advantage actor critic reinforcement learning may be performed by using processor 608 (e.g., a GPU) to instantiate multiple learning agents 1002 in parallel. Each agent 1002 asynchronously performs actions and calculates rewards using a single machine learning model (such as a deep neural network) and a global model.

In some configurations, policies may be updated every step (or predetermined number of steps) based on the cumulative rewards determined by each agent 1002. Each agent 1002 may contribute to the global policy such that the total knowledge of the global model increases and the global policy learns how to best modify the recommendations. Each time the global model is updated (e.g., after every step and/or predetermined number of steps), new weights are propagated back to agents 1002 such that each agent 1002 shares common policies.

The global model allows each agent 1002 to have a more diversified training data and eliminates a need for synchronization of models associated with each agent 1002. In other configurations, there may be models associated with each agent 1002 and each agent 1002 may calculate a reward using a corresponding machine learning model. In some embodiments, agents 1002 in other servers may update the global model (e.g., federated learning).

Once trained and validated, the agents 1002 may be employed during a testing (or an inference phase). During testing, the machine learning model (and in particular, the agents 1002) may ingest unknown data to predict recommendations.

Referring back to FIG. 9, in some embodiments, other probabilistic analyses may be performed to determine one or more recommendations based on present or future financial state information. For example, a Monte Carlo simulation may be used to generate a probability distribution for each recommendation. Various recommendations may be mathematically represented using functions. For example, a recommendation function may include various quadratic terms representing considerations determined by a customer relationship manager or other specialist when providing recommendations to users 132 based on the user's 132 financial state.

One or more variables in a function may be assigned as a random variable such that each time an iteration is performed, a value will be selected for the random variable from a normal distribution, uniform distribution, lognormal distribution, and the like depending on the variable. For example, some variables may have values selected from a normal distribution of values, while other variables have values selected from a normal distribution of values.

The SFE 606 may determine a recommendation based on a maximum probability of each of the maximum probabilities of the Monte Carlo recommendation simulations. Alternatively or additionally, the SFE 606 may determine a maximum recommendation based on a group of recommendations, where the group of recommendations may include groups of aggressive recommendations, conservative recommendations, or moderate recommendations.

Referring back to FIG. 9, the ICS controller 104 may proceed to step 908*a*, 908*b*, 908*c* or some combination.

At step 908*a*, the ICS controller 104 may transmit the user's 132 financial state and the recommendations to the user 132. In some embodiments, the ICS controller 104 may transmit the information via a notification. The notification may include the future financial state of the user 132 (e.g., 132 accounts receivable data, accounts payable data, account balance data, liquid asset data, illiquid asset data, 401k data, IRA data, and the like) and the recommendation based on predicted data of a financial state of the user 132.

For example, the SFE 606 may determine in the future that the user 132 will not have enough liquid assets to pay their bills. Based on the future prediction of the financial state of the user 132 (e.g., not having enough liquid assets to pay their bills), the SFE 606 may recommend taking out a loan and using particular property as collateral backing. Accordingly, the user 132 may avoid the predicted future financial state (e.g., not having enough liquid assets to pay their bills) by presently taking out a loan and using the particular property as collateral backing.

At step 908*b*, the ICS controller 104 may transmit the user's 132 financial state and/or the recommendations to an account manager. Step 908*b* may be similar in some regards to step 906*b*. For example, the ICS controller 104 may transmit the recommendation to an account manager which is assigned to the user. The account manager may be a dedicated team member assigned to the accounts of the user. The account manager may be a general analyst who is receives the recommendation. In these and other embodiments, the account manager may provide the recommendation to the customer. The account manager may provide the recommendation generated by the ICS controller 104 accompanied with other recommendations (i.e., generated by the account manager and/or third parties). In some embodiments, the ICS controller 104 may transmit the information via a notification. The notification may include the future financial state of the user 132 (e.g., 132 accounts receivable data, accounts payable data, account balance data, liquid asset data, illiquid asset data, 401k data, IRA data, and the like) and the recommendation based on predicted data of a financial state of the user 132.

At step 908*c*, the ICS controller 104 may transmit the user's 132 financial state and/or the recommendations to a third party. The third party may be an underwriter associated with a loan which was applied for by the user (or an entity associated with the user). For example, the underwriter may be tasked with underwriting (or evaluating a likelihood of success) associated with the loan applied for by the user/entity. The ICS controller 104 may be configured to transmit the user's financial state and/or recommendations to a device or portal associated with the underwriter. The underwriter may user the financial state and/or recommendations for approving/denying a loan application, or otherwise receiving more information relating to an applicant. While traditionally underwriters do not have ERP/CRM data available to them, the systems and methods described herein leverage such data to provide recommendations and predicted future financial states, which may be used for loan underwriting decisions.

Figure 11:
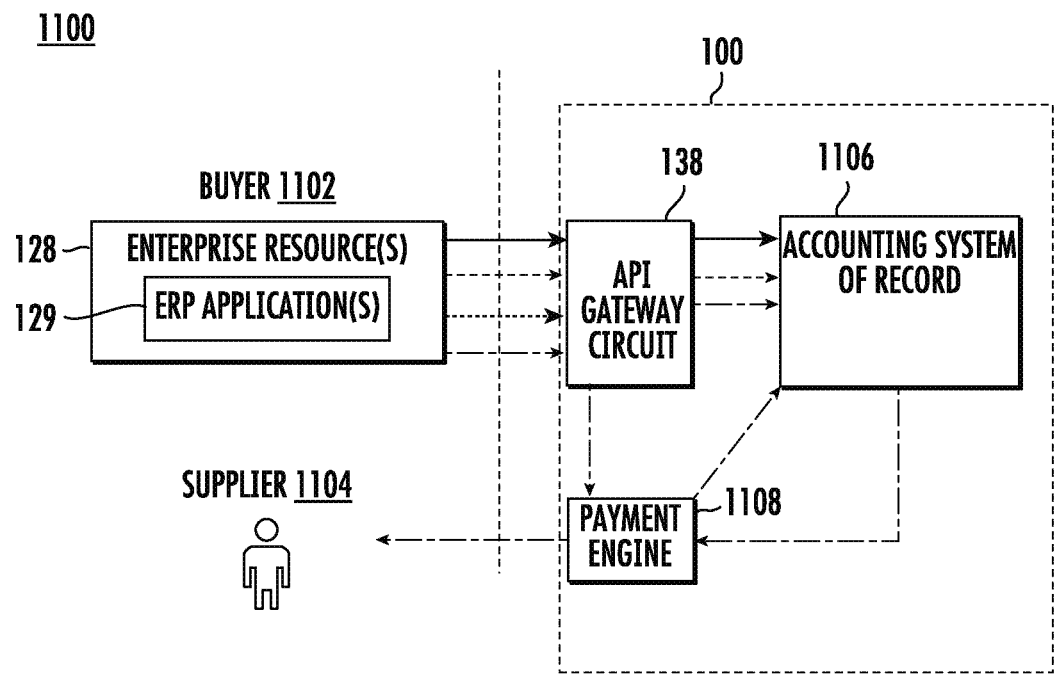
FIG. 11 is a system for financing accounts payable, according to an exemplary embodiment.
Figure 12:
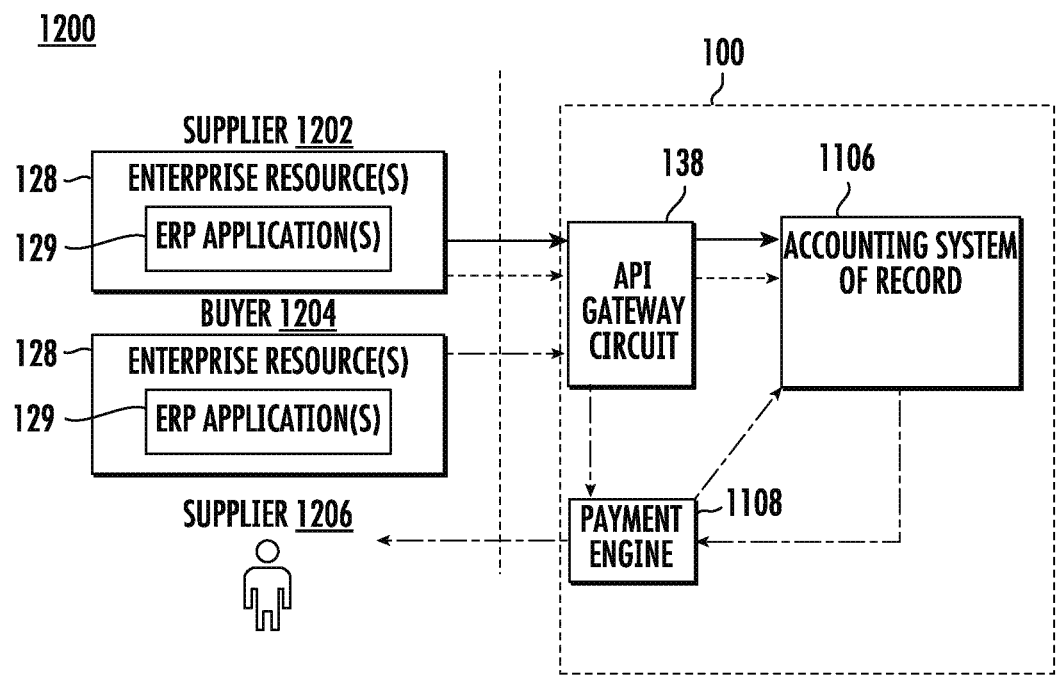
FIG. 12 is a system for a buyer financing accounts receivable, according to an exemplary embodiment.
Figure 13:
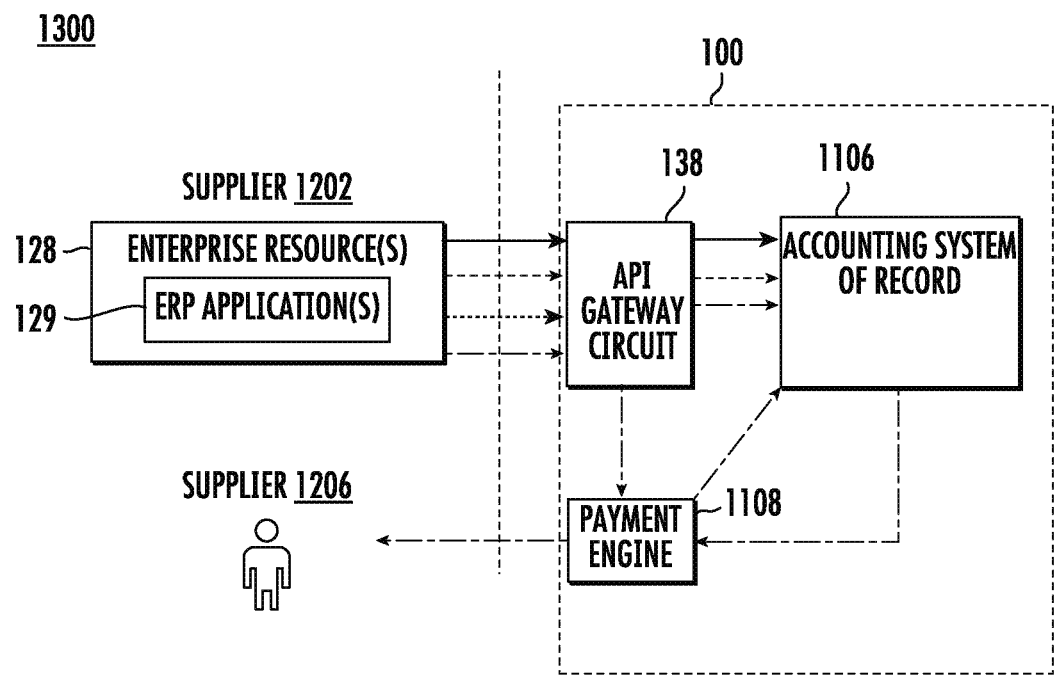
FIG. 13 is a system for a seller financing accounts receivable, according to an exemplary embodiment.

In some embodiments, the systems and methods described herein may be used for financing accounts payable (i.e., supply chain financing (SCF)) such that a buyer may finance payments to a supplier, and or financing accounts receivable (i.e., key accounts purchase (KAP)) such that one party can finance accounts receivable to receive payment at an earlier date than an expected payment date or payment due date. Referring generally to FIG. 11-FIG. 13, depicted are diagrams of systems 1100-1300 for financing accounts payable and accounts receivable, according to various embodiments of the present disclosure. Specifically, FIG. 11 shows a system 1100 for financing accounts payable, according to an illustrative embodiment. FIG. 12 shows a system 1200 for a buyer financing accounts receivable, according to an illustrative embodiment. FIG. 13 shows a system 1300 for a seller financing accounts receivable, according to an illustrative embodiment. The systems 1100-1300 may include components similar to those described above, such as the enterprise resource(s) 128, the ICS 100, the API gateway circuit 138, and so forth.

In some embodiments, the API gateway circuit 138 may include additional APIs to those shown in FIG. 2. For example, the API gateway circuit 138 may include a send invoice data API, a send payment API, a send payment advice API, and/or an inquiry API. These additional APIs may be used in the systems 1100-1300 as described in greater detail below to facilitate financing accounts payable and/or accounts receivable, according to various embodiments of the present disclosure. In some embodiments, the send invoice data API may be used to send invoice data from a buyer/supplier computing device to the ICS 100. The ICS 100 may be configured to receive the invoice data from the buyer/supplier computing device via the send invoice data API. The ICS 100 may be configured to automatically trigger processing and sending of payments (e.g., to a buyer or supplier) responsive to receiving the invoice data via the send invoice API. In some embodiments, the invoice data API may be incorporated into the transact circuit 250 shown in FIG. 2. The send payment API may be used (e.g., by a buyer or supplier) to pay money owed to the institution maintaining the ICS 100. In some embodiments, the send payment API may be incorporated into the transact circuit 250 shown in FIG. 2. For example, the send payment API may be similar in some respects to the payment initiation circuit 252, the ACH payment circuit 254, real time payment circuit 258, and/or the wire payment circuit 260. The send payment API may accept or facilitate payments via ACH, wire transfers, real-time payments, etc. The inquiry API may be configured to receive status requests or inquiries regarding expected payments from either a buyer or a supplier. For example, the inquiry API may be configured to receive requests relating to payment due dates, payment amounts, and/or other related information. The inquiry API may be incorporated into the services circuit 240, for example. The send payment advice API may be configured to send and/or receive data relating to payments that have been sent separately. For example, the send payment advice API may be used for internal reconciliation and accounting against a loan (i.e., by a supplier and/or a buyer).

Figure 14:
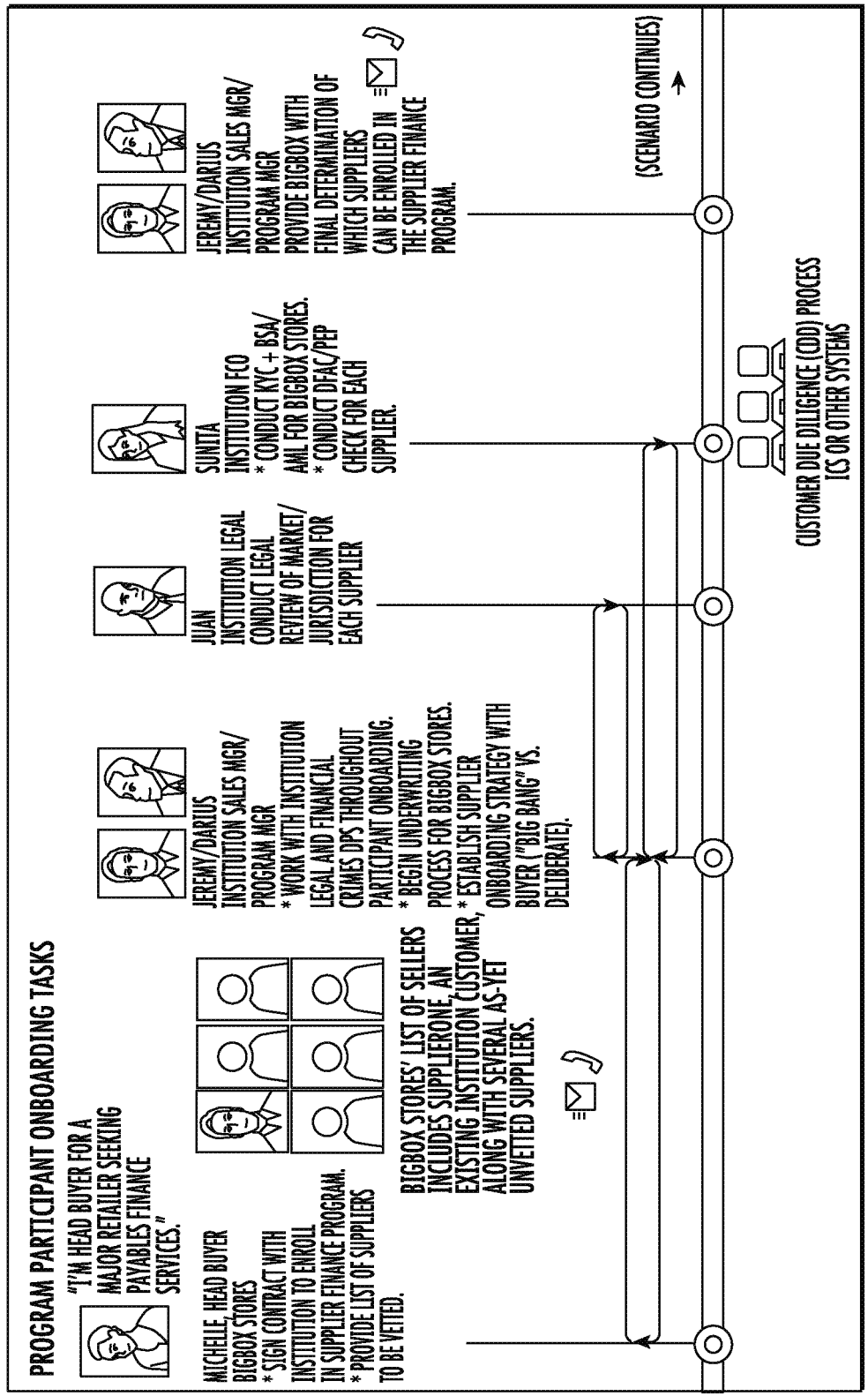
FIG. 14-FIG. 16 show a series of diagrams showing a use case for financing accounts payable, according to an exemplary embodiment.
Figure 15:
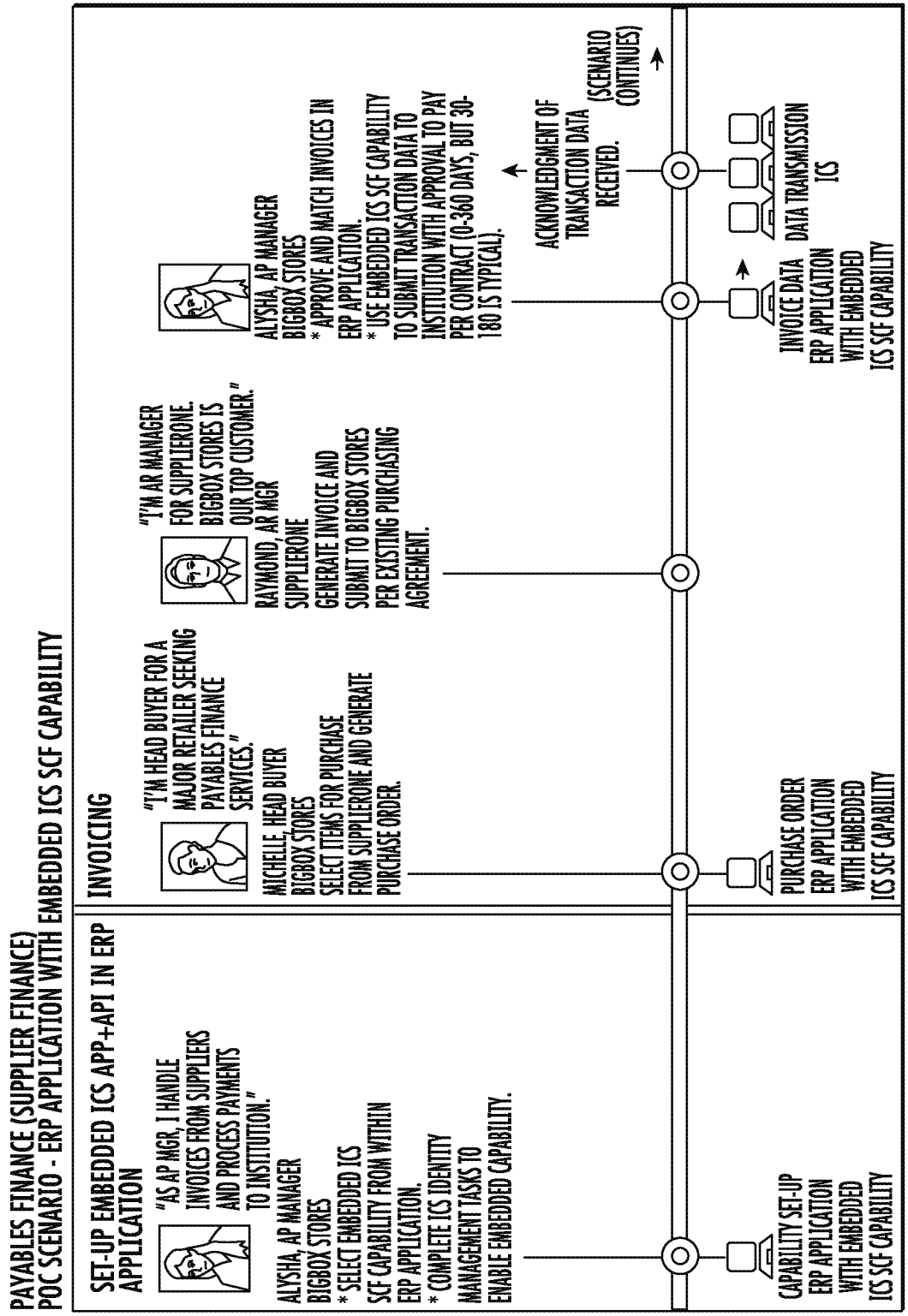
Figure 16:
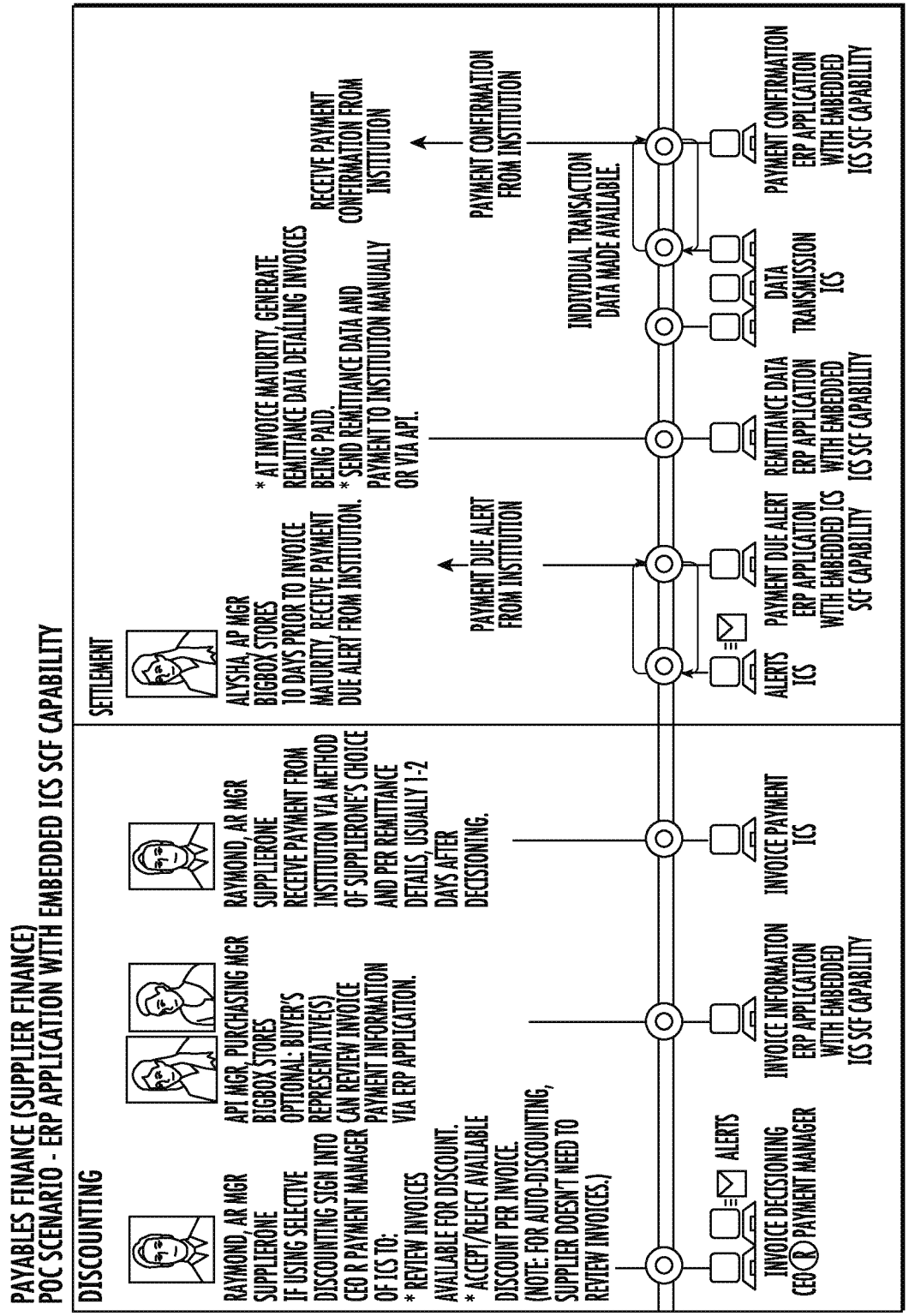

Referring now to FIG. 14-FIG. 16, depicted is a series of diagrams showing a use case for financing accounts payable (also referred to herein as supplier financing), according to an illustrative embodiment. FIG. 14-FIG. 16 are described herein in conjunction with FIG. 11.

As shown in FIG. 14, as part of onboarding, a buyer 1102 may be onboarded with the ICS 100, which may include engaging in a contract and providing a list of suppliers 1104 to the ICS 100. The list of suppliers 1104 may include existing customers (or tenants, participants, members, clients, etc.) of the ICS 100, and non-customers of the ICS 100. The ICS 100 (including various users, administrators, or other entities of the institution) may perform due diligence of the buyer 1102, including performing underwriting, legal/compliance evaluation of various markets of the buyer 1102, collecting data relating to the buyer 1102 and/or supplier 1104 (i.e., know your customer (KYC) data for the buyer 1102, bank secrecy act (BSA)/anti-money laundering (AML) compliance data for the buyer 1102, office of foreign assets control (OFAC) and/or politically exposed persons (PEP) checks for the suppliers 1104, and so forth), and establishing an onboarding strategy with the buyer 1102. In some embodiments, the ICS 100 may be configured to onboard buyers 1102 and at least some of the suppliers 1104. For example, some of the suppliers 1104 may be enrolled within the supplier financing program. Following due diligence, the ICS 100 may provide the buyer 1102 an indication or determination of which suppliers 1104 can be enrolled in the supplier financing program described herein. As part of enrollment of the suppliers 1104, the suppliers 1104 may receive payments and billings from the buyers 1102 under a purchase agreement between the supplier 1104 and buyer 1102.

As shown in FIG. 15, and following enrollment as described above in FIG. 14, the buyer 1102 may set up, establish, or otherwise provide an ERP application 130 access to data from the ICS 100. For example, the buyer 1102 may select an option for establishing a connection (such as an electronic data interchange (EDI) connection as described in FIG. 27-FIG. 28 below) between an ERP application 130 and the ICS 100. The buyer 1102 may complete ICS identity management tasks to provide embedded ICS capabilities within the ERP application 130 (such as, for example, signing into an account for the ICS 100 via an interface of the ERP application 130).

At a subsequent point in time, the buyer 1102 may select items for purchase from a supplier 1104. The buyer 1102 may generate a purchase order (e.g., within the ERP application 130 or via a different application or interface), and submit the purchase order to the supplier 1104. The supplier 1104 may generate an invoice and submit the invoice to the buyer 1102 as per an existing purchasing agreement (i.e., between the buyer 1102 and supplier 1104). Following the buyer 1102 receiving the invoice from the supplier 1104, the buyer 1102 may approve and match the invoice with the purchase order in the ERP application 130. In the embodiments shown in FIG. 11, the buyer 1102 may submit the invoice received from the supplier 1104 to the ICS 100 using the ERP application 130, accompanied with instructions for paying the invoice (i.e., to pay the supplier 1104 according to the purchasing agreement, such as within a certain number of days from the date of the invoice). In some embodiments, the ERP application 130 may transmit the invoice (or data from the invoice) to the ICS 100 as an API call to the API gateway circuit 138 (shown as a solid line from the enterprise resources 128 to the API gateway circuit 136). The API gateway circuit 138 may forward, send, or otherwise provide the invoice data to the send invoice data API (also referred to herein as invoice API) for processing. As described in greater detail below with reference to FIG. 17, the buyer 1102 may designate the invoice from the supplier 1104 for financing by the institution using the ERP application 130 through the invoice API.

The ICS 100 may be configured to receive the invoice data via the invoice API. The ICS 100 may be configured to route, transmit, or otherwise provide (i.e., automatically) the invoice data to an accounting system of record 1106. The accounting system of record 1106 may be configured to maintain records or data relating to customer(s) of the ICS 100. In some embodiments, the accounting system of record 1106 may include a microservice backend and a batch interval processing circuit which are communicably coupled to a database or other data structure. The microservice backend may be configured to ingest, analyze, process, or otherwise parse data received via the API gateway circuit 138. The microservice backend may be configured to populate the database with data for the buyer 1102, supplier 1104, and so forth (such as data relating to financed invoices, outstanding payments, payments received, and the like). The batch interval processing circuit may be configured to process, implement, or otherwise initiate transactions at various intervals.

As shown in FIG. 16, in some embodiments, the ICS 100 may provide a discounting option to the supplier 1104. The discounting option may be an option in which a supplier 1104 may accept or reject available discounts per invoices. For example, a user may accept a discount to receive payment from the institution of the ICS 100 earlier than contracted at a discount relative to the invoice amount. If the supplier is enrolled in selective discounting, a user of the supplier 1104 may access a corresponding ERP application 130 (or other enterprise resource 128) which is communicably coupled to the ICS 100 to review invoices which are available for discount and accept/reject the discounts for the invoices. In some embodiments, the user of the supplier 1104 may access an ICS 100 application or interface (shown in FIG. 16 as a commercial electronic office (CEO) for reviewing invoices which are available for discount and accept/reject the discounts for the invoices. The CEO may be a platform or suite which includes an online and mobile banking platform for account holders with the institution. In some embodiments, the supplier 1104 may receive alerts relating to the available invoices for discounting. In some embodiments, the ICS 100 may generate recommendations regarding whether to accept a discounted invoice based on a cash flow/funds availability for the supplier 1104 (e.g., using one or more of the components described above with reference to FIG. 6-FIG. 10). Where the supplier 1104 accepts an offer for a discount on an invoice, the ERP application 130 may transmit data relating to the acceptance to the ICS 100 via the API gateway circuit 136 for incorporation into the accounting system of record 1106. In some embodiments, following a supplier 1104 accepting the discounted invoice, the buyer 1102 may review the invoice payment information (including the discount) using the ERP application 130 which accesses the data from the accounting system of record 1106 of the ICS 100 via the API gateway circuit 136. The buyer 1102 may exercise an option to pay the invoice (rather than financing) according to the discounted invoice. In some embodiments, following the supplier 1104 accepting the discount for the invoice, the ICS 100 may be configured to initiate payment to the supplier 1104. In some embodiments, the ICS 100 may be configured to initiate payment to the supplier 1104 by causing the batch interval processing engine to transmit data corresponding to the invoice (shown as dot-dot-dash arrow) to a payment engine 1108. The payment engine 1108 may be any device, component, or hardware configured to initiate payments. In some embodiments, the payment engine 1108 may be or include one of the payment APIs described above with reference to FIG. 2 (such as the ACH payment circuit 254, the payment initiation circuit 252, the real time payment circuit 258, wire payment circuit 260, etc.). The ICS 100 may be configured to initiate payment according to a selected payment method provided by the supplier 1104 (e.g., via the ERP application 130 of the supplier 1104).

Following payment of the supplier 1104 by the institution, the invoice may become due to the buyer 1102. At this point, the buyer 1102 may settle with the institution. In some embodiments, the buyer 1102 may initiate various inquires (shown as a dashed line) at various times between sending an invoice and settlement within the ERP application 130. The ERP application 130 may transmit the inquiry data via the inquiry API of the API gateway circuit 136 to the ICS 100. The accounting system of record 1106 may transmit responses to the inquiries back to the ERP application 130 for rendering to the buyer 1102 (as described in greater detail with reference to FIG. 18). At a predetermined duration prior to invoice maturity (such as 10 days), the ICS 100 may initiate one or more alerts to the ERP application 130 for rendering to the buyer 1102. At invoice maturity, the buyer 1102 may generate remittance data which details invoices being paid by the buyer. The buyer 1102 may send remittance data and payment to the institution through the ERP application 130 via the send payment API (or manually) (shown as dotted line). The ICS 100 may receive the payment information (i.e., the remittance data) from the ERP application 130 and update the accounting system of record 1106. The ICS 100 may forward the payment information to the payment engine 1108. The payment engine 1108 may be configured to update the accounting system of record 1106 based on the received payment information. The ICS 100 may confirm the payment and provide a payment confirmation through the ERP application 130 to the buyer.

Figure 17:
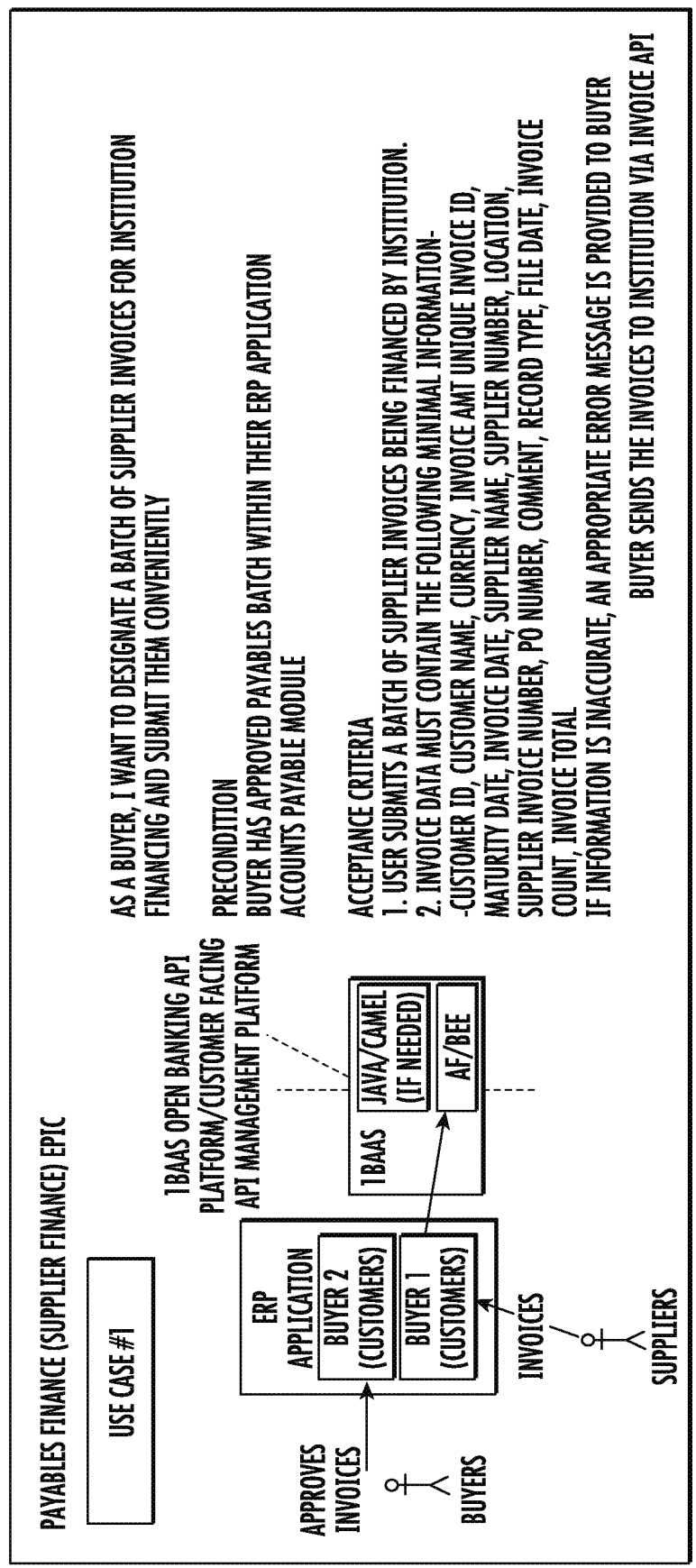
FIG. 17 is a diagram showing a use case for an accounts payable batch financing, according to an exemplary embodiment.

Referring now to FIG. 17, depicted is a diagram showing a use case for an accounts payable batch financing, according to an illustrative embodiment. In this example, the buyer 1102 may designate a batch of supplier 1104 invoices for institution financing and submit them conventionally (i.e., according to the terms of the purchasing agreement between the buyer 1102 and supplier 1104). As a precondition, the buyer 1102 may have approved the payables batch (i.e., the invoices) within an accounts payable module (i.e., an interface element or portion representing accounts payable) of the ERP application 130. A user of the buyer 1102 may submit the batch of invoices being financed by the institution using the ERP application 130. The invoice data may include, at least, a customer (e.g., buyer 1102) identifier, a customer name, a currency or denomination (e.g., for paying/financing in different currencies), an invoice amount, a unique invoice identifier, a maturity date (i.e. a date in which the invoice is to mature), a supplier 1104 name, a supplier 1104 number, a location, a supplier invoice number, a purchase order number, a comment, a record type, a file date, an invoice count, and an invoice total. If the information is inaccurate, the ERP application 130 and/or the ICS 100 may provide an error message to the buyer 1102. The buyer 1102 may send the batch of invoices being financed using the ERP application 130 to the ICS 100 via the invoice API of the API gateway circuit 138.

Figure 18:
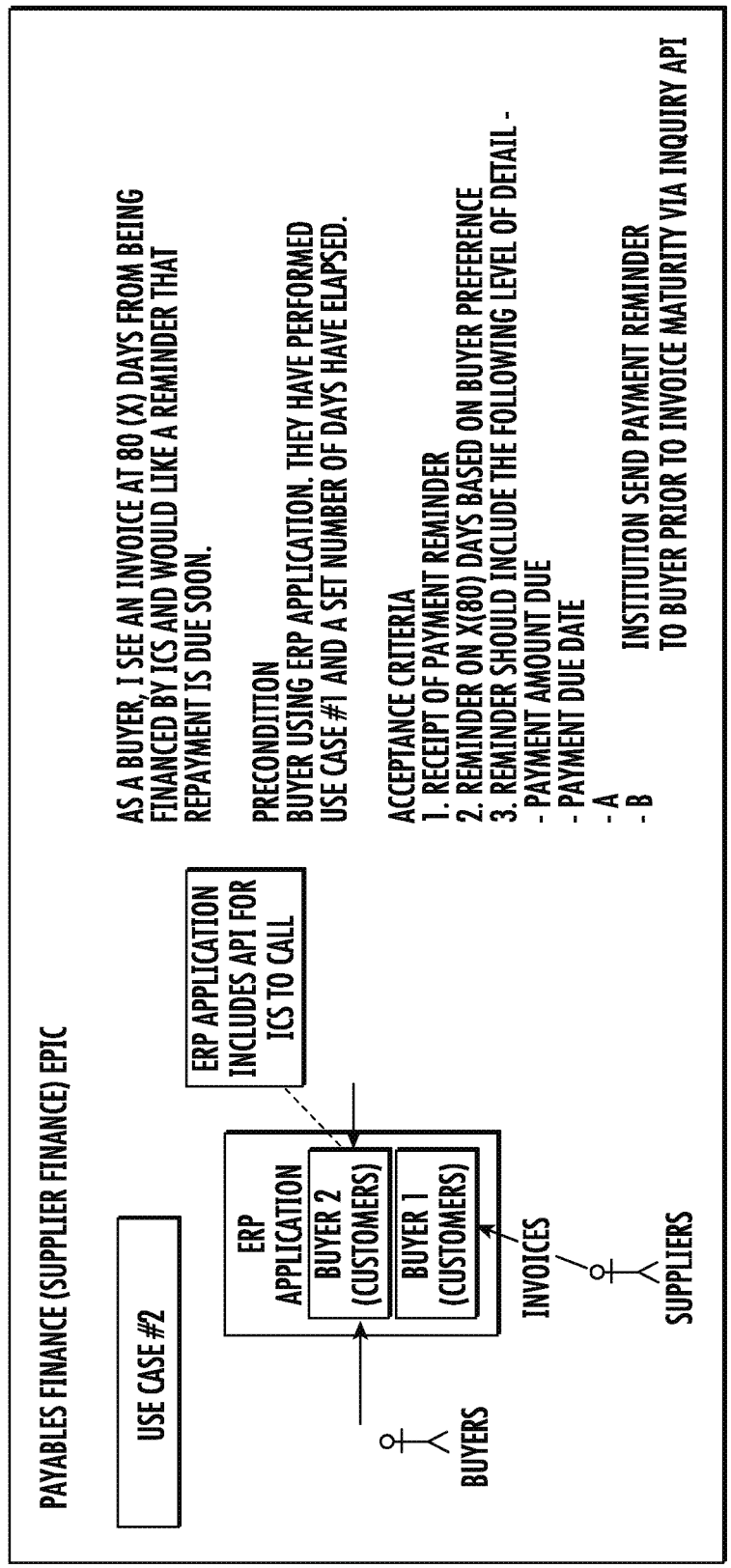
FIG. 18 is a diagram showing a use case for an accounts payable repayment reminder, according to an exemplary embodiment.

Referring now to FIG. 18, depicted is a diagram showing a use case for an accounts payable repayment reminder, according to an illustrative embodiment. In this example, the buyer 1102 may notice that an invoice (i.e., from a supplier) is a certain number of days from being financed by the ICS 100 and the buyer would like a reminder that repayment is due soon. As a precondition to the second use case, the buyer 1102 may be using the ERP application 130, has financed at least one invoice, and at least some number of days have passed. The ICS 100 may send the payment reminder to the buyer 1102 prior to the invoice maturity via the inquiry API of the API gateway circuit 136 for rendering at the ERP application 130 to the buyer 1102. In some embodiments, the ICS 100 may generate the payment reminder for the buyer 1102 a number of days prior to maturity (such as 10 days, 15 days, 30 days, etc.) based on a buyer preference, which may be provided by the buyer 1102 as part of selecting the invoice for financing. The reminder may include, for example, a payment amount due, a payment due date, and any other additional information (such as invoice number, purchase order number, supplier identifier or supplier name, etc.).

Figure 19:
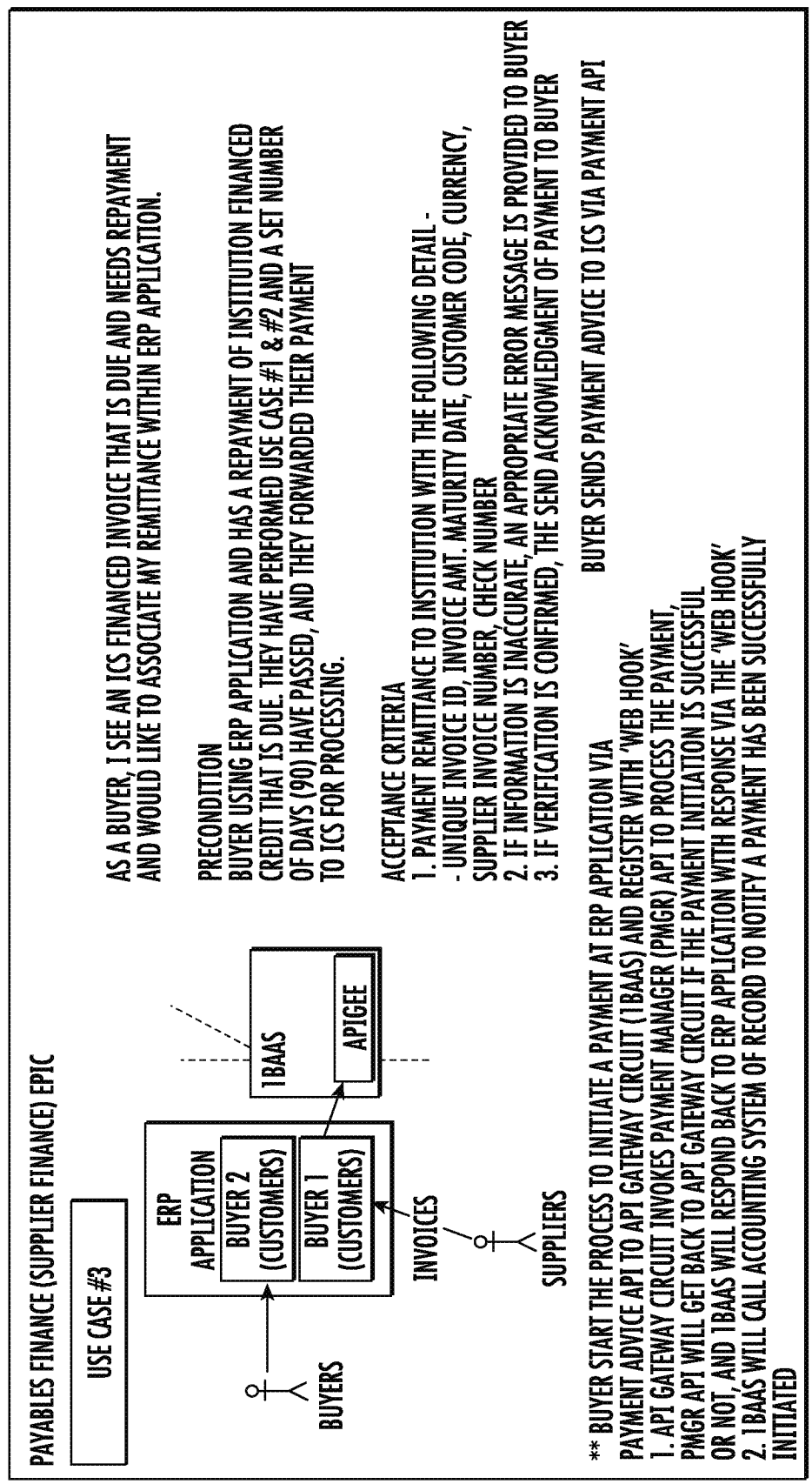
FIG. 19 is a diagram showing a user case for repayment of an accounts payable, according to an exemplary embodiment.

Referring now to FIG. 19, depicted is a diagram showing a user case for repayment of an accounts payable, according to an illustrative embodiment. As shown in FIG. 19, in some embodiments, a buyer 1102 may view (i.e., in the ERP application 130) that the ICS 100 financed an invoice to a supplier 1104 and the buyer 1102 is to associate a remittance within the ERP application 130. As a precondition of repayment, the buyer 1102 may be using the ERP application and have a repayment of an institution financed credit that is due. In other words, the buyer 1102 may have performed the use cases shown in FIG. 17-18, a set number of days have passed, and they have forwarded their payment to the ICS 100 for processing. To accept payment, the ICS 100 may receive (e.g., via the payment manager API of the API gateway circuit 138) from the ERP application 130 a unique invoice ID, an invoice amount, a maturity date, a customer (i.e., buyer 1102) code, a currency (e.g., for paying/financing in different currencies), a supplier invoice number, and a check number. If the information is inaccurate, the ICS 100 and/or ERP application 130 may provide an error message to the buyer 1102. If the information is accurate and verification is confirmed, the ICS 100 and/or the ERP application 130 may send an acknowledgement of payment to the buyer 1102.

In some embodiments, the buyer 1102 may begin the process to initiate a payment with the ICS 100 at the ERP application 130 via the payment manager API of the API gateway circuit 138, and register the ERP application 130 with a web hook of the ICS 100. The API gateway circuit 138 may invoke a payment manager API to process the payment, which may be similar to one of the APIs described with reference to the transact circuit 250 in FIG. 2. The payment manager circuit may respond to the API gateway circuit 138 if the payment initiation from the buyer 1102 is successful or not, which may in turn respond to the ERP application 130 via the web hook. If successful, the API gateway circuit 138 may call (i.e., transmit data to) the accounting system of record 1106 to notify that a payment from the buyer 1102 has been successfully initiated.

Figure 20:
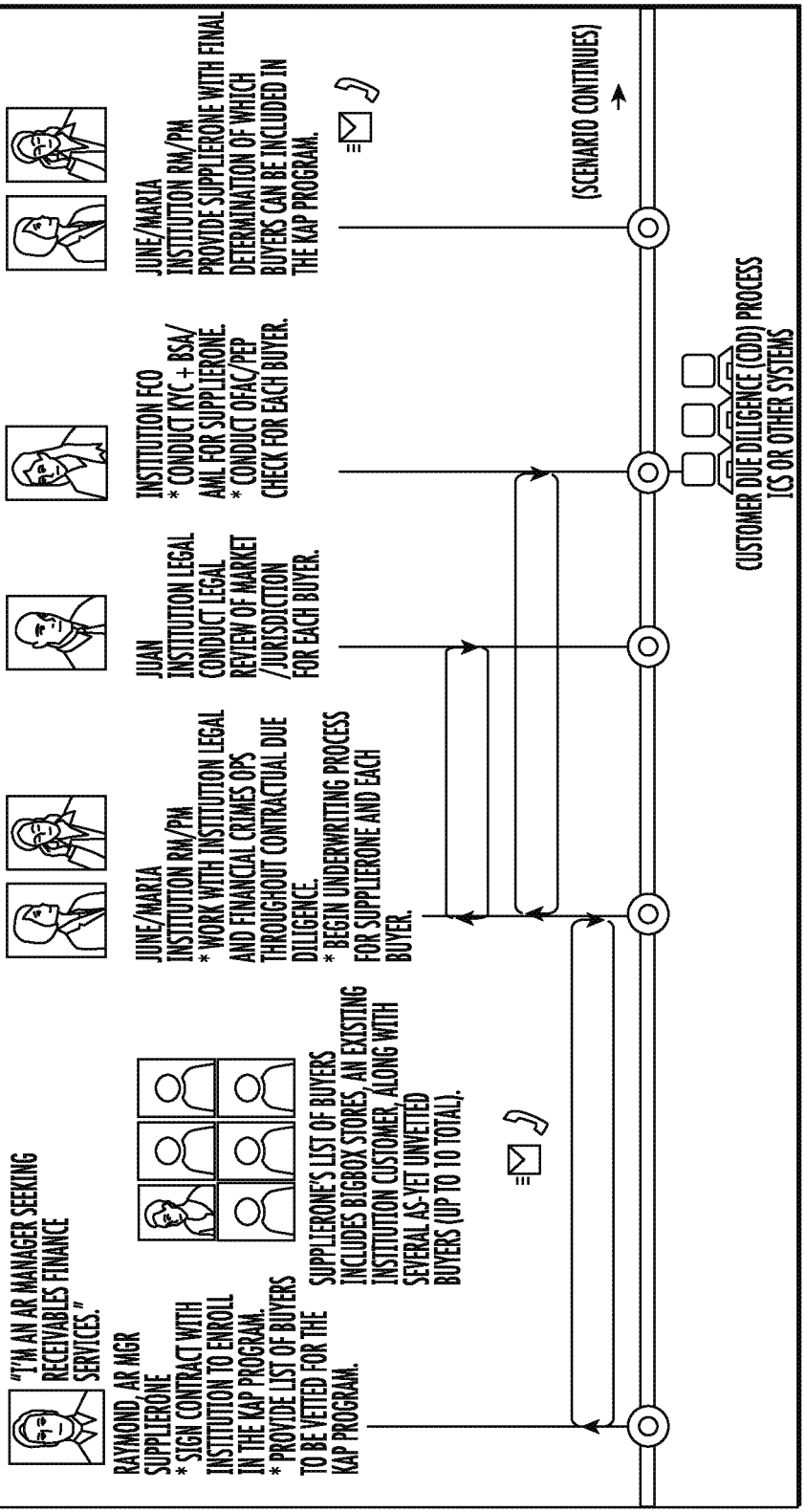
FIG. 20-FIG. 22, show a series of diagrams showing a use case for financing accounts receivable, according to an exemplary embodiment.
Figure 21:
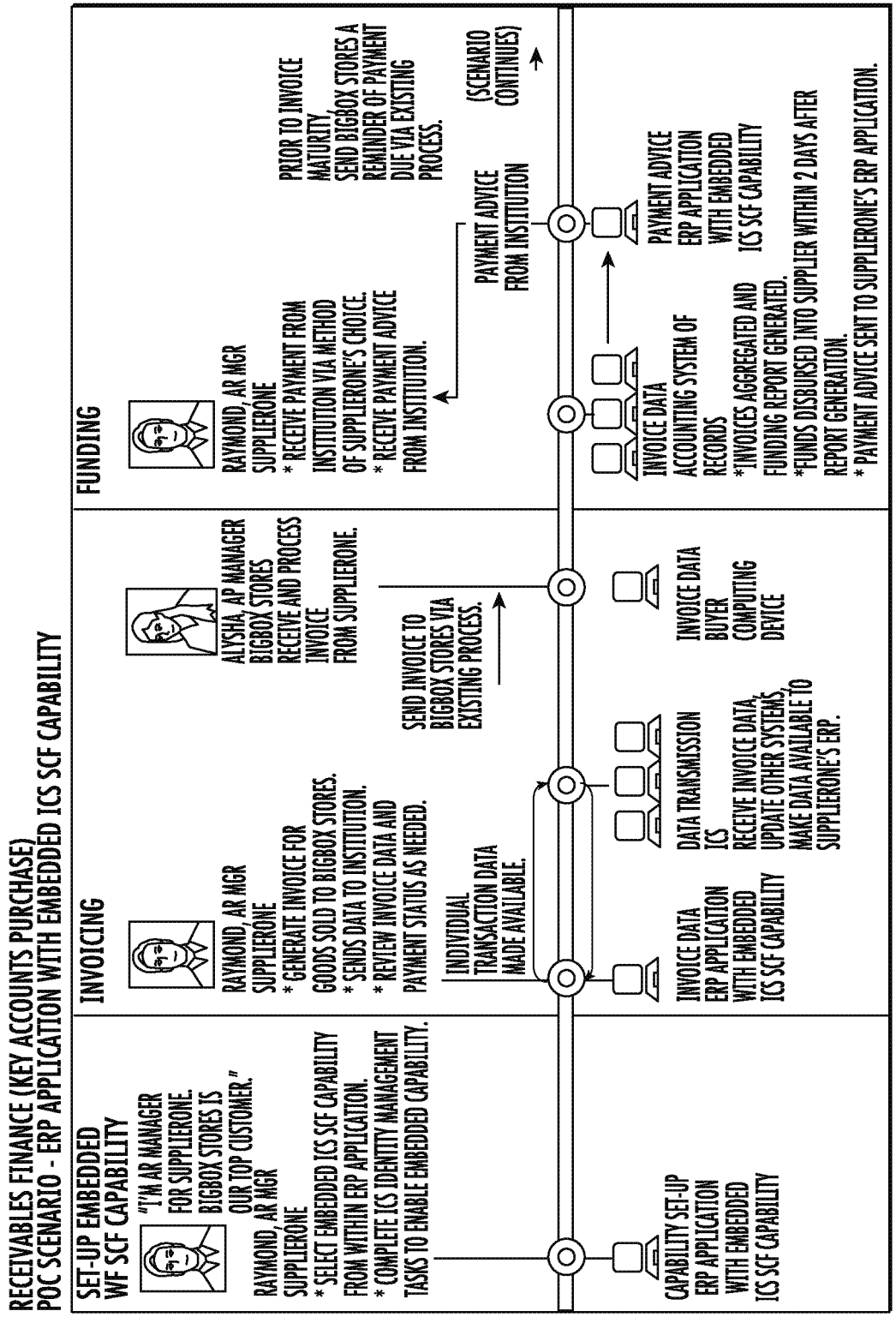
Figure 22:
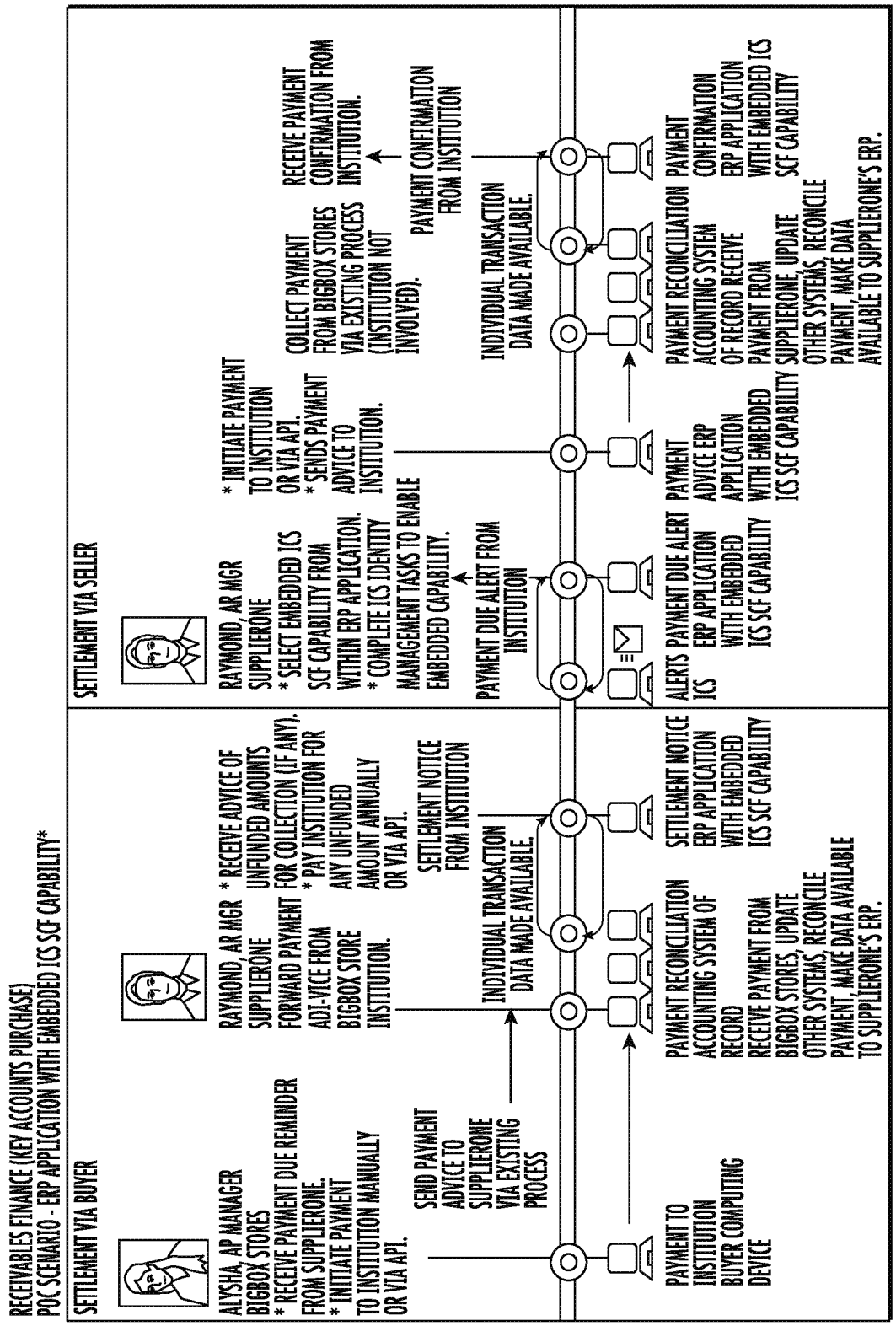

Referring now to FIG. 20-FIG. 22, depicted is a series of diagrams showing a use case for financing accounts receivable (also referred to herein as key accounts purchase), according to an illustrative embodiment. FIG. 20-FIG. 22 are described herein in conjunction with FIG. 12-FIG. 13. In the embodiment shown in FIG. 12, both the seller 1202 and buyer 1204 are enrolled with the ICS 100. On the other hand, in the embodiment shown in FIG. 13, the seller 1202 is enrolled with the ICS 100.

As shown in FIG. 20, as part of onboarding, a supplier 1202 may be onboarded with the ICS 100, which may include engaging in a contract with the institution to enroll in the key accounts purchase program, and providing a list of buyers 1204 to the ICS 100. Onboarding shown in FIG. 20 may be similar in some regards to onboarding described above with reference to FIG. 17. The list of buyers 1204 may include existing customers (or tenants, participants, members, etc.) of the ICS 100, and non-customers of the ICS 100. The ICS 100 (including various users, administrators, or other entities of the institution) may perform due diligence of the supplier 1202, including performing underwriting, legal/compliance evaluation of various markets of the supplier 1202 and/or buyer 1204, collecting data relating to the supplier 1202 and/or buyer 1204 (i.e., know your customer (KYC) data for the supplier 1202, bank secrecy act (BSA)/anti-money laundering (AML) compliance data for the supplier 1202, office of foreign assets control (OFAC) and/or politically exposed persons (PEP) checks for the buyers 1204, and so forth), and/or establishing an onboarding strategy with the supplier 1202. Following due diligence, the ICS 100 may provide the buyer 1102 an indication or determination of which suppliers can be enrolled in the key accounts purchasing program described herein.

As shown in FIG. 21, and following enrollment as described above in FIG. 20, the supplier 1202 may set up, establish, or otherwise provide an ERP application 130 access to data from the ICS 100. For example, the supplier 1202 may select an option for establishing a connection (such as an electronic data interchange (EDI) connection as described in FIG. 27-FIG. 28 below) between an ERP application 130 and the ICS 100. The supplier 1202 may complete ICS identity management tasks to provide embedded ICS capabilities within the ERP application 130 (such as, for example, signing into an account for the ICS 100 via an interface of the ERP application 130).

At a subsequent point in time, the supplier 1202 may generate an invoice for goods sold to a buyer 1204. The supplier 1202 may generate an invoice (e.g., within the ERP application 130 or via a different application or interface), and submit the invoice to the buyer 1204. In some embodiments, the supplier 1202 may send the invoice using the ERP application 130 to the ICS 100 using the send invoice data API of the API gateway circuit 138. The supplier 1202 may review the invoice data and payment status as needed (e.g., via the ERP application 130). In the embodiments shown in FIG. 12 and FIG. 13, the supplier 1202 may submit the invoice to the ICS 100 using the ERP application 130. In some embodiments, the ERP application 130 may transmit the invoice (or data from the invoice) to the ICS 100 as an API call to the API gateway circuit 138 (shown as a solid line from the enterprise resources 128 to the API gateway circuit 138). The API gateway circuit 138 may forward, send, or otherwise provide the invoice data to the send invoice data API (also referred to herein as invoice API) for processing. As described in greater detail below with reference to FIG. 23, the supplier 1202 may transmit the invoice(s) for the buyers to the ICS 100 via the ERP application 130.

The ICS 100 may be configured to receive the invoice data via the invoice API. In some embodiments, the ICS 100 may be configured to receive the invoice data via the invoice API from both the supplier 1202 and the buyer 1204. The ICS 100 may receive the invoice data from the buyer 1202 in a manner similar to receiving the invoice data from the buyer 1102 described above with reference to FIG. 11 and FIG. 15. The ICS 100 may be configured to route, transmit, or otherwise provide (i.e., automatically) the invoice data to the accounting system of record 1106. The accounting system of record 1106 may be configured to generate a funding report for transmission to the supplier 1104. In some embodiments, the funding report may include payment advice (such as advice generated by one of the components described above with reference to FIG. 6-FIG. 10). In some embodiments, the ICS 100 may be configured to send the payment advice via the payment advice API of the API gateway circuit to the ERP application 130 for rendering to the supplier 1202. The supplier 1202 may receive payment from the institution via the supplier's choice (e.g., as part of selecting the invoice for financing). Prior to the invoice maturity, the ICS 100 and/or supplier 1202 may send a reminder to the buyer 1202 via an existing process.

As shown in FIG. 22, the buyer 1204 may settle with the supplier 1202. Specifically, the buyer 1204 may receive a payment due reminder from the supplier 1202 and/or from the ICS 100 via the ERP application 130. The buyer 1204 may initiate payment to the institution of the ICS manually or via the payment API described above. The buyer 1204 may initiate payment using a buyer computing device. The ICS 100 may receive data relating to the buyer 1204 settlement (i.e., via the payment API of the API gateway circuit 138). The ICS 100 may provide the settlement data to the accounting system of record 1106 for updating the payment records for the buyer 1204, for the supplier 1202, and forth. The accounting system of record 1106 may reconcile payment from the buyer 1204 with the seller financing data for the invoice. The accounting system of record 1106 may update the seller financing data to reflect payment received from the buyer 1204. In some embodiments, the buyer 1204 may send payment advice to the supplier 1202 via an existing process (e.g., to indicate payment by the buyer 1204 of the invoice). The supplier 1202 may forward, transmit, or otherwise provide the payment advice from the buyer 1204 to the ICS using the ERP application 130 via the payment advice API of API gateway circuit 138. The accounting system of record 1106 may be configured to generate a settlement notice for sending to the supplier 1202 on the ERP application 130 using one of the APIs of the API gateway circuit 138. The settlement notice may indicate any unfunded amounts for collection by the supplier 1202 from the buyer 1204. The supplier 1202 may pay the institution for any unfunded amount manually or within the ERP application 130 using an API as described above.

Prior to the invoice maturity, the supplier 1202 may receive a payment due alert from the institution. In some embodiments, the supplier 1202 may receive the payment due alert on the ERP application using the inquiry API of the API gateway circuit 138 of the ICS 100. The supplier 1202 may initiate payment to the institution manually or via the payment API described above. The supplier 1202 may send payment advice from the ERP application 130 to the ICS 100 using the payment advice API of the API gateway circuit 138. The accounting system of record 1106 may receive the payment from the supplier 1202 (e.g., via the payment advice API of the API gateway circuit 138 from the ERP application 130 of the supplier 1202). The accounting system of record 1106 may update other systems, reconcile payment, and make the data reflecting the payment available via the ERP application 130 of the supplier 1202. The ICS 100 may send a payment confirmation to the ERP application 130 of the supplier 1202 using an API of the API gateway circuit 138.

Figure 23:
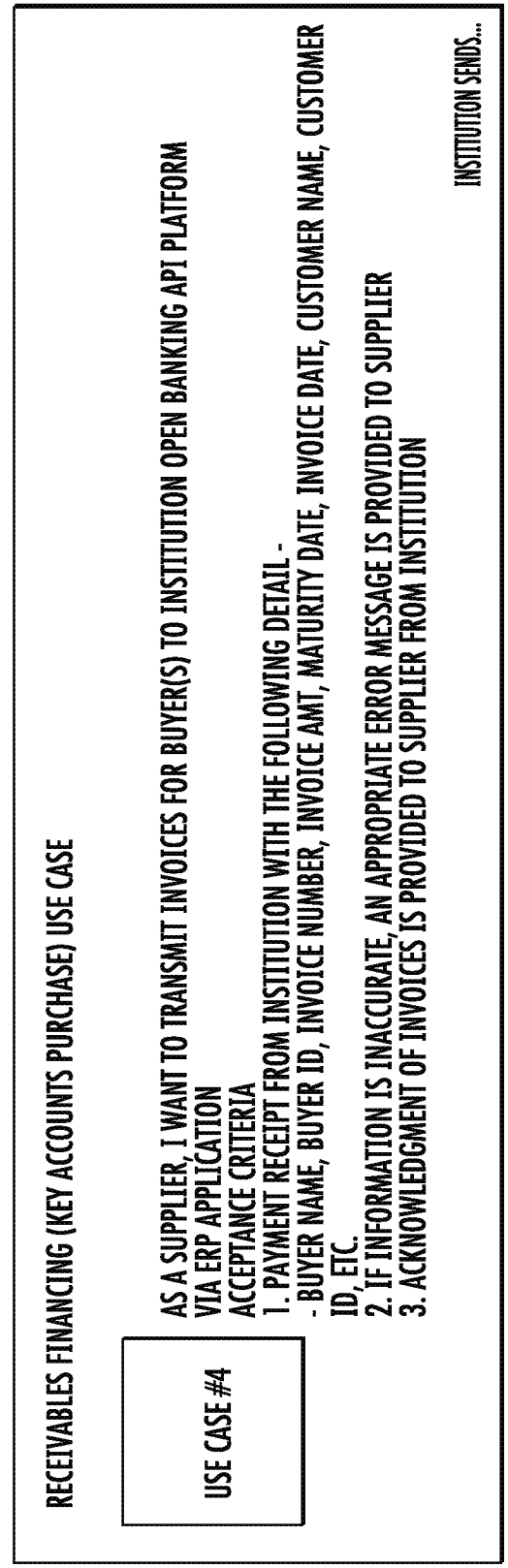
FIG. 23 is a diagram showing a use case for transmitting invoices for receivable financing, according to an exemplary embodiment.

Referring now to FIG. 23, depicted is a diagram showing a use case for transmitting invoices for receivable financing, according to an illustrative embodiment. As shown in FIG. 23, a supplier 1202 may transmit invoices for various buyers 1204 to the API gateway circuit 138 (i.e., the institution open banking API platform) using an ERP application 130 of the supplier 1202. The supplier 1202 may transmit the invoices to the ICS 100 via the invoice API of the API gateway circuit 138. In some embodiments, the supplier 1202 may provide data to the institution accompanying the invoice, such as buyer 1204 name, buyer identifier, invoice number, invoice amount, maturity date, invoice date, customer (i.e., supplier 1202) name, customer identifier, and so forth. If the data provided with the invoice is inaccurate or inconsistent, the ICS 100 and/or ERP application 130 may provide an error message to the supplier 1202. If the information is accurate or consistent with the invoice, the ICS 100 may provide an acknowledgement of the invoices to the supplier 1202 (e.g., via the invoice API of the API gateway circuit 138 to the ERP application 130 for the supplier 1202).

Figure 24:
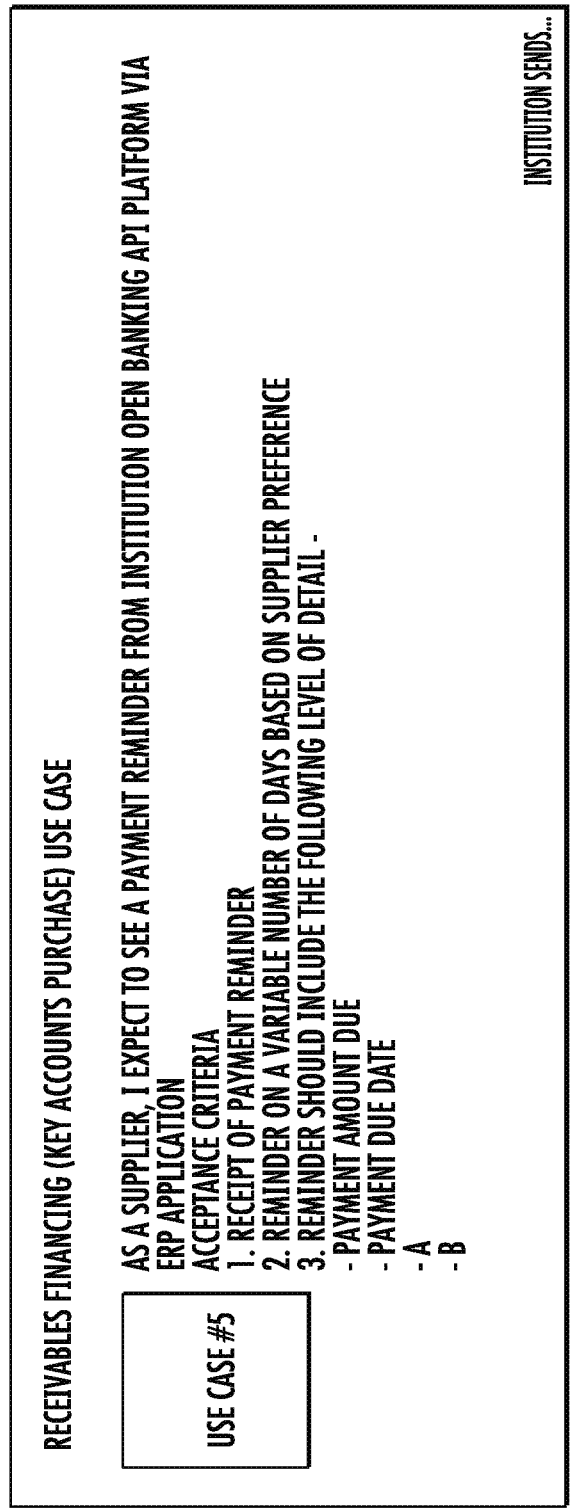
FIG. 24 is a diagram showing a use case for receiving payment reminders for receivable financing, according to an exemplary embodiment.

Referring now to FIG. 24, depicted is a diagram showing a use case for receiving payment reminders for receivable financing, according to an illustrative embodiment. As shown in FIG. 24, the supplier 1202 may request a payment reminder from the API gateway circuit 138 of the ICS via the ERP application 130. In this use case, the supplier 1202 may request a payment reminder via the inquiry API of the API gateway circuit 138. The ICS 100 may transmit a response (i.e., a payment reminder) to the supplier 1202 prior to the invoice maturity via the inquiry API of the API gateway circuit 138 to the ERP application 130. In some embodiments, the payment reminder may be sent on a variable number of days based on a supplier preference as specified in the request. The payment reminder may include a payment amount due, a payment due date, and any additional material or data (such as buyer identifier, buyer name, invoice number, etc.).

Referring now to FIG. 25, depicted is a diagram showing a use case for repayment of a financed invoice by a supplier, according to an illustrative embodiment. As shown in FIG. 25, the supplier 1202 may receive a notification or indication (i.e., via the ERP application 130) that an institution financed invoice is due and needs repayment by the seller 1202, and the seller is associating a remittance within the ERP application 130. As a precondition to the use case shown in FIG. 25, the supplier 1202 may be using the ERP application 130 and has a pre-payment of institution financed credit that is due. Additionally, the supplier 1202 may have performed the use cases described in FIG. 23-FIG. 24 and a set number of days have passed (such as 90 days). The supplier 1202 may forward the supplier's payment or remittance to the ICS. In some embodiments, the supplier 1202 may send the remittance to the ICS including a unique invoice identifier, an invoice amount, a maturity date, a customer (i.e., a supplier 1202) code, a currency, a supplier invoice number, a check number, etc. In some embodiments, the supplier 1202 (and/or the buyer 1204 as described above) may initiate payment within the ERP application 130 by sending an API call to the payment advice API at the API gateway circuit 138 of the ICS, and register the payment API with a web hook. The API gateway circuit 138 may invoke the payment manager API to process the payment, and the payment manager API may respond to the API gateway circuit 138 if the payment initiation is successful or not. The API gateway circuit 138 may respond to the ERP application 130 with a response via the web hook. The response may include an error message if the information is accurate, or a verification/acknowledgement if the verification is confirmed. The API gateway circuit 138 may call, send, or otherwise provide information relating to the successful payment to the accounting system of record 1106 indicating successful payment.

Figure 26:
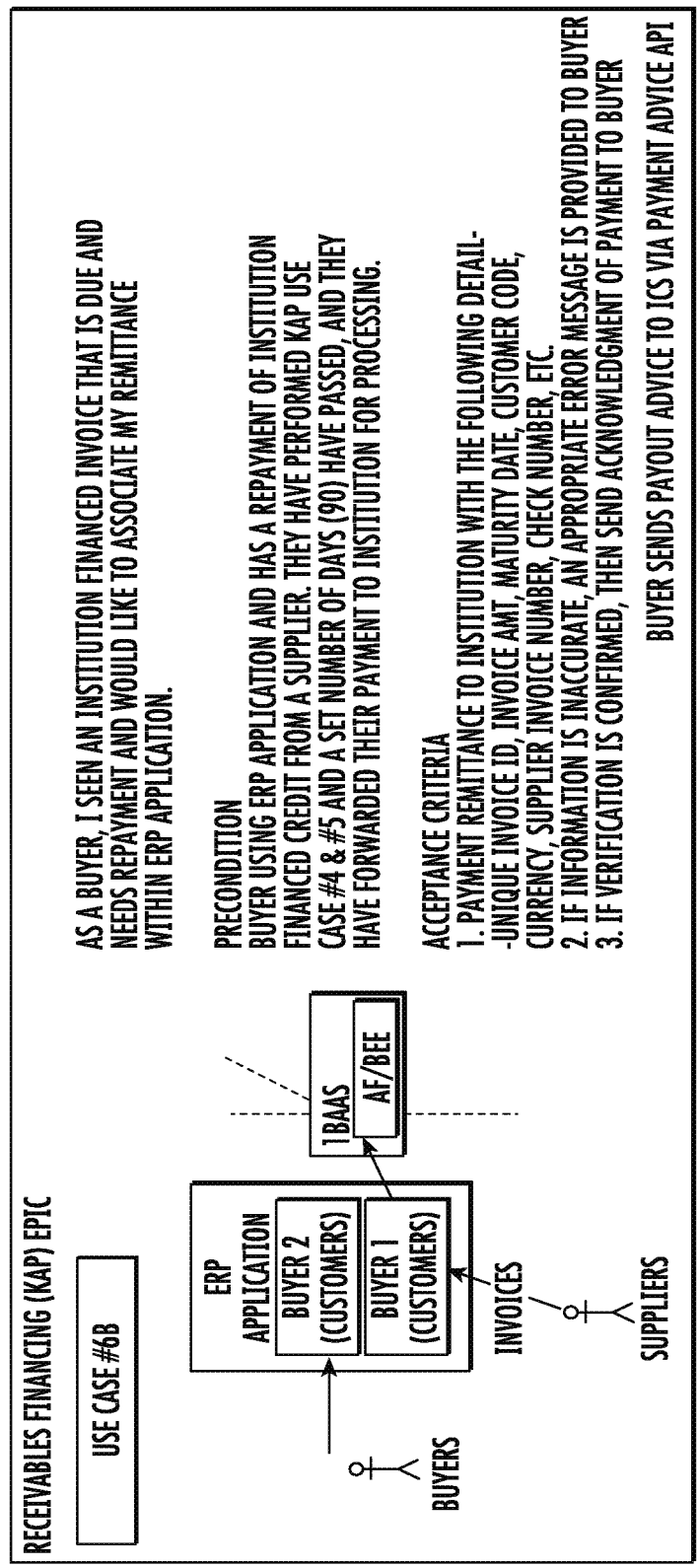
FIG. 26 is a diagram showing a use case for repayment of a financed invoice by a buyer, according to an exemplary embodiment.

Referring now to FIG. 26, depicted is a diagram showing a use case for repayment of a financed invoice by a buyer, according to an illustrative embodiment. FIG. 26 may be similar in some regards to FIG. 19 and FIG. 25. As shown in FIG. 26, in some embodiments, a buyer 1204 may view (i.e., in the ERP application 130) that an institution financed invoice is due and needs repayment by the buyer 1204, and the buyer 1204 is associating a remittance within the ERP application 130. As a precondition of repayment, the buyer 1204 may be using the ERP application and have a repayment of an institution financed credit from a supplier 1202.

The buyer 1204 may have performed the key accounts purchase use cases shown in FIG. 23-FIG. 24, and a set number of days (such as 90 days) may have passed. The buyer 1204 may forward their payment or remittance to the institution for processing. In some embodiments, the buyer 1204 may transmit, send, or otherwise provide the remittance data from the ERP application 130 to the ICS 100 using the payment advice API of the API gateway circuit 138. The remittance data may include a unique invoice identifier, an invoice amount, a maturity date, a customer (i.e., buyer 1204) code, a currency, a supplier invoice number, a check number, etc. If the data provided by the user 1204 is inaccurate or inconsistent with the invoice, the ICS 100 and/or ERP application 130 may provide an error message to the supplier 1202. If the information is accurate or consistent with the invoice, the ICS 100 may provide an acknowledgement of the invoices to the buyer 1204 (e.g., via the invoice API of the API gateway circuit 138 to the ERP application 130 for the buyer 1204). In some embodiments, the payment may be made in a different currency by leveraging a foreign exchange (FX) API of the API gateway circuit 138. For example, the ERP application 130 may send an API call to the FX API to request an exchange rate for a particular denomination or currency. As another example, the ERP application 130 may transmit a request for payment or remittance in a particular denomination or currency, and the request may be routed to the FX API to convert the currency of an account of the user to an account specified in the request.

Figure 27:
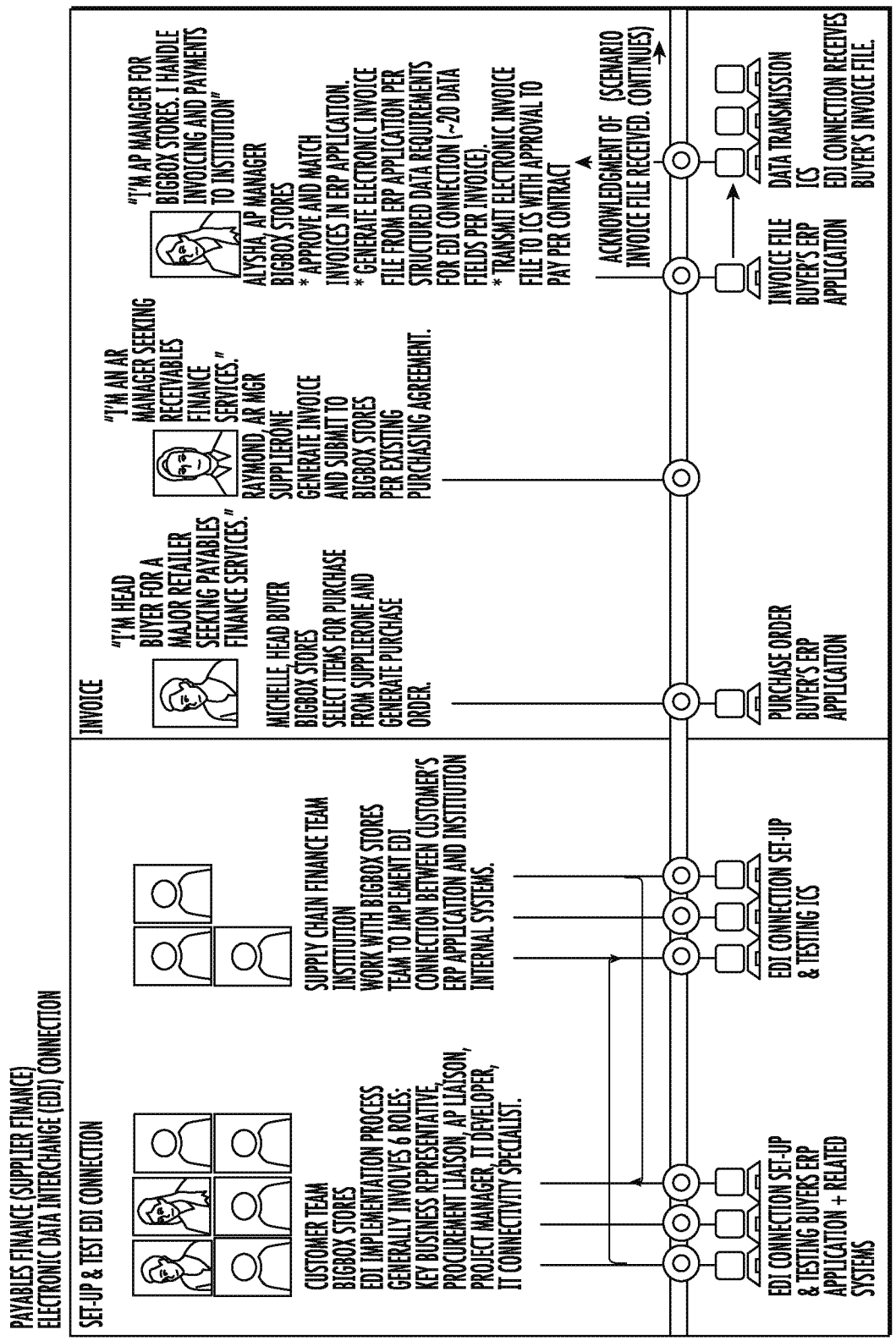
FIG. 27 is a diagram showing a flow of establishing an electronic data interchange (EDI) connection between the ERP application and the ICS, according to an exemplary embodiment.

Referring now to FIG. 27, depicted is a diagram showing a flow of establishing an electronic data interchange (EDI) connection between the ERP application 130 and the ICS 100, according to an illustrative embodiment. While FIG. 27 is shown with reference to payables financing, it is noted that similar connections may be established between suppliers ERP applications 130 and the ICS 100. The EDI connection implementation may include interfacing with a key business representative of the buyer 1102, a procurement liaison, an AP liaison, a project manager, an IT developer, and/or an IT connectivity specialist. The EDI connection set-up and testing may facilitate establishing a connection between the buyers ERP application 130 and/or other enterprise resources 128 and the ICS 100. The institution may work with the buyer 1102 to implement the EDI connection between the ERP application 130 and the ICS 100. Following set-up, the buyer 1102 may perform invoicing and purchase orders via the ERP application 130. Specifically, the buyer 1102 may use the ERP application 130 to select items for purchase from the supplier 1104 and generate a purchase order. The buyer 1102 may transmit the purchase order to the supplier 1104, and the supplier 1104 may generate an invoice for sending to the buyer 1102 according to an existing purchase agreement. Once the buyer 1102 receives the invoice from the supplier 1104, the buyer 1102 may match the invoice and purchase order in the ERP application 130. The buyer 1102 may generate an electronic invoice file from the ERP application 130 which is structured according to the structured data requirements for the EDI connection (i.e., approximately 20 data fields per invoice as described above). The buyer 1102 may transmit the electronic invoice file to the ICS 100 with approval to pay per the contract using the ERP application 130. The ICS 100 may confirm receipt and acknowledge the invoice file from the ERP application 130.

Figure 28:
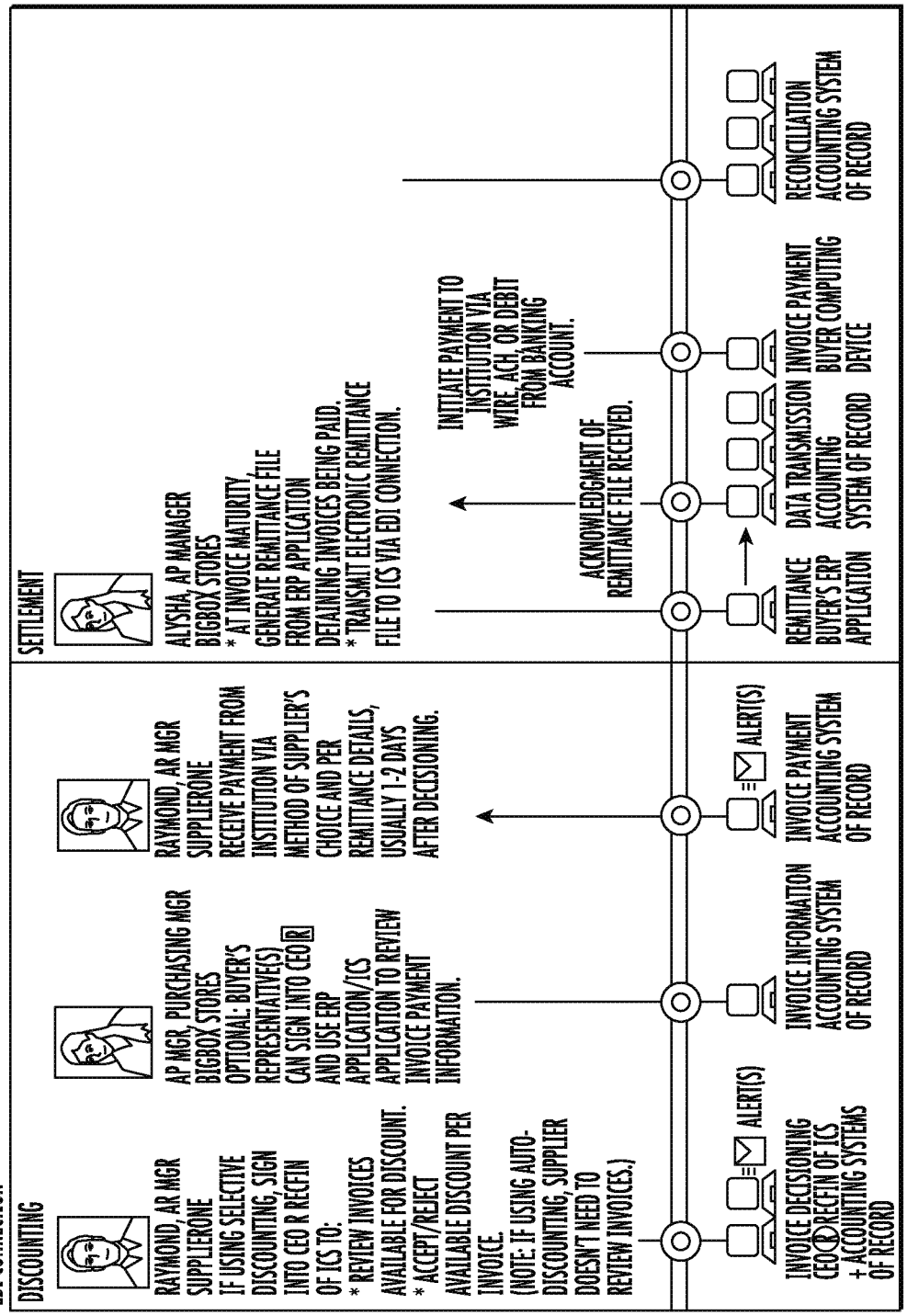
FIG. 28 is a diagram showing a flow of establishing an EDI connection between the ERP application and the ICS, according to an exemplary embodiment.

Referring now to FIG. 28, depicted is a diagram showing a flow of establishing an electronic data interchange (EDI) connection between the ERP application 130 and the ICS 100, according to an illustrative embodiment. FIG. 28 may be a continuation of the flow shown in FIG. 27. Following receiving the invoice file from the ERP application 130, in some embodiments, the supplier 1104 may use selective discounting to review invoices available for discounting, and accept/reject the discounts. The supplier 1104 may review the invoices using a program, website, webpage, or other resource of the ICS 100 and/or the accounting system of record 1106. In some embodiments, the buyer 1102 may use the ERP application and/or ICS application to review invoice payment information, which may be accessible via the accounting system of record 1106. In some embodiments, the user of the supplier 1104 may access an ICS 100 application or interface (shown in FIG. 28 as CEO) for reviewing invoices which are available for discount and accept/reject the discounts for the invoices. As described above with reference to FIG. 16, the CEO may be a platform or suite which includes an online and mobile banking platform for account holders with the institution. The supplier 1104 may receive payment from the institution via a method of the suppliers choice, which may be updated within the accounting system of record 1106. At invoice maturity, the buyer 1102 may generate a remittance file from the ERP application 130 which details the invoices being paid by the buyer 1102. The buyer 1102 may transmit the electronic remittance file from the ERP application 130 to the ICS 100 using the EDI connection. The ICS 100 may route the remittance file to the accounting system of record 1106, which may acknowledge receipt of the remittance file from the ERP application 130. In some embodiments, the buyer 1102 may initiate payment to the institution via wire, ACH, debit from a bank account, etc. via the buyer computing device for remittance, and the accounting system of record 1106 may reconcile the payment to the institution.

Figure 29:
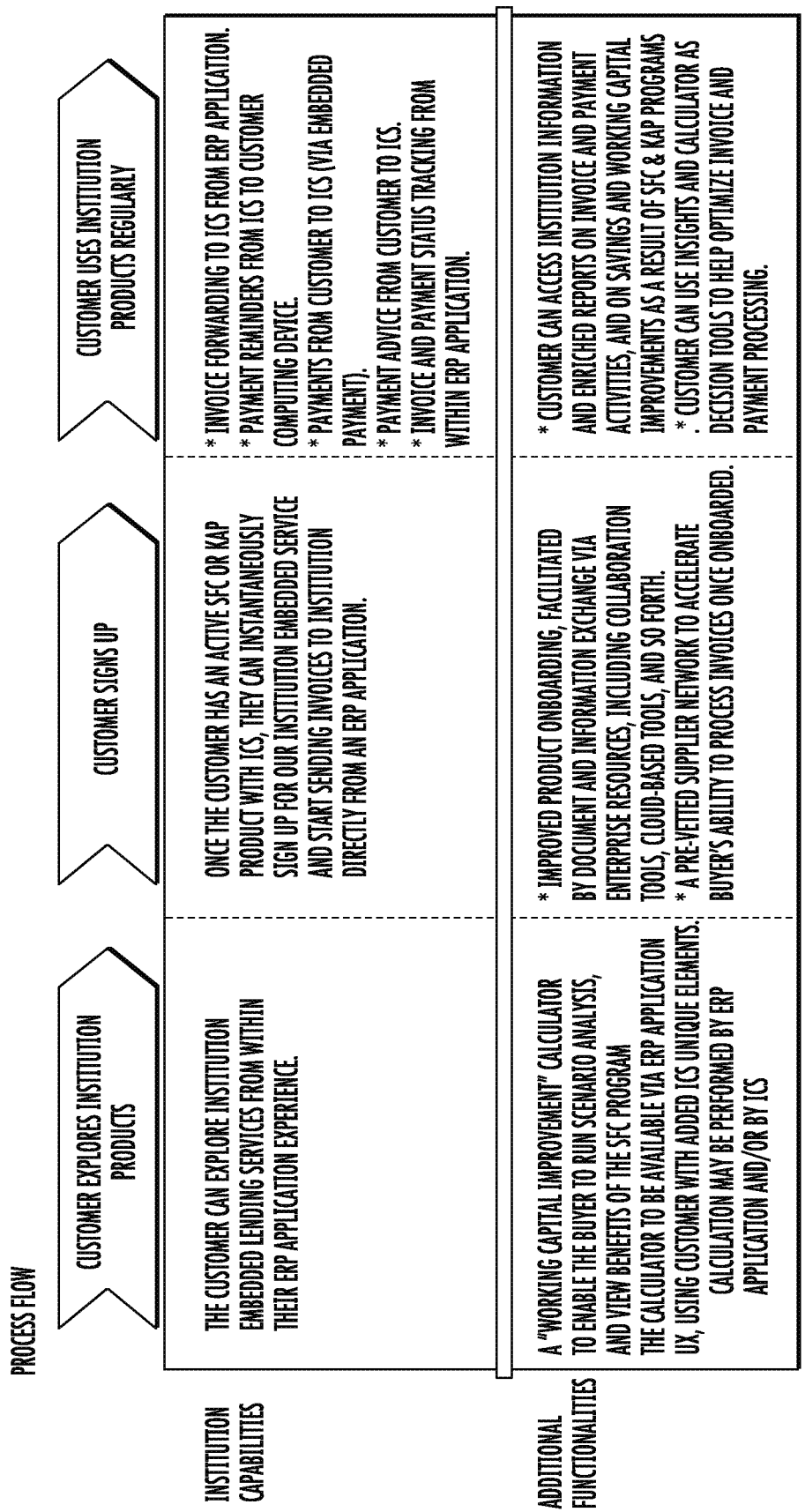
FIG. 29 is a diagram showing a process flow of enrollment of a customer using an ERP application with the ICS, according to an exemplary embodiment.

Referring now to FIG. 29, depicted is a diagram showing a process flow of enrollment of a customer using an ERP application with the ICS 100, according to an illustrative embodiment. As shown in FIG. 29, the process flow may include institution capabilities (i.e., capabilities of institutional offerings through the ICS 100) and additional functionalities. In the process flow, a prospective customer may explore embedded lending services (i.e., accounts payable financing, accounts receivable financing, etc.) within the ERP application 130 through a plug-in or other interface element on the ERP application 130. If the customer is interested in the embedded lending services, the customer may establish an SCF or KAP product with the ICS (i.e., by enrolling with the institution and establishing the SCF or KAP as described above). Once the customer has an active SCF or KAP product with the ICS, the customer may sign up for the institution embedded services and start ending invoices to the institution directly from the ERP application 130. As the customer uses the institution products regularly, the customer may perform invoice forwarding from the ERP application 130 to the ICS 100, receive payment reminders from the ICS 100 on the customer computing device, the ICS 100 may receive payments from the customer via embedded payments on the ERP application 130, the ICS 100 may receive payment advice from the customer (i.e., advising on payments or status of payments), and/or track invoice and payment status from within the ERP application 130.

In some embodiments, the ERP application 130 may include, maintain, or otherwise provide a working capital improvement calculator. The working capital improvement calculator may provide a tool by which the customer may run scenario analysis to view benefits of the SCF/KAP programs. In some embodiments, the working capital improvement calculator may be implemented by the ERP application 130 using data from the ERP application 130. IN some embodiments, the working capital improvement calculator may be implemented by the ICS 100 using data from the ERP application 130 (and the interface for the working capital improvement calculator may be presented within the ERP application 130). In some embodiments, the calculator may be available via the ERP application 130 user interface, using customer data from the ERP application 130 with added ICS 100 unique elements (such as insights which are generic to a wide range of potential customers, insights for potential customers which are similar to existing customers, such as similar sized customers, customers in similar industries, etc.). In some embodiments, the working capital improvement calculator may use data similar to the data used by the smart financial engine described above with reference to FIG. 6-FIG. 10. In some embodiments, the working capital improvement calculator may perform calculations similar to those described above with reference to FIG. 6-FIG. 10 for providing scenario analysis to the customer.

Once the customer signs up with the ICS 100, the customer may receive improved product onboarding which may be facilitated by document and information exchange via enterprise resources 128, including collaboration tools, cloud-based tools, and so forth. Additionally, the customer may access a pre-vetted network (i.e., of suppliers and/or buyers) to accelerate the customer's ability to process invoices once onboarded. As the customer uses the institution products regularly, the customer may access institution information and enriched reports on invoice and payment activities through the ERP application 130. Additionally, the enriched reports may include savings and working capital improvements as a result of the SCF and KAP programs. Furthermore, the customer may use the insights and working capital improvement calculator as decision tools to help optimize invoice and payment processing. In this embodiment, the working capital improvement calculator may use invoices and payments through the ERP application 130 and the ICS 100 data for the customer for calculating or projecting various scenarios in which the customer selects different financing options and payment dates (in a manner similar to the smart financial engine calculations described above with reference to FIG. 6-FIG. 10). In some embodiments, the insights may be or include a dashboard which provides recommendations on invoice and payment processing. The recommendations may be generated by one or more of the components described above with reference to FIG. 6-FIG. 10. In some embodiments, the recommendations may be generated based on common errors, which may be generic to the customer or based on errors from the customers. For example, the ICS 100 may generate recommendations relating to payment failures, such as switching or converting from check payments to ACH payments.

Figure 30:
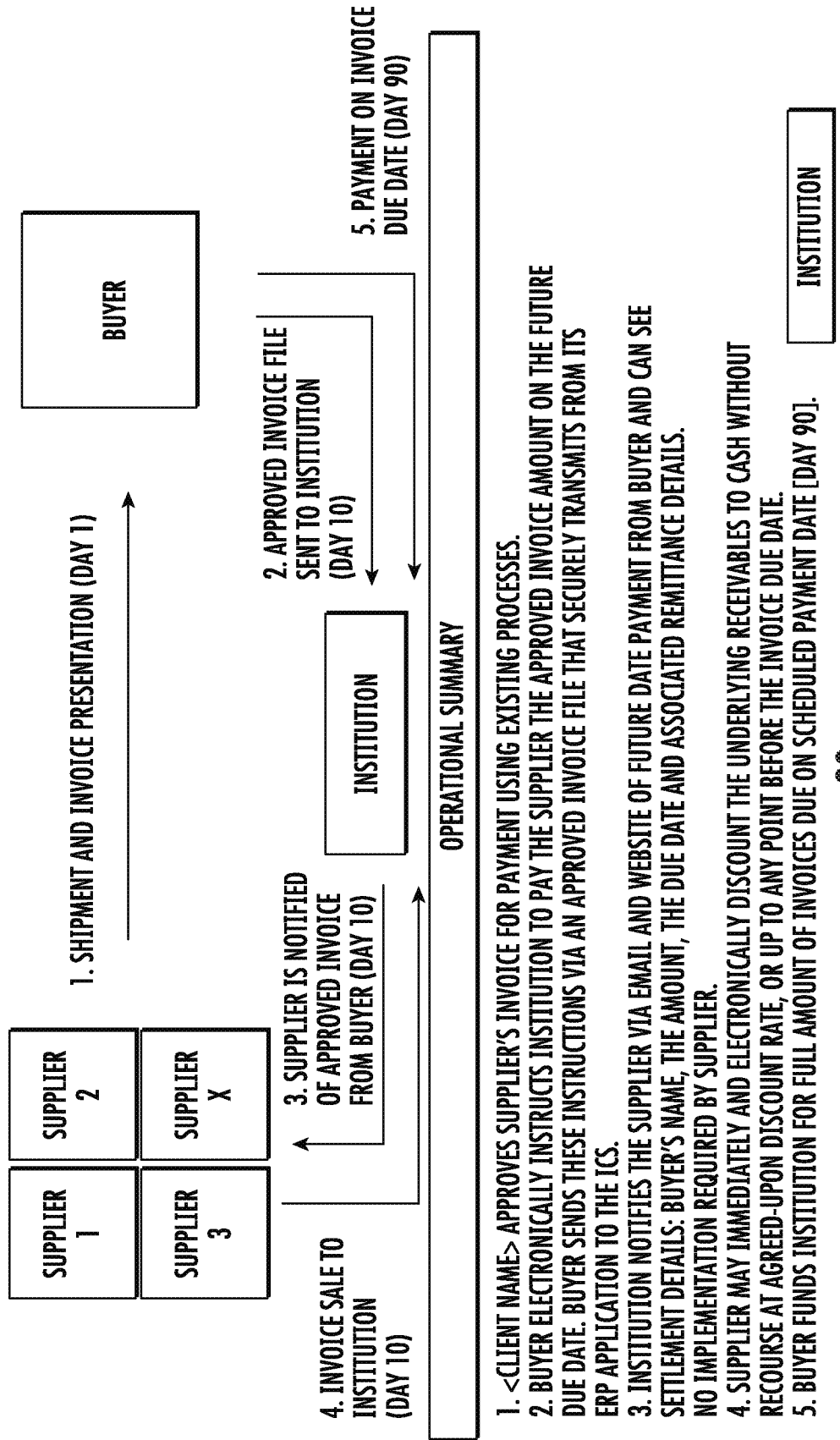
FIG. 30 is a diagram showing a supplier finance program structure, according to an exemplary embodiment.

Referring now to FIG. 30, depicted is a diagram showing a supplier finance program structure, according to an illustrative embodiment. As shown in FIG. 30, various suppliers may ship products and provide invoices to a buyer. The buyer may send an approved invoice file using the ERP application 130 via the invoice API of the API gateway circuit 138 to the ICS 100. In some embodiments, the buyer electronically instructs the institution to pay the supplier the approved invoice amount on the future date. The buyer may send the instructions via an improved invoice file that is securely transmitted from the ERP application 130 of the buyer to the ICS 100. The ICS 100 may send the supplier a notification which indicates an approved invoice from the buyer. In some embodiments, the institution may notify the supplier via email and website of the future dated payment form the buyer and the seller may review the settlement details (i.e., the buyer's name, amount, due date, associated remittance details, etc.). The supplier may provide an invoice sale to the institution following approval of the invoice. In some embodiments, the supplier may electronically discount the underlying receivables to cash at an agreed-upon discount rate or up to any point before the invoice due date with the institution. In some embodiments, the supplier may provide an invoice sale to finance an accounts receivable for the invoice from the buyer to the ICS 100. The supplier may provide the invoice sale via the ERP application 130 by sending the invoice data to the invoice API of the API gateway circuit 138 to the ICS 100. The buyer may initiate payment to the institution on the invoice due date.

Figure 31:
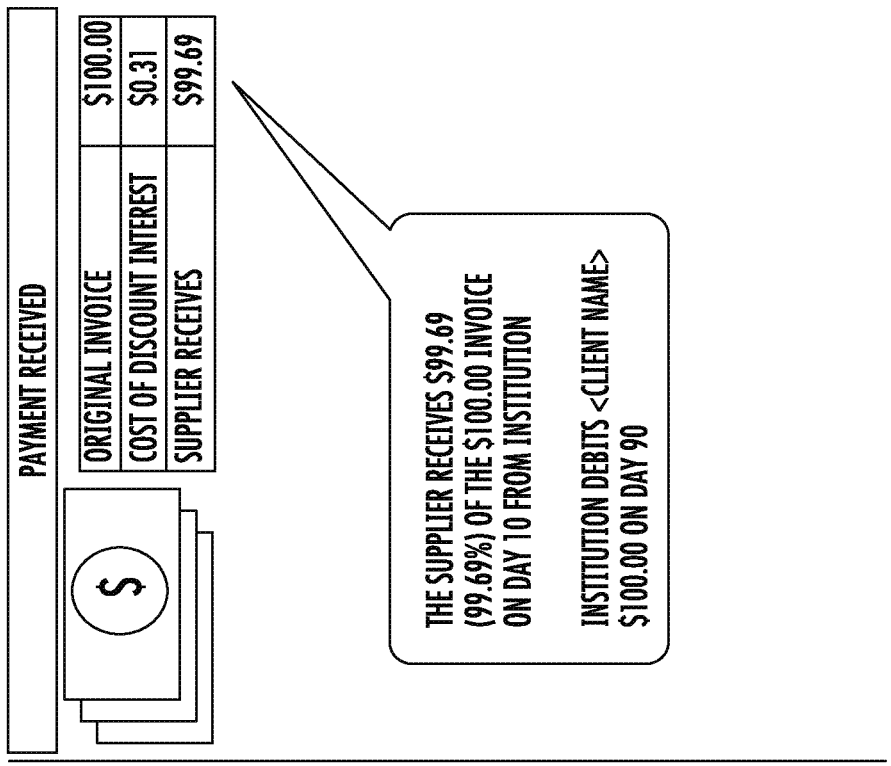
FIG. 31 is a diagram showing a calculation for a supply chain financing (SCF) payment, according to an exemplary embodiment.

Referring now to FIG. 31, depicted is a diagram showing a calculation for an SCF payment, according to an illustrative embodiment. As shown in FIG. 31, the system may use various assumptions, including a supplier finance (SF) spread, payment day, terms invoice, and London Interbank Offered Rate (LIBOR) 90-day rate for computing the discounted interest amount.

Figure 32:
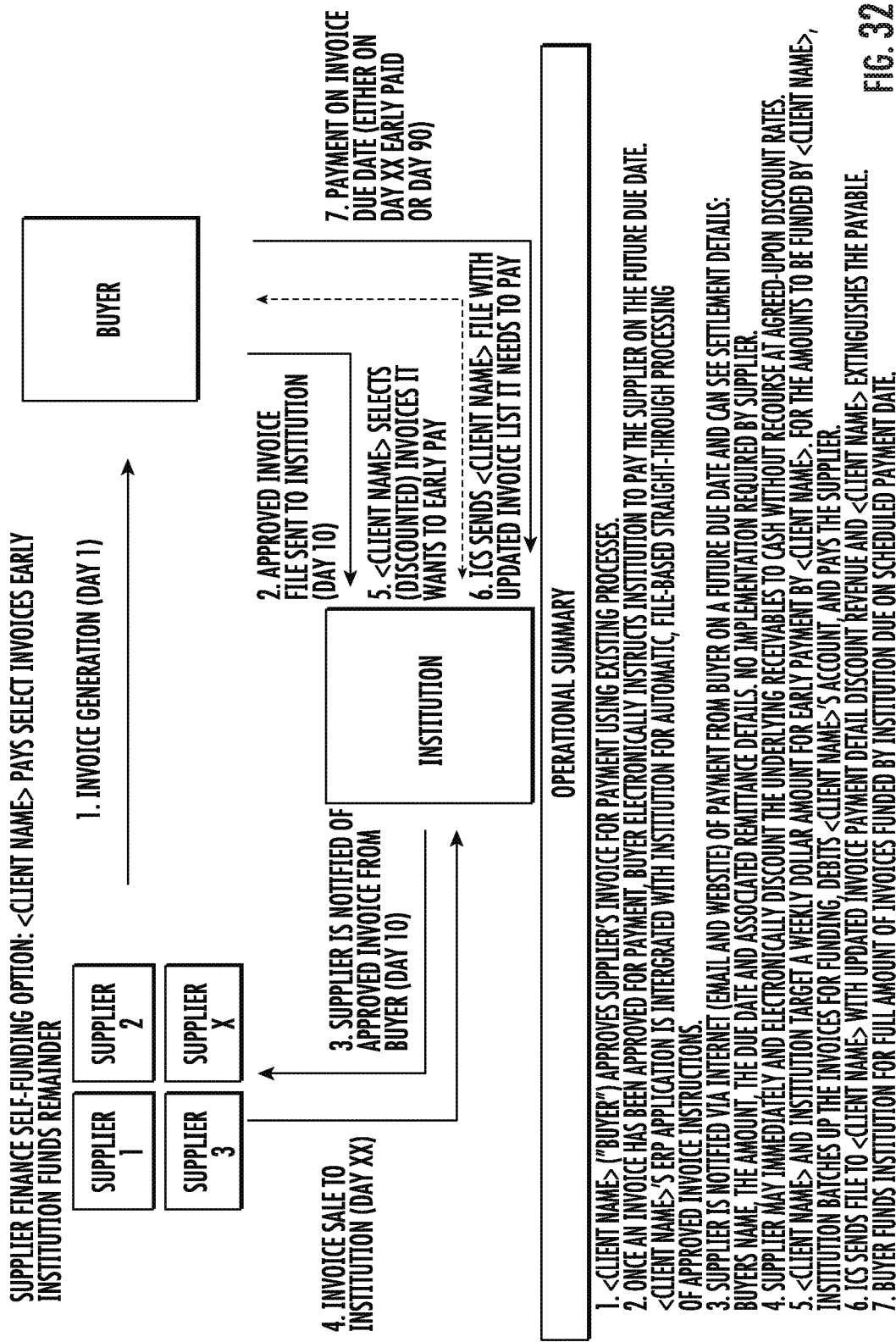
FIG. 32 is a diagram showing a supplier finance self-funding program structure, according to an exemplary embodiment.

Referring now to FIG. 32, depicted is a diagram showing a supplier finance self-funding program structure, according to an illustrative embodiment. In the example shown in FIG. 32, the supplier may select invoices for early payment, and the institution funds the remainder. As shown in FIG. 32, the suppliers may generate an invoice for the buyer. The buyer may approve the supplier's invoice for payment using existing processes. The buyer may approve invoice file for sending to the institution. In some embodiments, the buyer may instruct the institution to pay the supplier on the future date (specified in the invoice or a different date). The buyer's ERP application 130 may be integrated with the ICS 100 for automatic, file-based straight-through processing of approved invoice instruction as described above. The ERP application 130 may transmit the invoice file or data to the ICS via the invoice API of the API gateway circuit 138. The supplier may be notified of the approved invoice from the buyer. In some embodiments, the supplier may be notified via the internet (i.e., via an email or website) of payment from the buyer on a future date and can review the settlement details (i.e., buyer's name, amount, due date, associated remittance details). The supplier may electronically discount the underlying receivables to cash at an agreed-upon discount rate. The buyer and institution may target a weekly dollar amount for early payment by the buyer. For amounts to be funded by the buyer, the ICS 100 (i.e., the accounting system of record 1106) may batch the invoices for funding, debit the buyer's account, and pay the supplier. The ICS may send the buyer file to the buyer with updated invoice payment detail discount revenue and the buyer may extinguish the payable. The buyer may fund the institution for the full amount of invoices funded by the institution due on scheduled payment dates.

Figure 33:
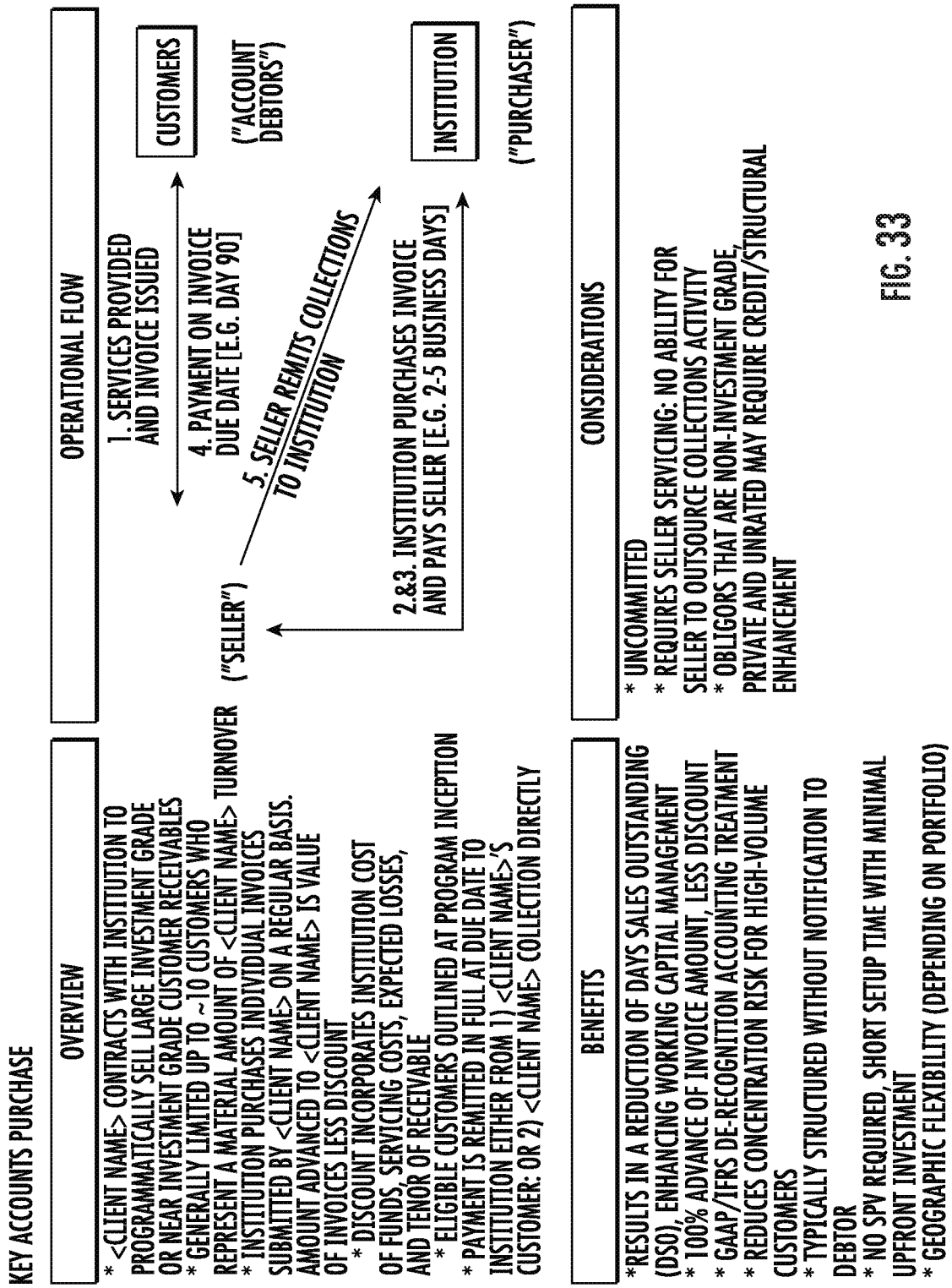
FIG. 33 is a diagram showing an overview of the key accounts purchase (KAP) program, according to an exemplary embodiment.

Referring now to FIG. 33, depicted is a diagram showing an overview of the key accounts purchase (KAP) program, according to an illustrative embodiment. As shown in FIG. 33, and as an overview, the buyer and/or supplier (i.e. client) may contract with the institution to programmatically sell large investment grade or near investment grade customer receivables. The customer may be limited to up to approximately ten customers which represent a material amount of the client's turnover. The institution may purchase individual invoices submitted by the client on a regular basis. The amount advanced to the client may be the value of the invoices less the discount (which incorporates the institution cost of funds, servicing cost, expected losses, and tenor of receivables). The eligible customers may be outlined to the client at inception. Payment may be remitted in full at the due date to the institution either from the customer or the client collection directly. Various benefits, an operational flow, and considerations are shown in FIG. 33.

Figure 34:
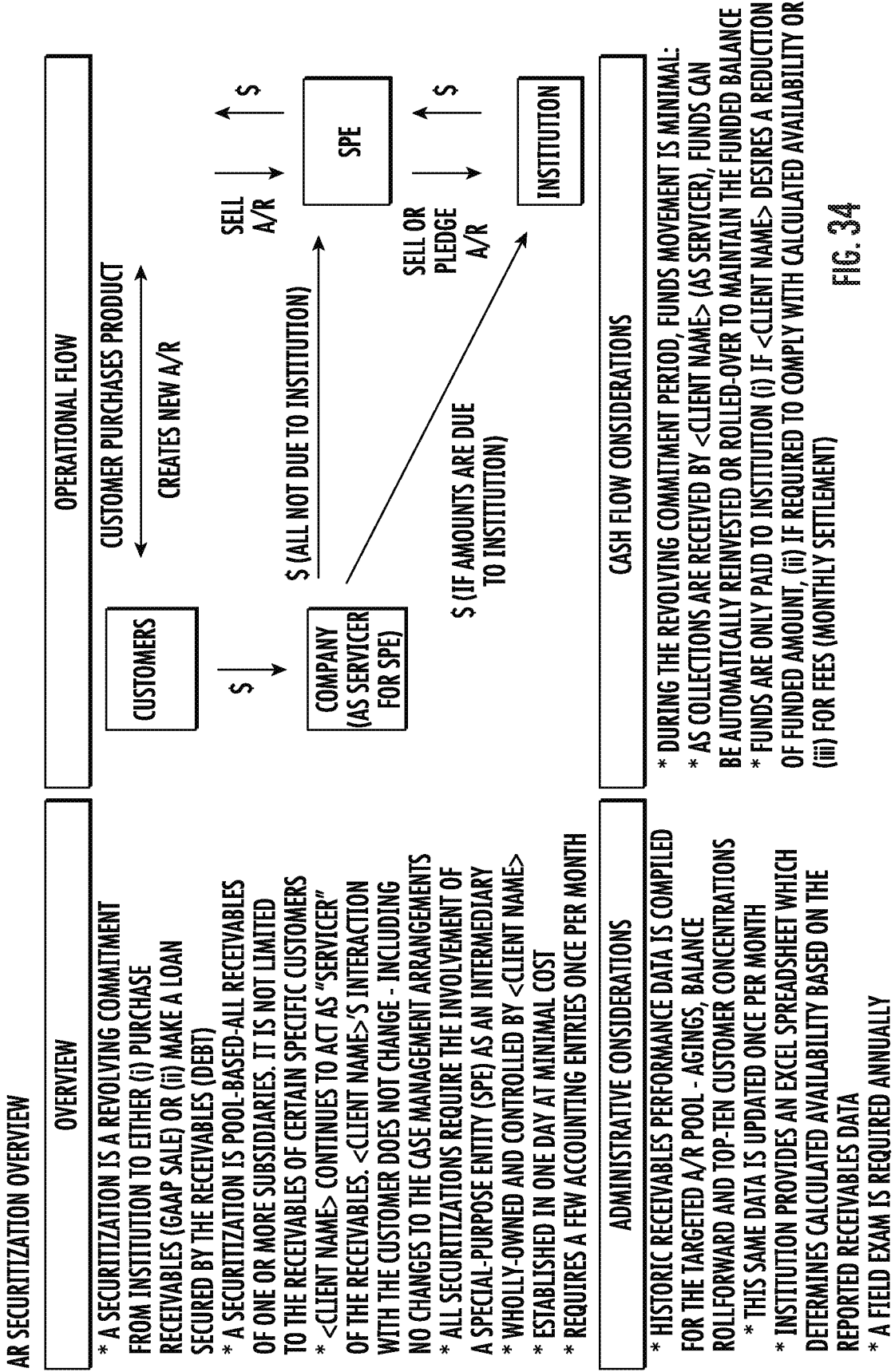
FIG. 34 is a diagram showing an overview of AR securitization, according to an exemplary embodiment.

Referring now to FIG. 34, depicted is a diagram showing an overview of AR securitization, according to an illustrative embodiment. As shown in FIG. 34, and as a brief overview, a securitization may be a revolving commitment from the institution to either (i) purchase receivables (GAAP Sale) or (ii) make a loan secured by the receivables (Debt). The securitization may be pool-based which pools all receivables of one or more subsidiaries. As such, the securitization may not be limited to the receivables of certain specific customers. The client may continue to act as a servicer of the receivables. As such, the client's interaction with the customer may not change, including no changes to the cash management arrangements. All securitizations may include involvement of a special-purpose entity (SPE) as an intermediary, which may be wholly-owned and controlled by the client, established in a minimal time (i.e., one day) at minimal cost, and may require a few accounting entries once per month. Administrative considerations, an operational flow, and cash flow considerations are shown in FIG. 34.

Referring generally to the figures, there may be opportunities for companies to realize efficiencies, improve fraud protection and control their financial resources available through payments automation, real-time information reporting and integrated AI. In some systems, customer may not be capable of executing these opportunities due to the work required. Financial technology companies in the marketplace may see an opportunity and may be offering customers solutions. The systems and methods described herein may bring together ERP applications 130 and artificial intelligence (AI) capabilities with an institution's payment processing, information reporting and (in another workstream) lending products to create a unique experience for customers. Starting with cash flow visibility and payment automation, the collaboration can lead to a customer journey that may include vendor onboarding journey with account verification services, vendor management with AI tools to recognize potential errors or fraud or to recommend addressing, cash position visibility/cash forecasting and tools to engage lending facilities, FX rate retrieval, contact purchase and payment initiation using that contract in a single, simple experience; including opportunities for trade financing where appropriate, automated positive pay reporting for fraud protection services, automated payments running the gamut of payment rails with intelligence embedded to support users in selecting the most efficient method—or even making that determination for the customer. The systems and methods described herein may begin with a single customer, information reporting, and payment APIs from the API gateway circuit 138.

In some embodiments, the systems and methods described herein may function to provide integration between the APIs provided by the API gateway circuit 138 and an ERP application 189 or other enterprise resources 128. The APIs included or leveraged by the systems and methods described herein may include, at least, an account balance API, a transaction detail API, an ACH payment API, an ACH file and batch status API, and/or a wire transfer and status API, which may facilitate communications between the ICS 100 and ERP application 130.

As an example use case, a customer may quickly assess current cash positions and make scheduled payments through their ERP application 130. For example, the ERP application 130 may be integrated with the ICS 100 to receive information reporting and provide ACH payment automation. For example, the systems and methods described herein may provide for account balances and transaction reporting, which allows for monitoring of cash positions. Customers may initiate ACH credits for payments due. The ACH status API provides confirmations and further updates on ACH processing. The systems and methods described herein may use or include a transaction detail API, an account balance API, an ACH Payment API, and/or an ACH Status API, which may facilitate communications between the ICS 100 and ERP application 130.

As another example use case, a customer may quickly assess current cash positions and make urgent or large payments through their ERP application 130. By providing direct integration with information reporting and wire payment automation, the systems and methods described herein may allow for monitoring cash positions via the accounts balance and transaction reporting. Additionally, a customer can initiate wire transfers for payments due. The systems and methods described herein may use or include a transaction detail API, an account balance API, and/or a wire API, which may facilitate communications between the ICS 100 and ERP application 130.

As yet another example use case, a manufacturer and importer service customer may assess cash positions, identify invoices eligible for early payment discounts, and make schedule payments through the ERP application 130. By providing direct integration with information reporting and wire payment automation, the systems and methods described herein may provide for monitoring of cash positions via the account balances and transaction reporting/ Additionally, the systems and methods described herein pay provide a customer with ability to determine whether any approved invoices are within an early payment/trade discount window (e.g., by alerts or otherwise). Additionally, the systems and methods described herein may allow a user to make payment decisions based on actual cash positions. The systems and methods described herein may use or include a transaction detail API, an account balance API, an ACH payment API, an ACH status API, and analytics service, which may facilitate communications between the ICS 100 and ERP application 130.

In addition to the use cases described above, the systems and methods described herein may include artificial intelligence components or other aspects which alert customer if a payment batch they are about to send will exceed their available balance (which may be a popup alert in the ERP application 130). In some embodiments, the systems and methods described herein may use or include an information reporting API, an ACH API, a wire payment API, and an analytics service, which may facilitate communications between the ICS 100 and ERP application 130.

In some embodiments, the ERP application 130 may include a user interface or page which includes an integration option where institution tools are integrated as an "embedded" app. The embedded app may provide a landing page available via a tab on the menu bar of the ERP application 130 that then provides access to the features of the ICS 100 integration that have been purchased or otherwise enrolled in by the customer. For example, from the menu bar or landing page, the customer may select "Bill Payments" and from there select "Pay Bills" to select invoices to pay and submit payments, "International FX Payments" which would not be supported in our first offering, and "History" to research payments sent and inquire as to payment status. Additionally, the customer may select "Reports" from the menu bar, and from there select "Balances and Transfers" to review information reporting and (potentially) initiate transaction search. Finally, from the menu bar or landing page, the customer may select "Positive Pay" to submit issued check details to the positive pay service.

In some embodiments, the ERP application 130 may include a user interface or page which includes payment selections. This may be a view within an ERP application 130 where an authorized user enters criteria to identify approved invoices that are ripe for payment, and select a payment method if there is no default configured and submit for processing. Users may enter the invoice selection criteria they wish to use in the filter section. Invoices from the bill list are flagged for payment by clicking in the check box field or otherwise selecting a bill from the list. Users can set a payment method for payees that do not have a default configured (e.g., in a "Payment Method" column for the bills). When invoices have been selected, the user may click a "PAY" button or other user interface element at the top of the bills list to submit payments. In some embodiments, a popup appears show the payment batch totals and allow for the funding account to be selected for the payment batch. For example, a customer may use the List of Values to select the correct funding account for the payment batch, and click an "OK" button to select the funding account for the payment batch.

In some embodiments, the ERP application 130 may include an information reporting section which launches with a balance summary page. Selecting a particular account number may launch transaction detail reporting to drill down on the reported balance for the account. A user may select account or view buttons to open the transaction details view for the selected account. On the account details screen or user interface, the user may view the transactions posted on the account. Available actions may include refreshing the transaction data, changing the transaction date range, exporting the information on the screen to comma separated values (CSV) format. The user may select view on any transaction to view additional transaction details. A pop-up window may display additional transaction details. Additionally, a dashboard screen may also display alerts, insights, and provide contact information and/or a link for support.

The systems and methods described herein which provide supplier financing options may provide numerous benefits by unlocking cash-flow through minimal improvements in days payable outstanding (DPO). Additionally, the systems and methods described herein may enable buyers to extend payment terms, and subsequently improve DPO, while minimizing financial impact to the supplier base for the buyers. The systems and methods described herein may provide cash savings which may be directed to fund other corporate initiatives (such as capital exchange, share repossessions, dividends, debt reduction, etc.), and the cash savings may not be classified as debt. Additionally, the early receipt of cash may enhance supplier cash flow and improve days sales outstanding. The systems and methods described herein may lower supplier cost of capital (i.e. supplier with weaker credit profile may reduce financing costs associated with floating the A/R at higher cost of funds). The systems and methods described herein may enhance supplier payment visibility via automated institution-provided technical platform. The systems and methods described herein may provide for supplier-paid discounted interest based a buyer's financial strength. The systems and methods described herein may provide no fees charged to buyer or supplier for program implementation nor ongoing service-rather, the institution may earn the discount interest when suppliers use the program. The systems and methods described herein may reduce bank transaction fees (fewer checks paid, ACH, wire transfers, etc.).

Referring generally to the figures, systems and methods for embedding financial insights are described herein. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In various implementations, the enterprise computing system may identify and evaluate trade opportunities associated with trade terms. Trade terms may include one or more agreed upon terms between two parties (e.g., an enterprise and a vendor) that trade one or more benefits in exchange for one or more burdens. An example of a trade term may be an early payment discount. Trade opportunities may be the opportunity associated with the ability to perform a trade term and/or claim the benefit of the trade term. For example, a trade term defines that an enterprise will receive a 2% discount (e.g., the benefit) if the enterprise pays the invoice thirty days before the invoice is due (e.g., the burden). The trade opportunity exists thirty or more days before the invoice is due.

In some cases, when enterprises enter into agreements/relationships with vendors (or suppliers), various terms may be negotiated and agreed upon. For example, general (or global) trade terms may be determined and/or agreed upon by the parties and applied to each agreement between the parties. For instance, a 2% discount from the total invoice price may be assumed to apply to any agreement/contract between the two parties. The vendor and enterprise may determine the general trade terms as part of a general agreement (e.g., a business agreement) between the vendor and the enterprise. Such general trade terms may be maintained by the enterprise and/or the vendor.

In other cases, trade terms may be negotiated and/or agreed upon for certain transactions. Such particular trade terms may be located on an invoice document (e.g., a physical invoice document, an electronic invoice email). For instance, if the enterprise pays a particular invoice thirty days before the invoice is due, the enterprise may receive a 5% discount from the invoice price. In some embodiments, the particular trade terms may be the same as the global trade terms. That is, the global trade terms may be reiterated/repeated on each invoice. In other embodiments, the particular trade terms may be different from the global trade terms.

As described herein, a computing system may identify invoices associated with enterprise and third party and extract information regarding the agreement. The invoice information extracted may include trade terms. As described herein, the trade terms indicate one or more benefits (e.g., a discount) that a party receives in exchange for the party performing one or more burdens (e.g., paying the invoice early). The computing system evaluates whether the benefits outweigh the burdens using a sequence of decisions (e.g., evaluations). The computing system transmits a notification to the enterprise in the event that one or more trade terms are determined to be beneficial for the enterprise. The enterprise may then timely claim the trade opportunity by performing the trade terms.

Beneficially, the computing system proactively identifies and evaluates trade terms. Identifying and evaluating trade terms may increase the operational efficiency of enterprises. In some embodiments, clients (e.g., patrons of the enterprise, customers, members, and other people associated with the enterprise) may receive advantages associated with increased operational efficiencies (e.g., reduced prices, increased wages).

The systems and methods described herein provide many benefits over existing computing systems. For example, identifying, evaluating, and alerting enterprises to trade opportunities may reduce current or expected computational resources and traffic transmitted over a network. For example, enterprises that retroactively determine that they missed a beneficial trade opportunity may attempt to negotiate other similar opportunities with the vendor and/or attempt to retroactively claim the benefit of the lapsed trade opportunity. Accordingly, by preemptively identifying, evaluating, and alerting enterprises of beneficial trade opportunities, computational resources are conserved by the computing system not transmitting traffic to the vendor. Similarly, both computational resources and operational enterprise resources are conserved by the automatic evaluation of the trade opportunity. For example, one or more administrators and/or stakeholders of the enterprise may not need to spend time determining and/or communicating (or weighing) advantages/disadvantages of one or more trade opportunities. Accordingly, transmitted intralink traffic may be reduced. Similarly, memory of the computing devices of the enterprise may be conserved by not storing cost/benefit analyses or other digital notes weighing trade opportunities. Instead, the computing device proactively identifies trade opportunities and evaluates the opportunities to preempt (or minimize) future processing (both computational processing and enterprise operational processing) associated with the trade opportunity.

Figure 35:
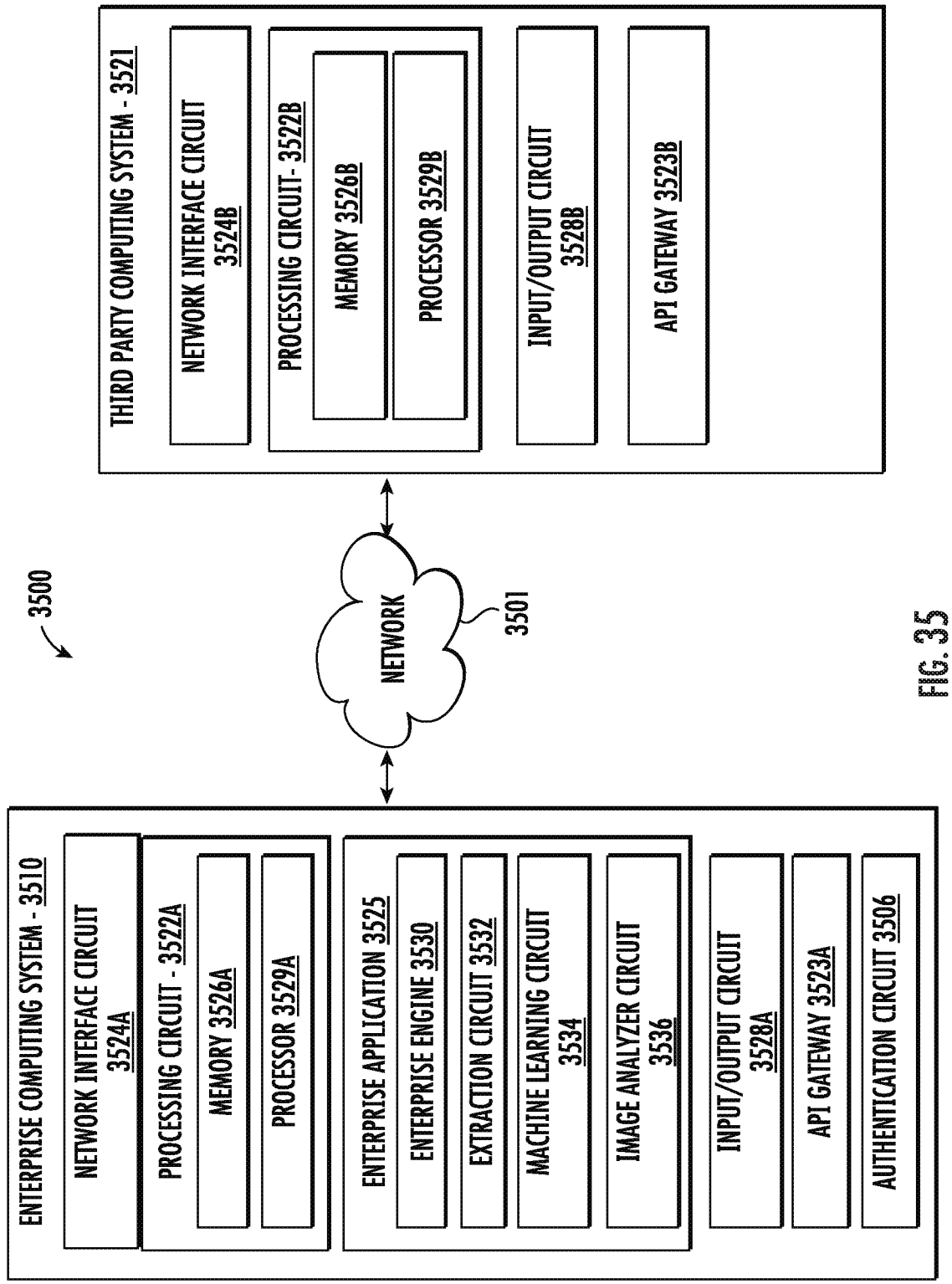
FIG. 35 is a schematic diagram of a computing system for identifying and evaluating trade opportunities, according to an exemplary embodiment.

Referring now to FIG. 35, a schematic diagram of a computing system 3500 for identifying and evaluating trade opportunities is shown, according to an exemplary embodiment. Computing system 3500 is shown to include an enterprise computing system 3510 associated with an enterprise and a third party computing system 3521 associated with a third party (e.g., a supplier, a vendor). Devices and components in FIG. 35 can be added, deleted, integrated, separated, and/or rearranged in various embodiments of the disclosed embodiments. The various systems and devices may be communicatively and operatively coupled through a network 3501. Network 3501 may permit the direct or indirect exchange of data, values, instructions, messages, and the like (represented by the arrows in FIG. 35). The network 3501 may include one or more of the Internet, cellular network, Wi-Fi, Wi-max, a proprietary network, or any other type of wired or wireless network of a combination of wired or wireless networks.

The enterprise and third party may enter into business relationships via contracts or other agreements. The enterprise computing system 3510 and third party computing system 3521 organize, manage, perform, and facilitate the operation of (e.g., satisfaction of) the various contracts/agreements entered into by the enterprise and third party. In one example, the third party may be a vendor selling widgets to the enterprise. The sale agreement (e.g., contract, invoice) may define the terms of the sale such as the number of widgets, the price per widget, interest, the date of the payment(s) for the widgets, late fees, and the like. The sale agreement may be communicated between the enterprise computing system 3510 and the third party computing system 3521 using a physical document and/or an electronic/digital document. Both the enterprise computing system 3510 and the third party computing system 3521 may store the terms of the agreement (or the agreement itself) in memory. As described herein, one or more terms of the agreement may be called the trade terms if the enterprise associated with the enterprise computing system 3510 and the third party associated with the third party computing system 3521 are trading an operational benefit for an operational burden.

Both the enterprise computing system 3510 and the third party computing system 3521 may be any type of electronic device including standalone computers (e.g., laptop computers, desktop computers, etc.), and/or mobile devices (e.g., smart phones, personal digital assistants, tablet computers, etc.). Similarly, both the enterprise computing system 3510 and the third party computing system 3521 may be structured as one or more server computing systems, for example, comprising one or more networked computer servers having a processor and non-transitory machine readable media.

Both the enterprise computing system 3510 and the third party computing system 3521 may include a network interface circuit 3524A and 3524B respectively (hereinafter called "network interface circuit 3524"), a processing circuit 3522A and 3522B respectively (hereinafter called "processing circuit 3522"), a memory of the processing circuit 3526A and 3526B respectively (hereinafter called "memory 3526"), a processor of the processing circuit 3529A and 3529B respectively (hereinafter called "processor 3529"), an input/output circuit 3528A and 3528B respectively (hereinafter called "input/output circuit 3528"), and an application programming interface (API) gateway 3523A and 3523B respectively (hereinafter called API gateway 3523).

The network interface circuit 3524 is structured to receive communications from and provide communications to the enterprise computing system 3510 and/or the third party computing system 3521. In this regard, the network interface circuit 3524 is structured to exchange data, communications, instructions, and the like between the enterprise computing system 3510 and the third party computing system 3521. The network interface circuit 3524 of the enterprise computing system 3510 and the third party computing system 3521 is structured or adapted for and configured to establish a communication session via the network 3501. The network interface circuit 3524 includes programming and/or hardware-based components that couple the enterprise computing system 3510 and/or the third party computing system 3521 to the network 3501. For example, the network interface circuit 3524 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 3524 includes the hardware and machine-readable media structured to support communication over multiple channels of data communication (e.g., wireless, Bluetooth, near-field communication, etc.). Further, in some arrangements, the network interface circuit 3524 includes cryptography module(s) to establish a secure communication session (e.g., using the IPSec protocol or similar) in which data communicated over the session is encrypted and securely transmitted. In this regard, invoice data (or other types of data) may be encrypted and transmitted to prevent or substantially prevent the threat of hacking or unwanted sharing of information.

To support the features of the enterprise computing system 3510 and/or the third party computing system 3521, the network interface circuit 3524 provides a relatively high-speed link to the network 3501, which may be any combination of a local area network (LAN), an intranet, the Internet, or any other suitable communications network, directly or through another interface.

The processing circuit 3522 may include at least one memory 3526 coupled to a processor 3529. The memory 3526 includes one or more memory devices (e.g., RAM, NVRAM, ROM, Flash Memory, hard disk storage) that store data and/or computer code for facilitating at least some of the various processes described herein. That is, in operation and use, the memory 3526 stores at least portions of instructions and data for execution by the processor 3529 to control the processing circuit 3522. The memory 3526 may be or include tangible, non-transient computer-readable volatile memory and/or non-volatile memory. The processor 3529 may be implemented as one or more processors, application specific integrated circuits (ASICs), field programmable gate arrays (FPGAs), digital signal processors (DSPs), and/or other suitable electronic processing components.

The memory 3526 may hold, store, categorize, and/or otherwise serve as a repository for invoices and other general business relationship information between the enterprise computing system 3510 and the third party computing system 3521. The memory 3526 may be structured to provide information relating to invoices, such as terms of the invoices, dates of the invoices, parties involved in the invoice, party contact information (e.g., email address, physical address, phone number of the account holder), and so on. Thus, the memory 3526 may track and store activity regarding the business relationships associated with the enterprise and one or more third parties (or third parties and other third parties).

The input/output circuit 3528 includes communication circuitry for facilitating the exchange of data, values, messages, and the like between an input/output device and administrator(s) using the enterprise computing system 3510 (or other administrators using the third party computing system 3521). In yet another embodiment, the input/output circuit 3528 includes machine-readable media for facilitating the exchange of information between an input/output device and the administrator or other user. In still another embodiment, the input/output circuit 3528 includes any combination of hardware components, communication circuitry, and machine-readable media. Hardware components can include a touchscreen, a keypad, microphone, camera, or buttons for receiving user inputs. Components of the input/output circuit 3528 display text, and/or transmit audio to/from one or more administrators. Additionally or alternatively, the input/output circuit 3528 may be configured to display graphics such as menus, instructions, questions, background photos (e.g., advertisements, etc.), logos, dynamic user interfaces and so on generated by the enterprise application 3525. In one embodiment, the display is a touchscreen display that is capable of detecting administrator touches, e.g., to provide user inputs. In other embodiments, the administrator(s) may generate user inputs via a mouse, keyboard, and the like.

The enterprise computing system 3510 and third party computing system 3521 may also include an API gateway 3523. The API gateway 3523 may be configured to facilitate the transmission, receipt, authentication, data retrieval, and/or exchange of data between the components (e.g., applications) of the enterprise computing device 3510 and/or the third party computing system 3521.

An API is a software-to-software interface that allows a first computing system of a first entity to utilize a defined set of resources of a second (external) computing system of a second (external) entity to, for example, access certain data and/or perform various functions. In such an arrangement, the information and functionality available to the first computing system is defined, limited, or otherwise restricted by the second computing system. To utilize an API of the second computing system, the first computing system may execute one or more APIs or API protocols to make an API "call" to (e.g., generate an API request that is transmitted to) the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users (e.g., name, identification number, biometric data), accounts, dates, functionalities, tasks, etc. The API gateway 3523 in the enterprise computing system 3510 provides various functionality through APIs by accepting API calls via the API gateway 3523. The API calls may be generated via an API engine of a system or device (e.g., enterprise computing system 3510 and/or third party computing system 3521) to, for example, make a request from another system or device.

The API gateway 3523 may be configured to facilitate the communication and exchange of content and data between the enterprise computing system 3510 and the third party computing system 3521. To process various API calls, the API gateway 3523 may receive, process, and respond to API calls using other circuits of the enterprise computing system 3510 and/or the third party computing system 3521. Additionally, the API gateway 3523 may be structured to receive communications (e.g., API calls, API response data, etc.) from other circuits of the enterprise computing system 3510 and/or the third party computing system 3521. That is, other circuits may communicate content and data to the enterprise computing system 3510 and/or the third party computing system 3521 via the API gateway circuit 3523. Therefore, the API gateway 3523 is communicatively coupled other circuits of the of the enterprise computing system 3510 and/or the third party computing system 3521, either tangibly via hardware, or indirectly via software.

The enterprise computing system 3510 is configured to run a variety of application programs and store associated data in a database of the memory 3526A, for instance. One such application run by the enterprise computing system 3510 (and executed via the processing circuit 3522A) may be the enterprise application 3525. It should be appreciated that while the enterprise application 3525 is shown as being operated by the enterprise computing system 3510, the third party computing system 3521 may execute a third party application capable of performing the same operational and functional objectives as the enterprise application 3525. That is, any party in at least a two party arrangement may employ an application to identify, evaluate and alert one or more users/administrators of beneficially redeemable trade terms extracted from one or more agreements between the parties. In other embodiments, an application capable of performing the same operational and functional objective as the enterprise application 3525 may be executed by one or more other servers/computing systems (e.g., a disinterested party in the agreement between the enterprise and the third party). Generally, the enterprise application 3525 may be configured agnostic to the system executing the engine. In a first example, the enterprise application 3525 may receive an available account balance and transaction details from one party, and supplier trade terms, invoice data, trade terms (e.g., invoice discount data, invoice discount amount), and invoice amount from another party. Further, the enterprise application 3525 may maintain, use, or otherwise access data/resources from other applications of the different parties. Each application maintained, used, or otherwise accessed by the enterprise application 3525 may be part of a suite or platform of applications which are accessible by the enterprise application 3525. Each of the applications may be locally-hosted applications or resources (e.g., executing on various computing devices), or cloud-hosted or web-based applications or resources provisioned to the system employing the enterprise application 3525 by one or more third parties, disinterested parties, and/or the enterprise.

Figure 36:
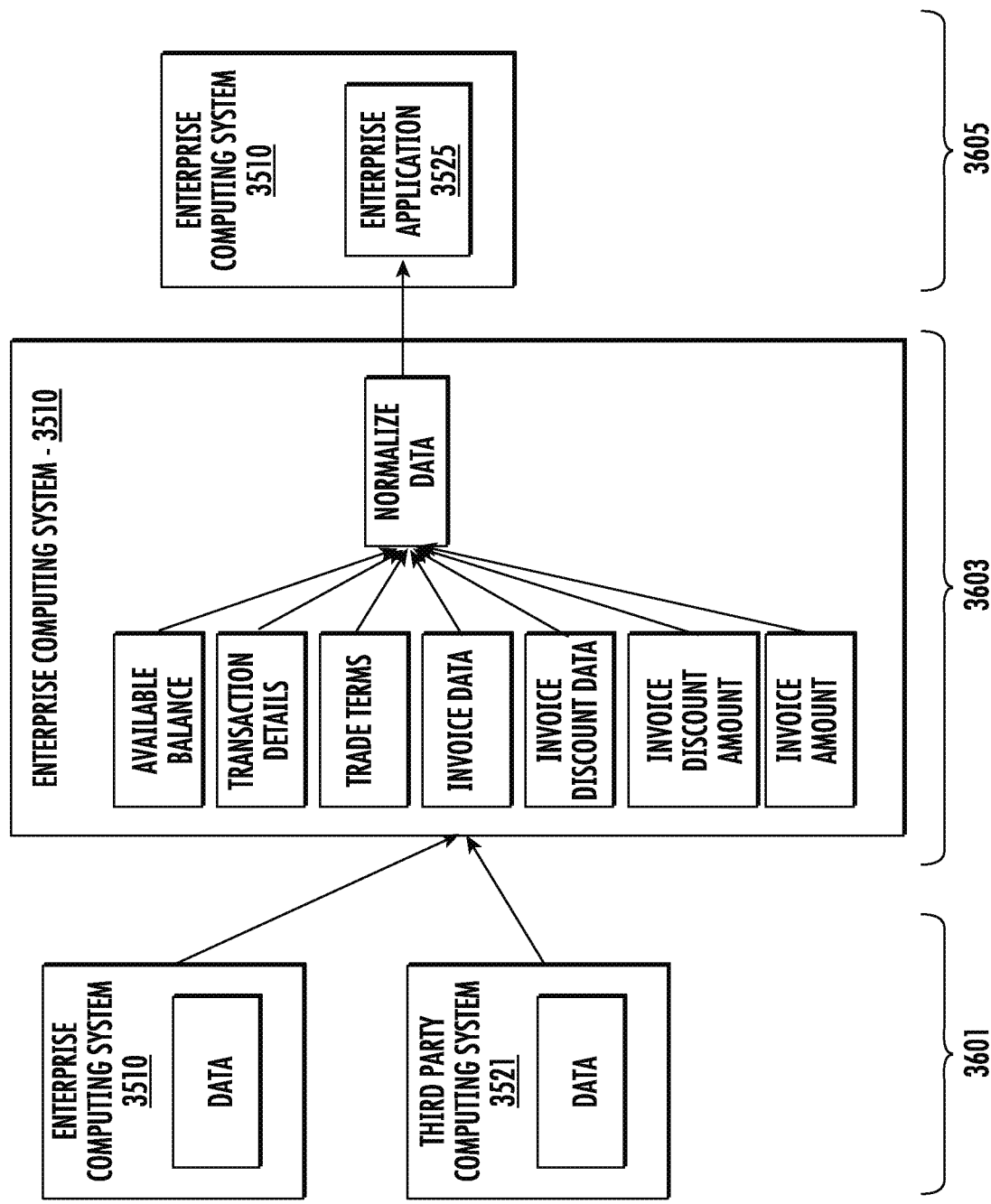
FIG. 36 is a network diagram of the computing system of FIG. 35, according to an exemplary embodiment.

Referring now to FIG. 35 and FIG. 36, depicted is a network diagram of the computing system 3500, according to an exemplary embodiment. As shown, the enterprise computing system 3510 is both collecting the data and processing the data. It should be appreciated that the third party computing system 3521 (or any party in at least a two party agreement, or a disinterested associated with at least a two party agreement) may collect the data and process the data. In yet other embodiments, the system collecting the data may be different from the system processing the data (e.g., executing the enterprise application 3525).

In 3601, various systems (e.g., the enterprise computing system 3510 and one or more third party computing system 3521) may transmit data for collection in 3603. As shown, the enterprise computing system 3510 may retrieve data (from memory 3526A, from one or more other applications executed by the enterprise computing system 3510, from API gateway 3523A) including available balance data of the enterprise (or a customer of the enterprise, for instance) including balance information from checking accounts, savings accounts, credit accounts, etc., and transaction data (e.g., various burdens identified in various transactional agreements entered into by the enterprise, such as a specified number of widgets to produce, accounts receivable data for the enterprise, accounts payable data for the enterprise). Other data not shown, such as tax data, may also be collected by the enterprise computing system 3510 at 3601. The third party computing system 3521 may retrieve data (from memory 3526B, from one or more other applications executed by the third party computing system 3521, from API gateway 3523B) including trade terms (e.g., the benefits of the transaction and/or the burdens of the transaction), invoice data (e.g., dates, party information including party names and party contact information, goods/services identified in the transaction), invoice discount data (e.g., the burden to the third party computing system 3521), and the invoice amount. Other data not shown may also be collected by the third party computing system 3521 at 3601.

In some embodiments, the enterprise computing system 3510 and/or third party computing system 3521 may employ APIs in 3601 configured to facilitate communication and exchange of content and data with the enterprise computing system 3510 in 3603. The enterprise computing system 3510 may also receive various content and data extracted from one or more applications from one or more third party computing systems 3521.

In an illustrative example, the third party computing system 3521 may send API calls to one or more applications of the third party computing system 3521 in 3601 to extract data/content to be transmitted to the enterprise computing system 3510 in 3603. For example, data from various applications of an application platform (e.g., an accounting software platform) may be collected by the third party computing system 3521 in 3601. Moreover, the third party computing system 3521 (or the enterprise computing system 3510) may be accessible by one or more other computing systems which may not have entered into an agreement with the third party computing system 3521 (or the enterprise computing system 3510) but may, in the future, enter into an agreement with the third party computing system 3521 (or the enterprise computing system 3510). That is, one or more future computing systems may be queried for data via the API gateway 3523 in 3601.

In some embodiments, the enterprise computing system 3510 may query the third party computing system 3521 for data. In other embodiments, the third party computing system 3521 may transmit data to the enterprise computing system 3510 without being queried for data. For example, the third party computing system 3521 may transmit any data that it is authorized to transmit to the third party computing system 3521. Additionally or alternatively, the third party computing system 3521 may transmit select data to the enterprise computing system 3510 (e.g., data that had been previously selected by one or more administrators at the third party computing system 3521).

The system responsible for aggregating and collecting the data in 3603 (here, the enterprise system 3510) is configured to standardize and integrate communications between the enterprise computing system 3510 and the external systems (e.g., the third party computing system 3521 and/or any platforms the third party computing system 3521 may use or access). As shown in 3603, the enterprise computing system 3510 may receive various content and data extracted from one or more applications from the enterprise computing system 3510 and/or third party computing system 3521. In 3603, the computing system normalizes the data received from 3601. Normalizing the data may include normalizing the values of the data (e.g., scaling the data from 1-100), normalizing the terms used in the data, normalizing the lineage, normalizing the data types, and the like. For example, the enterprise computing system 3510 may normalize the data in 3603 using one hot encoding.

In 3605, the enterprise application 3525 receives the normalized data from 3603 and performs a variety of functions and/or processes for the enterprise computing system 3510. As described herein, the enterprise application 3525 may identify, evaluate, and alert an administrator of trade opportunities associated with the agreements that may be claimed (or redeemed) by the enterprise computing system 3510.

Generally, the enterprise engine 3530, operated via the enterprise application 3525, is configured to retrieve documents from memory and/or computing systems (e.g., in 3601), monitor other data exchanges between the enterprise computing system 3510 and the third party computing system 3512 (e.g., emails), identify invoices, identify trade terms in the invoices, and evaluate the trade terms. The enterprise engine 3530 alerts administrator(s) of trade opportunities that is beneficial to the enterprise (e.g., the benefits of the trade term outweigh the burdens of the trade term). The enterprise engine 3530 extracts trade term information from one or more monitored and/or stored documents and evaluates whether the trade terms satisfy one or more criteria/evaluations.

As an example, and with reference to FIG. 3, administrator(s) of the enterprise may configure various aspects of the enterprise application 3525. The enterprise application 3525 may be displayed on a user interface on a display executed using the enterprise computing system 3510. One or more administrators of the enterprise computing system (e.g., users, managers, accountants) may configure the parameters of the enterprise application 3525 such as the various thresholds used during the evaluation of the trade term, the notification preferences, and the like. The administrators may use the input/output devices 3528 to configure the enterprise application 3525 using mice, keyboards, trackpads, touch displays, text entry boxes, drop down meus, sliders, buttons, and the like. For example, thresholds (e.g., benefit thresholds and burden thresholds, as described herein), notification configurations (e.g., how the enterprise engine 3530 transmits notifications, when the enterprise engine 3530 transmits notifications, what the notifications transmitted by the enterprise engine 3530 look like) and other administrator preferences may be configured by administrator(s) using the enterprise application 3525.

Figure 37:
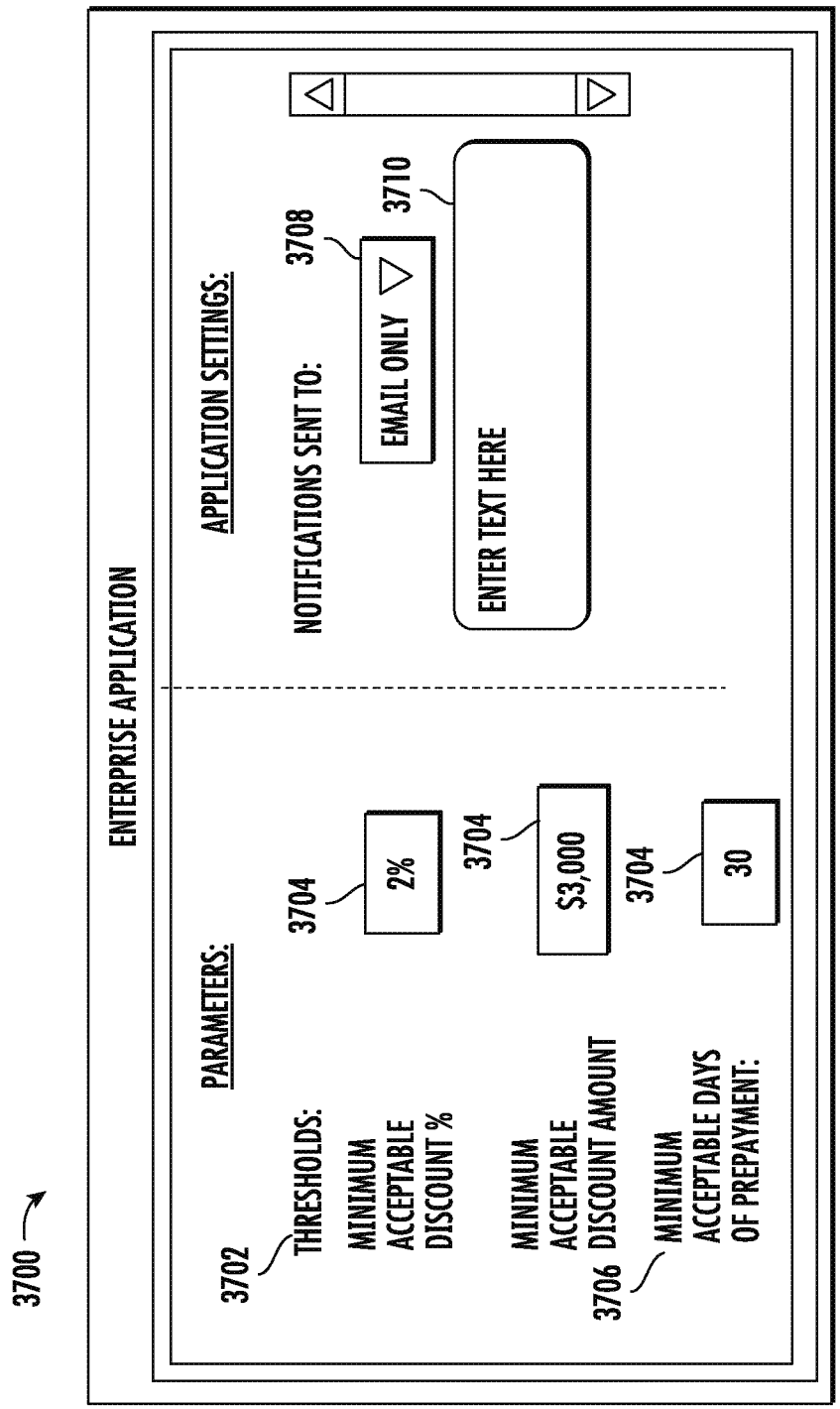
FIG. 37 is a user interface displayed on a device executing an enterprise computing system, according to an exemplary embodiment.

Specifically, FIG. 37 depicts a user interface 3700 displayed on a device executing the enterprise application 3525. As shown by 3702, various benefit thresholds may be configured. For example, the benefit thresholds such as the minimum acceptable discount percent threshold and the minimum acceptable discount amount threshold (e.g., benefit thresholds) are configured. In this example, as shown, the evaluation of the trade term involves the combination of a percent evaluation and a dollar amount evaluation. An administrator may manually enter the threshold values into configurable boxes 3704. In the example user interface 3700, the administrator may also configure a burden threshold such as a time duration (e.g., the minimum number of acceptable days of prepayment) in 3706.

In addition to configuring the thresholds of the enterprise application 3525, the administrators may also configure various application settings. For example, settings that may be configured include a frequency of enterprise application 3525 execution (e.g., automatically executing weekly, monthly, daily, in response to receiving a trigger such as a new invoice), how notifications of available trade opportunities are communicated to administrators (e.g., via email, telephone call, text, widget on the administrator screen). As shown by the dropdown menu 3708, the administrator has configured the enterprise application 3525 to transmit notifications to emails only. The administrators may enter emails into the text box 3710 that will be transmitted notifications when the enterprise application 3525 determines one or more trade opportunities satisfying the parameters identified in 3702 and 3706.

Referring back to FIG. 35, the enterprise application 3525 is a downloaded and installed application that includes program logic stored in a system memory (or other storage location) of the enterprise computing system 3510 that includes an enterprise engine 3530, extraction circuit 3532, a machine learning circuit 3534, and an image analyzer circuit 3536. In this embodiment, the enterprise application 3525 is embodied as program logic (e.g., computer code, modules, etc.). During download and installation, and in some embodiments, the enterprise application 3525 is stored by the memory 3526A of the enterprise computing system 3510 and selectively executable by the processor 3529A. The program logic may configure the processor 3529A of the enterprise computing system 3510 to perform at least some of the functions discussed herein. In some embodiments the enterprise application 3525 is a stand-alone application that may be downloaded and installed on the enterprise computing system 3510. In other embodiments, the enterprise application 3525 may be a part of another application, such as another enterprise application.

The depicted downloaded and installed configuration of the enterprise application 3525 is not meant to be limiting. According to various embodiments, parts (e.g., modules, etc.) of the enterprise application 3525 may be locally installed on the enterprise computing system 3510 and/or may be remotely accessible (e.g., via a browser-based interface) from the enterprise computing system 3510 (or other cloud system in association with the enterprise computing system 3510). In this regard and in another embodiment, the enterprise application 3525 is a web-based application that may be accessed using a browser (e.g., an Internet browser provided on the enterprise computing system 3510). In still another embodiment, the enterprise application 3525 is hard-coded into memory such as memory 3526A of the enterprise computing system 3510 (i.e., not downloaded for installation). In an alternate embodiment, the enterprise application 3525 may be embodied as a "circuit" of the enterprise computing system 3510 as circuit is defined herein.

The extraction circuit 3532 of the enterprise application 3525 is configured to utilize various similarity algorithms/comparison techniques to extract information from digital documents. In some embodiments, the extracted information is used to determine whether the digital document is an invoice. In other embodiments, the extraction circuit 3532 is used to extract one or more terms from the invoice (e.g., trade terms, date invoice is due, total invoice amount).

An example of an algorithm that the extraction circuit 3532 may employ to extract phrase(s), term(s), string(s), and the like in digital documents includes a RegEx classifier. A RegEx classifier is a classifier that searches for, and matches, strings. RegEx classifiers apply search pattern(s) of alphanumeric characters, and may include specific characters or delimiters (e.g. quotes, commas, periods, hyphens, etc.). In some embodiments, RegExes may be predetermined and digital documents may be scanned for the presence of various Regexes. In some embodiments, RegExes may be determined by the user. In alternate embodiments, Regexes may be generated. For example, evolutionary algorithms may be used to determine relevant RegExes that may be used to search the digital documents. Evolutionary algorithms operate by finding successful solutions based on other solutions that may be less successful. In a simplified example, the number of times that a particular RegEx has been matched to text in a digital document may be counted and summed. RegExes that have been identified in a document may be kept, and RegExes without any matches, or where the number of matches associated with that RegEx does not meet a certain threshold, may be discarded. Subsequently, attributes from the RegExes that have been matched may be mixed with other matched RegExes.

In some implementations, fuzzy logic may be implemented separately or as part of the RegEx to identify partial matches of the strings/expressions. The fuzzy logic output may comprise estimates or partial matches and corresponding values, such as "60% true" or "40% false" for a given match of a string/expression. Such implementations may be particularly helpful in instances where the RegEx fails to find an exact match. One example of a fuzzy logic model is the Levenshtein distance algorithm. Fuzzy string matching algorithms search for strings that reasonably match a given pattern. The Levenshtein distance algorithm assesses the text similarity of two strings by determining the minimum number of edits (insertions, deletions, or substitutions) to match the strings. In an example of the Levenshtein distance algorithm, strings in the labeled data may be compared to strings associated with predetermined rules. A score between 0 and 1 may be determined where a score of 1 is produced if the compared strings are identical, and a score of 0 is produced if there are no common characters between strings.

The extraction circuit 3532 may measure various degrees of string similarity. For example, maximum string similarity scores may be determined by evaluating the similarity of entire strings. Additionally or alternatively, partial string similarity scores may be determined by evaluating the similarity of portions of strings. For example, the extraction circuit 3532 may compare a portion of a string to one or more portions of other strings.

Additionally or alternatively, the extraction circuit 3532 may evaluate string constructions to determine the similarities of strings. In an example, a string may be considered a sentence. The token sort approach is an example of evaluating string constructions and involves creating tokens associated with several characters in the string, alphabetizing the tokens, and subsequently analyzing the original string with respect to the alphabetized token string. For instance, the string "peanuts and cracker jacks" may appear dissimilar to the string "cracker jacks and peanuts." However, while the strings are not exactly matched, the strings are the same, but merely in dissimilar constructions. Considering other constructions of the string may highlight the similarity of the strings. For example, using the token sort approach, both strings would result in "and cracker jacks peanuts." Thus, the strings would exactly match.

In some embodiments, the extraction circuit 3532 may chain together or otherwise combine various algorithms (or approaches) to extract data from the invoice.

The machine learning circuit 3534 of the enterprise application 3525 may be trained to perform one or more (or a sequence/chain/combination) of various functions. That is, the machine learning circuit 3534 may include computer-executable instructions structured to execute various machine learning models such as neural networks (including convolutional neural networks, long short term memory networks, gated networks, deep neural networks), support vector machines (SVMs), random forests, and the like. The machine learning circuit 3534 may include one or more machine learning models trained to identify (or classify) various documents to determine whether a particular document is an invoice. For example, the machine learning models of the machine learning circuit 3534 may ingest a document and analyze the ingested data using trained machine learning model(s) to classify the document (e.g., a binary classification such as invoice or non-invoice, or other classification such as invoice, receipt, request, reminder). In some embodiments, the machine learning circuit 3534 may include one or more machine learning models trained to predict a future enterprise account balance. In these embodiments, the machine learning models of the machine learning circuit 3534 may ingest financial data (e.g., accounts receivable, accounts payable, account balance, liquid assets, illiquid assets) and analyze the ingested data using trained machine learning model(s) to predict future financial data. In other embodiments, the machine learning circuit 3534 may include one or more machine learning models trained to recognize potential errors or fraud. In these embodiments, the machine learning models of the machine learning circuit 3534 may ingest historic invoice data (and characteristics of the historic invoices including when the invoice was paid, when the third party generated the invoice, and the media format of the invoice) to analyze the ingested data using trained machine learning model(s) to recognize potential errors or fraud in the invoices. The machine learning models in the machine learning circuit 3534 are discussed further herein with reference to FIGS. 4 and 5.

Figure 38:
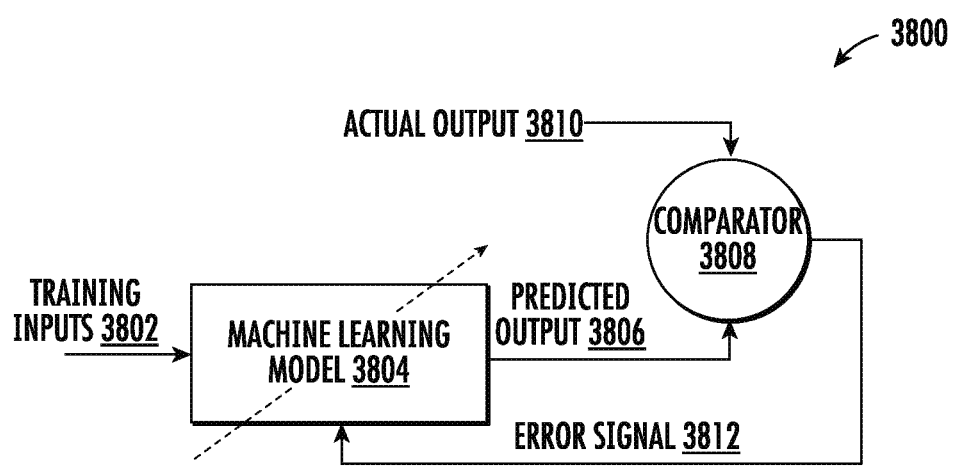
FIG. 38 is a block diagram of an example system using supervised learning, according to an exemplary embodiment.

In some embodiments, the machine learning models in a machine learning circuit 3534 may be trained to identify (or classify) documents using supervised learning. Referring first to FIG. 38, a block diagram of an example system 3800 using supervised learning that may be used to classify documents is shown according to an example embodiment. Supervised learning is a method of training a machine learning model given input-output pairs. An input-output pair is an input with an associated known output (e.g., an expected output). Machine learning model 3804 may be trained on known input-output pairs (e.g., documents and associated document classifications) such that the machine learning model 3804 can learn how to predict known outputs given known inputs. Once a machine learning model 3804 has learned how to predict known input-output pairs, the machine learning model 3804 can operate on unknown inputs to predict an output. The machine learning circuit 3534 may employ one or more machine learning models 3804. To train the machine learning models to classify a document using supervised learning, training inputs 3802 and actual outputs 3810 may be provided to the machine learning model 3804. Training inputs 3802 may include historic documents, and actual outputs 3810 may include the historic document classification. For example, one or more administrator(s) may have previously labeled (or classified/identified) documents as invoices and/or non-invoices (e.g., receipts, confirmations, requests). The inputs 3802 and actual outputs 3810 may be stored in memory 3526A.

In an example, a machine learning model 3804 may use the training inputs 3802 (e.g., documents) to predict outputs 3806 (e.g., a predicted document classification), by applying the current state of the machine learning model 3804 to the training inputs 3802. The comparator 3808 may compare the predicted outputs 3806 to the actual outputs 3810 (e.g., an actual document classification determined from an administrator or other machine learning trainer) to determine an amount of error or differences.

In other embodiments, the machine learning model 3804 may be trained using supervised learning to predict future enterprise financial data. In these embodiments, the training inputs 3802 may include accounts receivable data, accounts payable data, account balance data, liquid asset data, illiquid asset data, and the like. Actual outputs 3810 may generally include the future enterprise account balance. Specifically, actual outputs 3810 may include actual future accounts receivable data, actual future accounts payable data, actual future account balance data, actual future liquid asset data, actual future illiquid asset data and the like.

The inputs 3802 and actual outputs 3810 may be received from historic enterprise resource data from a data repository. For example, the machine learning model 3804 may receive the inputs 3802 and actual outputs 3810 from one or more APIs called by the enterprise engine 3530. The APIs may communicate with one or more data repositories. The machine learning model 3804 may be trained to predict future enterprise financial information (e.g., future enterprise account balance information one month into the future or future enterprise account balance information six months into the future) based on the training inputs 3802 and actual outputs 3810 used to train the machine learning model 3804.

In an embodiment, a machine learning model 3804 may be trained to predict future enterprise financial data based on current account balance data. For example, the machine learning model 3804 may use the training inputs 3802 (e.g., accounts receivable data, accounts payable data, account balance data, liquid asset data, illiquid asset data) to predict outputs 3806 (e.g., future accounts receivable data, future accounts payable data, future account balance data, future liquid asset data, future illiquid asset data) by applying the current state of the machine learning model 3804 to the training inputs 3802. The comparator 3808 may compare the predicted outputs 3806 to actual outputs 3810 (e.g., actual future accounts receivable data, actual future accounts payable data, actual future account balance data, actual future liquid asset data, actual future illiquid asset data) to determine an amount of error or differences. For example, the future predicted accounts receivable data (e.g., predicted output 3806) may be compared to the actual accounts receivable data (e.g., actual output 3810).

Training the machine learning model 3804 with data from various enterprise resources (e.g., accounts receivable data, accounts payable data, illiquid assets, liquid assets) allows the machine learning model 3804 to learn, and benefit from, the interplay between the current and future states of the enterprise and the enterprise resources. For example, training the machine learning model to predict a future account balance with accounts receivable input data may result in improved accuracy of the future account balance. Conventional approaches may predict a future account balance information algorithmically, without consideration of other factors that may affect the future account balance such as accounts receivable data. Generally, machine learning models are configured to learn the dependencies between various inputs. Accordingly, by being trained using a enterprise resource data holistically, the machine learning model 3804 learns the dependencies between the enterprise resource data and other data/factors of the enterprise, resulting in improved future predictions (e.g., forecasting) over predictions that are determined individually and/or independently.

In yet other embodiments, the machine learning model 3804 may be trained using supervised learning to recognize potential errors or fraud in invoices. In these embodiments, the training inputs 3802 may include historic third party invoices and invoice characteristics including when the invoice was paid, when the invoice was generated, the media format of the invoice (e.g., email, physical copy), and the like. Actual outputs 3810 may include classifications associated with the historic invoices (e.g., fraudulent invoice, invoice in error, standard invoice). An administrator may have classified the historic invoice if the invoice turned out to be fraudulent or in error.

The inputs 3802 and actual outputs 3810 may be received from a data repository containing historic invoices and associated invoice classifications (e.g., the invoice was transmitted in error, the invoice was fraudulent). Accordingly, the machine learning model 3804 may be trained to recognize when an invoice has characteristics of those of a fraudulent invoice or an invoice in error based on the training inputs 3802 and actual outputs 3810 used to train the machine learning model 3804.

In some embodiments, the machine learning model 3804 may learn from the aggregation of all historic invoices. That is, training the machine learning model 3804 with all historic invoices allows the machine learning model 3804 to learn, and benefit from, the trends of the invoices from the third party. For example, the training machine learning model 3804 may identify relationships between the invoices and third parties such as higher invoice payments during particular months of the year. In some embodiments, the machine learning circuit 3534 may train machine learning models 3804 for each third party associated with the enterprise such that recognizing errors/fraud in the invoices is specific to particular third parties. In other embodiments, the machine learning circuit 3534 may train the machine learning models 3804 for all of the third parties associated with the enterprise such that the machine learning models 3804 learns to detect anomalies in invoices generally.

In an embodiment, a machine learning model 3804 may be trained to recognize fraudulent invoices or invoices in error based on a present invoice. For example, the machine learning model 3804 may use the training inputs 3802 (e.g., historic invoices) to predict outputs 3806 (e.g., a predicted classification associated with the invoice) by applying the current state of the first machine learning model 3804 to the training inputs 3802. The comparator 3808 may compare the predicted outputs 3806 to actual outputs 3810 (e.g., actual invoice classification) to determine an amount of error or difference. For example, the predicted invoice classification (e.g., predicted output 3806) may be compared to the actual invoice classification (e.g., actual output 3810).

During training, the error (represented by error signal 3812) determined by the comparator 3808 may be used to adjust the weights in the machine learning model 3804 such that the machine learning model 3804 changes (or learns) over time to generate a relatively accurate prediction/classification using the input-output pairs. The machine learning model 3804 may be trained using the backpropagation algorithm, for instance. The backpropagation algorithm operates by propagating the error signal 3812. The error signal 3812 may be calculated each iteration (e.g., each pair of training inputs 3802 and associated actual outputs 3810), batch, and/or epoch and propagated through all of the algorithmic weights in the machine learning model 3804 such that the algorithmic weights adapt based on the amount of error. The error is minimized using a loss function. Non-limiting examples of loss functions may include the square error function, the room mean square error function, and/or the cross entropy error function.

The weighting coefficients of the machine learning model 3804 may be tuned to reduce the amount of error thereby minimizing the differences between (or otherwise converging) the predicted output 3806 and the actual output 3810. For instance, if a machine learning model 3804 is being trained to classify documents, then the predicted document classification will iteratively converge to the actual document classification. Similarly, if a machine learning model 3804 is being trained to predict future enterprise financial data, then the predicted future enterprise financial data will iteratively converge to the actual future enterprise financial data. Moreover, if a machine learning model 3804 is being trained to recognize potential errors or fraud in third party invoices, then the predicted potential errors or fraud associated with third party invoices will iteratively converge to actual errors or fraud associated with third party invoices.

The machine learning circuit 3534 may train the machine learning model(s) 3804 until the error determined at the comparator 3808 is within a certain threshold (or a threshold number of batches, epochs, or iterations have been reached). The trained machine learning model(s) 3804 and associated weighting coefficients may subsequently be stored in memory 3526A or other data repository (e.g., a database) such that the machine learning model(s) 3804 may be employed on unknown data (e.g., not training inputs 3802). Once trained and validated, the machine learning model(s) 3804 may be employed during testing (or an inference phase). During testing, the machine learning model(s) 3804 may ingest unknown data to predict document classifications, future enterprise financial data, and/or invoice classifications.

In some embodiments, instead of (or in addition to) the machine learning circuit 3534 classifying the invoice as fraudulent or in error, the enterprise engine 3530 may compare one or more extracted invoice terms to historic invoice terms to classify the invoice. The enterprise engine may compare an extracted invoice term to a predetermined number of historic invoice terms or all of the historic invoice terms. Comparing the extracted invoice terms to historic invoice terms may provide the enterprise engine 3530 insight as to whether one or more invoice terms are in error or fraudulent. For example, the enterprise engine 3530 may compare the extracted invoice term to one or more historic invoice terms and one or more thresholds. If the difference between the compared terms satisfied one or more thresholds, the enterprise engine 3530 may determine that the invoice associated with the extracted invoice terms is in error and/or the invoice associated with the extracted invoice terms is fraudulent.

Figure 39:
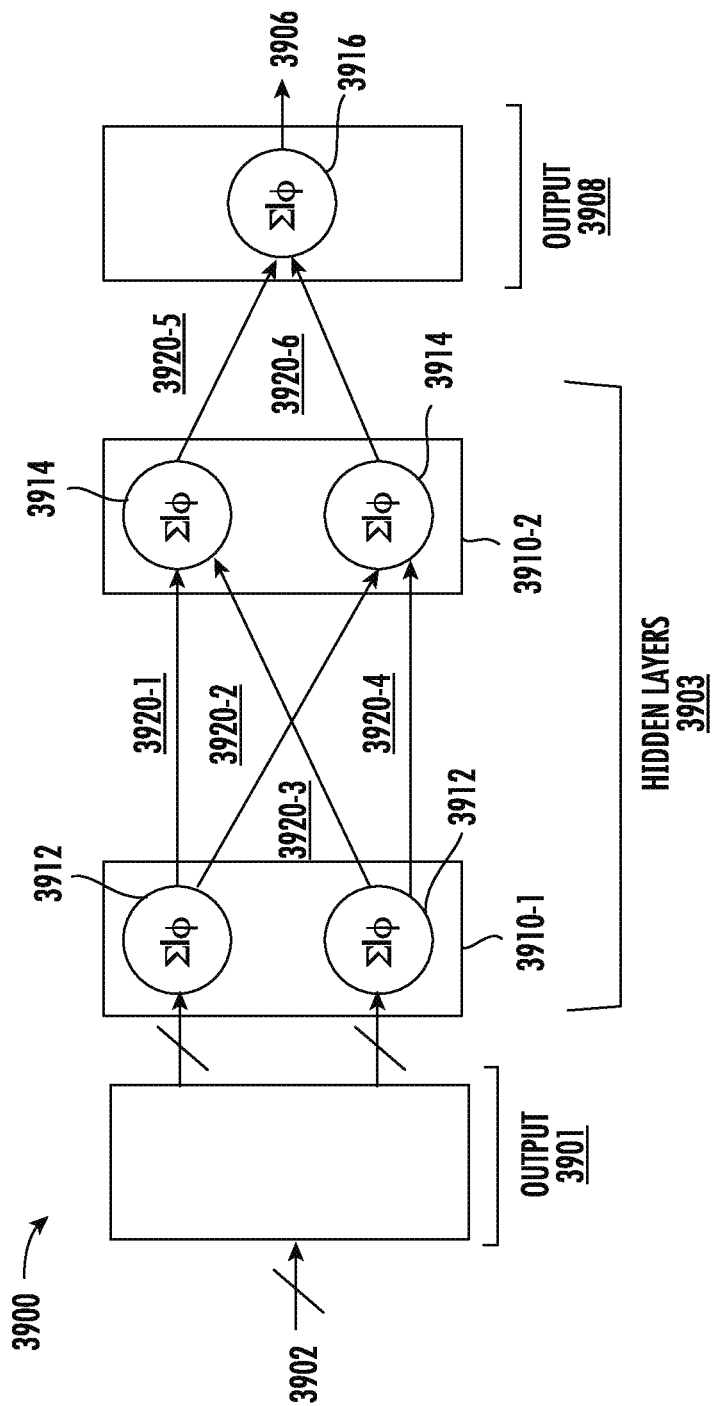
FIG. 39 is a block diagram of a simplified neural network model, according to an exemplary embodiment.

Referring next to FIG. 39, a block diagram of a simplified neural network model 3900 is shown, according to an example embodiment. The neural network may be a machine learning model that is trained to classify documents. The neural network model 3900 may include a stack of distinct layers (vertically oriented) that transform a variable number of inputs 3902 being ingested by an input layer 3904, into an output 3906 at the output layer 3908.

The neural network model 3900 may include a number of hidden layers 3910 between the input layer 3904 and output layer 3908. Each hidden layer has a respective number of nodes (3912, 3914 and 3916). In the neural network model 3900, the first hidden layer 3910-1 has nodes 3912, and the second hidden layer 3910-2 has nodes 3914. The nodes 3912 and 3914 perform a particular computation and are interconnected to the nodes of adjacent layers (e.g., nodes 3912 in the first hidden layer 3910-1 are connected to nodes 3914 in a second hidden layer 3910-2, and nodes 3914 in the second hidden layer 3910-2 are connected to nodes 3916 in the output layer 3908). Each of the nodes (412, 414 and 3916) sum up the values from adjacent nodes and apply an activation function, allowing the neural network model 3900 to detect nonlinear patterns in the inputs 3902. Each of the nodes (3912, 3914 and 3916) are interconnected by weights 3920-1, 3920-2, 3920-3, 3920-4, 3920-5, 3920-6 (collectively referred to as weights 3920). Weights 3920 are tuned during training to adjust the strength of the node. The adjustment of the strength of the node facilitates the neural network's ability to predict an accurate output 3906.

In some embodiments, the output 3906 may be one or more numbers (e.g., a vector of real numbers). The neural network model 3900 may transform the numbers into a classification using any classifier. For example, a document may be classified and/or an invoice may be classified. In one example, the real numbers from output 3906 may be input into a softmax classifier to be classified. A softmax classifier uses a softmax function, or a normalized exponential function, to transform an input of real numbers into a normalized probability distribution over predicted output classes. For example, if the neural network 3900 is being used to classify documents, the softmax classifier may indicate the probability of the output being in an invoice, being a receipt, being a request, etc. If the neural network 3900 is being used to classify invoices, the softmax classified may indicate the probability of the output being a standard invoice, a fraudulent invoice, or an invoice in error. The softmax classifier may be employed because of the classifier's ability to classify various classes. Other classifiers may be used to make other classifications. For example, the sigmoid function, makes binary determinations about the classification of one class (i.e., the output may be classified as either an invoice document or not an invoice document).

Referring back to FIG. 35, in some arrangements, the enterprise computing system 3510 may access the machine learning circuit 3534 using an API (e.g., from the API gateway 3523A). Beneficially, the enterprise computing system 3510 may reduce the computing resources consumed by the enterprise by executing one or more operations using the API. For example, each machine learning model of the machine learning circuit 3534 may have an associated API that may be used to call the machine learning model to reduce the burdens/computational resources of operating the machine learning models on the enterprise computing system 3510. For example, APIs may be invoked such that the machine learning models are implemented in different environments such as on cloud environments.

The image analyzer circuit 3536 of the enterprise application 3525 may extract information from digital documents or images by interpreting the pixels of the image. That is, the image analyzer circuit 3536 may include computer-executable instructions structured to extract information from text in digital images. For example, the image analyze circuit 3536 may label pixels using one or more characteristics, such as color, intensity or texture. Pixels with similar labels in a group of pixels may be considered to share the same visual features. For example, if several pixels in close proximity share the same intensity, then the enterprise engine may determine that those pixels may be closely related. Thus, the pixels may be a part of the same character, or, for example, the same curve comprising a portion of a single character.

The image analyzer circuit 3536 may use, for instance, optical character recognition to recognize characters from the pixels. For example, the image analyze circuit 3536 may compare image objects, or clusters of related pixels, to characters in a character and/or font database. Thus, the image analyzer circuit 3536 may match image objects in the invoice to characteristics of characters. For example, an image object may include part of a curve that resembles the curve in the lower portion of the letter 'c'. The image analyzer circuit 3536 may compare the curve with curves in other characters via a database. Subsequently, the image analyzer circuit 3536 may predict the character based on the features of the character (e.g., the curve). In some embodiments, the image analyzer circuit 3536 may employ a dictionary to check the extracted predicted characters/words against known character sequences/other data rules. In other words, a dictionary may be a means of checking that the predicted character, based on the image object, was accurately determined.

The enterprise computing system 3510 may also include an authentication circuit 3506 configured to authenticate administrators configuring parameters of the enterprise application 3525. The authentication may be in addition to or in place of authentication that may be required to access/use the enterprise application 3525. In some configurations, the authentication circuit 3506 may receive a credential (username and password, answer to security question, passcode, biometric information, etc.) that the authentication circuit 3506 matches to one or more stored credentials authorizing (or authenticating) administrator(s) in memory 3526A to configure parameters of the enterprise application 3525. For example, memory 3526A may contain a lookup table matching administrator authentication information (e.g., name, home address, IP address, MAC address, phone number, biometric data, passwords, usernames) to an administrator role, where various administrator rules allow administrators the authority to configure one or more parameters of the enterprise application 3525.

Figure 40:
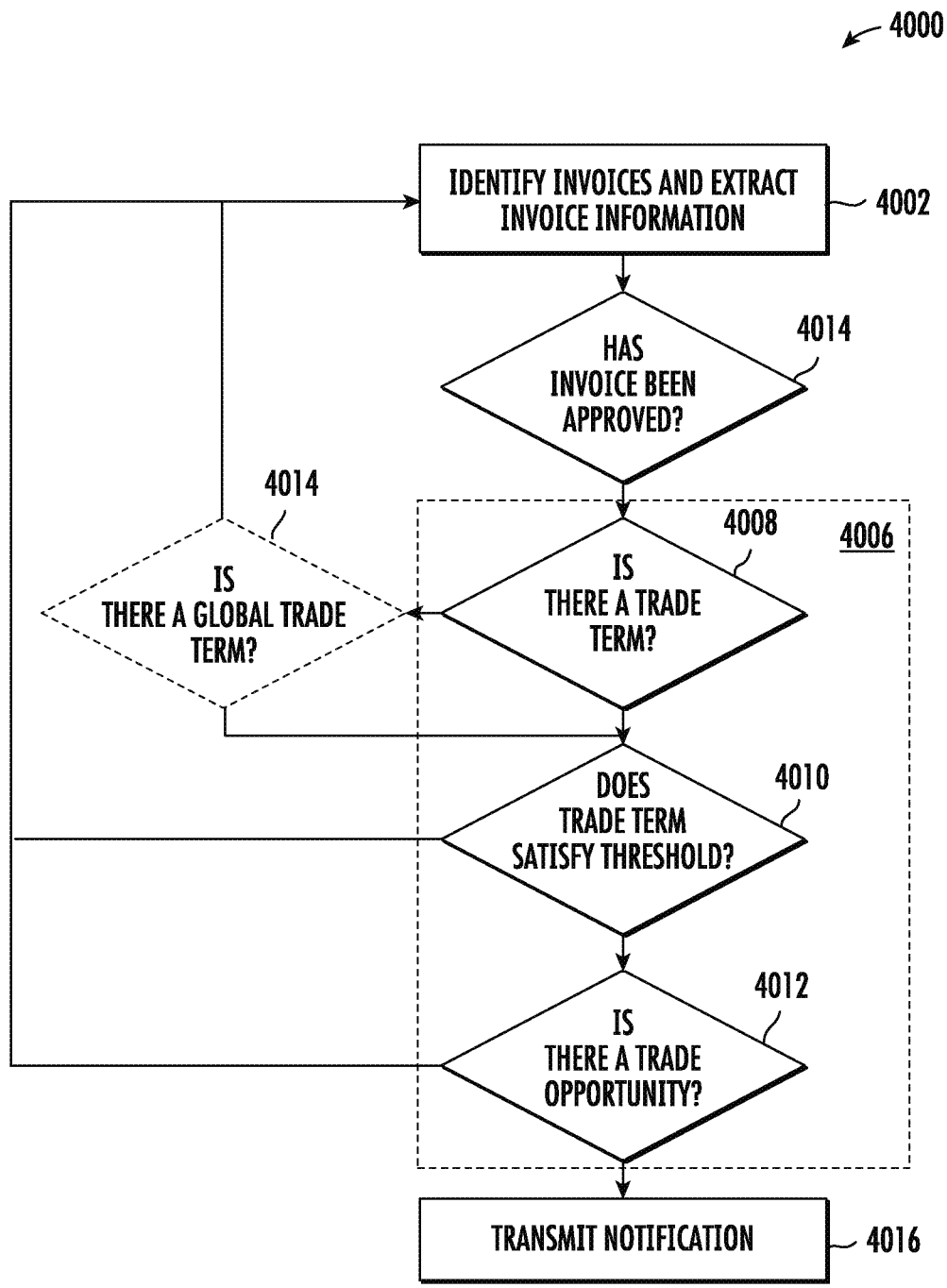
FIG. 40 is a flow diagram of a method for evaluating trade terms in an invoice, according to an exemplary embodiment.

Referring now to FIG. 40, a flow diagram of a method 4000 for evaluating trade terms in an invoice is shown, according to an exemplary embodiment. The method 4000 including each of the steps 4002-4016 may be performed by one or more of the devices or components described above with reference to FIG. 35-FIG. 39. Additionally, while shown as being performed in a particular order, it is noted that the steps of the method 4000 may be performed in any order.

In step 4002, the enterprise engine 3530 may identify invoices from received documents. In some embodiments, the enterprise engine 3530 receives documents (e.g., contracts, invoices) and enterprise resource planning information using a network of APIs that facilitates connections and communications between remotely hosted and/or locally executed applications. For example, via an API gateway, the enterprise computing system 3510 may communicably link to the third party computing system to receive one or more documents. In response and via the API gateway, the enterprise computing system 3510 may couple to the third party computing system 3521 (or other data repository) to receive documents. In other examples, the enterprise computing system 3510 may receive other financial information (e.g., enterprise resource information) instead of, or in addition to, documents.

In other embodiments, the enterprise engine 3530 receives documents from one or more applications. For instance, the enterprise engine 3530 may, after receiving authorization from an administrator of the enterprise in some embodiments, monitor emails or other data exchanges between the enterprise computing system 3510 and the third party computing system 3521. The enterprise engine 3530 may use various techniques to monitor emails and extract invoice information.

The enterprise engine 3530 may also receive documents manually from an administrator of the enterprise. For example, the administrator of the enterprise may create a document and manually enter one or more terms of a received document (e.g., a mailed document) into the enterprise computing system 3510. Additionally or alternatively, the enterprise engine 3530 may receive documents via an administrator of the enterprise scanning a physical document into the enterprise computing system 3510. The scanned document received by the enterprise computing system 3510 may be an image, or a digital visually perceptible version of the physical document. The digital image may include pixels, where pixels are the smallest addressable elements in the digital image.

In other embodiments, the enterprise engine 3530 may receive documents from memory. For example, the enterprise engine 3530 may query memory 3526 periodically (e.g., every month, every week, every day) to retrieve documents. In other embodiments, the enterprise engine may query memory 3526 in response to a trigger (e.g., in response to an administrator instruction to execute process 4000, in response to receiving a predetermined number of documents, and the like).

In some implementations, the enterprise engine 3530 may preprocess the received document(s). For example, in the case where the enterprise engine 3530 receives a digitally scanned document, the image of the document may have noise removed, become binarized (e.g., pixels may be represented as either a '1' for having a black color, for instance, and a '0' for having a white color), be normalized, and the like.

The enterprise engine 3530 may identify invoices from the received documents. For example, the enterprise engine 3530 may call the extraction circuit 3532 to parse through the received documents to identify invoices. For example, the extraction circuit 3532 may search the documents for keywords/topics such as "Invoice #" and if such keywords/topics are identified in a document (or a threshold number of keywords are identified in the document), then the enterprise engine 3530 may identify the document as an invoice.

In some embodiments, administrator(s) of the enterprise computing system 3510 may use rules to match data in the documents to determine classes (e.g., invoice, non-invoice). For example, the enterprise engine 3530 may create a lookup table (or dictionary), where each entry in the lookup table is a matching rule. The enterprise engine 3530 (or extraction circuit 3532) may utilize the entries in the lookup table to search for strings/keywords in documents to determine the class of the document.

In other embodiments, the enterprise engine 3530 may dynamically generate the lookup table. For example, the enterprise engine 3530 may determine that phrases/terms are commonly associated and match the phrases/terms in the lookup table. For example, phrases/terms that are analogized according to various similarity algorithms may receive a number of points. The enterprise engine 3530 may determine that the phrases/terms are similar and add them to the lookup table in the event that the points (representing agreement between the various similarity algorithms) satisfy a predefined matching threshold. The matching threshold may be manually determined by administrator(s) and/or dynamically determined by the enterprise engine 3530.

The entries in the lookup table may be used as templates or matching rules by one or more other circuits and/or algorithms. For example, the enterprise engine 3530 may perform latent semantic analysis ("LSA") to identify invoices based on strings of characters in scanned documents. LSA may determine the similarity of strings by associating strings with content and/or topics that the strings are frequently used to describe. A score between −1 and 1 may be produced, where 1 indicates that the strings are identical to a template string, while −1 means there is nothing that relates the strings to the template strings (e.g., topics). LSA performs string-topic similarity analysis by identifying relationships between strings and topics in a document. LSA evaluates the context of strings in a document by considering strings around each string. LSA includes constructing a weighted term-document matrix, performing singular value decomposition on the matrix to reduce the matrix dimension while preserving string similarities, and subsequently identifying strings related to topics using the matrix. Accordingly, documents with strings that are not similar to strings in the template are unlikely invoices since the strings in the template (e.g., the rows in the lookup table) are based on common strings in an invoice.

Additionally or alternatively, the enterprise engine 3530 may perform an n-gram analysis to identify invoices from received documents by matching topics and/or common phrases/expressions in common invoices (e.g., invoice templates). An n-gram is a continuous sequence of n-items in text. Among others, an n-gram may be a sequence of characters, words, or syllables in a text. An n-gram analysis may evaluate an n-gram's frequency in a text. The analysis of the frequency of the n-gram in the text may indicate that certain data fields and/or certain documents contain a certain number of topics. For instance, if an n-gram is repeated once, the n-gram is likely not associated with the document. In contrast if an n-gram is repeated multiple times, the n-gram is likely associated with the document. The enterprise engine 3530 may employ the n-gram analysis using the lookup table to define the n-grams to determine whether the received document is an invoice. If the received document is an invoice, the number of identified n-grams in the document may satisfy one or more thresholds.

In other embodiments, topic modeling algorithms such as Latent Dirichlet Allocation may be employed to determine the similarity of data in the documents to the entries in the lookup table to identify invoices. Topics in data may be modeled according to a Dirichlet distribution of topics, and each topic may be described by a Dirichlet distribution of words. Jean Shannon Distance may be used to measure the similarity of the document distributions to generate a similarity score between the data in the documents and strings/expressions in the lookup table. If the similarity score satisfies one or more thresholds, the enterprise engine 3530 may determine that the document is an invoice.

In other embodiments, the enterprise engine 3530 may call the machine learning circuit 3534 to identify invoices from documents. The enterprise engine 3530 may feed the machine learning circuit 3534 any documents received from memory 3526, from one or more applications, from a network of APIs, and the like and receive an identification (or other classification) of the document.

After the enterprise engine 3530 has identified one or more invoices from the documents, the enterprise engine 3530 may extract information (e.g., invoice information such as invoice amount, invoice due date, and trade term(s) from the invoice. In an example, if authorized according to the authorization circuit 3506, the extraction circuit 3532 may be configured to scan/crawl received/opened emails to extract information from an identified invoice in an email (e.g., the invoice being previously identified as an invoice as discussed herein). The extraction circuit 3532 extracts information in response to matching string(s)/character(s) in the email. For example, the extraction circuit 3532 may be configured to extract characters in a document until a space character is identified in response to matching the string "Discount Percent" in the invoice. Accordingly, characters after the string "Discount Percent" in the invoice will be extracted. In other embodiments, the image analyzer circuit 3536 may extract invoice information (including trade terms, if any) from a digital invoice document. Other methods of determining string similarity and/or string construction may be employed by the enterprise engine 3530 to extract information from the invoices.

In decision 4004, the enterprise engine 3530 may determine whether an invoice is approved and/or open. An approved invoice is an invoice that has been processed but not paid. The enterprise engine 3530 may determine whether an invoice has been approved by employing one or more image processing, natural language processing, and/or image detection algorithms to extract words/signatures/phrases from the invoice document (e.g., "Approved"). The enterprise engine 3530 may also analyze metadata associated with the invoice document. For example, the enterprise engine 3530 may use metadata to evaluate a time that the document was last modified, a user and/or user device that last modified the document, and the like. If the invoice has not been approved, the enterprise engine 3530 may be configured to transmit a notification to one or more administrator(s) to remind the administrator(s) to consider approving the invoice. In some embodiments, if the invoice has not been approved, the process restarts at step 4002 to identify a next one or more invoices. Similarly, if the invoice has closed (e.g., the invoice has been paid already, the invoice has been cancelled, one or more parties broke one or more terms of the invoice), then process restarts at step 4002 to identify a next one or more invoices. If the invoice has been approved, then the enterprise engine 3530 may execute the evaluation procedure 4006.

The enterprise engine 3530 evaluates the identified invoices as shown by evaluation procedure 4006. The enterprise engine 3530 may employ any one or more decisions (e.g., evaluation techniques/criteria) to evaluate the invoice(s) in evaluation procedure 4006. In some embodiments, the enterprise engine 3530 employs various gating evaluations as part of evaluation procedure 4006. For example, each evaluation (e.g., decision 4008, 4010, 4012 and/or 4014) may lead to a subsequent evaluation in the event the previous evaluation is satisfied. In some embodiments, as shown, if the invoice does not satisfy one or more gating evaluations, the process may restart at step 4002 to identify a next invoice. Administrator(s) may configure the order of evaluations, what each evaluation is evaluating, thresholds implemented during the evaluation, and the like.

In decision 3908, the enterprise engine 3530 evaluates whether the invoice contains a trade term using the invoice information extracted in step 4002. For example, the enterprise engine 3530 may search the invoice information for particular strings identified in the lookup table (as discussed with reference to step 4002). In some embodiments, if the invoice does not contain a trade term, the process may restart at step 4002 such that the enterprise engine 3530 may identify a new invoice.

In other embodiments, if the invoice does not contain a trade term, the process 4000 may proceed to decision 4014 to evaluate whether the third party (e.g., vendor or supplier) associated with the invoice is associated with a global trade term. A global trade term may be a trade term defined in a general contract with the vendor. For example, the enterprise engine 3530 may query data repositories, memory, and/or other servers to retrieve information associated with initial onboarding agreement between the third party and enterprise (e.g., a general contract). During the initial onboarding process (e.g., negotiations between the enterprise and third party), the third party and enterprise may agree to one or more global trade terms.

In some embodiments, during the initial onboarding process, the enterprise engine 3530 may be configured to verify the third party. For example, the enterprise engine 3530 may query one more databases to retrieve financial information about the third party, administrative information about the third party, and the like. For instance, the enterprise engine 3530 may query a server for third party administrative information such as account takeover information (e.g., whether there is information about a new party taking over an account, whether the account will be modified in the future) or other information that may indicate or quantify the legitimacy/authenticity of the third party. The enterprise engine 3530 may call the extraction circuit 3532 to search for particular strings in documents, webpages, and the like for characters that may indicate a troubled third party vendor/supplier.

Assuming the third party is verified, the decision 4014 evaluates whether there are global trade terms associated with the third party that may be applied to an identified invoice. In some embodiments, decision 4008 may be switched with decision 4014. That is, the evaluation 4006 may evaluate whether there are any global trade terms associated with the third party before evaluating there are any particular trade terms associated with an invoice. In some embodiments, the evaluation 4006 may evaluate whether there are any global trade terms and/or particular trade terms in a single decision step.

In some embodiments, the global trade terms and particular trade terms may be in conflict. For example, the global trade term may indicate a 2% discount while the particular trade term found on a particular invoice may indicate a 5% discount. In these cases, the enterprise engine 3530 may transmit a notification to one or more administrator(s) and/or transmit a notification to the third party computing system 3510. In some instances, the enterprise engine 3530 may be configured to select a trade term to supersede the conflicting trade terms. For example, the enterprise engine 3530 may be configured to determine the most recent trade term (e.g., analyzing the date on the invoice and comparing the date on the invoice to the date of the general contract). In an alternate example, the enterprise engine 3530 may be configured to always select the particular trade term as the governing trade term in the event the particular trade term and the global trade terms are in conflict (or vice-versa).

In decision 4010, the enterprise engine 3530 evaluates whether the trade term satisfies one or more thresholds. The enterprise engine 3530 evaluates whether the trade term satisfies one or more threshold(s) (or other criteria) because in some cases, the benefits received from the trade opportunity may not be worth the risk of the burdens of the trade term. For example, an enterprise may consider paying the invoice early a risk because by paying the invoice amount early, the enterprise is effectively extending a loan to the supplier.

In some embodiments, the enterprise engine 3530 may query one or more other servers/databases before determining whether the benefits received from the trade opportunity are worth the risk of the burdens of the trade term. For example, the enterprise engine 3530 may query a server to retrieve a current foreign exchange rate because currency exchanges may need to be performed before the enterprise pays the third party. The enterprise engine 3530 includes the foreign exchange rate in the evaluation of the trade terms. In other examples, the enterprise engine 3530 may query a server to retrieve interest rates or other costs associated with borrowing money.

In an illustrative example, the enterprise engine 3530 may evaluation whether the dollar amount redeemable in response to paying the invoice early is worth paying the invoice early (e.g., whether the discount is advantageous to the enterprise). The enterprise engine 3530 may determine whether the dollar amount redeemable is worth paying the invoice early by calculating, for instance, the annualized interest from the trade discount. If the annualized interest rate is higher than the cost of borrowing money to pay the invoice early, then the enterprise engine 3530 may determine that the dollar amount redeemable from the vendor is worth paying the invoice early. Additionally or alternatively, the enterprise engine 3530 may determine whether the dollar amount redeemable is worth paying the invoice early by calculating, for instance, whether the benefit received from claiming the discount is greater than (or less than) a benefit received by using the money to pay the invoice in different way(s). For example, the enterprise engine 3530 may determine that keeping the money that would be used to pay the invoice in an account earning interest is more beneficial than withdrawing the money to pay the invoice early and receiving the benefit of the discount.

In other embodiments, the enterprise engine 3530 may evaluate the benefit of the trade term and the burden of the trade term independently. Administrator(s) of the enterprise may configure benefit threshold(s) and/or burden threshold (s) that must be satisfied when evaluating the trade term. For example, benefit thresholds may include defining a minimum dollar amount and/or a minimum percentage of the total invoice amount. If a benefit threshold is not satisfied, then the enterprise engine 3530 may determine that the benefit of the trade term is not worth any risk (e.g., the benefit is too small). For example, an administrator may configure a 1% threshold. If the benefits of the trade term are less than 1% (e.g., the discount received from performing the trade term), then the enterprise engine 3530 may determine that the benefit threshold is not satisfied. Other example thresholds that may be configured include burden thresholds such as a maximum number of prepayment days. If a burden threshold is too large, then the enterprise engine 3530 may determine that the burden of the trade term is not worth any benefit (e.g., paying an invoice a year before the invoice due date may not be worth the benefit of the trade term because retaining the cash associated with paying the invoice may be more beneficial to the enterprise than the value of the discount). In yet other embodiments, the enterprise engine 3530 may perform other cost/benefit analyses and/or multiple cost benefit analyses/threshold comparisons at decision 3910 to evaluate whether the enterprise should consider the trade term and continue with the evaluation of the trade term.

If the terms of the trade are not beneficial to the enterprise (e.g., the burden of the benefit outweighs the benefit, the dollar amount redeemable from the trade term is insignificant), the process may restart at step 4002 such that new one or more invoices may be identified and evaluated by the enterprise engine 3530.

In decision 4012, the enterprise engine may evaluate whether a trade opportunity exists from the trade terms. For example, the invoice may contain a trade term (as identified by passing decision 4008), and the trade term may be beneficial for the enterprise (as identified by passing decision 4010). In decision 4012, the enterprise engine 3530 may evaluate whether the criteria of the trade term results in (or matures into) a valid trade opportunity. For example, a trade term that rewards the enterprise with a 10% discount if the enterprise pays the invoice 30 days before the invoice is due is only valid as a trade opportunity if the invoice is due in more than 30 days. If the trade opportunity is not possible (e.g., because one or more terms of the trade term are impossible, like a missed deadline), then the trade term does not vest into a trade opportunity.

Similarly, there may not be a trade opportunity if the enterprise does not have sufficient resources to perform the trade terms. For example, the enterprise may have insufficient funds to pay the invoice payment early. Additionally or alternatively, the enterprise may have insufficient funds to pay a batch of invoice payments early.

In some embodiments, the enterprise engine 3530 may determine whether there is a trade opportunity in decision 4012 in the context of other financial responsibilities or potential other trade opportunities (e.g., a batch of potential trade opportunities). In some embodiments, the enterprise engine 3530 may calculate a total payment amount for a selected batch of potential trade opportunities. The enterprise engine 3530 may compare the total payment amount for the selected batch of potential trade opportunities to a current intraday balance, where the enterprise engine 3530 may receive the intraday balance from memory 3526A, one or more APIs via the API gateway 3523 and/or one or more other data repositories/servers. In some embodiments, if the total payment amount for the selected potential batch of potential trade opportunities is less than the current intraday balance, then the enterprise engine 3530 may determine the selected potential batch of trade opportunities is an acceptable trade opportunity. In other embodiments, for the enterprise engine 3530 to determine the selected potential batch of trade opportunities is an acceptable trade opportunity, the total payment amount for the selected batch of potential trade opportunities must be a predetermined amount (e.g., a percentage difference, a dollar difference) less than the current intraday balance. In a non-limiting example, the administrator may configure the predetermined amount threshold such that the enterprise engine 3530 will determine that there is a trade opportunity given 50% of intraday balance remains after the total amount of the selected batch of potential trade opportunities is subtracted from the current intraday balance. One or more administrator(s) may configure the predetermined amount between the total payment amount for the selected batch of potential trade opportunities and the current intraday balance.

In other embodiments, instead of comparing the total payment amount of a selected batch of potential trade opportunities to a current intraday balance, the enterprise engine 3530 may compare the total payment amount of a selected batch of potential trade opportunities to predicted future enterprise financial data. The enterprise engine 3530 may also compare a trade term to predicted future enterprise financial data. The machine learning circuit 3534 may be trained to predict enterprise future financial data based on enterprise resource data such as accounts receivable data, accounts payable data, account balance data, liquid asset data, illiquid asset data and the like. The enterprise engine 3530 may compare the difference between the predicted enterprise future financial data determined from the machine learning circuit 3534 and the total payment amount of the selected batch of potential trade opportunities to one or more predetermined amounts to determine whether there is a trade opportunity given other financial responsibilities (e.g., the future financial state) of the enterprise.

It should be appreciated that the enterprise engine 3530 may execute one or more evaluations of the evaluation procedure 4006 (e.g., decision 4008, 4010, 4012, and/or 4014) in different orders and/or at different points in time. For example, decision 4012 may be evaluated before decision 4010. Additionally or alternatively, the enterprise engine 3530 may evaluate decision 4008 and decision 4010 in evaluation procedure 4006, and subsequently evaluate decision 4012. For example, the enterprise engine 3530 may evaluate decision 4010 at a different point in time. For instance the enterprise engine 3530 may evaluate decision 4010 (e.g., whether the enterprise has sufficient funds to pay the invoice) during a payment period (e.g., after the enterprise engine 3530 has determined that there is a trade term in decision 4008 and that benefits of the trade term satisfy the benefit threshold and the burdens of the trade term satisfy the burden threshold in decision 4010). That is, one or more evaluations may interrupt a subsequent process to facilitate an administrator verifying the payment. For instance, the enterprise engine 3530 may interrupt a payment process by evaluating whether the enterprise has sufficient resources to transfer funds for the payment.

In some embodiments, the enterprise engine 3530 may evaluate whether there is a trade opportunity in decision 4012 by evaluating the authenticity of the third party computing system. That is, if the third party is not authentic, there is not a trade opportunity. As discussed herein, the enterprise engine 3530 may compare extracted invoice terms (e.g., trade terms, invoice amount) of an invoice to one or more historic invoice terms and thresholds to determine whether the invoice is in error or fraudulent. The enterprise engine 3530 may also call the machine learning circuit 3534 to classify the invoice (e.g., a standard invoice, a fraudulent invoice, an invoice in error).

After the enterprise engine 3530 has evaluated the invoice according to evaluation procedure 4006, the enterprise engine 3530 may transmit one or more notifications to one or more administrators (or other users) indicating a trade opportunity in step 4016. Notifications transmitted to the administrator(s) include indications that an enterprise balance inquiry has been completed and payment may proceed, indications of a batch of trade opportunities the enterprise may beneficially redeem/claim, indications that one or more invoices did not complete (or satisfy) one or more evaluations (e.g., an indication that a trade term failed an evaluation in decision 4008, 4010, 4012, and/or 4014), indications that an invoice is fraudulent (or transmitted in error), some combination, and the like.

Figure 41A:
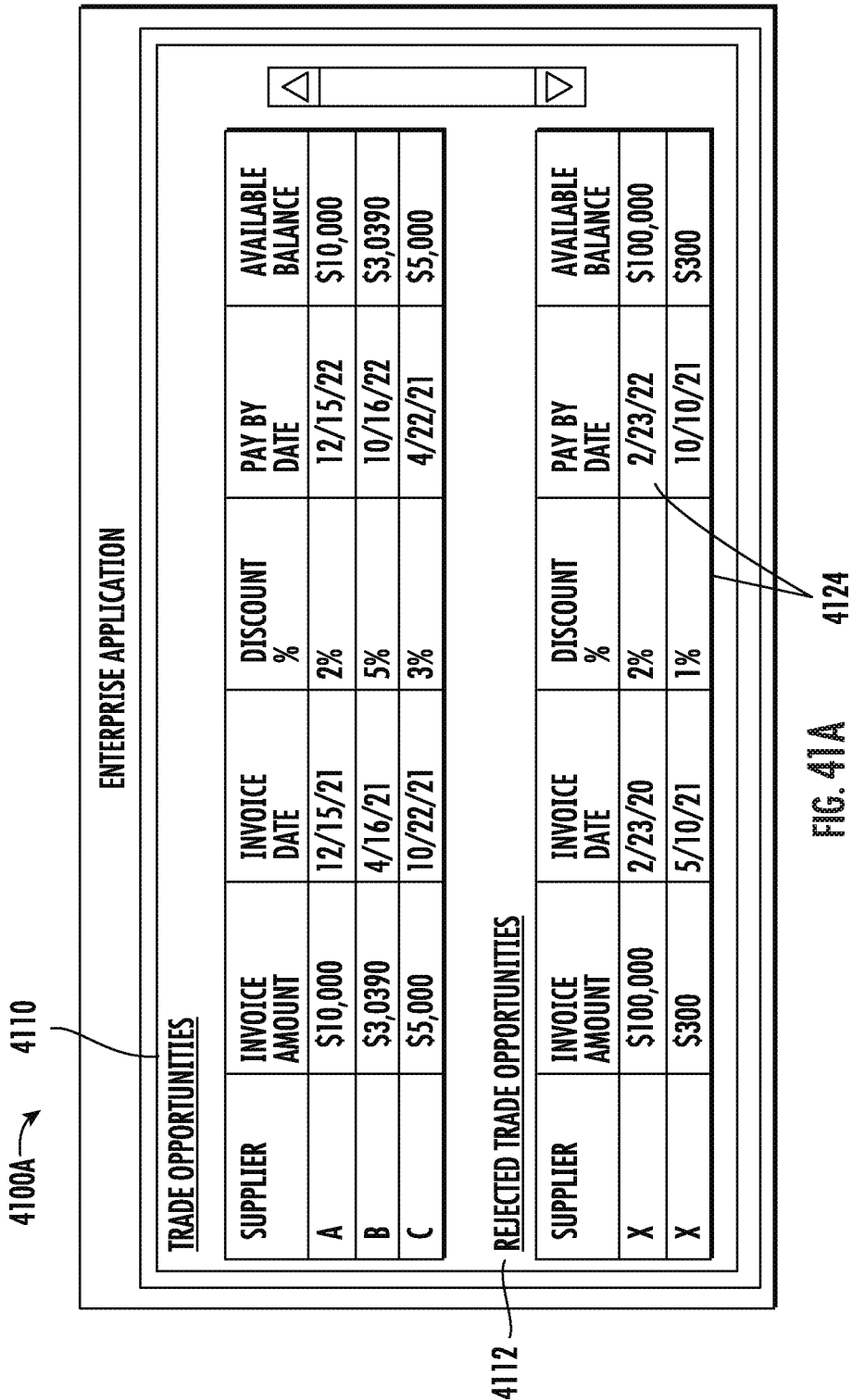
FIG. 41A is a user interface displayed on a device executing an enterprise application, according to an exemplary embodiment.

As an example, and with reference to FIG. 41A, the enterprise application 3525 may display user interface 4100*a* to one or more administrators. Specifically, FIG. 41A depicts a user interface 4100*a* displayed on a device executing the enterprise application 3525, according to one or more exemplary embodiments. As shown, the enterprise application 3525 is configured to transmit a notification indicating trade opportunities that have been identified and evaluated from invoices as shown in 4 3510. The displayed trade opportunity information (e.g., the invoice amount, the invoice data, the discount percent, the pay by date, and the available balance) may be configured by administrators. As shown, the trade opportunities that have been identified and evaluated from invoices 4 3510 are in a table. However, the enterprise application 3525 may also be configured to display one or more other representations of the evaluated trade opportunities (e.g., statistical representations, graphical representations). In other embodiments, the enterprise application 3525 may be configured to display the number of evaluated invoices, the number of available trade opportunities, a total cost to the enterprise if all (or a selected subset) of trade opportunities are paid, a total benefit to the enterprise if all (or a selected subset) of trade opportunities are claimed, and the like.

In the example user interface 4100*a*, the enterprise application 3525 is also configured to transmit trade terms from invoices that are not trade opportunities as shown in 4112. That is, the enterprise engine 3530 may have determined that the trade terms did not satisfy an evaluation of process 4000 (e.g., decision 4008, 4010, 4012, and/or 4014). As shown, the enterprise application 3525 indicates at 4124 one or more terms associated with the invoice (e.g., trade terms) that did not satisfy the evaluation process 4000. For example, the discount % may be too small to warrant paying the invoice early, or one or more trade terms may be impossible to satisfy (e.g., a deadline indicated by a trade term has been missed).

Figure 41B:
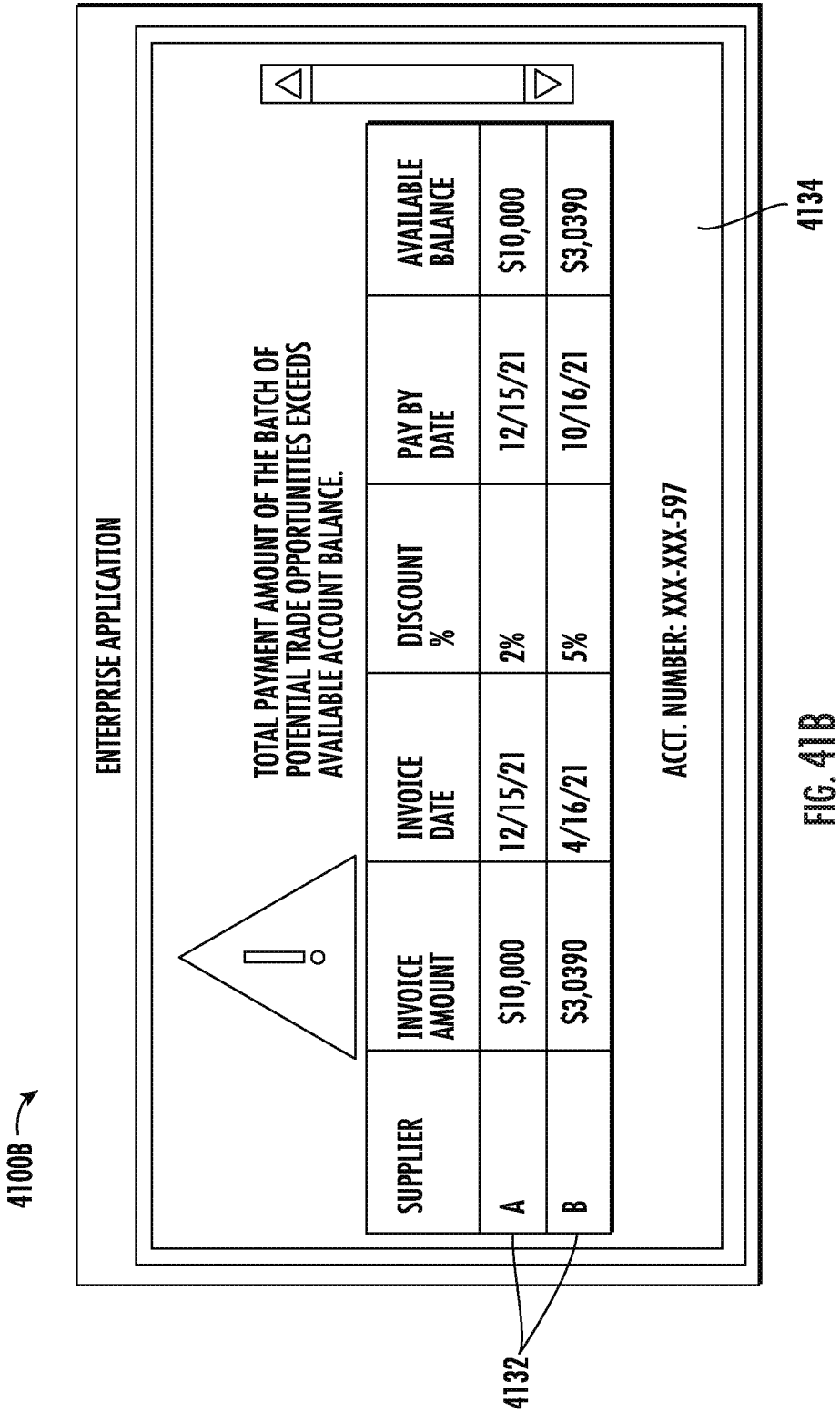
FIG. 41B is another user interface displayed on a device executing an enterprise application, according to an exemplary embodiment.

In an alternate example, and with reference to FIG. 41B, the enterprise application 3525 may display user interface 4000*b* to one or more administrators. Specifically, FIG. 4041B depicts another user interface 4100*b* displayed on a device executing the enterprise application. As shown, an alert 4130 is displayed to the administrator because the total payment of the batch of potential trade opportunities exceeds the enterprise account balance. As described with reference to step 4012 of FIG. 40, the enterprise engine 3530 may compare a total payment amount of a selected batch of potential trade opportunities to an intraday balance and one or more thresholds. In example user interface 4100b, the total payment amount of the selected batch of potential trade opportunities was less than the intraday balance. Additionally or alternatively, the total payment amount of the selected batch of potential trade opportunities may be less than the predetermined threshold.

In some embodiments, the enterprise application 3525 may also display (or display instead of alert 4130) the list of the selected batch of potential trade opportunities 4132. In some embodiments, the administrator may select (or deselect) trade opportunities of the selected batch of trade opportunities. In response to receiving new selections (or de-selections), the enterprise application 3525 may re-execute the enterprise engine 3530 to evaluate the combination of the selected trade opportunities and determine whether the selected trade opportunities satisfy one or more criteria (e.g., the total payment amount of a selected batch of potential trade opportunities is less than the current intraday balance or other predicted future enterprise account balance and/or a predetermined difference).

In some embodiments, the user interface 4100b may also display other information. For example, the user interface 4100b may include other alert text, one or more masked account numbers 734, a current account balance, the total amount of payments of the batch trade opportunities, and/or the total number of selected trade opportunities in the batch.

In some embodiments, the administrators may configure when the enterprise engine 3530 transmits notifications. For example, the administrator(s) may configure the enterprise engine 3530 to transmit a notification after one or more decisions (e.g., decision 4008, 4010, 4012, and/or 4014). For example, the enterprise engine 3530 may be configured to transmit an alert (or other warning, notification) to one or more administrator(s) if the enterprise engine 3530 determines insufficient funds associated with satisfying a trade opportunity (or a batch of trade opportunities) as determined in decision 4012.

In some embodiments, an administrator may configure the enterprise engine 3530 to transmit a notification in the event no invoices are identified as trade opportunities. For example, after a predetermined number of invoice evaluations, or after a predetermined amount of time (e.g., days, weeks, months) without any invoices satisfying the evaluation 4006 procedure (or one or more decisions including decisions 4008, 4010, 4012, and/or 4014), the enterprise engine 3530 may be configured to transmit a notification. For example, the transmitted notification may indicate that no valid trade opportunities have been identified in a predetermined number of days, that no valid trade opportunities have been identified in a predetermined number of received invoices, and the like.

In yet other embodiments, an administrator may configure the enterprise engine 3530 to automatically transfer funds to the third party given process 4000 has been satisfied. In these embodiments, in step 4016, the enterprise engine 3530 may transmit a notification to one or more administrators that payment has been processed. In other embodiments, an administrator may configure the enterprise engine 3530 to request approval before transferring funds to a third party. For example, in response to the completed process 4000, the administrator may configure the enterprise engine 3530 to prompt an administrator to determine whether the administrator wants to complete a trade opportunity (e.g., pay an invoice) or a batch of trade opportunities.

In the embodiments where the enterprise engine 3530 is configured to automatically pay an invoice (or pay an invoice in response to receiving approval from one or more administrators), the enterprise engine 3530 may perform one or more foreign currency exchanges. The enterprise engine 3530 may be configured to retrieve a foreign exchange rate, purchase a contract to lock in the retrieved foreign exchange rate, and initiate payment to the third party.

Moreover, in the embodiments where the enterprise engine 3530 is configured to automatically pay an invoice (or pay an invoice in response to receiving approval from one or more administrators), the enterprise engine 3530 may store the payment in memory 3526A and/or report the payment to one or more downstream applications (e.g., fraud tracking services) to ensure that the payment that is cleared matches the initiated check.

Additionally or alternatively, the enterprise engine 3530 may also prompt an administrator to evaluate whether the administrator wants to cancel a trade opportunity or a batch of trade opportunities (or de-select one or more selected trade opportunities). For example, the enterprise engine 3530 may transmit a notification to the administrator(s) with an interactive button that cancels payment of one or more trade opportunities, approves payment of one or more trade opportunities, and the like. In other embodiments, the administrator may configure the enterprise application 3525 to return to (or navigate to) one or more screens of the enterprise application (e.g., a list of identified invoice documents, a list of evaluated invoice documents, a payment selection screen) in response to completing evaluation 4006.

Figure 42:
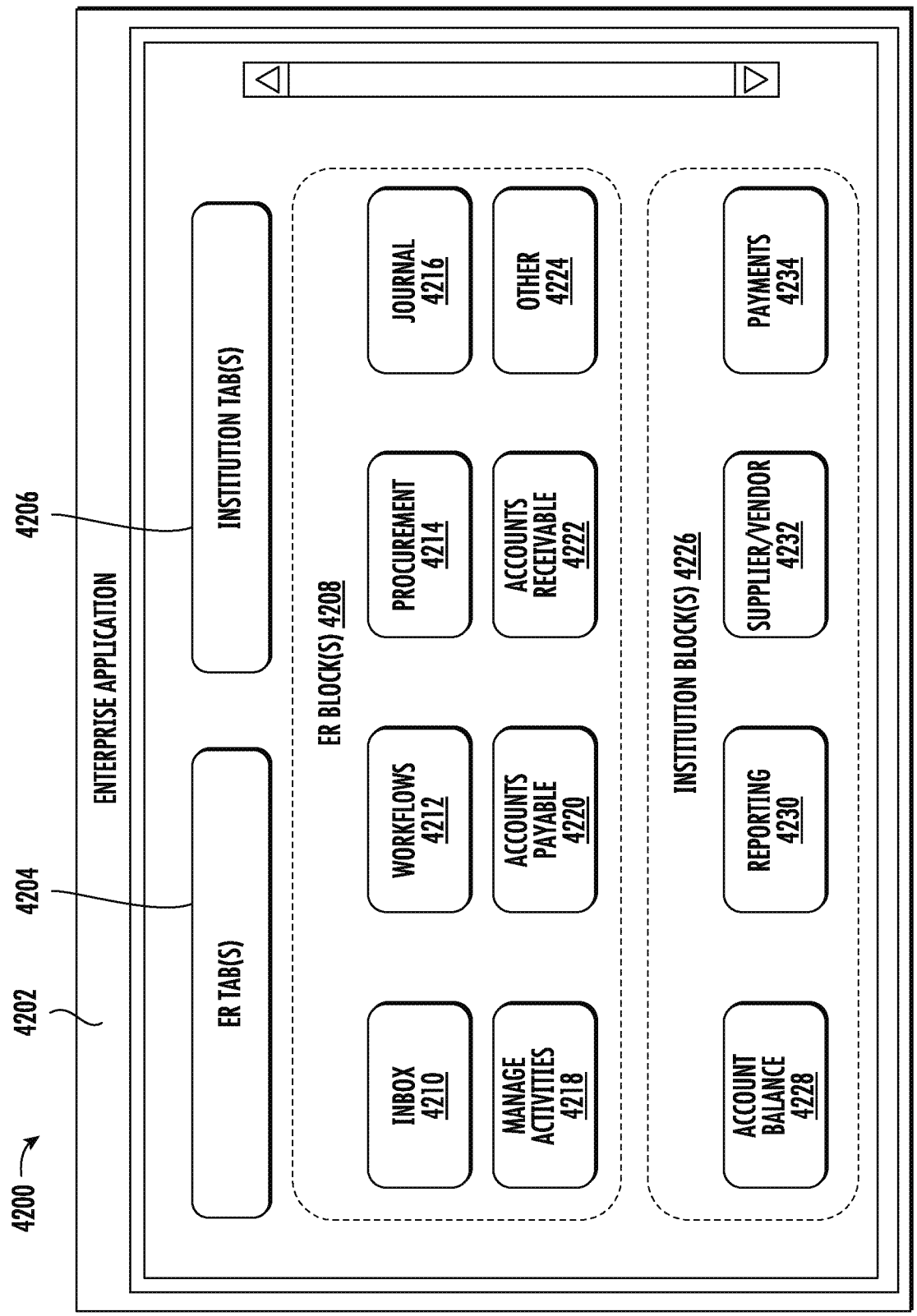
FIG. 42 is a user interface displayed on a device executing an enterprise application, according to an exemplary embodiment.

Referring now to FIG. 42, depicted is a user interface 4200 of an enterprise application 4202 (such as an ERP application 130, CRM application 129, or some other enterprise resource 128 described above with reference to FIG. 1). A user may access the enterprise application 4202 on their respective client device or computing device. As shown in FIG. 42, the user interface 4200 may include enterprise resource (ER) tabs 4204, institution tabs 4206, ER blocks 4208, and institution blocks 4226. The ER blocks 4208 may include, for example, user interface elements for accessing enterprise resource-specific features or pages of the enterprise application 4202. For example, the ER blocks 4208 may include, for example, an inbox 4210, workflows 4212, procurement 4214, a journal 4216, manage activities 4218, accounts payable 4220, accounts receivable 4222, or other 4224 various enterprise resources or features. Each of the blocks within the ER blocks 4208 may be managed by the enterprise application 4202 (e.g., a developer of the enterprise application 4202, an administrator of the enterprise application 4202, etc.).

The institution blocks 4226 may include, for example, user interface elements for accessing institution resources embedded within the enterprise application 4202. In some embodiments, different institution blocks 4226 may be displayed based on the user accessing the enterprise application 4202 (e.g., using access rights or user roles associated with the log-in credentials provided by the user for accessing the enterprise application 4202). The institution resources may be or include resources managed by the ICS 100 described above with reference to FIG. 1. The institution blocks 4226 may include, for example, account balance block 4228, reporting block 4230, supplier/vendor block 4232, payments block 4234, etc. The account balance block 4228 may be used for viewing account balances of accounts with the ICS 100 within the enterprise application 4202. For example, upon selecting the account balance block 4228, the enterprise application 4202 may execute one or more API calls to collect account information from the ICS 100 for rendering within a user interface of the enterprise application 4202 to the user. The reporting block 4230 may be used for generating various reports (e.g., composite summary reports, project summary reports, etc.). The reports may be configurable by the user to include data from the ICS 100, from the enterprise resource 128, or from various third-parties (e.g., credit or lending decisions, underwriting information, appraisal information, etc.). The supplier/vendor block 4232 may be used for generating summary reports on various partnership agreements, which may include summaries of outstanding invoices, accounts payable, accounts receivable, etc. The payments block 4234 may be used for making payments and/or viewing a summary of payments to vendors, as described in greater detail below. It is noted that each of (or alternative) the institution blocks 4226 may be used for launching corresponding user interfaces of the enterprise application 4202, which may correspondingly collect information from any source accessible via the enterprise application 4202 (e.g., through API calls to the ICS 100 or various integrated third-parties, by querying a database for the enterprise resource 128 corresponding to the enterprise application 4202, etc.).

The institution blocks 4226 included in the user interface 4200 of the enterprise application 4202 may be managed, controlled, or otherwise deployed by an institution or enterprise which is separate from (e.g., which does not manage) the enterprise application. In other words, the enterprise application 4202 may include a dedicated portion (e.g., the institution blocks 4226, institution tabs 4206) which is managed or otherwise controlled by the institution (e.g., which deploys or manages the ICS 100 described above with reference to FIG. 1). In some embodiments, since the institution manages some aspects of the enterprise application 4202, the institution may also deploy or incorporate other third-party resources (or data from the enterprise application 4202) into the portions of the enterprise application 4202 managed by the institution as described in greater detail below. Upon selecting a page, tab, block, or other user interface element of the user interface 4200 for the enterprise application 4202, a new user interface 4200 may be rendered to the user including data from the corresponding resource.

Figure 43:
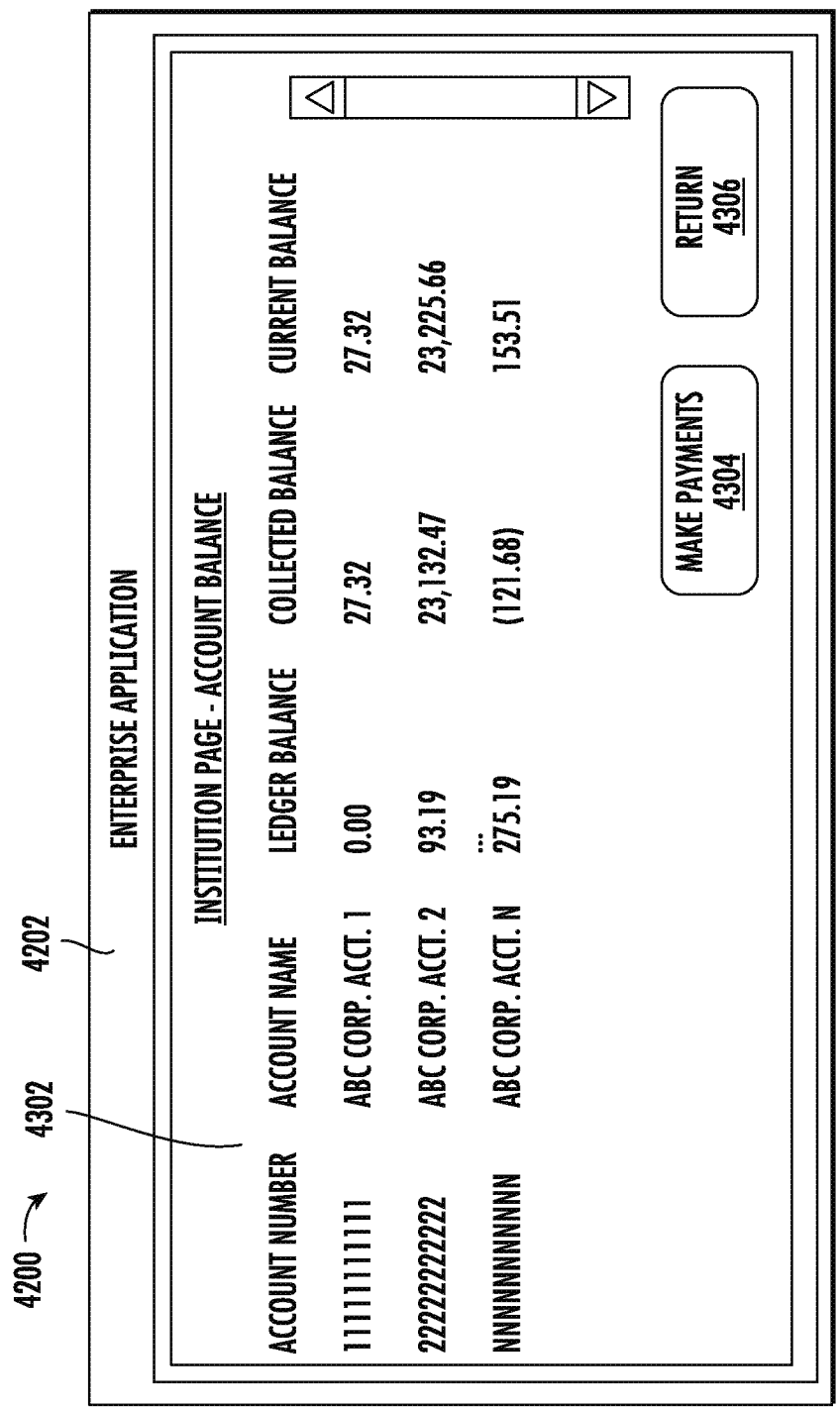
FIG. 43 is a user interface displayed on a device executing an enterprise application which includes institution resources, according to an exemplary embodiment.

Referring now to FIG. 43, depicted is a user interface 4300 of an enterprise application which includes institution resources, according to an illustrative embodiment. As shown in FIG. 43, where a user selects an account balance block 4228 shown in FIG. 42, the user interface 4300 may be rendered to the user. The user interface 4200 of the enterprise application 4202 is shown to include an institution page 4302 depicting account balance information (e.g., account number, account name, ledger balance, collected balance, current balance, etc.). As such, rather than navigating from the enterprise application 4202 to a dedicated page or resource for the institution, the institution page 4302 may be rendered within the enterprise application 4202. The enterprise application 4202 may perform one or more API calls to the ICS 100 (e.g., the API gateway circuit 136) to collect data for populating in the account balance page. Additionally, since the institution page is managed or controlled by the institution, the institution page may have elements and portions which are similar to dedicated institution pages that would be displayed if a user were to navigate to the institution webpage or application. In some embodiments, a user may select a user interface element (e.g., button) to make payments (e.g., make payments button 4304) or to navigate back to a previous page (e.g., return button 4304). In some embodiments, a user may select a particular account number to access a detailed view of the account (e.g., by navigating to a separate page in a browser which is separate from the enterprise application 4202 or by navigating to a new user interface within the enterprise application 4202 showing the detailed view of the account).

Figure 44:
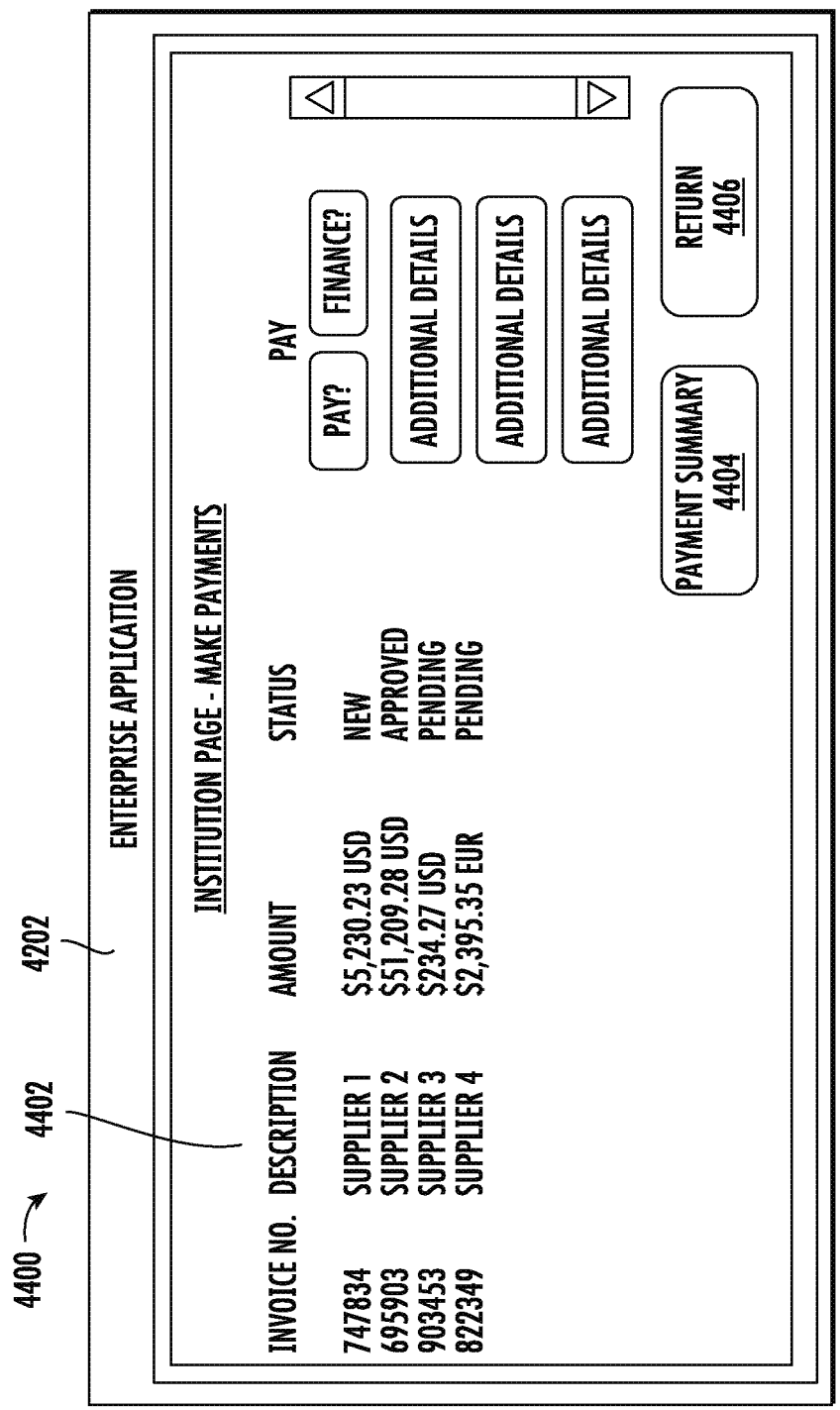
FIG. 44 is a user interface displayed on a device executing an enterprise application which includes a payment option, according to an exemplary embodiment.

Referring now to FIG. 44 and FIG. 45, depicted is a user interface 4400 of an enterprise application which includes a payment option and user interface 4500 of an enterprise application which includes a payment summary page, respectively, according to an illustrative embodiment. The user interfaces 4400, 4500 may be rendered responsive to a user selecting the make payments button 4304 on FIG. 43 (or payments button 4234 on FIG. 42). The user interface 4400, 4500 may be populated with data corresponding to invoice numbers, payment numbers, description, amount, account numbers, status, payment types, and pay options. It is noted that, in some instances, institutions may not have access to all of the data shown in FIG. 44. For instance, invoice numbers and supplier identifiers may be maintained by the enterprise application 4202 or enterprise resources 128, the status, payment amount, account number, and payment type may be managed by ICS 100, and financing (for instance, shown in FIG. 44) may be managed by the ICS 100 with conditional approval by a third-party (e.g., an appraisal entity, underwriting entity, insurance entity, etc.). However, because the enterprise application 4202 includes dedicated pages (referred to herein as institution pages 4302, 4402, 4502) which are managed by the ICS 100, a user of the enterprise application 4202 may seamlessly view data and information across or accessible via both the enterprise resource 128 and ICS 100 by accessing the enterprise application 4202.

Specifically referring to FIG. 45, a user accessing the payment summary page and viewing the user interface 4500 may be able to view payment related functionality including status. Additionally, the user may be able to select a set of invoices to be paid and go through steps within the enterprise application 4202 (e.g., separate from the institution portion) for paying the invoices. Since the ICS 100 manages the payments block 4234 (and correspondingly the user interface 4400 rendered responsive to selection of the payments block 4234), the ICS 100 may expose the third-party to data within the page or request data from the third-party (e.g., from computing devices or servers of the third-party) and configure the enterprise application 4202 to collect or transmit the corresponding data via corresponding API calls to the third-party. As such, the enterprise application 4202 may include dedicated portions which are managed by the ICS 100, which may correspondingly leverage data from third-parties.

As a brief example, a user may launch the enterprise application 4202, which may cause rendering the user interface 4200 shown in FIG. 42. The user may then select the account balance block 4228 on the user interface 4200, which in turn causes the enterprise application 4202 to launch user interface 4300 shown in FIG. 43. At any point on any user interface, the user may toggle between pages using the return buttons 4306, 4406, 4506. The enterprise application 4202 may initiate or execute one or more API calls to collect information from the ICS 100 to populate in the user interface 4300. The API calls may include API calls to collect data on account numbers, account names, balances, etc. Such data may not be otherwise accessible via the enterprise application 4202 but for the ICS 100 managing the account balance block 4228 and the corresponding user interface 4300 shown in FIG. 43. A user may then select the make payments button 4304 on the user interface 4300, which in turn causes the enterprise application 4202 to launch the user interface 4400. The enterprise application 4202 may collect, retrieve, or otherwise access data from the enterprise resource 128 to collect data on invoice numbers, description, amount, and/or payment status. Additionally, if the user were to select the additional details button for a respective payment, the enterprise application 4202 may collect or retrieve data from the enterprise resource 128 and/or ICS 100 relating to the respective payment (e.g., account used, payment date, payment type, and so forth). If the user were to select the pay button for the new invoice to Supplier 1, the enterprise application 4202 may execute or initiate one or more API calls to collect account information for rendering on the user interface 4402 so that the user may select an account from which to pay the invoice. If the user were to select the finance button for the new invoice, the enterprise application 4202 may render a corresponding user interface for the user to provide financing information, which may be provided to the ICS 100 or to other third-parties. A user may select the payment summary button 4404, which in turn causes the enterprise application 4202 to launch the user interface 4500 shown in FIG. 45. From this user interface 4500 (which is managed by the ICS 100 within the enterprise application 4202), the user may view information and data collected both from the ICS 100 and the enterprise resource 128. For instance, the enterprise application 4202 may execute or initiate one or more API calls to the ICS 100 to collect payment numbers, account numbers and payment types, and collect from the enterprise resource 128 send date, status, and amount (among other possible data, which may also include invoice numbers, supplier name, etc.). The enterprise application 4202 may render the data collected from the ICS 100 and enterprise resource 128 in a cohesive manner on the user interface 4500.

Figure 46:
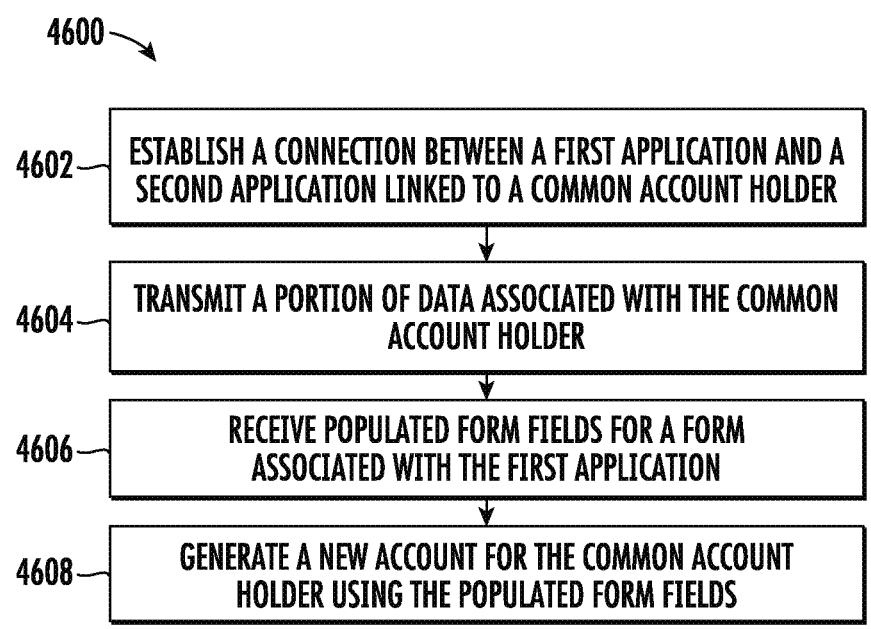
FIG. 46 is a flowchart of a process for facilitating communications between two computing systems, according to an exemplary embodiment.

Referring now to FIG. 46, a flow diagram of a process 4600 for facilitating communications between two computing systems is shown, according to an exemplary embodiment. More specifically, the process 4600 may be used to facilitate communication between two computing systems and/or applications, in order to generate an account for an account holder (e.g., common account holder, future account holder, etc.). In various embodiments, the process 4600 includes establishing a connection between a first application and a second application, transmitting from the first application to the second application a portion of data associated with a common account holder, receiving at the first application populated form fields for a form associated with the first application using the portion of data associated with the common account holder and data from the second application, and generating at the first application a new account for the common account holder using the populated form fields. The process 4600 may be performed using the computing system 50 of FIG. 1, such that reference is made to the components described above to aid in the description of the process 4600.

At step 4602, a connection is established between a first application executing on a first server and a second application executing on a second server, according to an exemplary embodiment. In an exemplary embodiment, the first application (e.g., the first server) and the second application (e.g., the second server) are linked to a common account holder (e.g., a user, entity, etc. having, applying, utilizing, etc. one or more accounts via the first application and the second application). The first application and/or the second application may be any of the applications discussed herein. For example, the first application and/or second application may be or include an institution application (e.g., of the ICS 100), the CRM application 129 (e.g., applications for establishing leads on new customers, assisting in converting a lead to a sale, planning delivery, and so forth), the ERP application 130 (e.g., HR or payroll applications, marketing applications, customer service applications, operations/project/supply chain management applications, commerce design applications, and the like), and/or any other suitable application. According to an exemplary embodiment, the first application is a financial institution application (e.g., of the ICS 100, etc.), and the second application is at least one of the ERP application 130 or the CRM application 129. As discussed above, the first application and/or the second application may be implemented on, or otherwise hosted on, any suitable computing system or device (e.g., the ICS 100, the user device 134, a discrete server, a group of two or more computing devices/servers, a distributed computing network, a cloud computing network, and/or another type of computing system capable of accessing and communicating using local and/or global network, etc.).

In some embodiments, establishing a connection between the first application and the second application includes receiving, by the first application, one or more API calls from the second application. For example, the first application (e.g., a financial institution application of the ICS 100, etc.) may receive an API call from the second application (e.g., the ERP application 130, the CRM application 129, etc. via the user device 134, a computing system, etc.) at the ICS controller 104 via the communications interface 120. The API call may be a variety of selections and/or requests, for example selections and/or requests for content associated with the first application (e.g., account aggregation information, account balance information, transaction detail information, account information, validation information, lending or loan information, foreign exchange information, payment initiation information, payment initiation requests, confirmation of funds information, etc.). In some embodiments, receiving the one or more API calls from the second application is presupposed by an authentication-session (e.g., user, user device, computing device, etc.) in order to gain access to the first application (e.g., the ICS 100, etc.), as discussed above.

In some embodiments, receiving the one or more API calls from the second application further includes receiving the one or more API calls via an API gateway circuit. For example, the API gateway circuit 138 may receive the one or more API calls via the ICS controller 104, the processing circuit 108, and/or any other component of the ICS 100, via the communications interface 120. In some embodiments, the API gateway circuit 138 is configured to identify, from a plurality of API circuits, an API circuit based on the type of the one or more API calls. For example, the API gateway circuit 138 may receive the one or more API calls, and identify (i.e., analyze, process, select, etc.) at least one of the plurality of circuits that is best configured to process the API call (e.g., circuits 210-276, etc.). In an exemplary embodiment, the API gateway circuit 138 is further configured to route the one or more API calls to the identified API circuit (e.g., circuits 210-276, etc.) associated with the type of the one or more API calls. The identified circuit may receive and/or process the API call, and provide output data (e.g., API response data) associated with API call and/or the associated account holder. For example, the output data (e.g., API response data) may include account aggregation information, account balance information, transaction detail information, account information, validation information, lending or loan information, foreign exchange information, payment initiation information, payment initiation requests, confirmation of funds information, etc. of an account holder (e.g., the common account holder, etc.). The output data may further be communicated, transmitted, and/or received by the API gateway circuit 138 and/or other components of the ICS 100 (e.g., the first application).

At step 4604, the first application transmits to the second application at least a portion of data associated with the common account holder, according to an exemplary embodiment. In an exemplary embodiment, the portion of data is accessible via the first application. For example, the portion of data may include the API response data (e.g., output data from the circuits 210-276, etc.), attained in response to the one or more API calls received from the second application. As discussed above, the portion of data may be associated with the common account holder, and/or may include account aggregation information, account balance information, transaction detail information, account information, validation information, lending or loan information, foreign exchange information, payment initiation information, payment initiation requests, confirmation of funds information, and/or any other suitable information associated with the first application.

At step 4606, the first application receives populated form fields for a form associated with the first application, according to an exemplary embodiment. For example, the first application (e.g., a financial institution application of the ICS 100) may receive the populated form fields from the second application (e.g., the ERP application 130, the CRM application 129, etc. via the user device 134, a computing system, etc.) at the ICS controller 104 via the communications interface 120. In an exemplary embodiment, the form is a form associated with the first application (e.g., a new account request, loan application, account balance verification, tax analysis, etc.), and/or the form fields are populated using the data from the first application (e.g., the API response data, output data from the circuits 210-276, etc.) and/or data from the second application. As discussed above, the data from the first application may include API response data (e.g., output data from the circuits 210-276, etc.), attained in response to the one or more API calls, for example account aggregation information, account balance information, etc. of the common account holder. The data from the second application may include data relating to the common account holder, and/or may include data associated with the second application. For example, the data from the second application may include planning delivery payroll information, marketing information, customer service information, operations/project/supply chain management information, commerce design information, and/or any other suitable information associated with the second application (enterprise name, management information, principle place of business, tax information, etc.).

At step 4608, the first application generates a new account for the common account holder using the populated form fields received from the second application, according to an exemplary embodiment. More specifically, the first application may (e.g., the ICS 100) may generate a new account (e.g., banking, savings, loan, international, etc.) for the common account holder based on the populated form fields, which includes data retrieved from the first application (e.g., account aggregation information, account balance information, etc.) and/or data received from the second application (e.g., enterprise name, management information, principle place of business, tax information, etc.), as discussed above. In some embodiments, the new account is a second account of the common account holder. In this regard, the populated form fields may include a request to transfer funds from a first account to a second account (e.g., the new account) of the common account holder, and the first application (e.g., of the ICS 100) may be configured to initiate a transfer of funds (e.g., from the first account) to the second account (e.g., a new account). In other embodiments, the populated form fields include other data associated with the actions or functions of the first application and/or the second application, and the first application is configured to initiate other actions and/or perform other functions (e.g. issue a loan instrument, verify an account balance, analyze tax information, analyze balances in trust accounts, brokerage accounts, mortgages, student loans, and/or any other suitable action or function associated with the first application).

As an illustrative example, a user 132 may request to open a new account with an institution. The user 132 may use the user device 134 to access an application (e.g., the second application, the ERP application 130, etc.), and send an API call to "request new account" (e.g., via the second application, the ERP application 130, etc.) to the first application (e.g., a financial institution application of the ICS 100, etc.). The API call may be communicated or transmitted to the first application (e.g., the ICS controller 104, etc.), via the network 124 and the communications interface 120. The first application may receive the API call (e.g., at the API gateway circuit 138), and the API gateway circuit 138 may identify from the plurality of circuits (e.g., circuits 210-276, etc.) at least one circuit that is best configured to process the API call. The API gateway circuit 138 may further route the API call to the one or more identified circuits (e.g., circuits 210-276), and the one or more circuits may receive, process, and/or provide data relating to the "request new account" API call. For example, the circuits may provide output data (e.g., API response data) that includes information associated with existing accounts of the user 132 (e.g., account aggregation information, account balance information, transaction detail information, etc.). The output data (e.g., API response data) may be communicated from the first application to the second application (e.g., via the communications interface 120, the network 124, etc.). The second application may receive the portion of data associated with the user 132 from the first application (e.g., the output data, API response data, etc.), and populate form fields for a form associated with the first application (e.g., an account application form for the financial institution, etc.). The form fields may include the data received from the first application (e.g., API response data, etc.), as well as data for the user 132 associated with the second application (e.g., customer service information, operations/project/supply chain management information, enterprise name, management information, principle place of business, tax information, etc.). In an exemplary embodiment, the second application transmits, and the first application receives, the populated form fields data (e.g., via the communications interface 120, the network 124, etc.). Using the populated form fields, the first application may generate a new account for the user 132 at the institution. For example, the new account may be a second account of the user 132 at the institution. The populated form fields may include a request to transfer funds from a first account (e.g., existing account) to a second account (e.g., the new account) of the user 132, and the first application (e.g., of the ICS 100) may initiate a transfer of funds (e.g., from the first account) to the second account (e.g., a new account).

Figure 47:
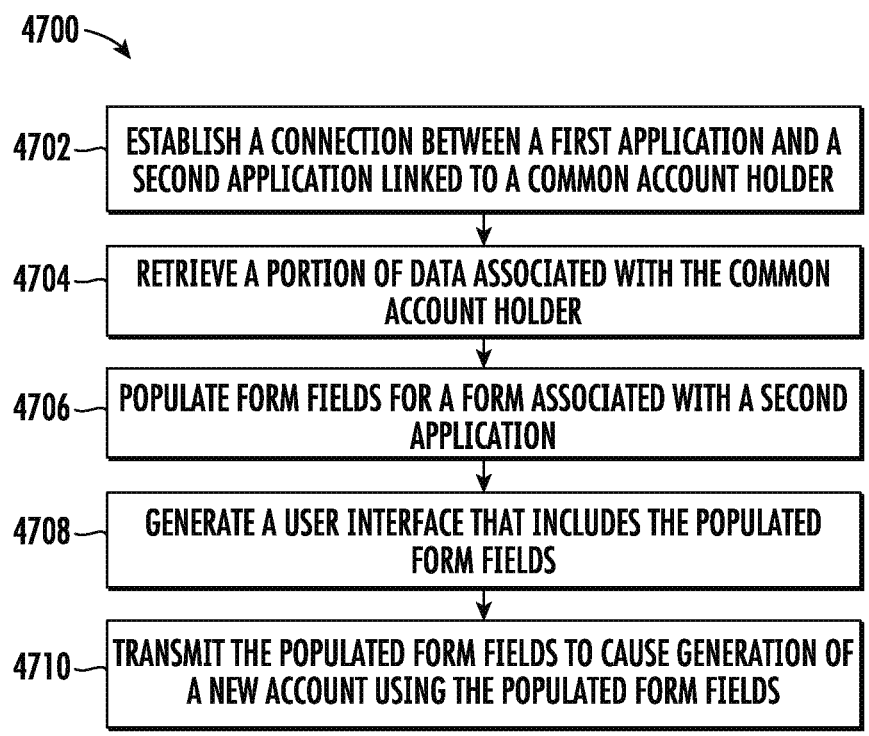
FIG. 47 is a flowchart of another process for facilitating communications between two computing systems, according to an exemplary embodiment.

Referring now to FIG. 47, a flow diagram of a process 4700 for facilitating communications between two computing systems is shown, according to an exemplary embodiment. More specifically, the process 4700 may be used to facilitate communication between two computing systems and/or applications, in order to generate an account for an account holder (e.g., a common account holder, a future account holder, etc.). In an exemplary embodiment, the process 4700 includes establishing a connection between a first application and a second application, retrieving by the first application a portion of data associated with a common account holder, populating form fields for a form associated with the second application using the data retrieved from the first application and data received by the second application, generating at the first application an interface that includes the populated form fields, and transmitting the populated form fields from the first application to a second server causing the second server to generate a new account using the populated form fields. The process 4700 may be performed using the computing system 50 of FIG. 1, such that reference is made to the components described above to aid in the description of the process 4700.

At step 4702, a connection is established between a first application executing on a first server and a second application executing on a second server, according to an exemplary embodiment. In an exemplary embodiment, the first application (e.g., the first server) and the second application (e.g., the second server) are linked to a common account holder (e.g., a user, entity, etc. having, applying, utilizing, etc. accounts via the first application and the second application). As discussed above, the first application and/or the second application may be any of the applications discussed herein (e.g., an institution application of the ICS 100, the CRM application 129, the ERP application 130, and/or any other suitable application). According to an exemplary embodiment, the first application is at least one of the ERP application 130 or the CRM application 129, and the second application is a financial institution application (e.g., of the ICS 100). The first application and/or the second application may be implemented on or otherwise hosted on any suitable computing system or device, as discussed above (e.g., the ICS 100, the user device 134, etc.).

In some embodiments, establishing a connection between the first application and the second application includes receiving, by the first application, one or more API calls from the second application. For example, the first application (e.g., the ERP application 130, the CRM application 129, etc.) may receive an API call from the second application (e.g., a financial institution application of the ICS 100, etc.) at a controller or a computing system via a communications interface and/or a network (e.g., the network 124). The API call may be a variety of selections and/or requests, for example selections and/or requests for content associated with the first application (e.g., planning delivery payroll information, marketing information, customer service information, operations/project/supply chain management information, commerce design information, enterprise name, management information, principle place of business, tax information, etc.). In some embodiments, receiving the one or more API calls from the second application is presupposed by an authentication-session (e.g., user, user device, computing device, etc.) in order to gain access to the first application (e.g., the ERP application 130, the CRM application 129, etc.), as discussed above.

In some embodiments, receiving the one or more API calls from the second application further includes receiving additional data associated with the second application. The second application may transmit certain data of an account holder (e.g., the common account holder, a future account holder, etc.) associated with the second application. For example, the second application may transmit additional data that includes account aggregation information, account balance information, transaction detail information, account information, validation information, lending or loan information, foreign exchange information, payment initiation information, payment initiation requests, confirmation of funds information, and/or any other suitable data associated with the second application. This data may be included with, or separate from, the data of the one or more API calls.

At step 4704, the first application retrieves at least a portion of data associated with the common account holder, according to an exemplary embodiment. In an exemplary embodiment, the portion of data is accessible via the second application. More specifically, the first application (e.g., the ERP application 130, the CRM application 129, etc.) may receive the one or more API calls, and/or the additional data, via an API gateway circuit. The API gateway circuit may be configured to receive the one or more API calls, identify at least one of a plurality of circuits that is best configured to process the API call, and/or route the one or more API calls to the identified API circuit or circuits. The identified circuit (or circuits) may receive and/or process the API call, and provide output data (e.g., API response data) associated with the API call and/or the associated account holder. For example, the output data (e.g., API response data) may include account balance or transaction information for planning delivery payroll information, marketing information, customer service information, operations/project/supply chain management information, commerce design information, and/or any other suitable information associated with the first application (e.g., enterprise name, management information, principle place of business, tax information, etc.). In some embodiments, the output data (e.g., API response data) includes a portion of the additional data received from the second application, and/or data associated with the second application stored at the first application (e.g., account aggregation information, account balance information, transaction detail information, account information, validation information, lending or loan information, foreign exchange information, payment initiation information, payment initiation requests, confirmation of funds information, and/or any other suitable information associated with the second application, etc.).

At step 4706, the first application populates form fields for a form associated with the second application, according to an exemplary embodiment. In an exemplary embodiment, the form is a form associated with the second application (e.g., a loan application, new account request, account balance verification, tax analysis, etc.), and/or the form fields are formed using the data retrieved from the first application (e.g., the API response data, output data from the circuits, etc.) and/or the additional data received from the second application. As discussed above, the data retrieved from the first application may include API response data, attained in response to the one or more API calls, for example information for planning delivery payroll information, marketing information, customer service information, operations/project/supply chain management information, and/or any other suitable information associated with the first application (e.g., enterprise name, management information, principle place of business, tax information, etc.). The data received from the second application may include data relating to the common account holder, and/or may include data associated with the second application (e.g., account aggregation information, account balance information, transaction detail information, etc.).

At step 4708, the first application generates a user interfaces that includes the populated form fields, according to an exemplary embodiment. In an exemplary embodiment, the first application (e.g., the ERP application 130, the CRM application 129, etc.) generates an interface, for example a graphical user interface, a mobile user interface, and/or any other suitable interface that may display content and data, that includes the populated form fields. According to an exemplary embodiment, the first application displays, via the user interface 302, one or more user interface elements 308 that include components of the populated form fields. A user (e.g., the common account holder, a future account holder, etc.) may interact with the one or more user interface elements 308 (e.g., via the user interface 302), for example to analyze, request, transmit, etc. the populated form fields data. As discussed above, the populated form fields may include information associated with the second application, for example, a plurality of accounts of a user or account holder (e.g., an existing account, a new account, etc.). In this regard, the first application, via the user interface 302, may display information associated with a plurality of accounts (e.g., via the populated form fields). A user may interact with the user interface element 308 to initiate an action or function associated with the second application and/or the plurality of accounts, for example, a user may initiate a transfer of funds from an existing account to a new account. The first application (e.g., via the user interface 302, the network 124, etc.) may transmit the instructions to the second application, which may cause the second application to complete the desired action or function (e.g., transfer funds from the existing account to the new account of the user). In other embodiments, the first application displays additional, fewer, and/or different information and/or the second application executes additional, fewer, and/or different functions, as discussed below.

At step 4710, the first application transmits to a second server the populated form fields, causing the second server to generate a new account, according to an exemplary embodiment. In an exemplary embodiment, the second server generates a new account based on the populated form fields, which includes data retrieved from the first application (e.g., enterprise name, management information, principle place of business, tax information, etc.) and/or data received from the second application (e.g., account aggregation information, account balance information, etc.). In some embodiments, the first applications transmits to the second application the populated form fields, causing the second application (e.g., the second server, etc.) to generate a new account. More specifically, the second server (e.g., the second application, the ICS 100, etc.) may generate a new account (e.g., banking, savings, loan, international, etc.) for the common account holder. In some embodiments, the new account is a second account of the common account holder, as discussed above. In this regard, the populated for fields may include a request to transfer funds from a first account to a second account (e.g., the new account) of the common account holder, and the second server (e.g., the second application, the ICS 100, etc.) may be configured to initiate a transfer of funds (e.g., from the first account) to the second account (e.g., the new account). In other embodiments, the populated form fields include other data associated with actions or functions of the second application and/or the first application, and the second application is configured to initiate other actions and/or perform other functions (e.g. issue a loan instrument, verify an account balance, analyze tax information, analyze balances in trust accounts, brokerage accounts, mortgages, student loans, and/or any other suitable action or function associated with the first application).

As an illustrative example, a user 132 may wish to apply for a loan with an institution. The user 132 may use the user device 134 to access an application (e.g., the first application, the ERP application 130, etc.), and communicate with the institution (e.g., the second application, the financial institution, the ICS 100, etc.) requesting a loan. The second application (e.g., the ICS 100) may send an API call to "request tax information," as part of the loan approval process, to the first application (e.g., the ERP application 130). The API call may, for example be communicated or transmitted to the first application (e.g., the ERP application 130) via the network 124. In some embodiments, the second application (e.g., the ICS controller 104) communicates additional data associated with the second application and/or the user 132 (e.g., validation information, lending or loan information, etc.) to the first application (e.g., the ERP application 130). The first application may receive the API call and/or the additional data (e.g., at an API gateway circuit), and the API gateway circuit may identify from a plurality of circuit at least one circuit that is best configured to process the API call. The API gateway circuit may further route the API call to the one or more identified circuits, and the one or more circuits may receive, process, and/or provide data relating to the "request tax information" API call. For example, the circuits may provide output data (e.g., API response data) that includes information associated with payroll tax information or historic tax payments of the user 132. The output data (e.g., API response data) may be communicated from the circuits to other components of the first application. Using the output data (e.g., the API response data) and/or the additional data received from the second application (e.g., the ICS 100), the first application may populate form fields for a form associated with the second application (e.g., a loan application form including tax information, etc.). The first application may also generate a user interface that includes the populated form fields. For example, the first application, via the user interface 302, may display one or more user interface elements 308 that include components of the populated form fields. The user 132 may interact with the one or more user interface elements 308, for example to send the loan request having the populated form fields. In an exemplary embodiment, the first application transmits the populated form fields to a second server (e.g., the second application). The second server may receive the populated form fields, and generate a new account or new instrument (e.g., a loan instrument, etc.) using the populated form fields.

Figure 48:
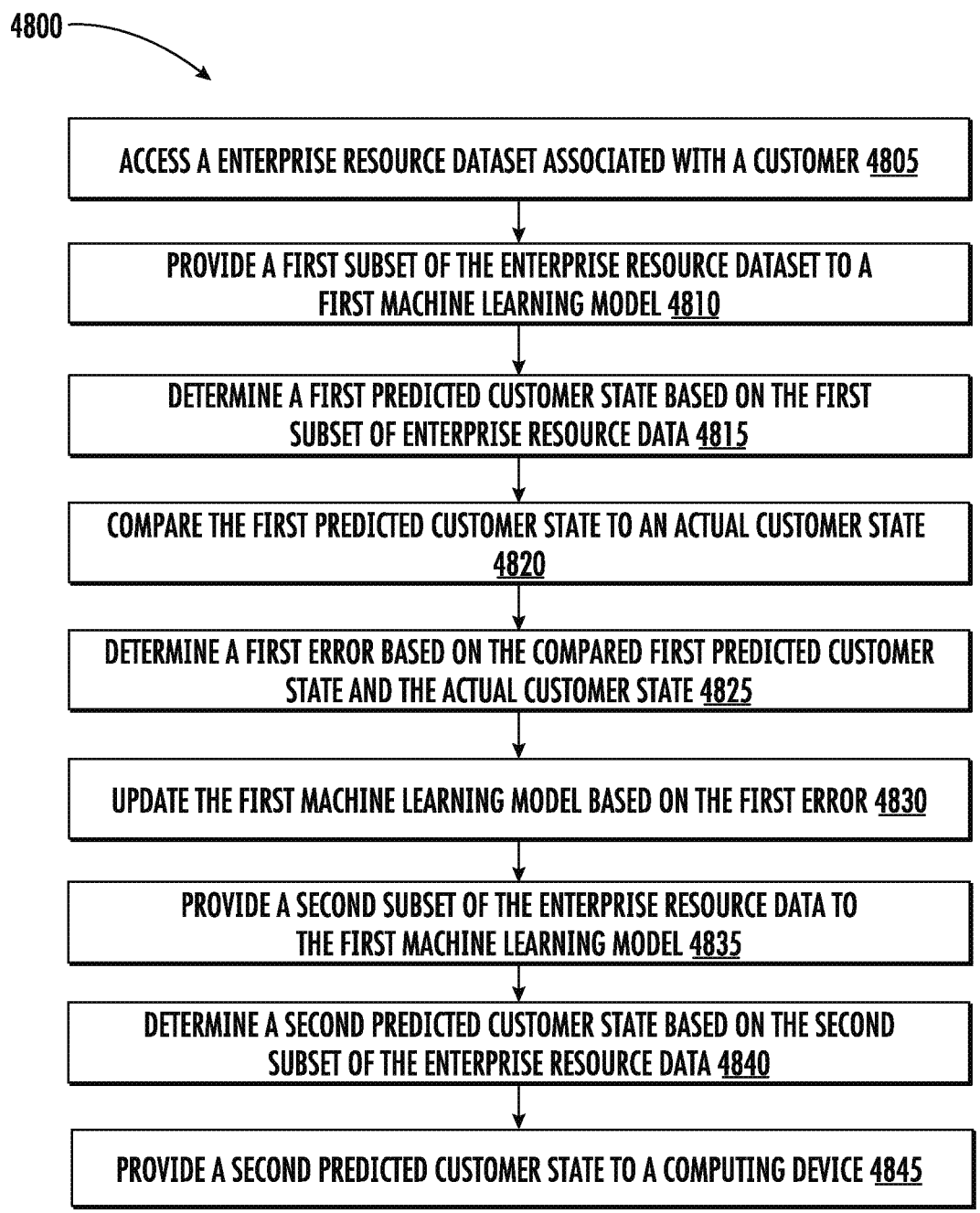
FIG. 48 is a flowchart of a method of determining a financial state of a customer, according to an exemplary embodiment.

Referring now to FIG. 48, a flow diagram of a method 4800 of determining a financial state of a customer is shown, according to an example embodiment. The financial state of the customer may be a state of the user's financial accounts. For example, the financial state of the user may be a current or future state of the user's accounts receivable data, accounts payable data, account balance data, liquid asset data, illiquid asset data, 401k data, IRA data, property holdings, and the like. The method 4800 may be performed by leveraging data generated by a Customer Relationship Management (CRM) application being utilized by a user (e.g., a customer), an Enterprise Resource Planning (ERP) application utilized by the user, and/or financial institution data generated by a financial institution supporting the user, to automatically determine a financial state of the user. Accordingly, training the machine learning model using historic enterprise resource data holistically, the machine learning model may predict dependencies between the enterprise resource data and other data/factors of the enterprise, resulting in improved future predictions (e.g., forecasting) over predictions that are determined individually and/or independently. The method may be performed by one or more components of the systems described herein. It should be appreciated that the method 4800 does not need to be performed in the order shown. Further, various processes may be omitted and additional processes may be included in the method 4800.

At process 4805, an enterprise resource dataset associated with a customer is accessed. For example, the ICS controller may receive enterprise resources data, including data from CRM applications, data from ERP applications, and/or data from a financial institution computing system. The enterprise resource data received (e.g., by the SFE 606) may include, for example, accounts receivable data, accounts payable data, account balance data (derived from one or more enterprises), liquid asset data, illiquid asset data, 401K data, investment retirement account (IRA) data, property holding data, investment opportunities, collateral backing opportunities, refinance opportunities, user feedback (e.g., whether a customer, customer relationship manager, or the like ranked (or scored) the recommendation as "positive" or "negative", whether the customer, customer relationship manager, or the like ranked (or scored) the recommendation as aggressive, conservative or moderate), and the like.

According to various embodiments, the process 4805 may include accessing enterprise resource 128 data using the API gateway circuit described above with reference to FIG. 1. The first machine learning model may also access one or more databases using API gateway circuit. As is discussed below, in some embodiments, the data received from databases may include trained machine learning models, thresholds, and the like. Alternatively or additionally, an enterprise may store trained machine learning models and/or threshold. Alternatively or additionally, the SFE 606 may store the trained machine learning models and/or thresholds. As such, the SFE 606 may include, maintain, or otherwise access the trained machine learning models described herein.

According to various embodiments, the enterprise resource dataset is stored in a data repository. For example, the data repository may be accessible by one or more machine learning models as is discussed further herein. The enterprise resource dataset may include various inputs (e.g., financial inputs, training inputs, etc.) and/or various outputs (e.g., financial outputs, predicted outputs, training outputs, etc.). For example, the various inputs may include at least one of accounts receivable data, accounts payable data, account balance data, liquid asset data, illiquid asset data, etc. and the various outputs may include future accounts receivable data, future accounts payable data, future account balance data, future liquid asset data, future illiquid asset data, etc. Further, the various inputs may include at least one of training accounts receivable data, training accounts payable data, training account balance data, training liquid asset data, training illiquid asset data, etc. and the various outputs may include training accounts receivable data, training accounts payable data, training account balance data, training liquid asset data, training illiquid asset data, etc.

At process 4810, a first subset of the enterprise resource dataset is provided to a machine learning model (e.g., a first machine learning model). For example, the first machine learning model may be trained to predict a customer state using a plurality of training financial inputs and a plurality of training financial outputs. According to various embodiments, each of the plurality of training financial inputs corresponds with financial data captured on or before a first date and each of the plurality of training financial outputs corresponding with financial data captured on or after a second date subsequent to the first date. In other words, the first machine learning model be trained to predict future financial outputs based on historic financial input data that is being generated by a Customer Relationship Management (CRM) application being utilized by a user (e.g., a customer), an Enterprise Resource Planning (ERP) application being utilized by the user, and/or financial institution data generated by a financial institution supporting the user.

At process 4815, a first predicted customer state is determined based on the first subset of enterprise resource data. For example, that first machine learning model (e.g., machine learning model 704, machine learning circuit 3525, etc.) may predict a financial state of a customer (e.g., the first predicted customer state) based on current user (e.g., the customer) enterprise resource data (e.g., the first subset of enterprise resource data). For example, the first machine learning model may use the training inputs (e.g., accounts receivable data, accounts payable data, account balance data, liquid asset data, illiquid asset data, 401k data, IRA data, and the like) to predict outputs (e.g., future accounts receivable data, future accounts payable data, future account balance data, future liquid asset data, future illiquid asset data, future 401k data, future IRA data, and the like), by applying the current state of the first machine learning model to the training inputs. In some embodiments, the machine learning circuit may include one or more machine learning models trained to predict a future enterprise account balance. In these embodiments, the machine learning models of the machine learning circuit may ingest financial data (e.g., accounts receivable, accounts payable, account balance, liquid assets, assets, etc.) and analyze the ingested data using trained machine learning model(s) to predict future financial data.

At process 4820, the first predicted customer state is compared to an actual customer state. For example, the customer state predicted by the first machine learning model may be compared to actual financial outputs. According to various embodiments, the predicted customer state corresponds with the date the actual final outputs represent. According to various embodiments, a comparator may compare the predicted outputs to actual outputs (e.g., actual future accounts receivable data, actual future accounts payable data, actual future account balance data, actual future liquid asset data, actual future illiquid asset data, actual future 401k data, actual future IRA data, and the like) to determine an amount of error or differences. For example, the future predicted accounts receivable data (e.g., predicted output) may be compared to the actual accounts receivable data (e.g., actual output).

At process 4825, a first error is determined based on the compared first predicted customer state and the actual customer state. For example, the comparator may compare the predicted outputs to actual outputs (e.g., a selected investment opportunity, a selected collateral backing, predicted refinance opportunity, and the like) to determine an amount of error or differences.

At process 4830, the first machine learning model is updated based on the first error. For example, the first machine model may be trained using the actual inputs and the actual outputs. During training, the error determined by the comparator may be used to adjust the weights in the machine learning model 704 such that the machine learning model 704 changes (or learns) over time. The machine learning model may be trained using a backpropagation algorithm, for instance. The backpropagation algorithm operates by propagating the error signal. The error signal may be calculated each iteration (e.g., each pair of training inputs and associated actual outputs), batch and/or epoch, and propagated through the algorithmic weights in the machine learning model such that the algorithmic weights adapt based on the amount of error. The error is minimized using a loss function. Non-limiting examples of loss functions may include the square error function, the root mean square error function, and/or the cross entropy error function.

The weighting coefficients of the machine learning model may be tuned to reduce the amount of error, thereby minimizing the differences between (or otherwise converging) the predicted output and the actual output. The machine learning model may be trained until the error determined at the comparator is within a certain threshold (or a threshold number of batches, epochs, or iterations have been reached). The trained machine learning model and associated weighting coefficients may subsequently be stored in memory or other data repository (e.g., a database) such that the machine learning model may be employed on unknown data (e.g., not training inputs). Once trained and validated, the machine learning model may be employed during a testing (or an inference phase). During testing, the machine learning model may ingest unknown data to predict future data (e.g., accounts receivable, accounts payable, 401k data, IRA data, account balance, and the like).

At process 4835, a second subset of the enterprise resource data is provided to the first machine learning model. The second subset of enterprise resource data may include inputs and/or outputs captured on or before a second date that is subsequent to the first date. According to various embodiments, the first machine learning model is configured to predict a future output (e.g., a predetermined period of time after the second date) based on historic inputs, as is discussed above with respect to process 4815. Thus, according to various embodiments actual outputs may not exist for each of the inputs included in the second subset of the enterprise resource date.

At process 4840, a second customer state is predicted based the second subset of the enterprise resource data. According to various embodiments, the second predicted customer state is determined based on the second subset of enterprise resource data in a similar manner as discussed above with respect to process 4815. For example, that first machine learning model (e.g., machine learning model 704, machine learning circuit 3525, etc.) may predict a financial state of a customer (e.g., the first predicted customer state) based on current user (e.g., the customer) enterprise resource data (e.g., the first subset of enterprise resource data). For example, the first machine learning model may use the training inputs (e.g., accounts receivable data, accounts payable data, account balance data, liquid asset data, illiquid asset data, 401k data, IRA data, and the like) to predict outputs (e.g., future accounts receivable data, future accounts payable data, future account balance data, future liquid asset data, future illiquid asset data, future 401k data, future IRA data, and the like), by applying the current state of the first machine learning model to the training inputs. In some embodiments, the machine learning circuit may include one or more machine learning models trained to predict a future enterprise account balance. In these embodiments, the machine learning models of the machine learning circuit may ingest financial data (e.g., accounts receivable, accounts payable, account balance, liquid assets, assets, etc.) and analyze the ingested data using trained machine learning model(s) to predict future financial data.

In some embodiments, the first machine learning model may categorize the predicted financial state of the user into negative and positive predicted financial states. For example, a negative financial state may be a in which the user does not have enough money to pay various accounts payable at the end of a month. A positive financial state may be a state in which the user has a surplus of money. In a different example, a positive financial state may be a state in which the user has enough money available in one or more accounts to make the necessary monthly payments.

The first machine learning model may determine whether the financial state of the user is a negative financial state based on statistically or algorithmically combining (or comparing) one or more predicted outputs from the machine learning model 704. For example, the first machine learning model may compare the predicted accounts receivable data with the predicted account balance and predicted accounts payable data. If the predicted accounts payable value is greater than an aggregated predicated account balance and predicted accounts receivable value, then the first machine learning model may determine that the user is in a negative financial state.

In contrast, if the aggregated predicted account balance and predicted accounts receivable value is greater than the predicted accounts payable value (by a predetermined percentage amount, for example), then the first machine learning model may determine that the user is not in a negative financial state. For instance, if the aggregated (e.g., sum) predicted account balance and predicted accounts receivable value is 10% greater than the predicted accounts payable value, then the first machine learning model may determine that the user is not in a negative financial state. In some embodiments, if the first machine learning model determines that the user is not in a negative financial state, then the first machine learning model may determine that the user is in a positive financial state.

In other embodiments, the first machine learning model may employ one or more thresholds (statically or dynamically determined) to evaluate whether the user is in a positive financial state. For example, if the aggregated predicted account balance and predicted accounts receivable value is 10% greater than the predicted accounts payable value, then the first machine learning model may determine that the user is not in a negative financial state, and if aggregated predicted account balance and predicted accounts receivable value is 30% greater than the predicted accounts payable value, then the first machine learning model may determine that the user is in a positive financial state.

At process 4845, the second predicted customer state is provided to a computing device. For example, the computing device may be associated with an agent of the financial institution, an underwriter, the customer, etc. For example, the second predicted customer state may be provided to a computing device associated with an underwriter associated with a loan which was applied for by the customer (or an entity associated with the user). For example, the underwriter may be tasked with underwriting (or evaluating a likelihood of success) associated with the loan applied for by the customer. The underwriter may user the financial state and/or recommendations for approving/denying a loan application, or otherwise receiving more information relating to an applicant. While traditionally underwriters do not have ERP/CRM data available to them, the systems and methods described herein leverage such data to provide recommendations and predicted future financial states, which may be used for loan underwriting decisions.

Figure 49:
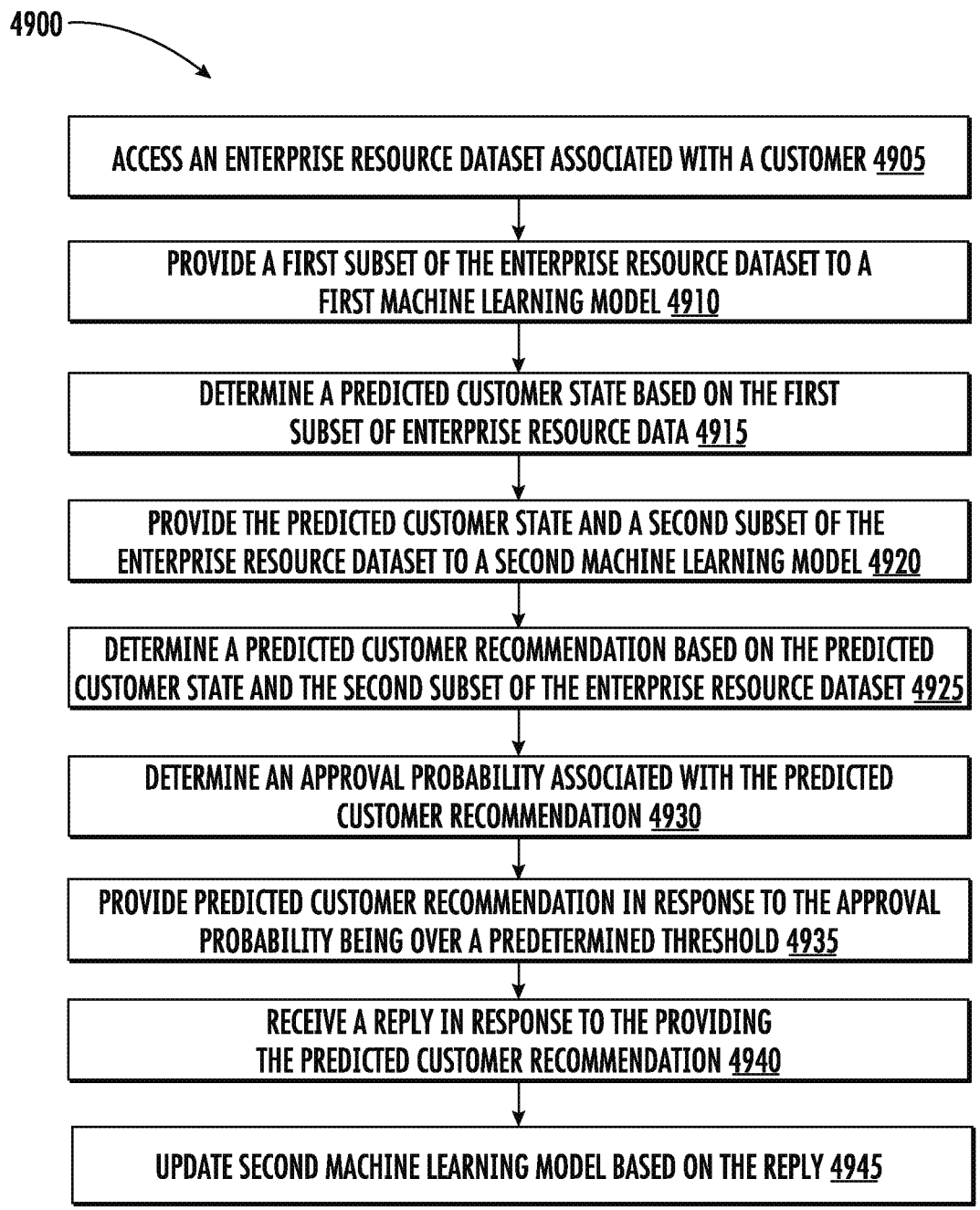
FIG. 49 is a flowchart of a method of determining a customer recommendation, according to an exemplary embodiment.

Referring now to FIG. 49, a flow diagram of a method 4900 of determining a customer recommendation is shown, according to an example embodiment. The recommendation may include one or more actions to be taken that may optimize a financial state of the customer (i.e., to apply for a loan using collateral determined from an ERP application, to invest in particular short term opportunities when assets and predicted accounts receivable are greater than accounts payable, and so forth). The recommendations may include any recommendations described herein, including investment opportunities, collateral backing opportunities, refinance opportunities, and the like. The financial state of the user may include any of the financial states described herein such as a current or future state of the user's accounts receivable data, accounts payable data, account balance data, liquid asset data, illiquid asset data, 401k data, IRA data, property holdings, and the like.

The method 4900 may be performed by leveraging data generated by a Customer Relationship Management (CRM) program being utilized by a user (e.g., a customer), an Enterprise Resource Planning (ERP) being utilized by the user, and/or financial institution data generated by a financial institution supporting the user, to automatically determine a customer recommendation for the user. Accordingly, training the machine learning model using historic enterprise resource data holistically, historic customer recommendations, historic underwriter replies, and/or historic customer replies, the machine learning model may predict dependencies between the enterprise resource data and other data/factors of the enterprise, resulting in improved future predictions (e.g., forecasting) and recommendations over predictions that are determined individually and/or independently. The method may be performed by one or more components of the systems described herein. It should be appreciated that the method 4900 does not need to be performed in the order shown. Further, various processes may be omitted and additional processes may be included in the method 4900.

At process 4905, an enterprise resource dataset associated with a customer is accessed. For example, the ICS controller may receive enterprise resources data, including data from CRM applications, data from ERP applications, and/or data from a financial institution computing system. The enterprise resource data received (e.g., by the SFE 606) may include, for example, accounts receivable data, accounts payable data, account balance data (derived from one or more enterprises), liquid asset data, illiquid asset data, 401K data, investment retirement account (IRA) data, property holding data, investment opportunities, collateral backing opportunities, refinance opportunities, user feedback (e.g., whether a customer, customer relationship manager, or the like ranked (or scored) the recommendation as "positive" or "negative", whether the customer, customer relationship manager, or the like ranked (or scored) the recommendation as aggressive, conservative or moderate), and the like.

According to various embodiments, the process 4905 may include accessing enterprise resource 128 data using the API gateway circuit described above with reference to FIG. 1. The first machine learning model may also access one or more databases using API gateway circuit. As is discussed below, in some embodiments, the data received from databases may include trained machine learning models, thresholds, and the like. Alternatively or additionally, an enterprise may store trained machine learning models and/or threshold. Alternatively or additionally, the SFE may store the trained machine learning models and/or thresholds. As such, the SFE may include, maintain, or otherwise access the trained machine learning models described herein.

According to various embodiments, the enterprise resource dataset is stored in a data repository. For example, the data repository may be accessible by one or more machine learning models as is discussed further herein. The enterprise resource dataset may include various inputs (e.g., financial inputs, training inputs, etc.) and/or various outputs (e.g., financial outputs, predicted outputs, training outputs, etc.). For example, the various inputs may include at least one of accounts receivable data, accounts payable data, account balance data, liquid asset data, illiquid asset data, customer recommendations, underwriter replies, customer replies etc. and the various outputs may include future accounts receivable data, future accounts payable data, future account balance data, future liquid asset data, future illiquid asset data, training customer recommendations, training underwriter replies, training customer replies etc. Further, the various inputs may include at least one of training accounts receivable data, training accounts payable data, training account balance data, training liquid asset data, training illiquid asset data, etc. and the various outputs may include training accounts receivable data, training accounts payable data, training account balance data, training liquid asset data, training illiquid asset data, etc.

At process 4910, a first subset of the enterprise resource dataset is provided to a first machine learning model (e.g., a first machine learning model discussed herein). For example, the first machine learning model may be trained to predict a customer state using a plurality of training financial inputs and a plurality of training financial outputs, as is described above with respect to the method 4800 shown in FIG. 48.

At process 4915, a first predicted customer state is determined based on the first subset of enterprise resource data. For example, that first machine learning model (e.g., machine learning model 704, machine learning circuit 3525, etc.) may predict a financial state of a customer (e.g., the first predicted customer state) based on current user (e.g., the customer) enterprise resource data (e.g., the first subset of enterprise resource data). For example, the first machine learning model may use the training inputs (e.g., accounts receivable data, accounts payable data, account balance data, liquid asset data, illiquid asset data, 401k data, IRA data, and the like) to predict outputs (e.g., future accounts receivable data, future accounts payable data, future account balance data, future liquid asset data, future illiquid asset data, future 401k data, future IRA data, and the like), by applying the current state of the first machine learning model to the training inputs in a similar manner as described above with respect to process 4815 shown in FIG. 48.

At process 4920, the predicted customer state and a second subset of the enterprise resource dataset is provided to a second machine learning model. For example, the predicted customer state and a second subset of the enterprise resource dataset may be provided to a second machine learning model (e.g., machine learning model 704, machine learning circuit 3525, etc.) trained to trained to predict a customer recommendations using a plurality of training financial inputs, a plurality of training customer states, a plurality of training customer recommendations, and a plurality of training recommendation replies corresponding with the plurality of training customer recommendations. According to various embodiments, each of the plurality of training financial inputs corresponds with financial data captured on or before a first date and each of the plurality of training financial outputs corresponding with financial data captured on or after a second date subsequent to the first date. In other words, the first machine learning model be trained to predict future financial outputs based on historic financial input data that is being generated by a Customer Relationship Management (CRM) program being utilized by a user (e.g., a customer), an Enterprise Resource Planning (ERP) being utilized by the user, and/or financial institution data generated by a financial institution supporting the user.

At process 4925, a predicted customer recommendation is determined based on the predicted customer state, the second subset of enterprise resource dataset. For example, the second machine learning model may be trained to make one or more recommendations to the user (e.g., the customer) based on the predicted data of the financial state of the user. For example, the second machine learning model may use the training inputs (e.g., future accounts receivable data, future accounts payable data, future account balance data, future liquid asset data, future illiquid asset data, future 401k data, future IRA data, and the like) to predict outputs (e.g., a probability of a predicted investment opportunity, a probability of a predicted collateral backing opportunity, a probability of a predicted refinance opportunity, and the like) by applying the current state determined (e.g., predicted, estimated, etc.) by the first machine learning model to the training inputs. The comparator may compare the predicted outputs to actual outputs (e.g., a selected investment opportunity, a selected collateral backing, predicted refinance opportunity, and the like) to determine an amount of error or differences.

The actual outputs may be determined based on historic data of recommendations made to the user by a customer relationship manager or other specialist. In an illustrative non-limiting example, a user six months ago may have been in a particular financial state. In response to being in the particular financial state, the user may have been advised of to seek an additional loan with various identified collateral backing. Thus, the input-output pair would be the particular financial state of the user 132 and the loan with identified collateral backing. In another illustrative non-limiting example, a user 132 four months ago may have been in a particular financial state. In response to being the in particular financial state, the user may have been advised to invest in one or more enterprises. The user may have received 30 day notes and rates, 60 day notes and rates, and 90 day notes and rates and selected an investment opportunity. Thus, the input-output pair would be the particular financial state of the user and the selected investment opportunity. Accordingly, the second machine learning model may learn to predict a recommendation (e.g., investment opportunity, collateral backing, refinance opportunity) for a given financial state. As described in greater detail below, the recommendation may be provided to the user, to a team member associated with the enterprise (i.e., to provide the recommendation to the user), and/or to other entities associated with the enterprise and/or user (such as loan underwriters in some instances).

According to various embodiments, multiple customer recommendations (e.g., opening an account, transferring holdings between accounts to optimize savings, investing money in stocks, investing money in bonds, investing money with various companies, taking out a loan, identifying property as collateral, identifying future accounts receivable as collateral, refinancing a loan, and the like), are determined. For example, a plurality of customer recommendations may be determined such that more than one recommendation may be provided to the user, to a team member associated with the enterprise (i.e., to provide the recommendation to the user), and/or to other entities associated with the enterprise and/or user (such as loan underwriters in some instances).

At process 4930, an approval probability associated with the predicted customer recommendation is determined. For example, an approval probability corresponding with a likelihood that the customer will approve the predicted customer recommendation may be determined by the second machine learning model. In other words, the approval probability may be associated with a likelihood a positive recommendation reply will be received. Additionally or alternatively, an approval probability may correspond with associated with a likelihood a positive underwriter reply will be received (e.g., an underwriter will approve the customer recommendation). According to various embodiments, the second machine learning model may be trained using training customer recommendations (e.g., historical customer recommendations) and training replies (e.g., historical replies to the training customer recommendations), such that the second machine learning model may generate approval probabilities specific to a certain customer and/or underwriter.

At process 4935, the predicted customer recommendation response is provided in response to the approval probability being over a predetermined threshold. For example, the recommendation may be provided to the user, to a team member associated with the enterprise (i.e., to provide the recommendation to the user), and/or to other entities associated with the enterprise and/or user (such as loan underwriters in some instances) in response to the approval probability being over a predetermined threshold. For example, the customer recommendation may be to apply for a loan. Prior to providing the customer recommendation to an underwriter for review, the approval probability may be determined for the underwriter. If the approval probability is above a predetermined threshold, then the customer recommendation may be provided to the underwriter for review.

According to various embodiment, process 4935 includes providing the predicted customer state with the customer recommendation. For example, the underwriter may be tasked with underwriting (or evaluating a likelihood of success) associated with the loan applied for by the user/entity. The ICS controller may be configured to transmit the user's financial state and/or recommendations to a device or portal associated with the underwriter. The underwriter may use the financial state and/or recommendations for approving/denying a loan application, or otherwise receiving more information relating to an applicant. While traditionally underwriters do not have ERP/CRM data available to them, the systems and methods described herein leverage such data to provide recommendations and predicted future financial states, which may be used for loan underwriting decisions.

At process 4940, a reply is received in response to providing the predicted customer recommendation. For example, an approval or denial of the customer recommendation may be received from the underwriter and/or the customer. According to various embodiments, the customer recommendation may be sent to the customer in response to receiving a positive reply from the underwriter. Additionally or alternatively, the customer recommendation may be sent to the underwriter in response to receiving a positive reply from the customer.

At process 4945, the second machine learning model is updated based on the reply. For example, according to various embodiments, the customer recommendation and the corresponding reply may be added as training data such that the second machine learning model is trained using the customer recommendation and the corresponding reply. The second machine learning model may then be trained using the updated training data.

Figure 50:
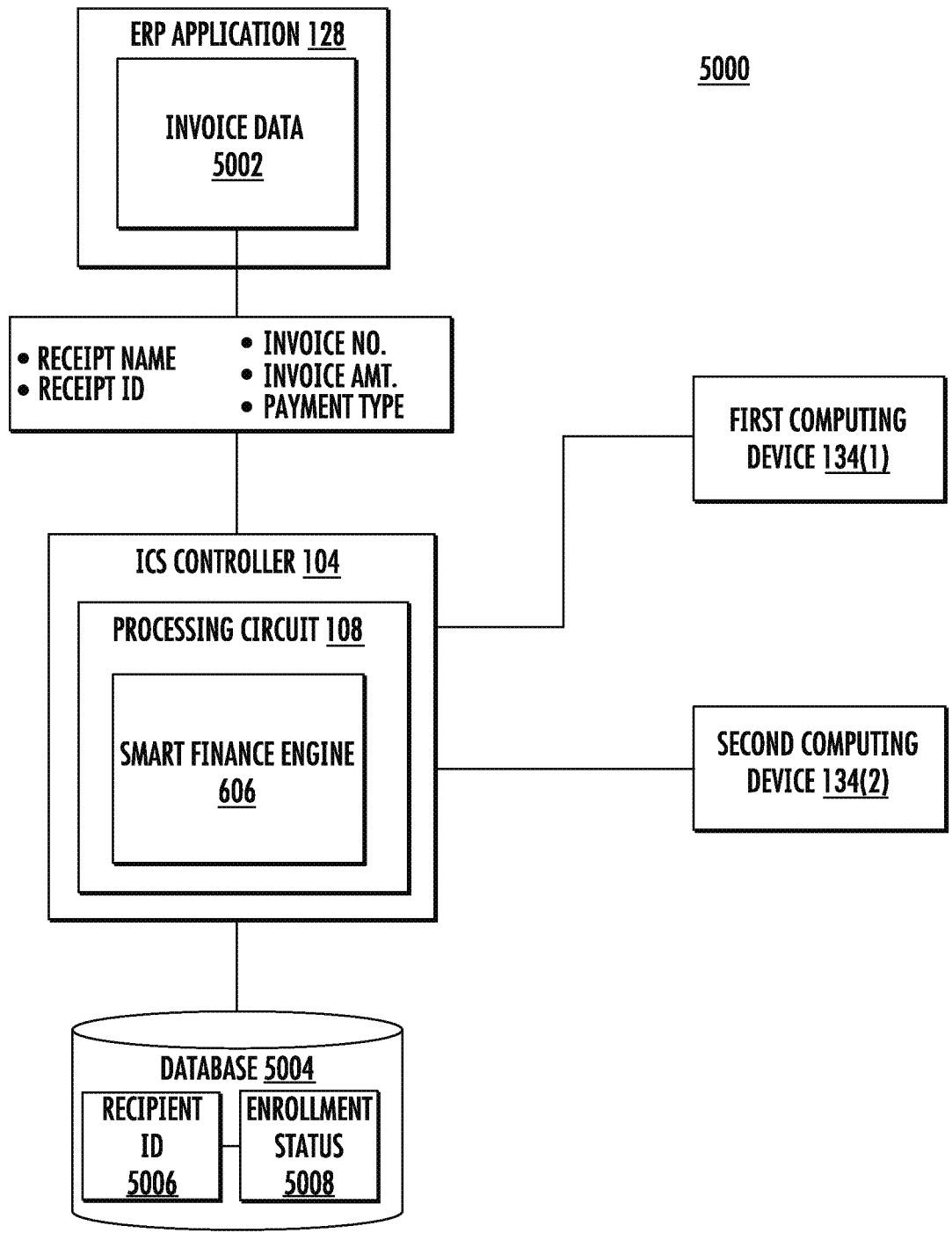
FIG. 50 is a system for providing recommendations relating to payment methods, according to an exemplary embodiment.

Referring now to FIG. 50, depicted is a system 5000 for providing recommendations relating to payment methods, according to an example implementation of the present disclosure. The system 5000 is shown to include the ICS controller 108 including a processing circuit 108 configured to execute the smart finance engine 606 and the ERP application 130. The ERP application 130 may include invoice data 5002. The invoice data 5002 may be similar to the invoice data described above with reference to FIG. 11-FIG. 13. The system 5000 is shown to include various computing device 134. The computing devices 134 may be associated with buyers (or payors) and suppliers (or payees). The computing devices 134 may be similar to the computing devices 134 described above. As described in greater detail below, the ICS controller 104 may be configured to establish a connection between the ERP application 130 and institution application corresponding to the ICS 100. The SFE 606 may be configured to receive the invoice data 5002 from the ERP application 130. The invoice data 5002 may include payment amounts, identifiers corresponding to the recipient (s), and payment types. The SFE 606 may be configured to identify that a recipient corresponding to a recipient identifier is enrolled to accept a second payment type, identify invoices which correspond to the recipient, and compute a difference in values corresponding to usage of the different payment types. The SFE 606 may be configured to present a recommendation to enroll in the second payment type on a user interface (e.g., of one of the computing devices 134).

The ERP application 130 may be configured to maintain invoice data 5002 corresponding to invoices to be paid by a buyer to various suppliers or recipients. In some embodiments, the ERP application 130 may be configured to receive the invoice data 5002 from an accounting system of the suppliers/recipients (e.g., at various intervals, responsive to a new invoice being transmitted from the accounting system to a computing system corresponding to the ERP application 130, etc.). For example, the accounting system of the supplier may be configured to transmit (e.g., automatically or responsive to a user input) invoices to various computing devices associated with buyers. The ERP application 130 may be configured to receive or ingest the invoices from the accounting system. In some implementations, a user may manually input the invoice data into the ERP application 130 responsive to receiving the invoice. In some implementations, the ERP application 130 may include a webhook or API or other linking of the ERP application 130 to an accounting system or computing device for the buyer. The ERP application 130 may be configured to automatically ingest, retrieve, or otherwise receive the invoice data responsive to a new invoice being sent to the computing device/ accounting system. The ERP application 130 may be configured to generate the invoice data by populating various form fields using data from the invoice (e.g., responsive to analyzing the invoice using, for instance, an OCR system or algorithm). The invoice data 5002 may include, for example, a recipient identifier, a recipient name, an invoice number, an invoice amount, and so forth. The ERP application 130 may be configured to store invoice data for a plurality of invoices for any number of recipients.

The ICS controller 104 may be configured to retrieve, download, access, or otherwise receive invoice data 5002 from the ERP application 130. In some embodiments, the ICS controller 104 may be configured to receive the invoice data at various intervals (e.g., daily, weekly, bi-monthly, monthly, quarterly, etc.). The ICS controller 104 may be configured to receive the invoice data 5002 by requesting the invoice data 5002 from the ERP application 130. In some embodiments, the ICS controller 104 may be configured to scrape invoice data 5002 at the scheduled intervals. The ICS controller 104 may be configured to retrieve the invoice data 5002 by transmitting various API calls to the ERP application 130 (as described above, and similar to the ERP application 130 transmitting API calls via the API gateway circuit 138 to the institution computing system as described above). As shown in FIG. 50, the ICS controller 104 may be configured to receive invoice data 5002 including, for each of a plurality of invoices, a recipient name, a recipient identifier, an invoice number, an invoice amount, and a payment type. The payment type may be or include a default or selected payment type or method to be used for paying the respective invoice. Various examples of payment types may include, for example, printed checks, automated clearing house (ACH) payments, wire transfers, credit card payments, or virtual card payments. Virtual card payments, as described herein, refer to a payment method in which a unique credit card number is generated for a particular payment with a credit limit set to the particular payment amount. As such, virtual card payments may offer a more secure payment method as compared to other payment methods. Virtual card payment methods may require enrollment by a particular buyer, and for the supplier or recipient to accept such payments. Virtual card payments may provide incentives to buyers using such a payment method including, for instance, cash back or incentive-based point systems, lower interest rates, and so forth.

The ICS controller 104 may include, maintain, or otherwise access one or more data structures or databases 5004 which include enrollment data. The enrollment data may include recipient identifiers 5006 associated with recipients or suppliers which are enrolled to accept virtual card payments. The enrollment data may include a ledger associated with known recipient identifiers 5006 and an enrollment status 5008 indicating whether or not the corresponding recipients have enrolled to accept virtual card payments for any payers or buyers. In some embodiments, the ICS controller 104 may be configured to update the database 5004 to include new recipient identifiers 5006 as new recipients are included in invoice data received from the ERP application 130. The ICS controller 104 may be configured to indicate or update the status as the payment type changes. For example, if a first invoice for a recipient indicates that the recipient is accepting a different form of payment other than virtual card payments (e.g., ACH, check, etc.), the ICS controller 104 may be configured to indicate initially that the recipient is not enrolled to accept virtual card payments (e.g., by including a status 5008 for the recipient identifier 5006 of the recipient as "NOT ENROLLED" or "OTHER PAYMENT TYPE" or the specific payment type). If a second or subsequent invoice indicates that the recipient is accepting virtual card payments, the ICS controller 104 may be configured to update the status 5008 to indicate that the recipient is enrolled to accept virtual card payments.

The SFE 606 may be configured to identify recipients from the invoice data 5002 which are enrolled to accept virtual card payments from other buyers. In some embodiments, the SFE 606 may be configured to perform a look-up function using the recipient identifiers in the database 5004 to identify recipients having an enrollment status indicating that the recipients have enrolled to accept virtual card payments. For example, the SFE 606 may be configured to identify a given recipient which as enrolled to accept virtual card payments from other buyers (but not yet the buyer to which the invoice was sent).

The SFE 606 may be configured to identify recipients that are enrolled to accept virtual card payments from other buyers. In some embodiments, the SFE 606 may be configured to identify recipients that are enrolled to accept virtual card payments using the recipient identifiers from the invoice data 5002 received from the ERP application 130 and the data stored in the database 5004. For example, the SFE 606 may be configured to perform a look-up function using the recipient identifiers from the invoice data 5002 to identify an enrollment status for the corresponding recipient identifiers. The SFE 606 may be configured to identify which recipients are enrolled to select virtual card payments responsive to the enrollment status in the database 5004 indicating that the recipient (e.g., corresponding to the recipient identifier) accepts virtual card payments from other buyers or payees. As described in greater detail below with reference to FIG. 51, the SFE 606 may be configured to identify, for a given buyer which is not using virtual card payments, whether recipients corresponding to various invoices accept virtual card payments from other buyers. Where the SFE 606 identifies a recipient which is enrolled to accept virtual card payments, the SFE 606 may be configured to identify previous invoices which were paid to the recipient by the given buyer using their current payment type (e.g., ACH, check, etc.). The SFE 606 may be configured to compute a difference between a first value associated usage of the current payment type and a second value associated with usage of virtual card payments, and present a recommendation to the buyer to enroll in virtual card payments with the recipient.

Figure 51:
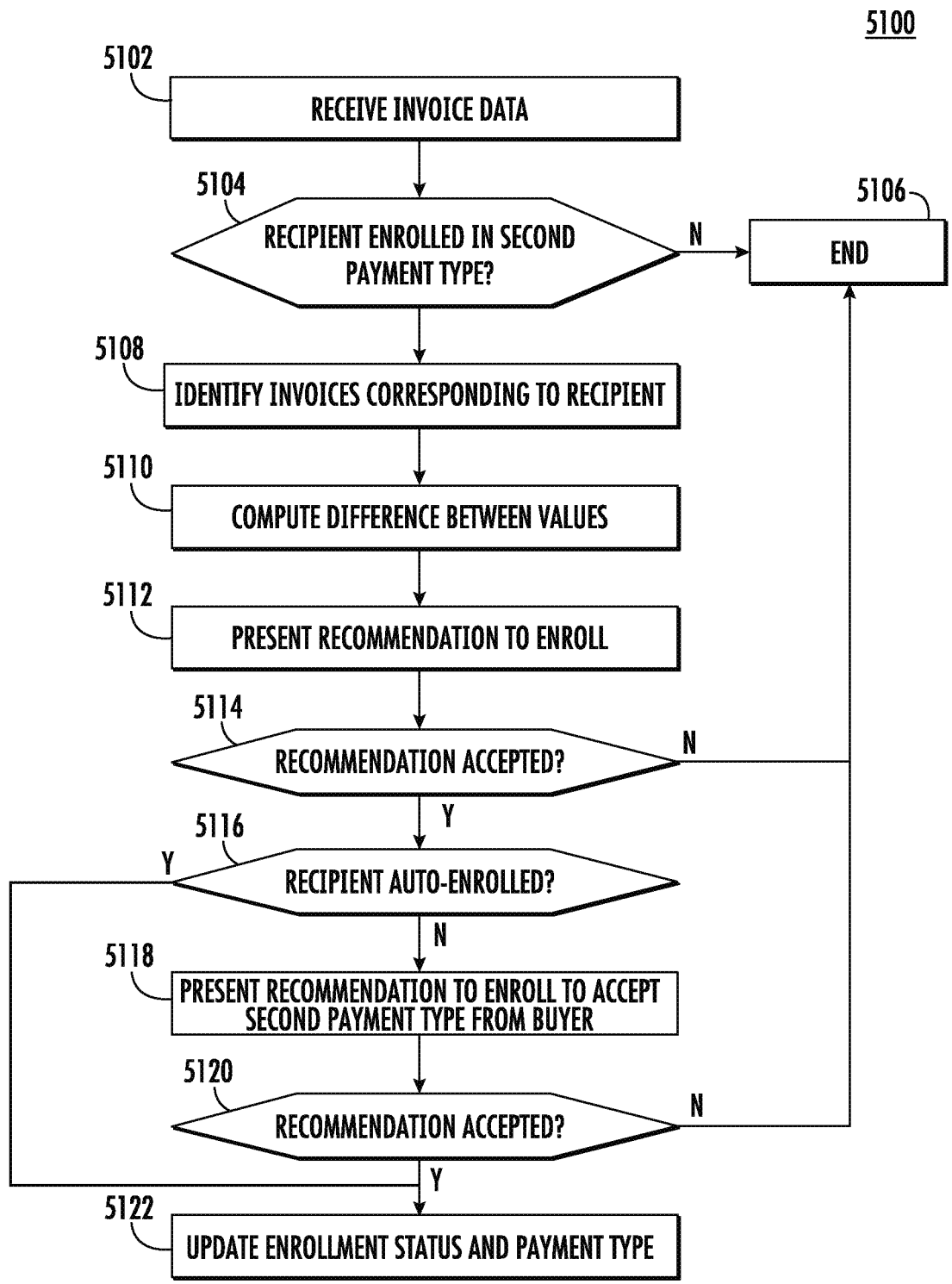
FIG. 51 is a flowchart showing a method of providing recommendations relating to payment types, according to an exemplary embodiment.

Referring now to FIG. 50 and FIG. 51, depicted is a flowchart showing a method 5100 of providing recommendations relating to payment types, according to an example implementation of the present disclosure. The method 5100 may be performed by the components or elements described above with reference to FIG. 50, including the ICS controller 104, SFE 606, and so forth. While described as accessing invoice data 5002 from an ERP application 130, it is noted that, in some embodiments, the SFE 606 may access data (including invoice data 5002) from other data sources including, for instance, other enterprise resources (such as a CRM application).

At step 5102, the SFE 606 may receive invoice data 5002 of a plurality of invoices for an account holder. The account holder may be a buyer to which the invoices from a plurality of recipients or suppliers. The SFE 606 may receive the invoice data 5002 from the ERP application 130 (e.g., executing on a server corresponding to the ERP application 130). The SFE 606 may receive the invoice data responsive to the buyer linking or otherwise establishing a connection between the ERP application 130 and SFE 606. For example, an administrator or user corresponding to the buyer may log into the ERP application 130 from a portal corresponding to the SFE 606 (or vice versa) to establish the connection between the ERP application 130 and SFE 606 or otherwise register the ERP application 130 and SFE 606. The SFE 606 may receive the invoice data 5002 from the ERP application 130 at various intervals (e.g., weekly, monthly, quarterly, on demand, etc.). The invoice data 5002 may include, at least, payment amounts, recipient identifiers, and payment types. The administrator may define or configure the payment type for invoices received from respective recipients. For example, the administrator may set default payment types (e.g., ACH, check, virtual credit card, etc.) for a given recipient using the ERP application 130. The invoice data 5002 may include data corresponding to invoices due to several different recipients. As such, the invoice data 5002 may include invoices having different payment amounts, different recipient identifiers, and different payment types.

At step 5104, the SFE 606 may determine whether any recipients are enrolled in a second payment type. The second payment type may be or include a virtual card payment type. The SFE 606 may determine whether any recipients are enrolled in the second payment type using the recipient identifier from the invoice data 5002 received at step 5102. For example, the SFE 606 may parse the invoice data 5002 to extract the recipient identifiers included in the invoice data. The SFE 606 may access the database 5004 to perform a look-up function using the extracted recipient identifiers to determine whether any of the recipient identifiers are linked or otherwise associated with a status indicating the corresponding recipient is enrolled to accept virtual card payments (e.g., the second payment type). Where the SFE 606 determines that a given recipient is enrolled in (e.g., enrolled to accept payments via) the second payment type, the method 5100 may proceed to step 5108. On the other hand, where the SFE 606 determines that no recipients corresponding to the invoice data 5002 received at step 5102 are enrolled in the second payment type, the method 5100 may proceed to step 5106 where the method 5100 ends (or loops back to step 5102 at a subsequent point in time for a subsequent iteration of the method 5100).

At step 5108, the SFE 606 may identify invoices corresponding to the recipient. In some embodiments, the SFE 606 may identify invoices corresponding to the recipient which is enrolled to accept virtual card payments. In some embodiments, the SFE 606 may identify the invoices using the recipient identifier for the recipient which was identified at step 5104. For example, the SFE 606 may apply a filter to the invoice data 5002 using the recipient identifier for the recipient which is enrolled in the second payment type to identify invoices which are associated with the recipient. In some embodiments, the SFE 606 may identify the invoices corresponding to the recipient by performing an API call to the ERP application 130 using the recipient identifier and a date range (e.g., last six months, last year, etc.) to identify one or more invoices paid by the buyer to the recipient. As such, the SFE 606 may identify at least one invoice from the invoice data 5002 received at step 5102 and may, in some implementations, identify further invoices for the recipient from the ERP application 130.

At step 5110, the SFE 606 may compute a difference between values. In some embodiments, the SFE 606 may compute a difference between a first value corresponding to usage of the current payment type for the invoices identified at step 5108 and a second value corresponding to usage of virtual card payments for the same invoices. The values may be different depending on various incentive-based offerings for the virtual card payments. For example, using virtual card payments may provide a percentage of the dollar value of the transaction back to the buyer (e.g., as a rebate or as redeemable points), reduced interest rates (as compared to traditional credit card payments), etc. The SFE 606 may compute a first value corresponding to payment of the invoices using the current payment type. For example, the SFE 606 may compute the first value by computing a sum of the payment amounts for each of the invoices reduced by any rewards or benefits associated with the first (or current) payment type. As one example, assuming the buyer paid ten $10,000 invoices to the recipient via a check (which does not include any benefits or invoices), the SFE 606 may compute the first value as $100,000. The SFE 606 may compute a second value corresponding to payment of the invoices using virtual card payments. Similar to the first payment type, the SFE 606 may compute the second value by computing a sum of the payment amounts for each of the invoices reduced by any rewards or benefits associated with using virtual card payments. Continuing the above example, assuming using virtual card payments has a benefit of 2% of the dollar value of transactions as a rebate to the buyer, the SFE 606 may compute the second value as $100,000 reduced by 2%, or $98,000.

At step 5112, the SFE 606 may provide a recommendation to the buyer to enroll in payments via the second payment type. In some embodiments, the SFE 606 may present a recommendation to enroll the buyer in payments via the virtual card payments on a user interface. For example, the SFE 606 may transmit a notification including the recommendation via an application corresponding to the ICS controller 104 for rendering on the first computing device 134(1) (e.g., the computing device 134(1) associated with the buyer). The computing device 134(1) may render the user interface including the recommendation to the user. In some embodiments, the SFE 606 may determine to provide the recommendation based on the comparison performed at step 5110. For example, the SFE 606 may determine to provide, transmit, send, or otherwise present the recommendation via the user interface on the first computing device 134(1) responsive to the second value being greater than the first value, responsive to the difference being greater than a threshold value (e.g., being greater than $100), and so forth.

At step 5114, the SFE 606 may determine whether the recommendation was accepted at step 5112. In some embodiments, the SFE 606 may determine whether the recommendation was accepted based on an input received from the user interface presented on the first computing device 134(1). In some embodiments, the SFE 606 may determine whether the recommendation was accepted based on a default setting associated with the account holder. For example, the SFE 606 may be configured to access the account associated with the buyer (e.g., by identifying the account with the ICS 104 which is linked to the account of the ERP application 130 from which the invoices are received) to identify a setting associated with the buyer. An administrator associated with the account holder for the buyer may select a setting to automatically enroll (or automatically accept recommendations to enroll) in virtual card payments. In some embodiments, the SFE 606 may receive a signal from the first computing device 134(1) indicating acceptance of the recommendation responsive to the user selecting a button or user interface element on the first computing device 134(1) indicating acceptance of the recommendation. Where the recommendation is accepted, the method 5100 may proceed to step 5116. However, where the recommendation is not accepted, the method 5100 may proceed back to step 5106.

At step 5116, the SFE 606 may determine whether the recipient is auto-enrolled to accept requests to accept payments via a virtual card. For example, and similar to the buyer automatically enrolling in accepting recommendations, an administrator for the recipient/supplier may access the second computing device 134(2) to update a setting indicating automatic acceptance of virtual card payments from buyers. The SFE 606 may access an account for the recipient using the recipient identifier (e.g., matching the recipient identifier with an account for the recipient for the ICS 104) to determine whether the supplier updated the setting for automatic enrollment to accept payments via virtual cards from buyers. If at step 5116, the SFE 606 determines that the recipient is automatically enrolled to accept payments via a virtual card, the method 5100 may proceed to step 5122. On the other hand, if the SFE 606 determines that the recipient is not automatically enrolled to accept payments via a virtual card, the method 5100 may proceed to step 5118.

At step 5118, the SFE 606 may present a recommendation on the second computing device 134(2). In some embodiments, the SFE 606 may present a recommendation to the recipient via the second computing device 134(2). The recommendation may be a recommendation for the recipient to enroll to accept payments from the buyer via the second payment type (e.g., via a virtual card). Step 5118 may be similar in some aspects to step 5112 described above. For example, the SFE 606 may transmit a notification to the second computing device 134(2) including the recommendation for rendering on a user interface of the second computing device 134(2). The user interface may include buttons or user interface elements for selection to indicate whether an administrator corresponding to the recipient selects to enroll to accept virtual card payments from the buyer.

At step 5120, the SFE 606 may determine whether the recommendation presented at step 5118 is accepted. Step 5120 may be similar in some aspects to step 5114. The SFE 606 may receive a signal from the second computing device 134(2) indicating whether the recommendation was selected. The SFE 606 may receive the signal responsive to selection of the user interface elements presented on the user interface of the second computing device 134(2). Where the SFE 606 receives a signal indicating acceptance of the recommendation from the second computing device 134(2), the method 5100 may proceed to step 5122. On the other hand, where the SFE 606 receives a signal indicating rejection of the recommendation from the second computing device 134(2), the method 5100 may proceed back to step 5106.

At step 5122, the SFE 606 may update an enrollment status and payment type. In some embodiments, the SFE 606 may update the enrollment status in the database 5002 associated with the recipient identifier 5006 for the recipient. The SFE 606 may update the enrollment status in the database 5002 to indicate that the recipient is accepting virtual card payments from a buyer (e.g., the buyer corresponding to the account holder associated with the ERP application 130). The SFE 606 may update the payment type settings for the ERP application 130. In some embodiments, the SFE 606 may update the payment type settings for the ERP application 130 by transmitting an API call to the ERP application 130 to trigger updating of the payment type setting associated with the recipient identifier. In some embodiments, the SFE 606 may update the payment type settings for the ERP application 130 by transmitting a signal to the ERP application 130 to trigger rendering of a notification (e.g., via the ERP application 130) indicating that the buyer and recipient accepted enrollment for payments via a virtual card. The administrator associated with the account holder may update the payment setting (e.g., manually) responsive to receiving the notification. In this regard, the SFE 606 may trigger automatic or manual updating of the payment setting at the ERP application 130. As such, when subsequent invoices are received via the ERP application 130 associated with the recipient, the ERP application 130 and/or ICS application may initiate transactions using the second payment type (e.g., virtual card payments) according to the subsequent invoice data.

Figure 52:
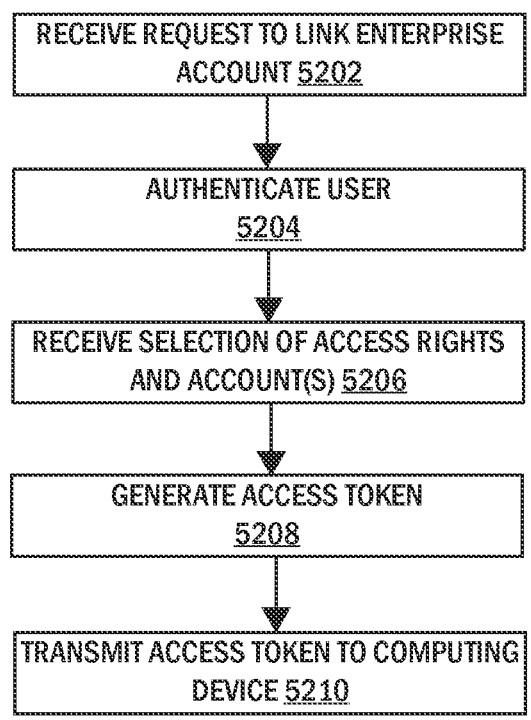
FIG. 52 is a flowchart showing an example method of providing access rights of an enterprise account to an enterprise resource, according to an exemplary embodiment.

Referring now to FIG. 52, depicted is a flowchart showing an example method 5200 of providing access rights of an enterprise account to an enterprise resource, according to an example implementation of the present disclosure. The method 5200 may be performed by the devices, components, or elements described above with reference to FIG. 1-FIG. 51. As a brief overview, at step 5202, a first computing system may receive a request to link an enterprise account. At step 5204, the first computing system may authenticate a user. At step 5206, the first computing system may receive a selection of access rights and account(s). At step 5208, the first computing system may generate an access token. At step 5210, the first computing system may transmit the access token to a computing device.

At step 5202, a first computing system may receive a request to link an enterprise account. In some embodiments, the first computing system may receive a request to link an enterprise account of the first computing system to a second computing system. The request may include log-in credentials for a user associated with the enterprise account and received via an application interface of the second computing system from a computing device of the user. The first computing system may receive the request responsive to a user associated with the enterprise account accessing the application interface of the second computing system to link the first and second computing systems. The first computing system may be or include the institution computing system 100 described above. The second computing system may be a system or server(s) associated with an enterprise resource 128. As such, and in an example embodiment, a user may access the enterprise resource 128 and launch or otherwise navigate to the application interface to establish the link between the enterprise resource 128 and enterprise account. As part of requesting establishment of the link, the user may provide log-in credentials for accessing the enterprise account of the first computing system. The log-in credentials may be or include a username and password, a key, biometric identifier, or other credentials that may be used for accessing a resource or service.

In some embodiments, as part of providing the application interface of the first computing system to the second computing system, the first computing system may provide, deploy, or otherwise incorporate a software development kit (SDK) or other application interface development logic which provides and/or maintains various state information of the application interface. For example, a first state may include pre-integration state (e.g., a state in which the application interface is not linked to any enterprise accounts), an on-going integration state (e.g., a state in which selections [e.g., received at step 5206] of access rights and accounts have been made), and an integration complete state (e.g., a state in which an access token has been generated for the integration). As described in greater detail below, the first computing system and/or application interface may update the state of the application interface responsive to completion of various steps. As the state of the application interface is updated, different user interfaces may be rendered/renderable via the application interfaces. As such, the application interface may accurately reflect whether the enterprise account has been previously linked, is currently being linked, or has never been linked to the second computing system.

At step 5204, the first computing system may authenticate a user. In some embodiments, the first computing system may authenticate the user based on the log-in credentials from the request matching log-in credentials associated with the enterprise account. The first computing system may extract or otherwise identify the log-in credentials from the request (e.g., received at step 5202). The first computing system may authenticate the user by performing a look-up function using the log-in credentials, to determine whether the request for the log-in credentials matches credentials for the account. For example, where the log-in credentials include a username and password, the first computing system may determine whether the username matches a username linked to the first account, and (responsive to determining a match) that the password matches the password for the username. Where the first computing system authenticates the use, the method 5200 may proceed to step 5206.

At step 5206, the first computing system may receive a selection of access rights and account(s). In some embodiments, as part of establishing the link responsive to the request, the first computing system may display or provide available accounts and access rights for display on a user interface of the computing device. For example, the first computing system may share, transmit, or otherwise send identifiers associated with available accounts to the computing device for display on a user interface of the enterprise resource, as part of configuring the link. The user may select which accounts from the available accounts are to be accessible via, on, or through the enterprise resource. Similarly, the first computing system may send available actions or access rights for each of the respective accounts. The user may select access rights for each of the selected accounts. In this regard, the first computing system may receive a selection of one or more access rights, and one or more accounts of the enterprise account, via the application interface of the second computing device.

In various instances, the user may select (and the first computing system may receive) selections of some but not all accounts that are accessible via the interface and/or some but not all access rights. For example, the first computing system may receive access rights that grant the second computing system access to a first account of the one or more accounts and blocks access to a second account of the one or more accounts. Similarly, the first computing system may receive access rights that grant the second computing system access to first data of a first type of an account, and may also deny access of second data of a second type. In this regard, as part of configuring the link between the enterprise account and second computing system, the first computing system may receive selections of various access rights that set or define access to various accounts including (but not limited to) access to specific types of data of the accounts and/or actions which may be performed on the respective data (together referred to as access rights).

Upon selecting the access rights and accounts of which the first computing system is providing access to the second computing system, the first computing system and/or application interface may update the state of the application interface (e.g., from the first state to the second state). Upon updating the state of the application interface, the first computing system may generate, create, establish, derive, or otherwise determine an authentication code for the first computing device. As such, the first computing system may generate the authentication code responsive to receiving the selection of the access rights and/or accounts. The authentication code may be generated as unique to the particular application interface, and specific to the computing device which provided the selections. The authentication code may be an alphanumeric code, a random code, etc. which the first computing system generates specifically for the client device and the application interface. The authentication code may have an expiration duration such that the authentication code is only valid for a particular duration. The first computing system may transmit, send, or otherwise provide the authentication code to the computing device (e.g., which provided the selections). The first computing system any provide the authentication code to the computing device responsive to generating the authentication code, responsive to updating the state of the application interface, etc.

At step 5208, the first computing system may generate an access token. In some embodiments, the first computing system may generate the access token for transmitting to the computing device (e.g., which sent the request at step 5202). The first computing system may generate the access token based on the access rights and the account(s) received or identified based on the selection(s) at step 5206. In some embodiments, the first computing system may generate the access token by encoding or encrypting the access rights and identifying information of the selected account using one or more encryption mechanisms (e.g., a public-private key, one or more cryptographic protocols, etc.). In this regard, the access token may identify the access rights and accounts which were selected at step 5206.

In some embodiments, the first computing system may generate the access token responsive to a request to generate the access token. For example, the computing device may transmit a request to the first computing system, for the first computing system to generate the access token. The request may include the authentication code generated by the first computing system for the computing device and application interface. The first computing system may receive the request and validate the authentication code. The first computing system may validate the authentication code by determining that the authentication code has not yet expired (e.g., based on the expiration duration and current time). The first computing system may validate the authentication code based on an identifier for the computing device and/or application interface matching a corresponding identifier of the authentication code (e.g., encoded in the authentication code, or linked at the first computing system to the authentication code). The first computing system may generate the access token responsive to validating the authentication code.

At step 5210, the first computing system may transmit the access token to a computing device. In some embodiments, the first computing system may transmit the access token to the computing device (e.g., which sent the request at step 5202), to provide the computing device access to the one or more accounts according to the one or more access rights, of the first computing system, via the second computing system. In some embodiments, following transmitting the access token, the first computing system and/or application interface may update the state of the application interface to reflect completion of integration. As such, following the user accessing a resource (e.g., enterprise resource) of the second computing system, the user may request data associated with the enterprise account from the first computing system. Upon requesting such data, the second computing system and/or computing device may transmit the access token (e.g., primary and/or secondary access token described below) received from the first computing system (e.g., together with an API call or some other request for data). The first computing system may validate the access token and transmit a response to the data request, responsive to the access token indicating that the data may be shared according to the access rights.

In some embodiments, the first computing system may transmit secondary access tokens together with the access token, for sharing, transmitting, or otherwise forwarding to other users associated with the enterprise account. For example, the first computing system may receive a user dataset including identifiers associated with a plurality of users of the enterprise. The first computing system may apply a filter based on titles (e.g., job titles or roles) to the user dataset, to identify users likely having access to the enterprise account data. The first computing system may generate secondary access tokens to the subset of users, for transmitting to the computing device. Additionally or alternatively, the first computing system may transmit identifiers associated with the subset of users to the computing device, which recommend granting secondary access tokens to the subset of users.

In some embodiments, the first computing system may receive a request to determine or identify various access rights identified in the access token. For example, the first computing system may receive the request by another computing device, following the first computing device completing integration of the first computing system with the second computing system. The request may include the access token, a client identifier of the second computing device and a secret associated with the access token. The secret may be a unique code or identifier associated with the enterprise account maintained by the first computing system and known to at least some end-users of the enterprise account. In some embodiments, the secret may be or include a public key associated with the enterprise account. The first computing system may determine that the second computing device is associated with the first computing device based on the client identifier of the second computing device. For example, the client identifier may be included in a list of known client identifiers to the first computing system as being associated with the enterprise account (e.g., similar to the user dataset). The first computing system may generate a message for transmission to the second computing device responsive to determining that the second computing device is associated with the first computing device. The message may include data corresponding to a payload of the access token determined using the secret associated with the access token. For instance, the first computing system may decrypt or otherwise determine the payload of the access token based on or using the secret associated with the access token. As noted above, the payload may identify the access rights and/or the account(s) identified in the access token. The payload may further identify, in various embodiments, the client identifier associated with the user of the first computing device which provided the selection of the one or more access rights and the one or more accounts. In this regard, the first computing system may generate the message to include data corresponding to the payload, which may include the access right(s), account(s), and identify the user which granted such access right(s) and account(s).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quadcore processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed:

1. A method comprising:

receiving, by a first computing system, a request to link an enterprise account of the first computing system to a second computing system, the request including log-in credentials for a user associated with the enterprise account and received via an application interface of the second computing system from a computing device of the user;

authenticating, by the first computing system, the user based on the log-in credentials from the request matching log-in credentials associated with the enterprise account;

receiving, by the first computing system, a selection of one or more access rights, and one or more accounts of the enterprise account, via the application interface of the second computing system;

generating, by the first computing system, an access token for transmission to the computing device, the access token identifying the one or more access rights and the one or more accounts; and transmitting, by the first computing system, the access token to the computing device, to provide the computing device access to the one or more accounts according to the one or more access rights, of the first computing system, via the second computing system.

2. The method of claim 1, further comprising:

receiving, by the first computing system, a second request for data of the enterprise account from the second computing system, the second request including the access token;

validating, by the first computing system, the access token based on the access token of the second request matching the access token associated with the enterprise account; and transmitting, by the first computing system, the data of the enterprise account to the second computing system responsive to validating the access token.

3. The method of claim 2, further comprising determining, by the first computing device, that the second request originates from a permitted user having at least one access right of the one or more access rights identified by the access token, wherein transmitting the data of the enterprise account is responsive to validating the access token and determining that the second request originates from the permitted user.

4. The method of claim 1, wherein the access token is a primary access token, the method further comprising:

receiving, by the first computing system, a secondary access token from the second computing system, the secondary access token granted to a second user associated with the enterprise account and having access rights defined under the primary access token; and transmitting, by the first computing system, data of the enterprise account to the second computing system according to the secondary access token.

5. The method of claim 4, further comprising:

determining, by the first computing system, one or more second users including the second user having a title associated with the one or more access rights of the primary access token; and transmitting, by the first computing system, identifiers associated with the one or more second users including the second user, to recommend granting respective secondary access tokens to the one or more secondary users.

6. The method of claim 1, wherein the one or more access rights grant the second computing system access to a first account of the one or more accounts and blocks access to a second account of the one or more accounts.

7. The method of claim 1, wherein the one or more access rights grant the second computing system access to first data of a first type of an account of the one or more accounts and deny the second computing system access to second data of a second type of the account.

8. The method of claim 1, wherein the application interface comprises a plug-in application for the first application, accessed by the computing device through the second application.

9. The method of claim 1, further comprising maintaining, by the first computing system a state of the application interface while the application interface is used to link the enterprise account of the first computing system and the second computing system.

10. The method of claim 1, further comprising:

generating, by the first computing system, an authentication code responsive to receiving the selection of the one or more access rights;

transmitting, by the first computing system, the authentication code to the application interface executing on the computing device; and receiving, by the first computing system, a request for an access token from the application interface, the request including the authentication code.

11. The method of claim 10, wherein generating the access token is responsive to the authentication code included in the request matching the authentication code generated and transmitted to the application interface.

12. The method of claim 1, further comprising:

receiving, by the first computing system, from a second computing device, a request to identify the one or more access rights identified in the access token, the request including the access token, a client identifier of the second computing device and a secret associated with the access token;

determining, by the first computing system, that the second computing device is associated with the first computing device based on the client identifier of the second computing device; and generating, by the first computing system, a message for transmission to the second computing device, the message including data corresponding to a payload of the access token determined using the secret associated with the access token, the payload identifying the access rights identified in the access token.

13. The method of claim 12, wherein the payload further comprises an identifier associated with a user of the first computing device which provided the selection of the one or more access rights and the one or more accounts.

14. A system comprising:

one or more hardware processors of a first computing system, the one or more hardware processors configured to:

receive a request to link an enterprise account of the first computing system to a second computing system, the request including log-in credentials for a user associated with the enterprise account and received via an application interface of the second computing system from a computing device of the user;

authenticate the user based on the log-in credentials from the request matching log-in credentials associated with the enterprise account;

receive a selection of one or more access rights, and one or more accounts of the enterprise account, via the application interface of the second computing system;

generate an access token for transmission to the computing device, the access token identifying the one or more access rights and the one or more accounts; and transmit the access token to the computing device, to provide the computing device access to the one or more accounts according to the one or more access rights, of the first computing system, via the second computing system.

15. The system of claim 14, wherein the one or more hardware processors are configured to:

receive a second request for data of the enterprise account from the second computing system, the second request including the access token;

validate the access token based on the access token of the second request matching the access token associated with the enterprise account; and transmit the data of the enterprise account to the second computing system responsive to validating the access token.

16. The system of claim 15, wherein the one or more hardware processors are configured to determine that the second request originates from a permitted user having at least one access right of the one or more access rights identified by the access token, wherein transmitting the data of the enterprise account is responsive to validating the access token and determining that the second request originates from the permitted user.

17. The system of claim 14, wherein the application interface comprises a plug-in application for the first application, accessed by the computing device through the second application.

18. The system of claim 14, wherein the one or more hardware processors are further configured to:

generate an authentication code responsive to receiving the selection of the one or more access rights;

transmit the authentication code to the application interface executing on the computing device; and receive a request for an access token from the application interface, the request including the authentication code, the one or more hardware processors generate the access token responsive to the authentication code included in the request matching the authentication code generated and transmitted to the application interface.

19. The system of claim 14, wherein the one or more hardware processors are further configured to:

receive, from a second computing device, a request to identify the one or more access rights identified in the access token, the request including the access token, a client identifier of the second computing device and a secret associated with the access token;

determine that the second computing device is associated with the first computing device based on the client identifier of the second computing device; and generate a message for transmission to the second computing device, the message including data corresponding to a payload of the access token determined using the secret associated with the access token, the payload identifying the access rights identified in the access token and comprising an identifier associated with a user of the first computing device which provided the selection of the one or more access rights and the one or more accounts.

20. A non-transitory computer readable medium storing instructions that, when executed by one or more processors, cause the one or more processors to:

receive a request to link an enterprise account of a first computing system to a second computing system, the request including log-in credentials for a user associated with the enterprise account and received via an application interface of the second computing system from a computing device of the user;

authenticate the user based on the log-in credentials from the request matching log-in credentials associated with the enterprise account;

receive a selection of one or more access rights, and one or more accounts of the enterprise account, via the application interface of the second computing system;

generate an access token for transmission to the computing device, the access token identifying the one or more access rights and the one or more accounts; and transmit the access token to the computing device, to provide the computing device access to the one or more accounts according to the one or more access rights, of the first computing system, via the second computing system.

* * * * *